US008758114B2

(12) United States Patent
Itagaki et al.

(10) Patent No.: US 8,758,114 B2

(45) Date of Patent: Jun. 24, 2014

(54) GAMING MACHINE AND CONTROL METHOD THEREOF

(75) Inventors: Takehisa Itagaki, Koto-ku (JP); Masahiko Konishi, Koto-ku (JP); Masaya Honda, Koto-ku (JP); Masahiro Yoshida, Koto-ku (JP); Hiroki Saito, Koto-ku (JP); Kazumasa Yoshizawa, Koto-ku (JP); Hiroki Nakamura, Koto-ku (JP); Kenta Sugano, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 827 days.

(21) Appl. No.: 12/878,622

(22) Filed: Sep. 9, 2010

(65) Prior Publication Data

US 2011/0059788 A1 Mar. 10, 2011

(30) Foreign Application Priority Data

Sep. 10, 2009 (JP) ................................ 2009-209667

(51) Int. Cl.
*A63F 13/00* (2014.01)

(52) U.S. Cl.
USPC .................................. 463/20; 463/16; 463/25

(58) Field of Classification Search
USPC ................................................ 463/16, 20, 25
See application file for complete search history.

(56) References Cited

U.S. PATENT DOCUMENTS

| | | | | |
|---|---|---|---|---|
| 6,561,902 | B1 * | 5/2003 | Walker et al. | 463/25 |
| 2004/0162132 | A1 * | 8/2004 | Jaffe et al. | 463/20 |
| 2008/0004105 | A1 * | 1/2008 | Cregan et al. | 463/20 |
| 2008/0146316 | A1 * | 6/2008 | Yoshizawa | 463/20 |
| 2008/0254894 | A1 * | 10/2008 | Michaelson et al. | 463/42 |
| 2009/0104973 | A1 | 4/2009 | Kato | |

* cited by examiner

*Primary Examiner* — James McClellan
(74) *Attorney, Agent, or Firm* — Lexyoume IP Meister, PLLC

(57) ABSTRACT

A gaming machine executes a process with new entertainability. The game executes a normal game accepting an input of selecting any of the plurality of the specific symbols stop-displayed, in response to a fact that a plurality of the specific symbols are stop-displayed, in the normal game executed. A benefit is awarded according to the specific symbols selected. Whether or not to generate a specific game state is determined, in response to the specific symbols selected. An input of selecting a specific symbol other than the specific symbol previously selected is accepted from among the plurality of specific symbols stop-displayed, in response to a fact that it is determined that the specific game state has been generated. A benefit is awarded according to the specific symbol selected in the last processing.

7 Claims, 73 Drawing Sheets

FIG. 25

| Combination No. | Symbol | Kind | Combination | | | | | Weight |
|---|---|---|---|---|---|---|---|---|
| | | | R1 | R2 | R3 | R4 | R5 | |
| 1: | WILD | 5K | WILD | WILD | WILD | WILD | WILD | 1 |
| 2: | WILD | 4K | | WILD | WILD | WILD | WILD | 5 |
| 3: | WILD | 4K | WILD | | WILD | WILD | WILD | 5 |
| 4: | WILD | 4K | WILD | WILD | | WILD | WILD | 5 |
| 5: | WILD | 4K | WILD | WILD | WILD | | WILD | 5 |
| 6: | WILD | 4K | WILD | WILD | WILD | WILD | | 5 |
| 7: | WILD | 3K | | | WILD | WILD | WILD | 10 |
| 8: | WILD | 3K | | WILD | | WILD | WILD | 10 |
| 9: | WILD | 3K | | WILD | WILD | | WILD | 10 |
| 10: | WILD | 3K | | WILD | WILD | WILD | | 10 |
| 11: | WILD | 3K | WILD | | | WILD | WILD | 10 |
| 12: | WILD | 3K | WILD | | WILD | | WILD | 10 |
| 13: | WILD | 3K | WILD | | WILD | WILD | | 10 |
| 14: | WILD | 3K | WILD | WILD | | | WILD | 10 |
| 15: | WILD | 3K | WILD | WILD | | WILD | | 10 |
| 16: | WILD | 3K | WILD | WILD | WILD | | | 10 |
| 17: | WILD | 2K | | | | WILD | WILD | 100 |
| 18: | WILD | 2K | | | WILD | | WILD | 100 |
| 19: | WILD | 2K | | | WILD | WILD | | 100 |
| 20: | WILD | 2K | | WILD | | | WILD | 100 |
| 21: | WILD | 2K | | WILD | | WILD | | 100 |
| 22: | WILD | 2K | | WILD | WILD | | | 100 |
| 23: | WILD | 2K | WILD | | | | WILD | 100 |
| 24: | WILD | 2K | WILD | | | WILD | | 100 |
| 25: | WILD | 2K | WILD | | WILD | | | 100 |
| 26: | WILD | 2K | WILD | WILD | | | | 100 |
| 27: | WILD | 1K | | | | | WILD | 165 |
| 28: | WILD | 1K | | | | WILD | | 165 |
| 29: | WILD | 1K | | | WILD | | | 165 |
| 30: | WILD | 1K | | WILD | | | | 165 |
| 31: | WILD | 1K | WILD | | | | | 165 |
| Total | - | - | - | - | - | - | - | 1951 |

GAMING MACHINE AND CONTROL METHOD THEREOF

CROSS-REFERENCE TO RELATED APPLICATIONS

This application is based on and claims a priority from the prior Japanese patent Application No. 2009-209667 filed on Sep. 10, 2009, the entire contents of which are incorporated herein by reference.

BACKGROUND OF THE INVENTION

1. Technical Field

The present invention relates to a gaming machine and a gaming machine control method.

2. Background Art

Conventionally, among gaming machines such as slot machines, there exist the ones in which when a predetermined condition is established (for example, when bonus symbols are displayed in a stopped state), a bonus is awarded. There are known, for example, gaming machines adapted to award gaming media such as coins or gaming machines adapted to execute a special game such as a free game in response to the fact that a predetermined condition is established.

Among such gaming machines adapted to award a bonus, there exist the ones in which: a plurality of bonuses are awarded; one bonus is selected from among the plurality of bonuses in response to the fact that a player has operated an input device such as buttons, and the selected bonus is awarded (see United State Application Publication No. 2009/0104973).

SUMMARY OF THE INVENTION

In the gaming machines in which a plurality of bonuses are provided, as described above, a player generally plays a game while holding a great interest as to types of the plurality of bonuses and selection of these bonuses.

The inventor, et al., came up with an idea that new entertainability may be created by adding new features in respect of the selection of the plurality of bonuses.

Namely, in the filed of game machines, as described above, there exist gaming machines in which a plurality of bonuses are provided, whereas the player-held impression, i.e., a change in the player's emotion differs depending on with what timing or sequence to execute such bonuses. In general, an emotion can be biologically and physiologically systemized as represented by an Emotion Ring of Plutchik. In order to cause a player to enjoy a game over a long period of time, it is preferable to continuously enhance emotions such as excitement, curiosity, desire, expectation, for example, among a variety of emotions. For that purpose, it becomes important how well a game can stimulate the player's feeling and how well a game can control the player's emotion. The stimuli to players by way of gaming machines include: a visual stimulus by way of video image or electrical decoration; an acoustic stimulus by way of voice; a stimulus by way of the contents of games or the like, for example. In the field of game, it is preferable to control the player's emotion and enjoy a game over a long period of time by combining game elements with each other in the collaboration of hardware and software. Stimuli are technical matters studied in psychophysics or the like, as exemplified in Weber-Fechner law or Steven's power law and the like. It is a technical issue in the field of gaming machines to impart a stimulus to a human being and control a human emotion by way of an output by the collaboration between hardware and software. The present invention attains a technical effect that the player's emotion is controlled in the gaming field, thereby making it possible to continue emotions such as players' excitement, curiosity, desire, or expectation to games, to hold a sense of expectation, to hold an interest relative to the contents of games, or to drive players to be engaged in the play of game. This technical effect leads to creation of new entertainability, and in turn, it is possible to prompt players to play game(s) over a long period of time.

It is an object of the present invention to provide a gaming machine with new entertainability and a gaming machine control method.

In order to achieve the above-described object, the present invention provides the following inventions of (1) to (7).

The invention of (1) includes the inventions of (1-1) to (1-8) sub-classified below.

The invention of (1-1) is directed to a gaming machine, comprising:

a symbol display device which is capable of variably displaying a plurality of symbols;

an input device which is capable of inputting an instruction related to a game; and a controller programmed to execute processing of:

(A) executing a normal game in which the symbol display device variably displays and then stop-displays the symbols;

(B) accepting in the input device an input of selecting any of the plurality of specific symbols stop-displayed, in response to a fact that a plurality of specific symbols are stop-displayed in the normal game executed in accordance with the processing (A);

(C) awarding a benefit according to the selected specific symbol in the processing (B);

(D) determining whether or not to generate a specific game state, in accordance with the selected specific symbol in the processing (B);

(E) accepting in the input device an input of selecting specific symbols other than the selected specific symbol in the processing (B), from among the plurality of specific symbols stop-displayed, in response to a fact that it is determined that the specific game state is generated in the processing (D); and (F) awarding a benefit according to the selected specific symbol in the processing (E).

According to the invention of (1-1), in response to the fact that a plurality of specific symbols (for example, three specific symbols) are stop-displayed in a normal game, a player can select any of the plurality of specific symbols stop-displayed, via an input device. A benefit according to the selected specific symbol is then awarded. For example, in a case where a predetermined payment symbol is selected, a predetermined payment (gaming media such as coins) is awarded. On the other hand, random numbers, for example, are extracted according to the selected specific symbol (for example, when a predetermined payment symbol is selected), thereby determining whether or not to generate a specific game state. In response to the fact that the specific game state is determined to be generated (for example, in a case where the extracted random numbers are within a specific numeric range), the player can further select a specific symbol other than the selected specific symbol via an input device. The benefit according to the selected specific symbol is then awarded. Even if no gaming media is betted, for example, a free game is executed which is a game in which the symbol display device variably displays and then stop-displays the symbols. Namely, in a case where a specific game state is generated, the player can acquire the benefit according to the specific symbols twice. Therefore, the great satisfaction can be imparted to a player. Further, it is possible to cause the player to hold a great sense of expectation to the possibility that such a specific game state is generated. The first-selected specific symbol is associated with the generation of the specific game state. Therefore, it is possible to cause the player to hold a great interest as to what kind of specific symbol is first selected. Further, the player can enjoy every minute of a specific symbol selection. In response to the fact that a plurality of specific symbols are stop-displayed in a normal game, it is possible to select any of such specific symbols. Therefore, the player can play the normal game while expecting that a plurality of specific symbols are stop-displayed. In this manner, it is possible to drive the player to be engaged in the game.

The invention of (1-2) is directed to the gaming machine of (1-1), wherein the processing (D) includes processing of determining a specific game state at a probability according to the selected specific symbol in the processing (B).

The processing (D) can include processing of (i) or (ii), for example:

(i) determining whether or not to generate a specific game state on condition that a predetermined specific symbols is selected; or (ii) determining whether or not to generate a specific game state, based on a random number table, in which types of specific symbols each are associated with a numeric range within which random numbers are allowable to be, and the extracted random numbers.

The predetermined specific symbols in the processing (i) can include predetermined payment symbol, for example. Data indicating the random number table in the processing (ii) is stored in a memory included in a gaming machine. According to the invention of (1-2), the first-selected specific symbols are associated with whether or not a specific game state is generated or at a probability at which a specific game state takes place. Therefore, a player can hold a further great interest relative to what kind of specific symbol is first selected.

The invention of (1-3) is directed to the gaming machine of (1-1), wherein the controller is further programmed to execute processing of (G) awarding a predetermined payment in response to the fact that a predetermined payment symbol is selected in the processing (B), and the processing (D) is processing of determining whether or not to generate a specific game state, in response to the fact the predetermined payment symbol is selected in the processing (B).

According to the invention (1-3), a specific game state can be generated only in a case where the first-selected specific symbol is a predetermined payment symbol. Therefore, a player can hold an interest as to whether or not the first-selected specific symbol is a predetermined payment symbol. When the first-selected specific symbol is a predetermined payment symbol, for example, if a specific game state is generated, a benefit (for example, a free game) is further awarded in addition to a predetermined payment. If no specific game state takes place, only the predetermined payment is awarded, and the benefit such as a free game is not awarded. When the first-selected specific symbol is a specific symbol other than the predetermined payment symbol (for example, a free game symbol) the benefit according to the specific symbol (for example, a free game) is awarded, whereas the predetermined payment is not awarded. Therefore, it is possible to create a situation causing the player to think about whether the predetermined payment symbol is desirable as the first-selected specific symbol or any specific symbol other than the predetermined payment symbol (for example, a free game symbol). In this manner, it is possible to drive the player to be engaged in the game.

The invention of (1-4) is directed to a gaming machine control method, comprising the steps of:

(A) a controller executing a normal game in which a symbol display device which is capable of variably displaying a plurality of symbols variably displays and then stop-displays the symbols;

(B) the controller accepting in an input device which is capable of inputting an instruction related to a game an input of selecting any of the plurality of specific symbols stop-displayed, in response to a fact that a plurality of specific symbols are stop-displayed in a normal game executed in the step (A);

(C) the controller awarding a benefit according to the selected specific symbol in the step (B);

(D) the controller determining whether or not to generate a specific game state in accordance with the selected specific symbol in the step (B);

(E) the controller accepting in the input device an input of selecting a specific symbol other than the selected specific symbol in the step (B), from among the plurality of specific symbols stop-displayed, in response to a fact that it is determined that the specific game state is generated in the step (D); and (F) the controller awarding a benefit according to the selected specific symbol in the step (E).

According to the invention of (1-4), in response to the fact that a plurality of specific symbols (for example, three specific symbols) are stop-displayed in a normal game, a player can select any of the plurality of specific symbols stop-displayed, via an input device. A benefit according to the selected specific symbol is then awarded. In a case where a predetermined payment symbol is selected, for example, a predetermined payment (gaming media such as coins) is awarded. On the other hand, random numbers, for example, are extracted according to the selected specific symbol (for example, when a predetermined payment symbol is selected), thereby determining whether or not to generate a specific game state. In response to the fact that the specific game state is determined to be generated (for example, in a case where the extracted random numbers are within a predetermined numeric range), the player can further select a specific symbol other than the selected specific symbol. The benefit according to the selected specific symbol is then awarded. For example, even if no gaming media is betted, a free game is executed as a game in which the symbol display device variably displays and then stop-displays the symbols. Namely, in a case where a specific game state is generated, the player can acquire the benefit according to the specific symbols twice. Therefore, the great satisfaction can be imparted to a player. Further, it is possible to cause the player to hold a great sense of expectation to the possibility that such a specific game state is generated. The first-selected specific symbols are associated with the generation of the specific game state. Therefore, it is possible to cause the player to hold a great interest as to what kind of specific symbol is first selected. Further, the player can enjoy every minute of a specific symbol selection. In response to the fact that plurality of specific symbols are stop-displayed in a normal game, it is possible to select any of such specific symbols. Therefore, the player can play the normal game while expecting that a plurality of specific symbols are stop-displayed. In this manner, it is possible to drive the player to be engaged in the game.

The invention (1-5) is directed to the gaming machine of (1-1), wherein the controller is programmed to execute the processing of:

(B) in the normal game executed in the processing (A), in response to a fact that a plurality of specific symbols including a payment symbol is displayed, accepting in the input device an input of selecting any of the plurality of specific symbols stop-displayed;

(C) awarding a payment according to the payment symbol, in a case where a payment symbol is selected in the processing (B);

(D) determining whether or not to generate a specific game state, in a case where the payment symbol is selected in the processing (B); and (E) accepting in the input device an input of selecting a specific symbol other than the selected payment symbol in the processing (B), from among the plurality of specific symbols stop-displayed in accordance with the processing (A), in response to a fact that it is determined that the specific game state is generated in the processing (D).

The invention (1-6) is directed to the gaming machine of (1-5), wherein the benefits of different kinds are associated with the plurality of specific symbols stop-displayed in accordance with the processing (B).

The invention (1-7) is directed to the gaming machine of (1-5) or (1-6), wherein among the plurality of specific symbols stop-displayed in accordance with the processing (B), execution of a special game other than a normal game is associated with a specific symbol other than a payment symbol, as a benefit to be awarded in a case where the specific symbol is selected in the processing (B).

The invention (1-8) is directed to the gaming machine of (1-7), wherein:

the special game include at least one kind of game of a predetermined number of free games and a feature game;

the free game is a game in which even if no gaming media is betted, a symbol display device variably displays and then stop-displays the symbols; and the feature game is a game in which an input of selecting any option from among a plurality of options is accepted from an input device, and then, award a benefit associated with the selected option by the input.

The invention of (2) includes the inventions of (2-1) to (2-6) sub-classified below.

The invention of (2-1) is directed to a gaming machine, comprising:

a symbol display device which is capable of variably displaying and stop-displaying a plurality of symbol; and a controller programmed to execute processing of:

(A) determining symbols to be stop-displayed in the symbol display device;

(B) determining whether or not a determined symbol is included in the symbols determined to be stop-displayed in predetermined display regions provided in the symbol display device, from among the symbols determined in accordance with the processing (A);

(C) determining whether or not to generate a specific game state, in a case where it is determined that the predetermined symbol is not included in the processing (B);

(D) replacing one of the symbols displayed on the symbol display device with a WILD symbol substitutable for another symbol, in response to a fact that it is determined that the specific game state is generated in the processing (C);

(E) awarding a payment based on the WILD symbol replaced with in accordance with the processing (D); and (F) awarding a predetermined benefit, based on the predetermined symbols stop-displayed, in a case where the predetermined symbols are stop-displayed in the symbol display device.

Conventionally, there exist gaming machines in which a benefit is awarded to a player, in a case where a symbol display device stop-displays predetermined symbols. Among such gaming machines, United State Patent Application Publication No. 2007/0066389 discloses a gaming machine in which, in a case where a WILD symbol is stop-displayed, the WILD symbol is extended or expanded, and based on the extended or expanded WILD symbol, a benefit is awarded to the player. In addition, United State Patent Application Publication No. 2008/0045305 discloses a gaming machine, in a case where symbols of same kinds are rearranged at both ends of two paylines as diagonal line, a WILD symbol or the like is rearranged on a crossing point of the diagonal line. Further, United State Patent Application Publication No. 2006/0046831 discloses a gaming machine in which stop-displayed symbols are changed to WILD symbols, and then, a payment is made based on a combination of the changed WILD symbols. In such a gaming machine, the player plays a game while expecting that predetermined symbols such as WILD symbols are stop-displayed.

In contrast, according to the invention of (2-1), a specific game state can take place on condition that a predetermined symbol is not included in symbols determined to be stop-displayed in predetermined display regions (for example, regions corresponding to one of five reels). If the specific game state takes place, one of the symbols displayed on the symbol display device is replaced with a WILD symbol, and a payment is awarded based on the WILD symbol replaced with. The WILD symbol is a symbol which is substitutable for another symbol, and a payment can increase accordingly. Further, according to the invention of (2-1), the payment based on such WILD symbols can be performed in a case where it is determined that a predetermined symbol is not stop-displayed in a predetermined display region. Therefore, a player can hold a certain sense of expectation relative to the fact that the predetermined symbol is not stop-displayed in the predetermined display region.

According to the invention of (2-1), in a case where predetermined symbols are stop-displayed, a predetermined benefit is awarded based on the predetermined symbols stop-displayed. Therefore, the fact that the predetermined symbols are stop-displayed is beneficial for players. Thus, it is possible to cause the player to think about whether or not the predetermined symbols are to be stop-displayed in the predetermined display regions. It is also possible to drive the player to be engaged in the game. It is further possible to cause a player, who is disappointed with the fact that the predetermined benefit could not be acquired because predetermined symbols were not stop-displayed, to expect the fact that a specific game state takes place. In a case where the specific game state takes place and the payment based on the WILD symbols is then awarded, an unexpected sense of satisfaction can be imparted to the player.

The invention of (2-2) is directed to a gaming machine, comprising:

a symbol display device which is capable of scroll-displaying a plurality of symbol arrays comprised of a plurality of symbols in each symbol array display region; and a controller programmed to execute processing of:

(A) determining symbols to be stop-displayed in the symbol display device;

(B) determining whether or not a predetermined symbol is included in the symbols determined to be stop-displayed in the predetermined symbol array display regions, among the symbols determined in accordance with the processing (A);

(C) determining whether or not to generate a specific game state, in a case where it is determined that the predetermined symbol is not included in the processing (B);

(D) replacing all symbols configuring one or more symbol arrays with WILD symbols substitutable for other symbols, in response to a fact that it is determined that the specific game state is generated in the processing (C);

(E) awarding a payment based on the WILD symbol replaced with in accordance with the processing (D); and (F) awarding a predetermined benefit, based on the predetermined symbols stop-displayed, in a case where the predetermined symbols are stop-displayed in the symbol display device.

According to the invention of (2-2), a specific game state can take place on condition that a predetermined symbol is not included in the symbols determined to be stop-displayed in predetermined symbol array display regions (for example, the region corresponding to one of five reels). If the specific game state takes place, one of the symbols displayed on the symbol display device are replaced with a WILD symbol, and a payment is awarded based on the WILD symbol replaced with. The WILD symbol is a symbol substitutable for another symbol, and a payment can increase accordingly. Further, according to the invention of (2-2), the payment based on such WILD symbols can be performed in a case where the predetermined symbols are not stop-displayed in the predetermined symbol array display regions. Therefore, a player can hold a certain sense of expectation relative to the fact that the predetermined symbols are not stop-displayed in the predetermined symbol array display regions.

According to the invention of (2-2), in a case where predetermined symbols are stop-displayed, a predetermined benefit is awarded based on the predetermined symbols stop-displayed. Therefore, the fact that the predetermined symbols are stop-displayed is beneficial for players. Thus, it is possible to cause the player to think about whether or not the predetermined symbols are to be stop-displayed in the predetermined symbol array display regions. It is also possible to drive the player to be engaged in the game. It is further possible to cause a player, who is disappointed with the fact that the predetermined benefits could not be acquired because predetermined symbols were not stop-displayed, to expect the fact that a specific game state takes place. In a case where the specific game state takes place and the payment based on the WILD symbols is then awarded, an unexpected sense of satisfaction can be imparted to the player.

Further, according to the invention of (2-2), all symbols configuring symbol arrays are replaced with WILD symbols. The number of WILD symbols after replaced can be very large, and thus, a player can acquire a very large amount of gaming media in accordance with a payment based on the WILD symbols. Therefore, it is possible to cause the player to hold a great sense of expectation for the payment based on the WILD symbols. Further, it is possible to cause the player to hold one's attention to an effect at the time of replacing with WILD symbols.

The invention of (2-3) is directed to the gaming machine of (2-2), wherein:

the processing (D) includes:

(D-1) specifying one or more symbol arrays targeted for replacement with WILD symbols, in response to the fact that it is determined that a specific game state is generated in the processing (C); and (D-2) replacing all symbols configuring the symbol arrays specified in accordance with the processing (D-1) with the WILD symbols, and the controller is provided to further execute processing of:

(G) determining an effect for replacement with WILD symbols, based on the symbol arrays specified in accordance with the processing (D-1); and (H) executing the effect determined in accordance with the processing (G) at the time of replacing with the WILD symbols in accordance with the processing (D-2).

According to the invention of (2-3), an effect at the time of replacing with WILD symbols is determined based on symbol arrays targeted for replacement with WILD symbols. Therefore, a player can expect the number of symbol arrays targeted for replacement with WILD symbols or positions of the symbol arrays, in accordance with what kind of effect is performed at the time of replacing with WILD symbols. Further, the player can enjoy the effect performed at the time of replacing with WILD symbols more.

The invention of (2-4) is directed to a gaming machine control method, comprising the steps of:

(A) a controller determining symbols to be stop-displayed in a symbol display device which is capable of variably displaying and stop-displaying a plurality of symbols;

(B) the controller determining whether or not a predetermined symbol is included in the symbols determined to be stop-displayed in predetermined display regions provided in the symbol display device, among the symbols determined in accordance with the step (A);

(C) the controller determining whether or not to generate a specific game state, in a case where the controller determines that the predetermined symbol is not included in the step (B);

(D) the controller replacing one of the symbols displayed on the symbol display device with a WILD symbol substitutable for another symbol, in response to a fact that it is determined that the specific game state is generated in the step (C);

(E) the controller awarding a payment, based on the WILD symbol replaced in accordance with the step (D); and (F) the controller awarding a predetermined benefit, based on the predetermined symbols stop-displayed, in a case where the predetermined symbols stop-displays in the symbol display device.

According to the invention of (2-4), a specific game state can take place on condition that a predetermined symbol is not included in symbols determined to be stop-displayed in predetermined display regions (for example, the regions corresponding to one of five reels). If the specific game state takes place, symbols displayed on the symbol display device are replaced with WILD symbols, and a payment is awarded based on the WILD symbols replaced with. The WILD symbols are symbols substitutable for other symbols, and a payment can increase accordingly. Further, according to the invention of (2-4), the payment based on such WILD symbols can be performed in a case where it is determined that a predetermined symbol is not stop-displayed in a predetermined display region. Therefore, a player can hold a certain sense of expectation relative to the fact that the predetermined symbol is not stop-displayed in the predetermined display region.

According to the invention of (2-4), in a case where predetermined symbols are stop-displayed, a predetermined benefit is awarded based on the predetermined symbols stop-displayed. Therefore, the fact that the predetermined symbols are stop-displayed is beneficial for players. Thus, it is possible to cause a player to think about whether or not the predetermined symbols are to be stop-displayed in the predetermined display regions. It is also possible to drive the player to be engaged in the game. It is further possible to cause a player, who is disappointed with the fact that the predetermined benefit could not be acquired because predetermined symbols were not stop-displayed, to expect the fact that a specific game state takes place. In a case where the specific game state takes place and the payment based on the WILD symbols is then awarded, an unexpected sense of satisfaction can be imparted to the player.

The invention of (2-5) is directed to the gaming machine of (2-2), wherein the processing (B) is processing of determining whether or not a predetermined symbol is included in the symbols determined to be stopped in one predetermined symbol array display region, among the symbols determined in accordance with the processing (A).

The invention of (2-6) is directed to the gaming machine of (2-2) or (2-5), wherein:

the processing (E) is processing of awarding a payment, based on symbols stop-displayed on a winning line, when a plurality of symbols including WILD symbol replaced with in accordance with the processing (D) are stop-displayed in a plurality of symbol array display regions;

the winning line is made up of a combination of display regions of symbols selected on a one-by-one symbol basis from each of a plurality of symbol array display regions; and the number of winning lines employed in the processing (E) is determined according to a BET number of gaming media.

The invention of (3) include the inventions of (3-1) to (3-7) sub-classified below.

The invention of (3-1) is directed to a gaming machine, comprising:

a symbol display device which is capable of variably displaying a plurality of symbols;

a BET input device which is capable of inputting a BET; and a controller programmed to execute processing of:

(A) accepting an input from the BET input device for betting gaming media whose amount is equal to or less than a predetermined maximum BET amount;

(B) executing a normal game in which the symbol display device variably displays and then stop-displays the symbols, after the gaming media is betted in the processing (A);

(C) awarding a predetermined benefit in response to a fact that a predetermined condition is established in the normal game, in a case where the amount of the gaming media betted in the normal game executed in accordance with the processing (B) is less than the maximum BET amount; and (D) awarding a benefit which is greater than the predetermined benefit, in response to the fact a predetermined condition is established in the normal game, in a case where the amount of the gaming media betted in the normal game executed in accordance with the processing (B) is the maximum BET amount.

According to the invention of (3-1), in a case where the amount of gaming media betted in a normal game in which a predetermined condition is established is the maximum BET amount, a greater benefit is awarded than that in a case where the amount of gaming media betted in the normal game is less than the maximum BET amount.

For example, there can be exemplified cases of:

(i) awarding a predetermined amount of gaming media as a predetermined benefit, whereas awarding gaming media whose amount exceeds the predetermined amount as a benefit which is greater than the predetermined benefit; and (ii) executing a predetermined number of bonus games as a predetermined benefit, whereas executing bonus games whose number exceeds the predetermined number, as a benefit which is greater than the predetermined benefit.

The bonus games can include games such as: a game in which a payment amount per a unit BET amount is relatively large; a game in which a big hit appears at a comparatively high probability; and a free game which is a game in which even if no gaming media is betted, the symbol display device variably displays and then stop-displays the symbols. Namely, a bonus game is a game in which there is a high possibility that balance of gaming media (the amount obtained by reducing a payment amount of gaming media from an entry amount of gaming media) can be increased in comparison with a normal game.

As just described, according to the invention of (3-1), in a case where the amount of gaming media betted in a normal game in which a predetermined condition is established is the maximum BET amount, a player can acquire a benefit which is greater than a predetermined benefit. Therefore, pleasure can be imparted to the player having betted the maximum BET amount of gaming media in the normal game in which the predetermined condition is established. In addition, it is possible to prompt the player to bet the maximum BET amount of gaming media. Further, in order to acquire a benefit which is greater than a predetermined benefit, the maximum BET amount of gaming media needs to be betted in the normal game in which the predetermined condition is established. Even if the maximum BET amount of gaming media is betted in an earlier normal game, the fact is not considered. Therefore, in a situation in which the player is unaware of when a predetermined condition is established, it is possible to cause the player to continue betting of the maximum BET amount of gaming media. In this manner, the profits in gaming facilities such as casinos can be increased.

The invention of (3-1) includes a case in which, in place of the processing (C) and (D), the controller is programmed to execute processing of:

(X) awarding a predetermined benefit in response to the fact that a predetermined condition is established in the normal game executed in accordance with the processing (B);

(Y) determining whether or not the amount of gaming media betted in the normal game in which the predetermined condition is established is the maximum BET amount; and (Z) awarding an additional benefit in addition to the predetermined benefit awarded in accordance with the processing (X), in a case where it is determined that the amount of gaming media betted in the normal game is the maximum BET amount in the processing (Y).

The invention of (3-2) is directed to the gaming machine of (3-1), wherein the processing (C) includes processing of awarding gaming media in response to the fact that a predetermined condition is established in the normal game, in a case where the amount of gaming media betted in the normal game executed in the processing (B) is less than the maximum BET amount; and the processing (D) includes processing of awarding gaming media whose amount is greater than the amount of gaming media awarded in accordance with the processing (C), in response to the fact that the predetermined condition is established in the normal game, in a case where the amount of gaming media betted in the normal game executed in accordance with the processing (B) is the maximum BET amount.

According to the invention of (3-2), in a case where the amount of gaming media betted in a normal game in which a predetermined condition is established is the maximum BET amount, a player can acquire more gaming media than that in a case where the amount of gaming media betted in the normal game is less than the maximum BET amount. Therefore, pleasure can be imparted to the player having betted the maximum BET amount of gaming media in the normal game in which the predetermined condition is established. In addition, it is possible to prompt the player to bet the maximum BET amount of gaming media. Further, in order to acquire more amounts of the gaming media, the maximum BET amount of gaming media needs to be betted in the normal game in which the predetermined condition is established. Even if the maximum BET amount of gaming media is betted in an earlier normal game, the fact is not considered. Therefore, it is possible to cause the player to continue betting of the maximum BET amount of gaming media. In this manner, the profits in gaming facilities such as casinos can be increased.

The invention of (3-3) is directed to the gaming machine of (3-1), wherein the processing (C) includes processing of executing a predetermined number of free games which are games in which even if no gaming media is betted, the symbol display device variably displays and then stop-displays the symbols, in response to the fact that a predetermined condition is established in the normal game, in a case where the amount of gaming media betted in the normal game executed in accordance with the processing (B) is less than the maximum BET amount; and the processing (D) includes processing of executing the free games, the number of which is greater than the predetermined number, in response to the fact that a predetermined condition is established in the normal game, in a case where the amount of gaming media betted in the normal game executed in accordance with the processing (B) is the maximum BET amount.

According to the invention of (3-3), in a case where the amount of gaming media betted in a normal game in which a predetermined condition is established is a maximum BET amount, more free games are executed than in a case where the amount of gaming media betted in the normal game is less than the maximum BET amount. Therefore, pleasure can be imparted to a player having betted the maximum BET amount of gaming media in the normal game in which the predetermined condition is established. In addition, it is possible to prompt the player to bet the maximum amount of gaming media. Further, in order to enjoy more free games, the maximum BET amount of gaming media needs to be betted in the normal game in which the predetermined condition is established. Even if the maximum amount of gaming media is betted in an earlier normal game, the fact is not considered. Therefore, it is possible to cause the player to continue betting of the maximum BET amount of gaming media. In this manner, the profits in gaming facilities such as casinos can be increased.

The invention (3-4) is directed to the gaming machine of (3-1), wherein the processing (C) includes processing of:

(C-1) executing a predetermined number of free games which are games in which even if no gaming media is betted, the symbol display device variably displays and then stop-displays the symbols, in response to the fact that a predetermined condition is established in the normal game, in a case where the amount of gaming media betted in the normal game executed in accordance with the processing (B) is less than the maximum BET amount;

(C-2) further executing a specific number of free games subsequent to the processing (C-1) is executed when the predetermined condition is established prior to the execution of the processing (C-1) completes, and the processing (D) includes processing of:

(D-1) executing the free games whose number is greater than the predetermined number, in response to the fact that the predetermined condition is established in the normal game, in a case where the amount of gaming media betted in the normal game executed in accordance with the processing (B) is the maximum BET amount; and (D-2) further executing the free games whose number is greater than the specific number, subsequent to the processing (D-1) is executed when the predetermined condition is established prior to the execution of the processing (D-1) completes.

According to the invention of (3-4), in a case where the amount of gaming media betted in a normal game in which a predetermined condition is established is a maximum BET amount, more free games are executed than in a case where the amount of gaming media betted in the normal game is less than the maximum BET amount. Further, even if a predetermined condition is established in a free game, where the amount of gaming media betted in a normal game triggering generation of a free game is the maximum BET amount, more free games are added than in a case where the amount of gaming media betted in the normal game is less than the maximum BET amount. Therefore, pleasure is imparted to a player having betted the maximum amount of gaming media in a normal game in which a predetermined condition is established. In addition, it is possible to prompt the player to bet the maximum BET amount of gaming media. Further, in order to enjoy more free games, the maximum BET mount of gaming media needs to be betted in the normal game in which the predetermined condition is established. Even if the maximum amount of gaming media is betted in an earlier normal game, the fact is not considered. Therefore, it is possible to cause the player to continue betting of the maximum BET amount of gaming media. In this manner, the profits in gaming facilities such as casinos can be increased.

In the invention of (3-4), a predetermined number of times and a specific number of times may be identical to each other or may be different from each other. In the present specification, establishing a predetermined condition in a free game is also referred to as "establishing a retrigger."

The invention of (3-5) is directed to a gaming machine control method, comprising the steps of:

(A) a controller accepting an input of betting gaming media whose amount is equal to or smaller than a predetermined maximum BET amount, from a BET input device which is capable of inputting a BET;

(B) the controller executing a normal game in which a symbol display device which is capable of variably displaying a plurality of symbols variably displays and then stop-displays the symbols after gaming media is betted in the step (A);

(C) the controller awarding a predetermined benefit, in response to a fact that a predetermined condition is established in the normal game, in a case where the amount of gaming media betted in a normal game executed in accordance with the step (B) is less than the maximum BET amount; and (D) the controller awarding a benefit which is greater than the predetermined benefit, in response to a fact that the predetermined condition is established in the normal game, in a case where the amount of gaming media betted in the normal game executed in accordance with the step (B) is the maximum BET amount.

According to the invention of (3-5), in a case where the amount of gaming media betted in a normal game in which a predetermined condition is established is the maximum BET amount, a greater benefit is awarded than that in a case where the amount of gaming media betted in the normal game is less than the maximum BET amount. For example, there can be enumerated cases of:

(i) awarding a predetermined amount of gaming media as a predetermined benefit, whereas awarding gaming media whose amount exceeds the predetermined amount as a benefit which is greater than the predetermined benefit; and (ii) executing a predetermined number of bonus games as a predetermined benefit, whereas executing bonus games whose number exceeds the predetermined number, as a benefit which is greater than the predetermined benefit.

The bonus games can include games such as: a game in which a payment amount per a unit BET amount is relatively large; a game in which a big hit appears at a comparatively high probability; and a free game which is a game in which even if no gaming media is betted, the symbol display device variably displays and then stop-displays the symbols. Namely, a bonus game is a game in which there is a high possibility that balance of gaming media (the amount obtained by reducing a payment amount of gaming media from an entry amount of gaming media) can be increased in comparison with a normal game.

As just described, according to the invention of (3-5), in a case where the amount of gaming media betted in a normal game in which a predetermine condition is established is the maximum BET amount, a player can acquire a benefit which is greater than a predetermined benefit. Therefore, pleasure can be imparted to the player having betted the maximum BET amount of gaming media in the normal game in which the predetermined condition is established. In addition, it is possible to prompt the player to bet the maximum BET amount of gaming media. Further, in order to acquire a benefit which is greater than a predetermined benefit, the maximum BET amount of gaming media needs to be betted in the normal game in which the predetermined condition is established. Even if the maximum BET amount of gaming media is betted in an earlier normal game, the fact is not considered. Therefore, in a situation in which the player is unaware of when a predetermined condition is established, it is possible to cause the player to continue betting of the maximum BET amount of gaming media. In this manner, the profits in gaming facilities such as casinos can be increased.

The invention of (3-5) includes a case in which in place of the steps (C) and (D), there are included the steps of:

(X) awarding a predetermined benefit, in response to the fact that a predetermined condition is established in a normal game executed in accordance with the step (B);

(Y) determining whether or not the amount of gaming media betted in the normal game in which the predetermined condition is established is the maximum BET amount; and (Z) awarding an additional benefit, in addition to the predetermined benefit awarded in accordance with the step (X), in a case where the amount of gaming media betted in the normal game in the step (Y) is the maximum BET amount.

The invention of (3-6) is directed to the gaming machine of (3-1), wherein the predetermined condition is that a bonus trigger is established in a normal game.

The invention of (3-7) is directed to the gaming machine of (3-6), wherein:

the bonus trigger is associated with a free game or a feature game;

the processing (C) is processing of awarding a predetermined benefit in the free game or the feature game, in response to a fact that the bonus trigger associated with the free game or the feature game is established in the normal game, in a case where the amount of gaming media betted in the normal game executed in the processing (B) is less than the maximum BET amount;

the processing (D) is processing of awarding a benefit which is greater than the predetermined benefit in the free game or the feature game, in response to the fact that the bonus trigger associated with the free game or the feature game is established in the normal game, in a case where the amount of gaming media betted in the normal game executed in the processing (B) is the maximum BET amount;

the free game is a game in which even if no gaming media is betted, a symbol display device variably displays and then stop-displays the symbols; and the feature game is a game adapted to accept an input of selecting any of a plurality of options and then award a benefit associated with the selected option by the input.

The invention of (4) includes the inventions of (4-1) to (4-8) sub-classified below.

The invention of (4-1) is directed to a gaming machine, comprising:

a symbol display device which is capable of variably displaying a plurality of symbols; and a controller programmed to execute processing of:

(A) executing a normal game in which the symbol display device variably displays and then stop-displays the symbols, after a gaming media is betted;

(B) starting a free game which is a game in which even if no gaming media is betted, the symbol display device variably displays and then stop-displays the symbols, when a predetermined condition is established in the normal game executed in accordance with the processing (A);

(C) replacing a stop-displayed trigger symbol with a WILD symbol which is substitutable for another symbol, when the trigger symbol is stop-displayed in a predetermined display region provided in the symbol display device, in a free game started in accordance with the processing (B);

(D) determining a symbol to be replaced with a WILD symbol, from among symbols other than the trigger symbols stop-displayed in the predetermined display regions, of a plurality of symbols stop-displayed, when the trigger symbols are stop-displayed in the predetermined display regions, in the free game started in accordance with the processing (B);

(E) replacing the symbol determined in accordance with the processing (D) with the WILD symbol after executing the processing (C); and (F) awarding a payment, based on the WILD symbol replaced in accordance with the processing (C) and the processing (E).

According to the invention of (4-1), when a trigger symbol is stop-displayed in a predetermined display region in a free game, several symbols are replaced with WILD symbols, and a payment is awarded based on the WILD symbols replaced with. A WILD symbol is a symbol which is substitutable for another symbol, and a payment can increase accordingly. Therefore, a player can expect that a trigger symbol is stop-displayed in a predetermined display region in a free game. In this manner, it is possible to drive the player to be engaged in the play of game(s).

Further, according to the invention of (4-1), a symbol is replaced with a WILD symbol in accordance with the steps of:

(i) replacing a trigger symbol stop-displayed in a predetermined display region with a WILD symbol; and (ii) subsequent to the step (i), replacing another symbol with a WILD symbol.

In accordance with the step (i), a player can clearly recognize that a trigger symbol is stop-displayed in a predetermined display region, causing the player to pay attention to replacement with a WILD symbol in accordance with the step (ii). Further, it is possible to enhance the player's sense of expectation with respect to the number or the like of symbols to be replaced with WILD symbols and to drive the player to be engaged in the play of game(s).

The invention of (4-2) is directed to a gaming machine, comprising:

a symbol display device which is capable of scroll-displaying a plurality of symbol arrays comprised of a plurality of symbols in each of symbol array display regions; and a controller programmed to execute processing of:

(A) executing a normal game in which the plurality of the symbol arrays are stop-displayed after scroll-displayed in each of the symbol array display regions, after the gaming media is betted;

(B) starting a free game which is a game in which even if no gaming media is betted, the plurality of the symbol arrays are stop-displayed after scroll-displayed in each of the symbol array display regions, when a predetermined condition is established in the normal game executed in accordance with the processing (A);

(C) replacing a stop-displayed trigger symbol with a WILD symbol which is substitutable for another symbol, when the trigger symbol is stop-displayed in the predetermined symbol array display regions in the free game started in accordance with the processing (B);

(D) determining a symbol to be replaced with the WILD symbol, from among symbols other than the trigger symbols stop-displayed in the predetermined symbol array display region, of the plurality of stop-displayed symbols, when the trigger symbol is stop-displayed in the predetermined symbol array display region in the free game started in accordance with the processing (B);

(E) replacing the symbol determined in accordance with the processing (D) with the WILD symbol, after executing the processing (C); and (F) awarding a payment, based on the WILD symbol replaced with in accordance with the processing (C) and the processing (E).

According to the invention of (4-2), when a trigger symbol is stop-displayed in a predetermined symbol array display region in a free game, several symbols are replaced with WILD symbols, and a payment is awarded based on the WILD symbols replaced with. A WILD symbol is a symbol which is substitutable for another symbol, and a payment can increase accordingly. Therefore, a player can expect that a trigger symbol is stop-displayed in a predetermined symbol array display region in a free game. In this manner, it is possible to drive the player to be engaged in the play of game(s).

Further, according to the invention of (4-2), a symbol is replaced with a WILD symbol in accordance with the steps of:

(i) replacing a trigger symbol stop-displayed in a predetermined symbol array display region with a WILD symbol; and (ii) subsequent to the step (i), replacing another symbol with a WILD symbol.

In accordance with the step (i), a player can clearly recognize that a trigger symbol is stop-displayed in a predetermined symbol array display region, causing the player to pay attention to replacement with a WILD symbol in accordance with the step (ii). Further, it is possible to enhance the player's sense of expectation with respect to the number or the like of symbols to be replaced with WILD symbols and to drive the player to be engaged in the play of game(s).

The invention of (4-3) is directed to the gaming machine of (4-1), wherein the controller is further programmed to execute processing of:

(G) restoring the WILD symbol replaced with in accordance with the processing (C) and the processing (E) to original symbols; and (H) variably-displaying and then stop-displaying the symbols in the symbol display device in the free game, after executing the processing (G).

According to the invention of (4-3), a next free game is executed after the WILD symbols replaced with have been restored to their original symbols. Therefore, in the next time and subsequent free games as well, these original symbols may be replaced with WILD symbols again. In this manner, it is possible to continue a player's sense of expectation relative to a payment based on the WILD symbols during a free game.

The invention of (4-4) is directed to a gaming machine control method, comprising the steps of:

(A) a controller executing a normal game in which after gaming media is betted, a symbol display device which is capable of variably displaying a plurality of symbols variably displays and then stop-displays the symbols;

(B) the controller starting a free game which is a game in which, when a predetermined condition is met in the normal game executed in accordance with the step (A), even if no gaming media is betted, the symbol display device variably displays and then stop-displays the symbols;

(C) the controller replacing a stop-displayed trigger symbol with a WILD symbol which is substitutable for another symbol, when the trigger symbol is stop-displayed in a predetermined display region provided in the symbol display device, in the free game started in accordance with the step (B);

(D) the controller determining a symbol to be replaced with the WILD symbol, from among symbols other than the trigger symbol stop-displayed in the predetermined display region, of the plurality of symbols stop-displayed, when the trigger symbol is stop-displayed in the predetermined display region in the free game started in accordance with the step (B);

(E) the controller replacing the symbol determined in accordance with the step (D) with the WILD symbol after executing the step (C); and (F) the controller awarding a payment, based on the WILD symbols replaced in accordance with the step (C) and the step (E).

According to the invention of (4-4), when a trigger symbol is stop-displayed in a predetermined display region in a free game, several symbols are replaced with WILD symbols, and a payment is awarded based on the WILD symbols replaced with. A WILD symbol is a symbol which is substitutable for another symbol, and a payment can increase accordingly. Therefore, in a free game, a player can expect that a trigger symbol is stop-displayed in a predetermined display region. In this manner, it is possible to drive the player to be engaged in the play of game(s).

According to the invention of (4-4), a symbol is replaced with a WILD symbol in accordance with the steps of:

(i) replacing a trigger symbol stop-displayed in a predetermined display region with a WILD symbol; and (ii) subsequent to the step (i), replacing another symbol with a WILD symbol.

In accordance with the step (i), a player can clearly recognize that a trigger symbol is stop-displayed in a predetermined display region, and the player can pay attention to replacement with a WILD symbol in accordance with the step (ii). The player's sense of expectation can be enhanced with respect to the number or the like of symbols targeted to be replaced with WILD symbols, making it possible to drive the player to be engaged in the play of game(s).

The invention of (4-5) is directed to the gaming machine of (4-2), wherein the processing (C) is processing of replacing a stop-displayed trigger symbol with a WILD symbol in the wake of a fact that a player inputs an instruction when a trigger is stop-displayed in a predetermined symbol array display region, in the free game started in accordance with the processing (B).

The invention of (4-6) is the gaming machine of (4-2) or (4-5), wherein the processing of determining a symbol to be replaced with a WILD symbol in the processing (D) includes processing of:

determining one or more symbol array display regions in which at least one symbols changed to WILD symbols exist, by means of lottery, from among a plurality of symbol array display regions;

determining the number of symbols to be changed to WILD symbols, by means of lottery, for each of the selected symbol array display regions; and determining a position of a symbol to be changed to a WILD symbol, by means of lottery, based on the determined number of symbols, for each of the selected symbol array display regions.

The invention of (4-7) is directed to the gaming machine of (4-2) or (4-5), wherein the processing of determining a symbol to be replaced with a WILD symbol in the processing (D) includes processing of:

determining one numeral, by means of lottery, from a predetermined numeric range, the predetermined numeric range defining 1 as a lower limit and defining, as an upper limit, a number obtained by subtracting the number of trigger symbols from the number of symbols displayed on a symbol display device; and determining a position of a symbol to be changed to a WILD symbol, by means of lottery, based on the determined number of symbols.

The invention of (4-8) is directed to the gaming machine of any one of (4-2), (4-5), (4-6), and (4-7), wherein the processing (F) is processing of awarding a payment, based on symbols stop-displayed on a winning line, when a plurality of symbols including the WILD symbols replaced with in accordance with the processing (C) and the processing (E) are stop-displayed in a plurality of symbol array display regions; and the winning line is comprised of a combination of display regions of symbols selected on a one-by-one symbol basis from each of the plurality of symbol array display regions.

The invention of (5) includes the inventions of (5-1) to (5-8) sub-classified below.

The invention of (5-1) is directed to a gaming machine, comprising:

a symbol display device which is capable of variably displaying a plurality of symbols;

an input device which is capable of inputting an instruction related to a game; and a controller programmed to execute processing of:

(A) executing a normal game in which the symbol display device variably displays and then stop-displays the symbols;

(B) accepting from the input device an input of selecting any option from a plurality of options, in a feature game started in the wake of a fact that a predetermined condition is established in the normal game executed in accordance with the processing (A);

(C) notifying contents of a selected option, every time an option is selected in the processing (B);

(D) determining whether or not a special payment is included in the contents of the plurality of options; and (E) awarding the special payment in a case where it is determined that the special payment is included in the processing (D) and where an option whose content is the special payment is selected in the processing (B).

According to the invention of (5-1), in a feature game, a player can select any option from among a plurality of options (for example, 29 options), via an input device. For example, images according to the options are displayed on a display, and the player touches a portion on a touch panel corresponding to images according to any option, thereby making it possible to select the option. Every time the player selects an option, the contents of the option are notified. For example, a display mode of an image (for example, card) according to a selected option changes from a display mode disabling the contents of the option to be visualized (for example, faced-down card) to a display mode enabling the contents to be visualized (for example, faced-up card). The contents of options can include a predetermined animation character or the amount of gaming media and the like. On the other hand, it is determined whether or not a special payment is included in the contents of a plurality of options. For example, after one or more random numbers are extracted, when the extracted random numbers are within a predetermined numeric range, it is determined that the special payment is included. In a case where an option whose content is the special payment is selected, the fact is notified and the special payment is awarded. According to the invention of (5-1), the player can play a feature game while expecting that it is notified that an option whose content is a special payment is selected. When it is notified that the option whose content is the special payment is selected, it becomes possible to cause the player to be strongly impressed with the fact that the special payment can be acquired. Further, a great pleasure can be imparted to the player. Since a special payment is not always included in the contents of a plurality of options, when it is notified that an option whose content is a special payment is selected, the player can feel the fact with surprise and a great sense of satisfaction can be provided.

The invention of (5-2) is directed to the gaming machine of (5-1), wherein:

the controller is further programmed to execute processing of (F) accepting a BET input from the input device; and the processing (E) is processing of awarding, as a progressive payment, gaming media whose accumulated amount is the amount obtained by cumulatively counting all or part of the amount of gaming media betted in the processing (F).

According to the invention of (5-2), a special payment is a progressive payment. The progressive payment means awarding gaming media whose amount obtained by cumulatively counting all or part of the amount of betted gaming media. Namely, a player can acquire gaming media accumulated while the gaming media betted by oneself or another player is employed as a fund, by drawing a winning option whose content is a progressive payment. Therefore, further greater pleasure is imparted to the player.

The gaming machine of (5-2) may be a so called standalone-type gaming machine or may be one of a plurality of network-connected gaming machines. In the case of the standalone-type gaming machine, the controller is further programmed to execute processing of (G) cumulatively counting all or part of the amount of gaming media betted in the processing (F). The processing (E) is processing of awarding, as a progressive payment, gaming media of an accumulated amount obtained by means of the cumulative counting in accordance with the processing (G).

In the case of the network-connected gaming machine, the gaming machine of (5-2) is a constituent element of a gaming system which comprises the following. Namely, the gaming system is directed to a gaming system comprising:

the gaming machine of (5-2);

a server having a processor; and a network enabling communication between the gaming machine and the server, the controller being further programmed to execute processing of:

(H) transmitting to the processor, BET information indicating the amount of gaming media betted in the processing (F);

the processor being programmed to execute processing of:

(X) receiving the BET information transmitted in accordance with the processing (H);

(Y) cumulatively counting all or part of the amount of gaming media indicated by the BET information received in accordance with the processing (X); and (Z) transmitting to the controller, accumulated-amount information indicating the accumulated amount obtained by means of the cumulative counting in accordance with the processing (Y), the controller being further programmed to execute processing of:

(I) receiving the accumulated-amount information transmitted in accordance with the processing (Z), the processing (E) being processing of awarding, as a progressive payment, gaming media whose accumulated amount is indicated by the accumulated-amount information received in accordance with the processing (I).

The invention of (5-3) is directed to the gaming machine of (5-2), wherein the processing (E) is processing of awarding, as a progressive payment, gaming media whose amount is obtained by adding the accumulated amount to the amount of gaming media corresponding to a progressive initial value; and the processing (D) is processing of determining that a specific payment is included in the contents of the plurality of options, at a probability based on the progressive initial value.

According to the invention of (5-3), a probability determined that a special payment is included in the contents of a plurality of options is obtained as a probability based on a progressive initial value. For example, the following two cases can be enumerated. In a case where the progressive initial value is large (for example, in a case where a large amount of gaming media can be awarded as a progressive payment), there can arise a low probability determined that a special payment is included in the contents of a plurality of options. Conversely, in a case where a progressive initial value is small (for example, in a case where a small amount of gaming media can be awarded as a progressive payment), there can arise a high probability determined that a special payment is included in the contents of a plurality of options. In this manner, adjustment can be made as to a timing with which a progressive payment takes place or the amount of gaming media awarded as a progressive payment. In addition, an administrator or the like of gaming facility or the like can change a probability determined that a special payment is included in the contents of a plurality of options, by changing the setting of a progressive initial value, via an input device included in a gaming machine or an input device connected to a server. Therefore, a gaming facility can be speedily and easily maintained and/or managed so that a special payment is included in the contents of a plurality of options at an optimal probability according to management strategy.

The invention of (5-4) is directed to the gaming machine of (5-2), wherein:

the processing (A) is processing of executing a normal game in which after a BET input is made in the processing (F), the symbol display device variably displays and then stop-displays symbols, gaming media is paid, the amount of which is based on the stop-displayed symbols and the amount of betted gaming media; and the processing (D) is processing of determining that a special payment is included in the contents of the plurality of options at a probability based on the amount of gaming media betted in the normal game in which the predetermined condition is established.

According to the invention of (5-4), the larger amount of gaming media betted in a normal game in which a predetermined condition is established is, the higher probability determined that a special payment is included in the contents of a plurality of option can arise. Therefore, it is possible to prompt a player to bet more gaming media. In order to increase a probability determined that a special payment is included in the contents of a plurality of options, many gaming media needs to be betted in a normal game in which a predetermined condition is established. Even if a plenty of gaming media is betted in an earlier normal game, the fact is not considered. Therefore, in a situation in which the player is unaware of a time point when a predetermined condition is established, it is possible to cause the player to continue betting of a plenty of gaming media. In this manner, the profits in gaming facilities such as casinos can be increased. Alternatively, the invention of (5-4) may be arranged so that a probability determined that the smaller amount of gaming media betted in a normal game in which a predetermined condition is established is, the higher probability determined that a special payment is included in the contents of a plurality of options is. If a smaller amount of gaming media is betted, a smaller amount of gaming media can be acquired in a normal game as well. Therefore, it is possible to cause the player to think about what amount of gaming media is to be betted.

The invention of (5-5) is directed to a gaming machine control method, comprising the steps of:

(A) a controller executing a normal game in which a symbol display device which is capable of variably displaying a plurality of symbols variably displays and then stop-displays the symbols;

(B) the controller accepting from an input device which is capable of inputting an instruction related to a game, an input of selecting any option from among a plurality of options, in a feature game started in the wake of a fact that a predetermined condition is established in the normal game executed in the step (A);

(C) the controller notifying contents of a selected option every time the option is selected in the step (B).

(D) the controller determining whether or not a special payment is included in the contents of the plurality of options; and (E) the controller awarding a special payment, in a case where it is determined that the special payment is included in the step (D) and where the option whose content is the special payment is selected in the step (B).

According to the invention of (5-5), in a feature game, a player can select any option from among a plurality of options (for example, 29 options), via an input device. For example, images according to the options are displayed on a display, and a player touches a portion on a touch panel corresponding to images according to any option, thereby making it possible to select the option. Every time a player selects an option, the contents of the option are notified. For example, a display mode of an image (for example, card) according to a selected option changes from a display mode disabling the contents of the option to be visualized (for example, faced-down card) to a display mode enabling the contents to be visualized (for example, faced-up card). The contents of options can include a predetermined animation character or the amount of gaming media and the like. On the other hand, it is determined whether or not a special payment is included in the contents of a plurality of options. For example, after one or more random numbers are extracted, when the extracted random numbers are within a predetermined numeric range, it is determined that the special payment is included. In a case where an option whose content is the special payment is selected, the fact is notified and the special payment is awarded. According to the invention of (5-5), a player can play a feature game while expecting that it is notified that an option whose content is a special payment is selected. When it is notified that the option whose content is the special payment is selected, a player can be strongly impressed with the fact that the special payment can be acquired, and a great pleasure can be imparted to the player. Since a special payment is not always included in the contents of a plurality of options, when it is notified that an option whose content is a special payment is selected, a player can feel the fact with surprise and a great sense of satisfaction can be provided.

The invention of (5-6) is directed to the gaming machine of (5-1), wherein in the processing (B), the feature game is started in the wake of the fact that the input device inputs an instruction of selecting the specific symbols associated with the feature game, when a plurality of specific symbols are stop-displayed in the normal game executed in accordance with the processing (A).

The invention of (5-7) is directed to the gaming machine of (5-1), wherein the processing (D) is processing of notifying to a player that an option whose content is the special payment is included in the plurality of options, in a case where it is determined whether or not a special payment is included in the contents of the plurality of options and where it is determined that the special payment is included therein.

The invention of (5-8) is directed to the gaming machine of (5-4), wherein the processing (D) is processing of determining that a special payment is included in the contents of a plurality of options at a higher probability as a larger amount of gaming media is bet in the normal game in which the predetermined condition is established.

The invention of (6) includes the inventions of (6-1) to (6-6) sub-classified below.

The invention of (6-1) is directed to a gaming machine, comprising:

a symbol display device which is capable of variably displaying a plurality of symbols;

a memory which is capable of storing data; and a controller programmed to execute processing of:

(A) executing a normal game in which the symbol display device variably displays and then stop-displays the symbols;

(B) executing a first feature game in which any option is selected from among a plurality of options, in response to a fact that a predetermined condition is established in the normal game executed in the processing (A);

(C) storing in the memory, specific item data corresponding to a specific item associated with the first feature game, in response to a fact that a predetermined specific item acquisition condition is established in the first feature game executed in accordance with the processing (B);

(D) determining whether or not the specific item data is stored in the memory, in response to a fact that a predetermined stage migration condition is established in the first feature game executed in accordance with the processing (B);

(E) awarding a payment, based on the specific item data, in a case where it is determined that the specific item data is stored in the memory in the processing (D);

(F) executing a second feature game in which a player's win or loss is determined in a case where it is determined that the specific item data is not stored in the memory in the processing (D); and (G) awarding a payment, based on the specific item data, in response to a fact that a player's win is determined in the second feature game executed in accordance with the processing (F).

According to the invention of (6-1), in a first feature game performed in the wake of the fact that a predetermined condition is established in a normal game, any option is selected from among a plurality of options. At a time point when a predetermined stage migration condition is established (for example, at a time point when a predetermined option is selected), in a case where a predetermined specific item acquisition condition (the condition for awarding a specific animation character in a game in which the specific animation character can be awarded, the game being played in the first feature game) has been established so far, the payment is awarded based on the specific items. At a time point when a predetermined stage migration condition is established, in a case where a predetermined specific item acquisition condition has not been established so far, a second feature game is executed. In a case where a player has won the second feature game, a payment is awarded based on a specific item (for example, a specific animation character acquired by a player). In other words, the second feature game is a consolation race to be played in a case where a predetermined specific item acquisition condition is not established in the first feature game. In general, in a feature game, a player plays a game while strongly expecting that he or she acquires a large amount of payment. Therefore, if the feature game completes while such large amount of payment cannot be acquired, the player feels that one's expectation is disappointed. As a result, the player's motivation or interest for game may be declined. In this regard, according to the invention of (6-1), in a case where a predetermined specific item acquisition condition is not established in the first feature game, the second feature game is executed. Thus, a chance that a payment can be acquired one more time can be imparted to such an almost disappointed player. In addition, a player can be strongly impressed with the fact that a bailout is taken. Therefore, even if the player has not successfully won the second feature game, it is possible to prevent the player's motivation or interest for game from being declined.

The invention of (6-2) is directed to the gaming machine of (6-1), wherein the processing (B) is processing of:

(B-1) selecting any of a plurality of bonus candidates including a predetermined payment and the first feature game, in response to a fact that a predetermined condition is established in the normal game executed in accordance with the processing (A); and (B-2) executing the first feature game, in a case where the first feature game is selected in accordance with the processing (B-1) and the controller is further programmed to execute processing of:

(H) awarding a predetermined payment, in a case where the predetermined payment is selected in accordance with the processing (B-1).

According to the invention of (6-2), in a case where a predetermined condition is established in a normal game, when a first feature game is selected, the selected first feature game is executed, and when a predetermined payment is selected, the selected predetermined payment is awarded. Apart from these, a plurality of bonuses are provided. In a case where the predetermined condition is established, a variety of payments can be performed according to a type of bonus to be selected. This causes a player to pay one's attention to which bonus is selected while holding a sense of expectation.

In spite of the fact that when a predetermined payment is selected, the selected predetermined payment is reliably awarded, in a case where a first feature game is selected, if the selected first feature game completes while a large amount of payment cannot be acquired with the predetermined specific item acquisition condition being not established, there arises a higher possibility that there arises a circumstance that a player feels that one's expectation is disappointed. In this regard, according to the invention of (6-2), in a case where the predetermined specific item acquisition condition is not established in the first feature game, a second feature game is executed, thus causing the player to be strongly impressed with a bailout is taken and reduce the possibility that the above-described circumstance arises.

The invention of (6-3) is directed to the gaming machine of (6-1), comprising an input device which is capable of inputting an instruction related to a game, the memory storing effect image data indicating a view showing how any animation character wins a race in which a plurality of animation characters for race participate, wherein: the processing (F) includes processing of:

(F-1) accepting in the input device, an input of selecting any of a plurality of animation characters for race, in a case where it is determined that the specific item data is not stored in the memory in the processing (D); and (F-2) causing the symbol display device or a display which is different from the symbol display device to display an effect image indicating a view showing how any animation character for race wins, based on the effect image data stored in the memory; and the processing (G) is processing of awarding a payment, based on specific item data corresponding to the animation character for race, in a case where the symbol display device or the display displays the effect image indicating the appearance that the animation character for race selected in the processing (F-1) wins, in accordance with the processing (F-2).

According to the invention of (6-3), in a second feature game, a player can select any of a plurality of animation characters for race, via an input device. In a case where an effect image is displayed indicating a view showing how the selected animation character for race wins a race, a payment is awarded according to specific item data corresponding to the animation character for race (for example, specific item data corresponding to a specific animation character which is awarded in a case where the selected animation character for race wins). Therefore, the player can feel a sense of affinity or a sense of community with the animation character for race through activity of cheerleading winning of one's own selected animation character for race or acquiring a payment according to the animation character for race. As a result, it is possible to drive the player to be engaged in the play of game(s) and feel an attachment to game(s).

The invention of (6-4) is directed to a gaming machine control method, comprising the steps of:

(A) a controller executing a normal game in which a symbol display device which is capable of variably displaying a plurality of symbols variably displays and then stop-displays the symbols;

(B) the controller executing a first feature game in which any option is selected from among a plurality of options, in response to a fact that a predetermined condition is established in the normal game executed in accordance with the step (A);

(C) the controller causing a memory which is capable of storing data to store specific item data corresponding to a specific item associated with the first feature game, in response to a fact that a predetermined specific item acquisition condition is established in the first feature game executed in the step (B);

(D) the controller determining whether or not the specific item data is stored in the memory, in response to a fact that a predetermined stage migration condition is established, in the first feature game executed in accordance with the step (B);

(E) the controller awarding a payment, based on the specific item data, in a case where it is determined that the specific item data is stored in the memory in the step (D);

(F) the controller executing a second feature game in which a player's win or loss is determinable, in a case where it is determined that the specific item data is not stored in the memory in the step (D); and (G) the controller awarding a payment, based on the specific item data, in response to a fact that it is determined that a player wins the second feature game executed in accordance with the step (F).

According to the invention of (6-4), in a first feature game played in the wake of the fact that a predetermined condition is established in a normal game, any option is selected from among a plurality of options. At a time point when a predetermined stage migration condition is established (for example, at a time point when a predetermined option is selected), a predetermined specific item acquisition condition (for example, a condition for awarding a specific animation character in a game in which the specific animation character can be awarded, the game being played in the first feature game) is established, a payment is awarded based on the specific item. At a time point when a predetermined stage migration condition is established, in a case where a predetermined specific item acquisition condition has not been established so far, a second feature game is executed. In a case where a player wins the second feature game, a payment is awarded based on a specific item (for example, a specific animation character acquired by a player). In other words, the second feature game is a consolation race to be played in a case where a predetermined specific item acquisition condition is not established in the first feature game. In general, in a feature game, a player plays a game while strongly expecting that he or she acquires a large amount of payment. Therefore, if the feature game completes while such large amount of payment cannot be acquired, the player feels that one's expectation is disappointed. As a result, the player's motivation or interest for game may be declined. In this regard, according to the invention of (6-4), in a case where a predetermined specific item acquisition condition is not established in the first feature game, the second feature game is executed.

Thus, a chance that a payment can be acquired one more time can be imparted to such an almost disappointed player. In addition, the player can be strongly impressed with the fact that a bailout is taken. Therefore, even if the player has not successfully won the second feature game, it is possible to prevent a player's motivation or interest for game from being declined.

The invention of (6-5) is directed to the gaming machine of (6-4), wherein the first feature game is started in the wake of the fact when a plurality of specific symbols are stop-displayed in the normal game executed in accordance with the processing (A), the input device inputs an instruction of selecting a specific symbol associated with the first feature game, in the processing (B).

The invention of (6-6) is directed to the gaming machine of (6-4), wherein the processing (D) is processing of determining whether or not the specific item data is stored in the memory, in response to the fact that an option associated with a second feature game is selected from among a plurality of options, in the first feature game executed in accordance with the processing (B).

The invention of (7) includes the inventions of (7-1) to (7-5) sub-classified below.

The invention of (7-1) is directed to a gaming machine, comprising:

a symbol display device which is capable of variably displaying a plurality of symbols; and a controller programmed to execute processing of:

(A) executing a normal game in which the symbols display device variably displays and then stop-displays the symbols;

(B) executing a feature game in which any option is selected from among a plurality of options, in response to a fact that a predetermined condition is established in the normal game executed in accordance with the processing (A);

(C) continuously notifying a content related to the selected option during a period in which the feature game is executed in the processing (B); and (D) awarding a payment, based on the content related to the selected option, in the feature game executed in accordance with the processing (B).

According to the invention of (7-1), any option is selected from among a plurality of options, in a feature game played in the wake of the fact that a predetermined condition is established in a normal game. In addition, a payment is awarded based on the content related to the selected option. The contents related to the options can include a predetermined animation character or the amount of gaming media and the like. The content related to the selected option is continuously notified during a period in which a feature game is executed. For example, a display mode of an image (for example, card) according to a selected option changes from a display mode disabling the contents of the option to be visually recognized (for example, faced-down card) to a display mode enabling the contents to be visually recognized (for example, faced-up card). The display mode after changed continues during the period in which the feature game is executed. As just described, the content related to the selected option is continuously notified during the period in which the feature game is executed, thus imparting a yardstick to a player as to the amount of payment acquirable in the feature game.

The invention of (7-2) is directed to the gaming machine of (7-1), comprising a memory which is capable of storing data, a specific option related to one animation character being included in the plurality of options, wherein the controller is further programmed to include processing of:

(E) causing the memory to store the specific item data indicating the animation character, in response to the fact that the specific option is selected in the feature game executed in accordance with the processing (B); and (F) executing an animation character game, based on the specific item data stored in the memory, in response to the fact that a predetermined stage migration condition is established in the feature game executed in accordance with the processing (B), and the processing (D) includes processing of awarding a payment, based on a result of the animation character game executed in accordance with the processing (F); and the processing (C) includes processing of continuously notifying an animation character indicated by the specific item data stored in the memory, during a period in which the feature game is executed in the processing (B).

According to the invention of (7-2), at a time point when a predetermined stage migration condition is established (for example, at a time point when a predetermined option is selected), an animation character game is executed based on specific item data (data indicating an animation character) stored in a memory. Afterwards, a payment is awarded based on a result of an animation character game. According to the invention of (7-2), the animation character indicated by the specific item data stored in the memory is continuously notified during a period in which a feature game is executed. Therefore, a player can keep track of what kind of animation character game is playable when a predetermined stage migration condition is established.

The invention of (7-3) is directed to the gaming machine of (7-2), wherein:

a fixed payment option whose content is a predetermined amount of gaming media is included in the plurality of options; the processing (D) includes processing of awarding a total amount of gaming media of amounts of gaming media which is the content of each of fixed payment options selected in the feature game executed in accordance with the processing (B); and the processing (C) includes processing of continuously notifying the amount of gaming media which is the content of each of the fixed payment options selected, during a period in which the feature game is executed in the processing (B).

According to the invention of (7-3), there is awarded a total amount of gaming media of amounts of gaming media which is the content of each of the fixed payment options selected in a feature game. The amount of gaming media which is the content of each of the fixed payment options already selected is continuously notified during a period in which the feature game is executed. Therefore, a player can keep track of the amount of gaming media clearly determined to be acquired at a current time period.

The invention of (7-4) is directed to a gaming machine control method, comprising the steps of:

(A) a controller executing a normal game in which a symbol display device which is capable of variably displaying a plurality of symbols variably displays and then stop-displays the symbols;

(B) the controller executing a feature game in which any option is selected from among a plurality of options, in response to a fact that a predetermined condition is established in the normal game executed in accordance with the step (A);

(C) the controller continuously notifying a content related to the selected option, during a period in which the feature game is executed in the step (B); and (D) the controller awarding a payment, based on the content related to the selected option, in the feature game executed in accordance with the step (B).

According to the invention of (7-4), any option is selected from among a plurality of options, in a feature game played in the wake of the fact that a predetermined condition is established in a normal game. In addition, a payment is awarded based on the content related to the selected option. The contents related to the options can include a predetermined animation character or the amount of gaming media or the like. The content related to the selected option is continuously notified during a period in which a feature game is executed. For example, a display mode of an image (for example, card) according to a selected option changes from a display mode disabling the contents of the option to be visualized (for example, faced-down card) to a display mode enabling the contents to be visualized (for example, faced-up card). The display mode after changed continues during the period in which the feature game is executed. As just described, the content related to the selected option is continuously notified during the period in which the feature game is executed, thus imparting a yardstick to a player as to the amount of payment acquirable in the feature game.

The invention of (7-5) is directed to the gaming machine of (7-1), comprising an input device which is capable of inputting an instruction related to a game, wherein in the processing (B), the feature game is started in the wake of the fact that when a plurality of specific symbols are stop-displayed in the normal game executed in accordance with the processing (A), the input device inputs an instruction of selecting the specific symbols associated with the feature game.

According to the present invention, there can be provided a gaming machine with new entertainability and a gaming machine control method.

BRIEF DESCRIPTION OF THE DRAWINGS

FIG. 25 is a view for explaining a variable reel lottery table according to the second embodiment of the present invention;

DESCRIPTION OF THE PREFERRED EMBODIMENTS

Hereinafter, embodiments (first to seventh embodiments) of the present invention will be described.

First Embodiment

A first embodiment describes the invention of (1). First of all, an outline of the first embodiment will be described. In a gaming machine 1 (see FIG. 4) according to the embodiment, a slot game is played. In the slot game, in response to the fact that three bonus symbols has stopped, this gaming machine accepts an input of selecting one bonus symbol from among the three stopped bonus symbols. Hereinafter, a game played in response to the fact that three bonus symbols are stop-displayed is referred to as a 3-option bonus game. A predetermined benefit (credit payment, free game, or 29-option game) is associated with a respective one of the three bonus symbols and then the bonus (credit payment, free game, or 29-option game) corresponding to the selected bonus symbol is awarded. A free game and a 29-option game will be described later. In the embodiment, in a case where a bonus symbol corresponding to credit payment is selected, there takes places a game state in which one bonus symbol can be further selected from among the remaining two bonus symbol at a predetermined probability. In this game state, selection one bonus symbol plays the free game or 29-option game corresponding to the bonus symbol.

Hereinafter, with reference to FIG. 1A to 1H, an outline of the first embodiment will be described. FIG. 1A to FIG. 1H are views each showing an example of an image displayed on a lower image display panel included in a gaming machine according to the first embodiment.

Figure 1A:
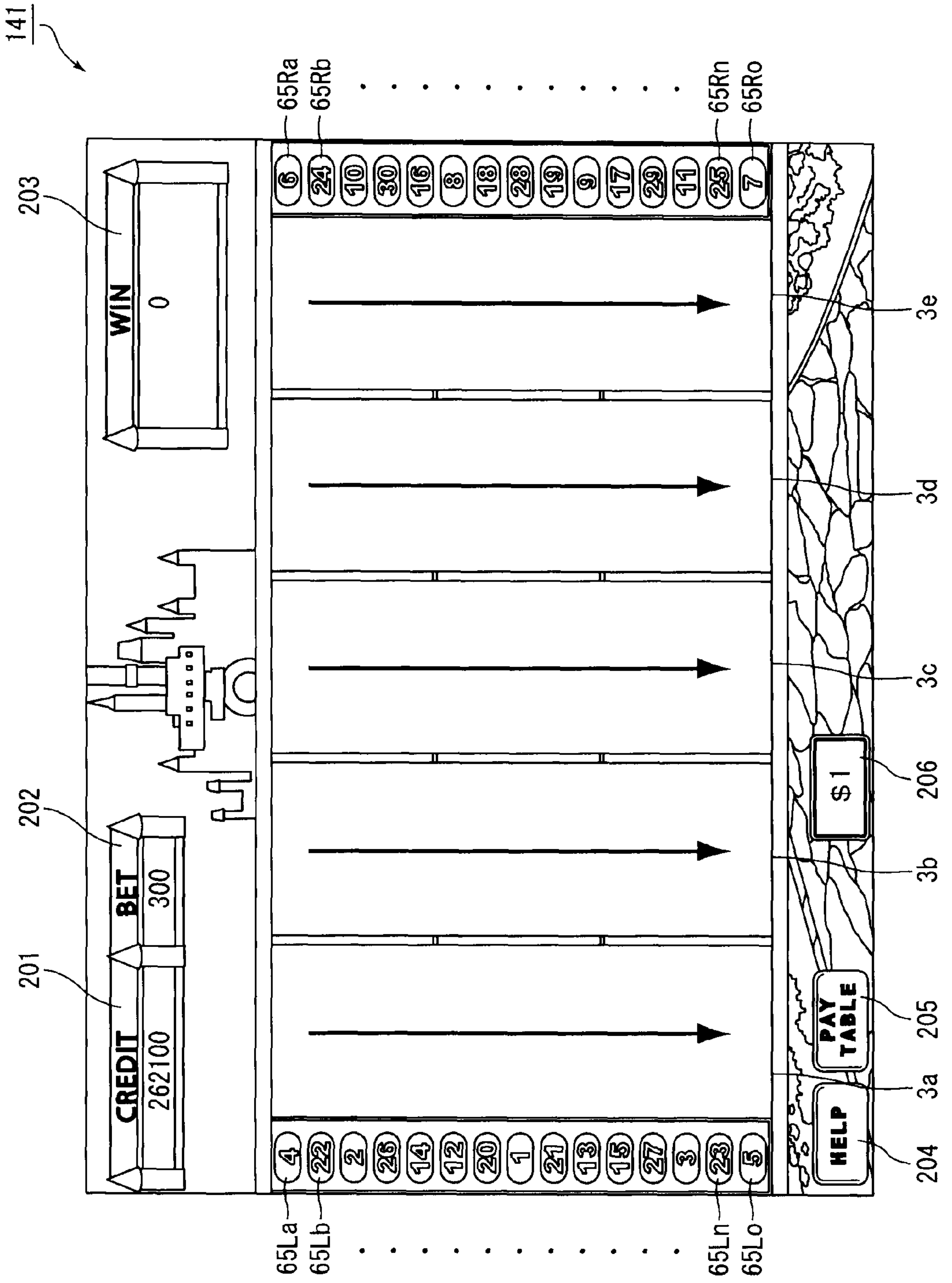
FIG. 1A is a view showing an example of an image displayed on a lower image display panel included in a gaming machine according to a first embodiment of the present invention.

As shown in FIG. 1A, five video reels 3 (3*a*, 3*b*, 3*c*, 3*d*, 3*e*) are displayed at a substantial center part of a lower image display panel 141 (see FIG. 4) included in a gaming machine 1 according to the embodiment. FIG. 1A shows how symbols are scroll-displayed in the video reels 3, respectively. The lower image display device 141 corresponds to a symbol display device of the present invention. Apart from the above, the lower image display panel 141 displays: a number-of-credits display portion 201 for displaying the number of credits; a number-of-BETs display portion 202 for displaying the number of BETs; a number-of-payouts display portion 203 for displaying the number of payouts; a help display button 204; a pay table display button 205 for displaying a payment table; a denomination display portion 206 for displaying a minimum unit of gaming media which can be employed in game(s); and a total of 30 payline generation portions 65 (65La, 65Lb, 65Lc, 65Ld, 65Le, 65Lf, 65Lg, 65Lh, 65Li, 65Lj, 65Lk, 65Ll, 65Lm, 65Ln, 65Lo, 65Ra, 65Rb, 65Rc, 65Rd, 65Re, 65Rf, 65Rg, 65Rh, 65Ri, 65Rj, 65Rk, 65Rl, 65Rm, 65Rn, 65Ro).

Figure 1B:
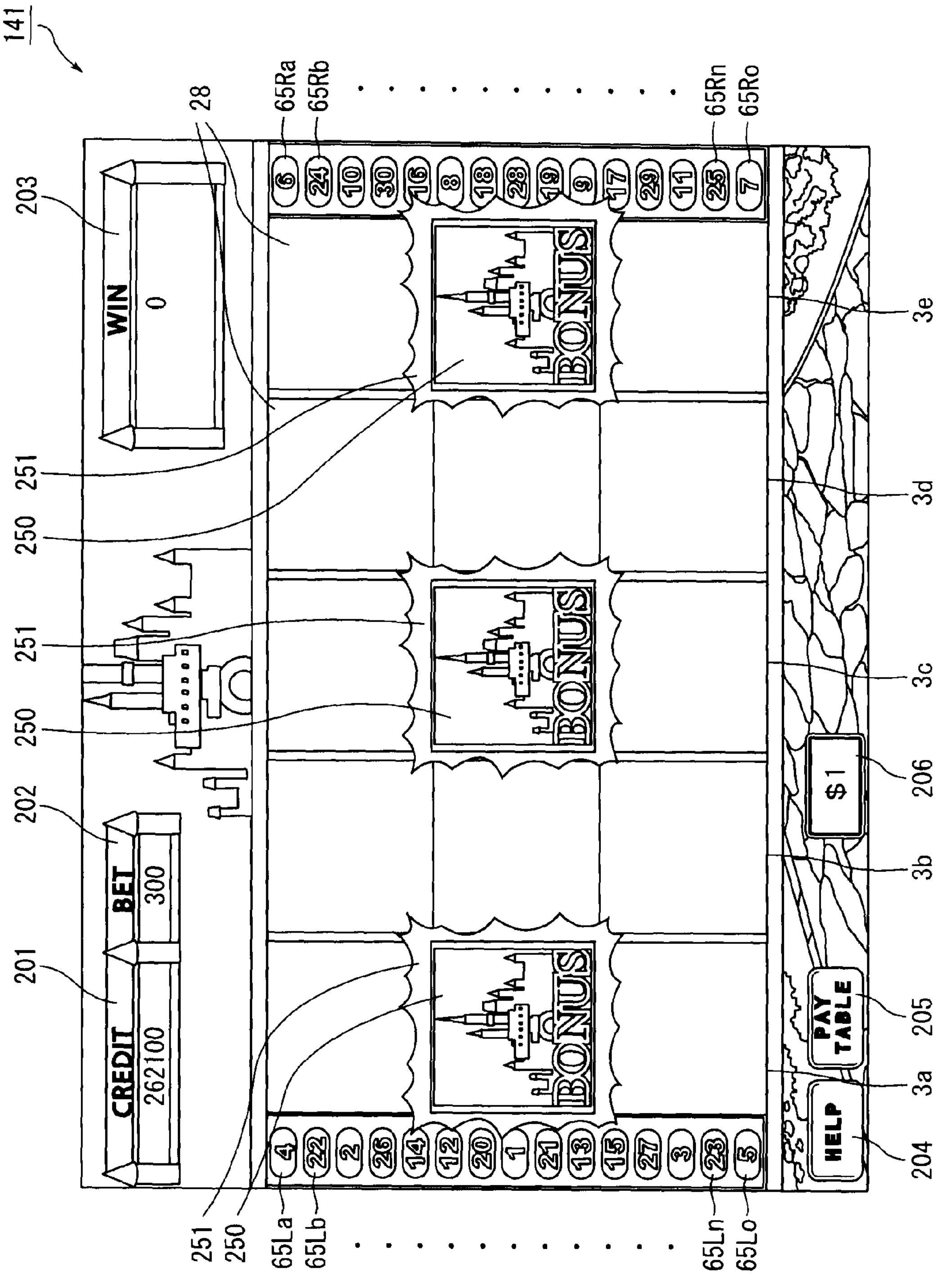
FIG. 1B is a view showing an example of an image displayed on the lower image display panel included in the gaming machine according to the first embodiment of the present invention.

FIG. 1B shows how three bonus symbols 250 stop after symbols have been scroll-displayed shown in FIG. 1A. Three bonus symbols 250 are stop-displayed in display blocks 28 at the middle stage of the video reels 3*a*, 3*c*, 3*e*, respectively, and an image 251 emphasizing that the bonus symbols 250 are stop-displayed is displayed around each of the bonus symbols 250. The bonus symbol 250 corresponds to a specific symbol of the present invention.

Figure 1C:
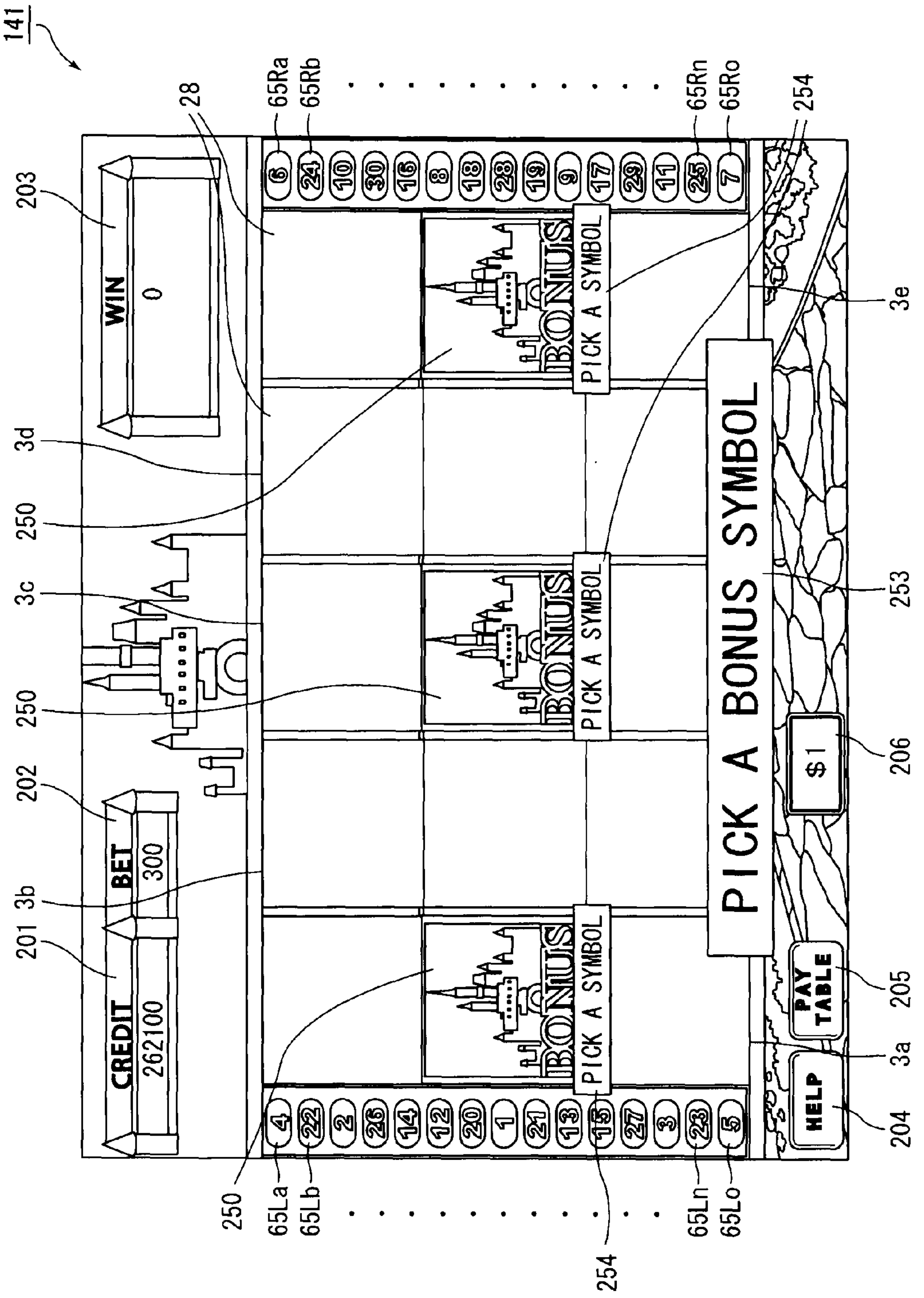
FIG. 1C is a view showing an example of an image displayed on the lower image display panel included in the gaming machine according to the first embodiment of the present invention.

Subsequently, as shown in FIG. 1C, an image 253 which prompts a player to select any of the bonus symbols 250 and an image 254 promoting selection of each of the bonus symbols 250 are displayed. As shown in FIG. 1C, the player cannot visually recognize which of the benefits (credit payment, free game, 29-option game) is associated with which of the bonus symbols 250 at this time point. A touch panel 114 (see FIG. 4) is provided on the lower image display panel 141, and the player can select one bonus symbol 250 by touching a site corresponding to any of the stop-displayed three bonus symbols 250 on the touch panel 114. The touch panel 114 corresponds to an input device of the present invention.

Figure 1D:
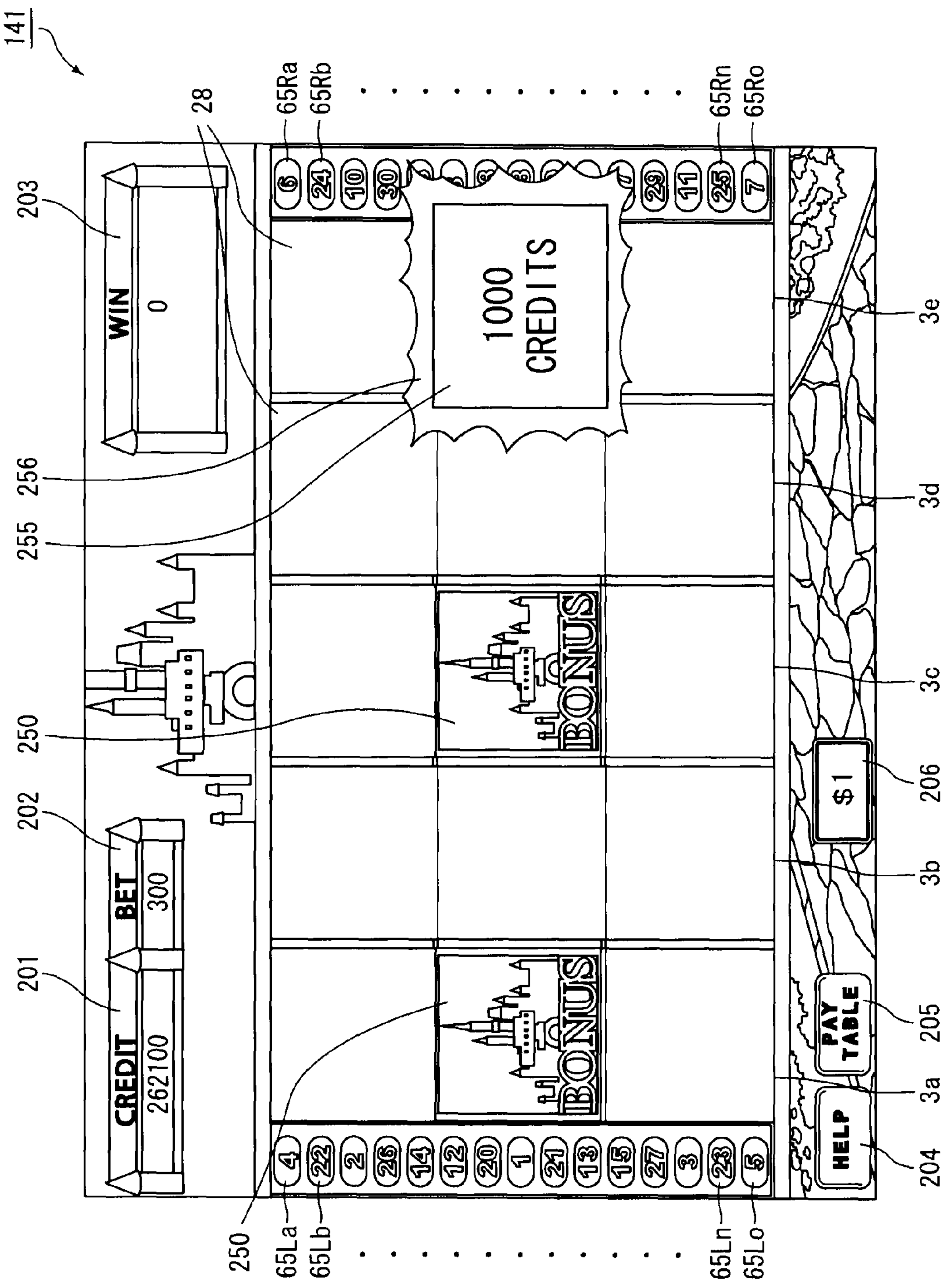
FIG. 1D is a view showing an example of an image displayed on the lower image display panel included in the gaming machine according to the first embodiment of the present invention.

When a player select the bonus symbol 250, an image indicating a benefit (credit payment, free game, or 29-option game) associated with the bonus game symbol 250 in advance is displayed at the site corresponding to the selected bonus symbol 250, as shown in FIG. 1D. FIG. 1D shows how the bonus symbol 250 stop-displayed on the fifth video reel 3*e* is selected. An image 255 indicating credit payment corresponding to the bonus symbol 250 and an image 256 emphasizing that credit payment is selected are also displayed.

Figure 1E:
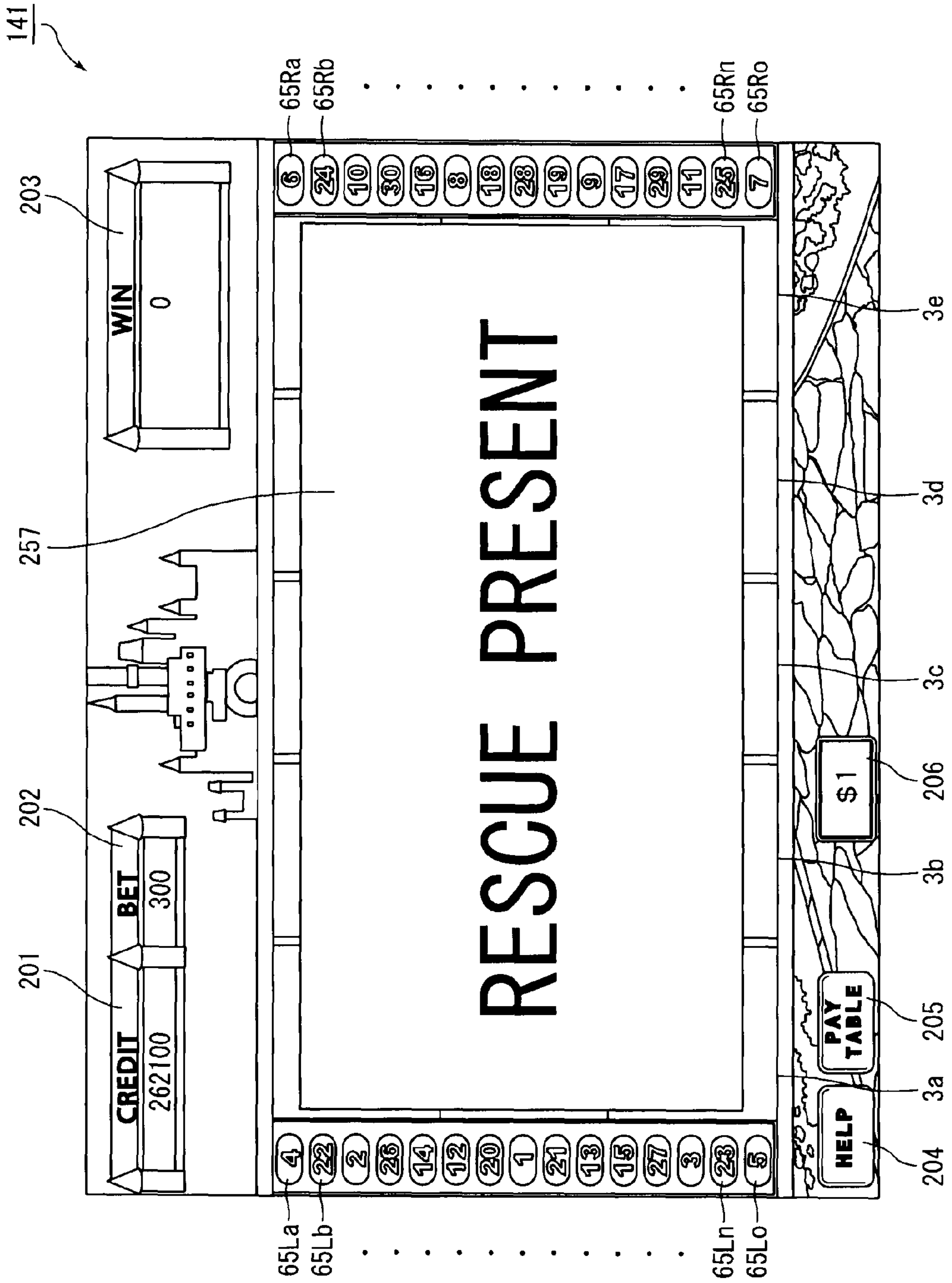
FIG. 1E is a view showing an example of an image displayed on the lower image display panel included in the gaming machine according to the first embodiment of the present invention.

As described above, in the embodiment, in a case where the bonus symbol 250 corresponding to credit payment is selected, "RESCUE PRESENT" which is a game state enabling further selection of a bonus symbol 250 takes place at a predetermined probability (1/4). If "RESCUE PRESENT" takes place, the lower image display panel 141 displays an image 257 indicating the fact of occurrence of "RESCUE PRESENT", as shown in FIG. 1E. The "RESCUE PRESENT" state corresponds to a specific game state of the present invention.

Figure 1F:
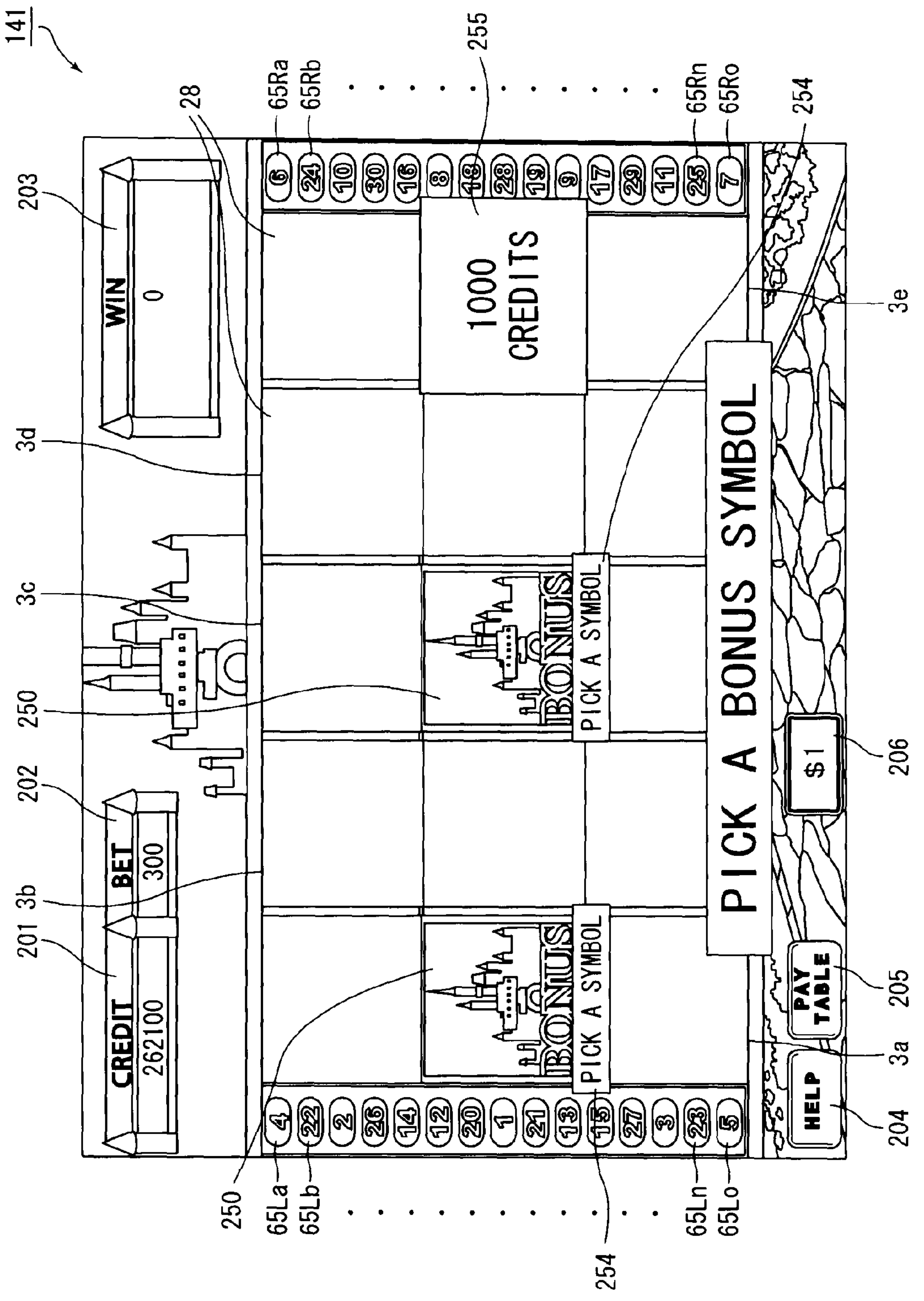
FIG. 1F is a view showing an example of an image displayed on the lower image display panel included in the gaming machine according to the first embodiment of the present invention.

Subsequently, an image 253 which prompts a player to select any bonus symbol 250 again and each image 254 which prompt a player to select a bonus symbol 250 are displayed (FIG. 1F). Symbols targeted to be selected at this time point are two bonus symbols 250 which are not selected. An image 255 displayed corresponding to the already selected bonus symbol 250 is continuously displayed.

Figure 1G:
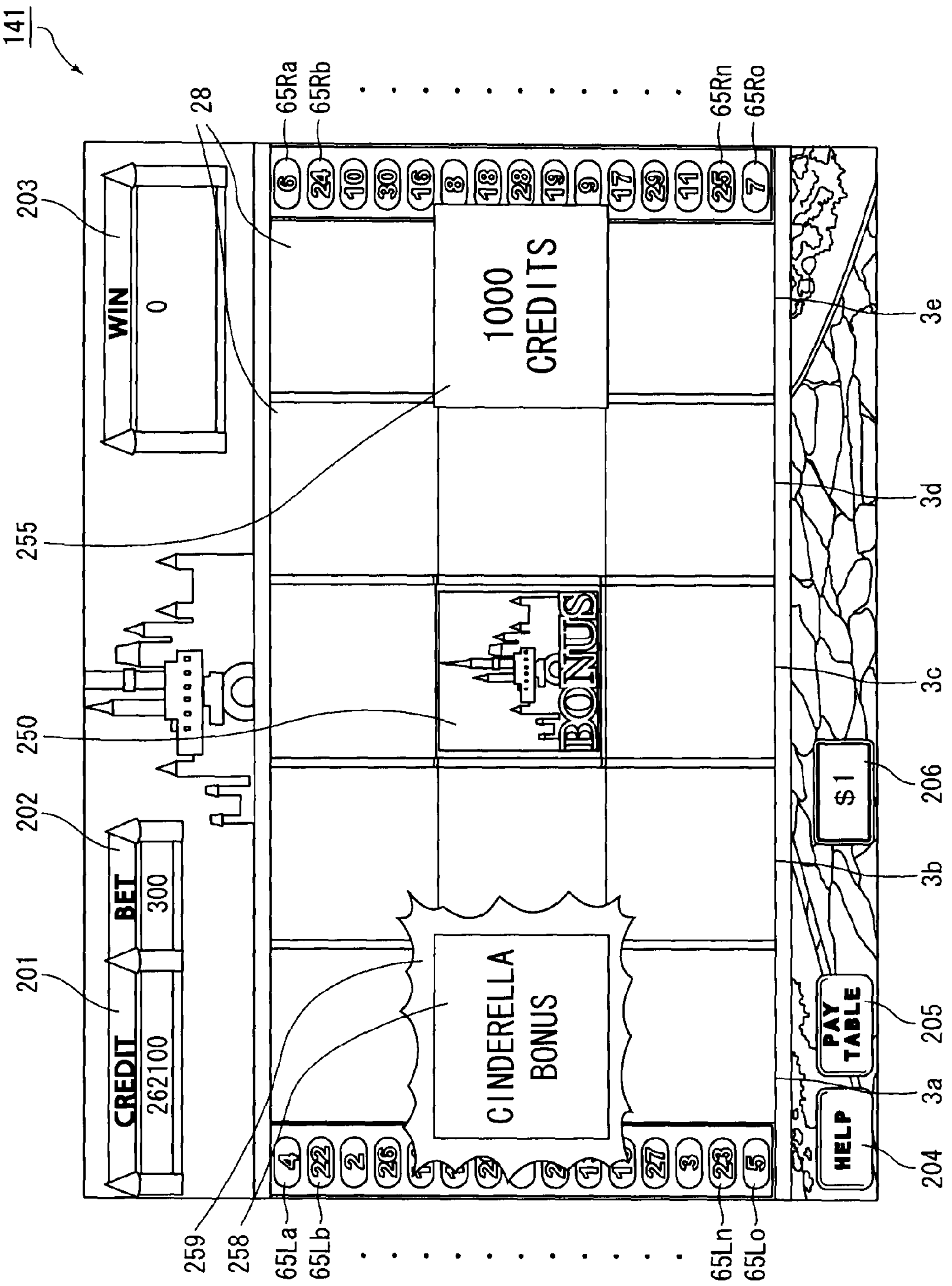
FIG. 1G is a view showing an example of an image displayed on the lower image display panel included in the gaming machine according to the first embodiment of the present invention.

If selecting a bonus symbol 250 in FIG. 1F, as shown in FIG. 1G, displays an image indicating a game (free game or 29-option game) corresponding to the bonus symbol 250 at a site corresponding to the selected bonus symbol 250. FIG. 1G shows how the bonus symbol 250 stop-displayed on a first video reel 3*a* is selected. An image 258 indicating a free game (CINDERELLA BONUS) corresponding to the bonus symbol 250 and an image 259 emphasizing that the free game is selected are also displayed. Afterwards, the selected free game "CINDERELLA BONUS" is played.

Figure 1H:
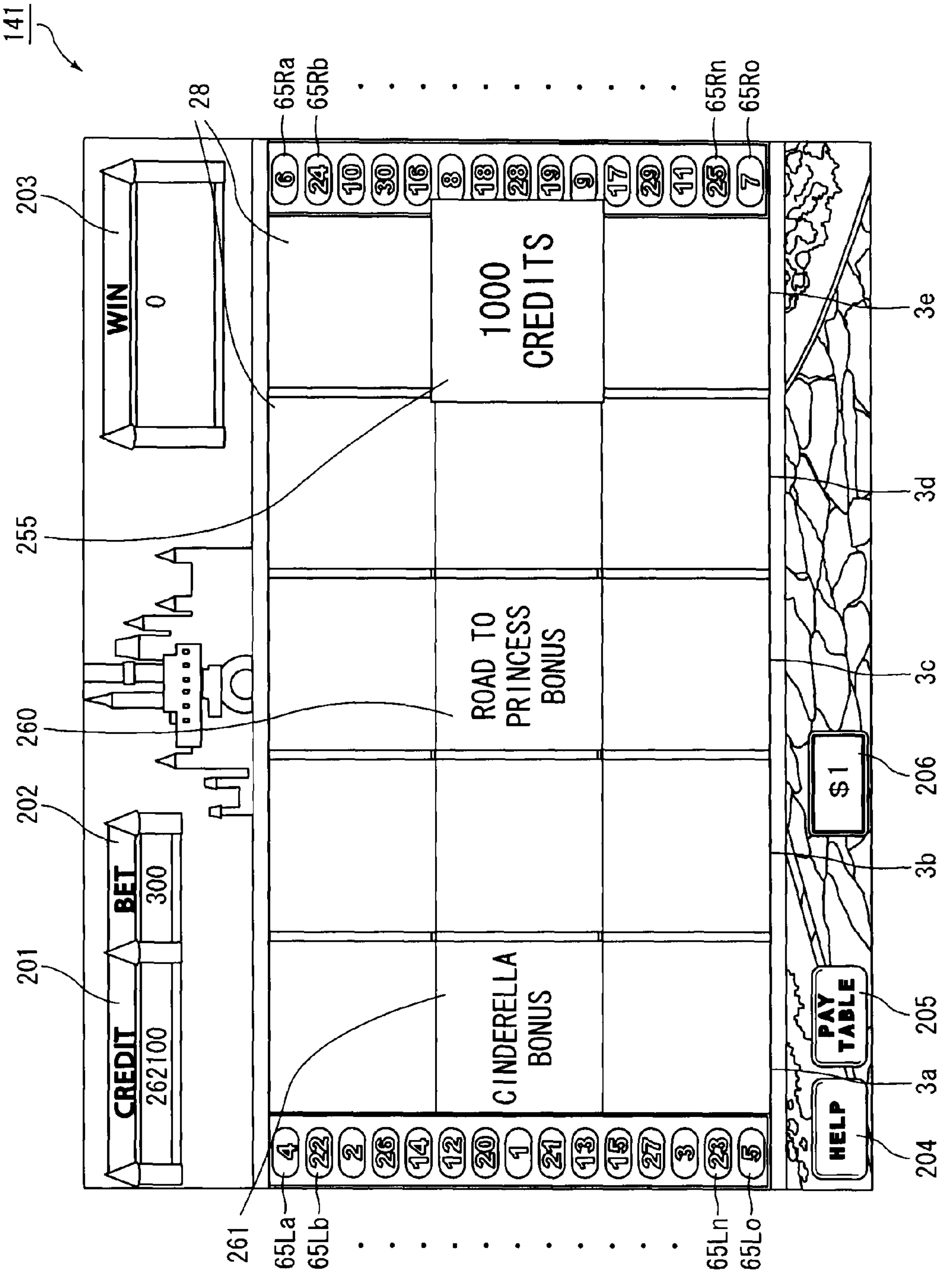
FIG. 1H is a view showing an example of an image displayed on the lower image display panel included in the gaming machine according to the first embodiment of the present invention.

If "RESCUE PRESENT" does not take place even when the bonus symbol 250 corresponding to credit payment is selected, as shown in FIG. 1H, a title of game (free game or 29-option game) corresponding to another bonus symbol 250 which is not selected is disclosed (image 260 and image 261), and a 3-option bonus game completes. In a case where a bonus symbol 250 corresponding to a free game or a 29-option game is selected on a scene (shown in FIG. 1C) in which one bonus symbol 250 can be selected from among three bonus symbols 250 as well, the display similar to that of FIG. 1H is provided. Afterwards, the selected free game or 29-option game is played.

[Description of Functional Flow Diagram]

Figure 2:
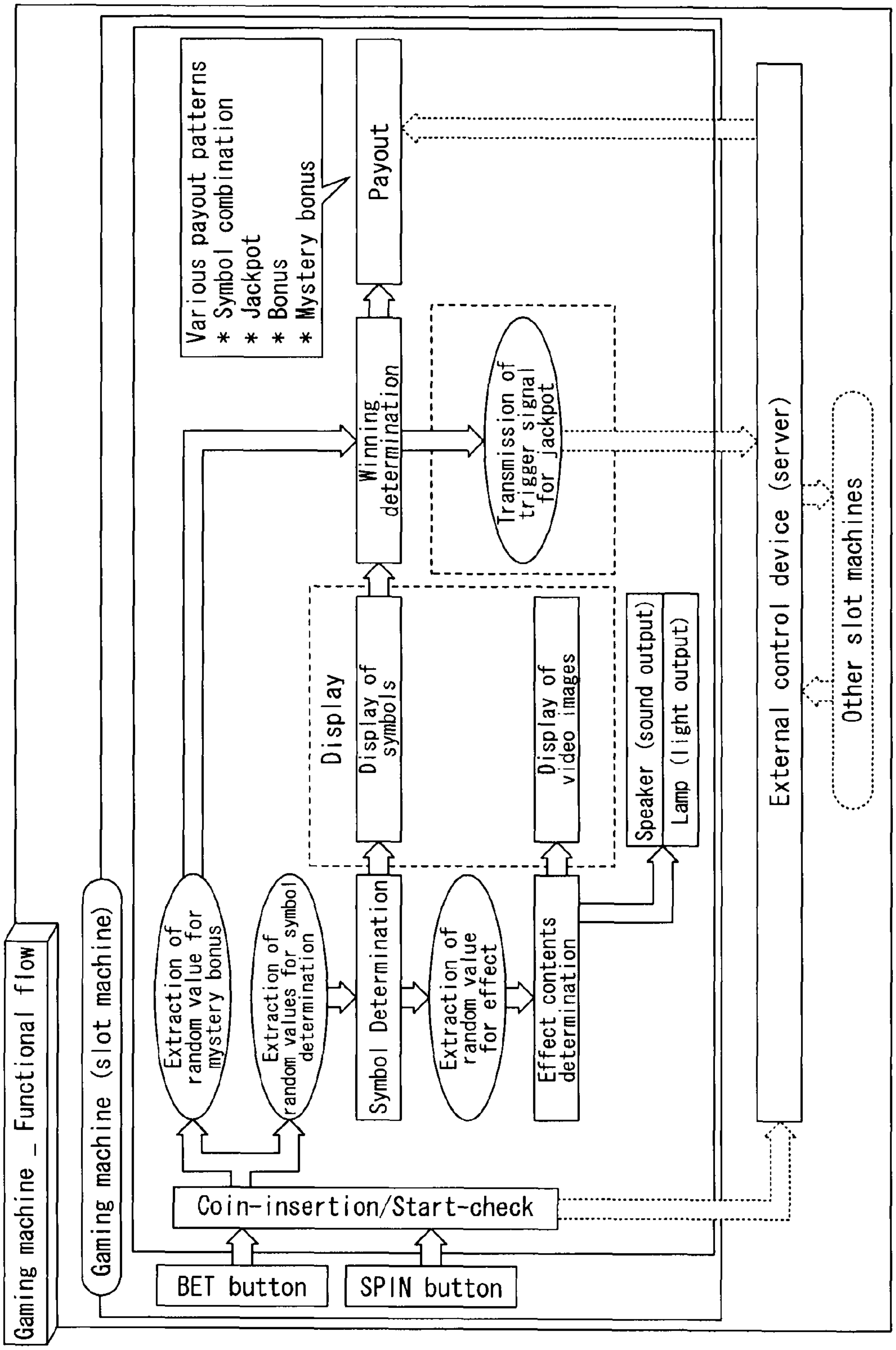
FIG. 2 is a functional flow diagram of the gaming machine according to the first embodiment of the present invention.

With reference to FIG. 2, basic functions of the gaming machine according to the embodiment will be described. FIG. 2 is a diagram showing a functional flow of the gaming machine according to the first embodiment of the present invention.

<Coin-Insertion/Start Check>

First, the gaming machine checks whether or not a player has pressed a BET button, and subsequently checks whether or not a player has presses a SPIN button.

<Symbol Determination>

When a player has then pressed the SPIN button, the gaming machine extracts random values for symbol determination and then determines symbols to be displayed for a player, when symbol array scrolling has been stopped in accordance with a respective one of a plurality of video reels displayed on a display.

<Symbol Display>

The gaming machine then starts scrolling of the symbol arrays of video reels respectively, and stops scrolling so that the determined symbols are displayed for a player.

<Determination of Winning Prize>

When scrolling of the symbol arrays of each video reels is stopped, the gaming machine determines whether or not a combination of symbols displayed for a player corresponds to a winning prize.

<Payout>

When the combination of symbols displayed for a player corresponds to the winning prize, the gaming machine awards a benefit corresponding to a type of the symbol combination to the player. For example, when a symbol combination related to coin payout is displayed, the gaming machine pays out the coins whose number corresponds to the symbol combination to the player.

When a symbol combination related to a bonus game trigger is displayed, the gaming machine starts a bonus game. The present embodiment defines stoppage of three bonus symbols as a bonus game trigger for bonus game. A player is promoted to select one of the stop-displayed three bonus symbols and then plays a 3-option bonus game enabling a payment to be awarded or a variety of games to be executed according to a result of the selection.

When a symbol combination related to a jackpot trigger is displayed, the gaming machine pays out coins of a jackpot amount to a player. A jackpot means a function of paying out coins of accumulated jackpot amount to a gaming machine if a jackpot trigger is established after part of coins consumed by a player in each gaming machine has been accumulated as a jackpot amount. The gaming machine calculates an amount to be accumulated on the jackpot amount (accumulated amount) for each game, and transmits the calculated amount to an external control device. The external control device accumulates the accumulated amount transmitted from each gaming machine on the jackpot amount.

Apart from the above bonuses, a bonus such as a mystery bonus can be awarded in a gaming machine. The mystery bonus means that a predetermined amount of coins are paid out by a player winning a dedicated lottery. When the SPIN button is pressed, the gaming machine extracts random values for mystery bonus, and determines whether or not a mystery bonus trigger is established, by means of lottery.

<Effect Determination>

A gaming machine conducts an effect by way of display-image representation, lamp light emission from a lamp, and speaker sound output. The gaming machine extracts random values for effect and then determines the contents of the effect, based on the symbols or the like determined by means of lottery.

[Entire Game System]

Figure 3:
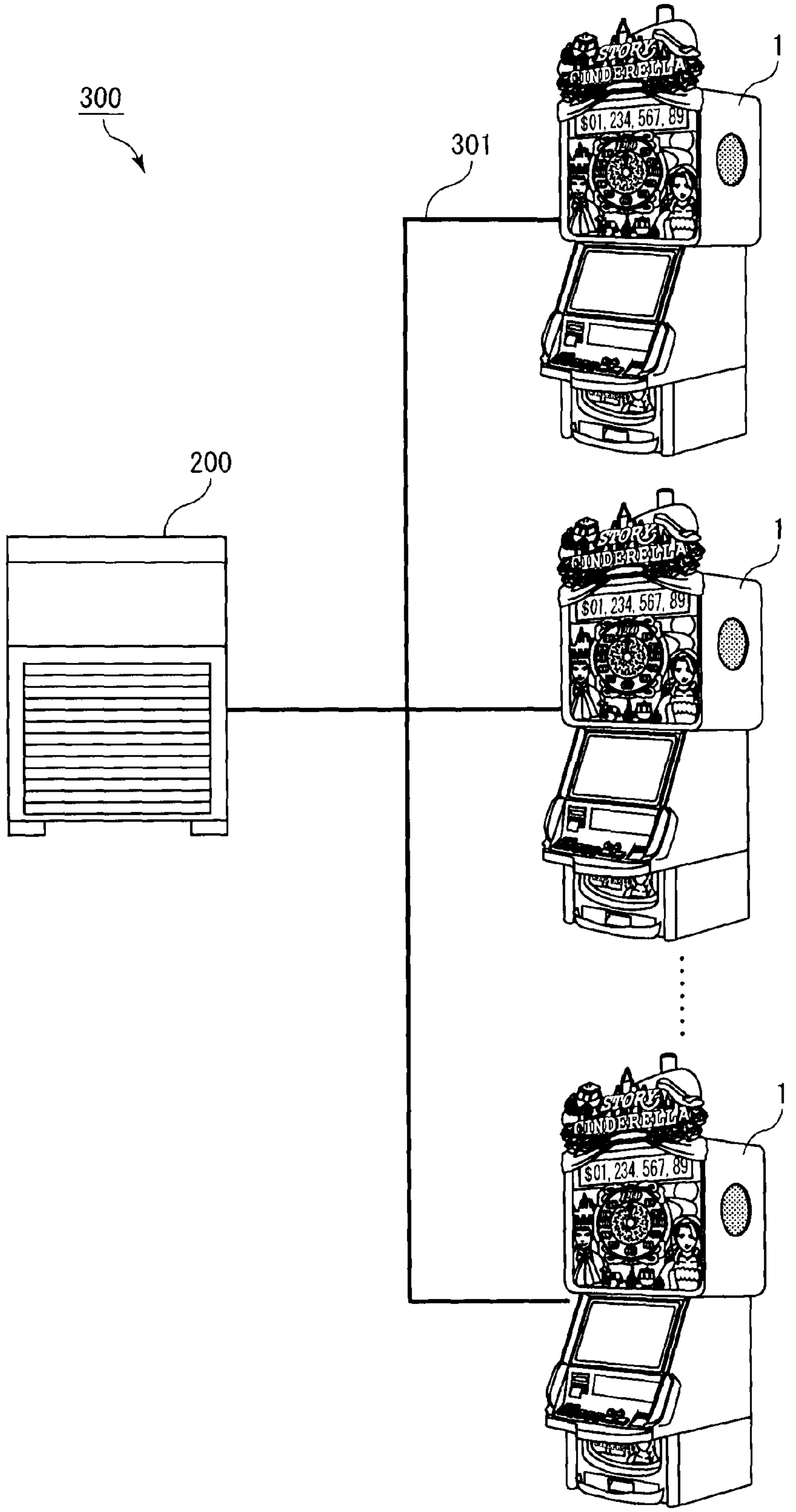
FIG. 3 is a view showing a game system including the gaming machine according to the first embodiment of the present invention.

Basic functions of the gaming machine have been described hereinabove. Next, with reference to FIG. 3, a game system including gaming machines will be described. FIG. 3 is a view showing a game system including the gaming machine according to the first embodiment of the present invention.

A game system 300 is provided with: a plurality of gaming machines 1; and an external control device 200 connected to each of the gaming machines 1 via a communication line 301.

The external control device 200 controls the plurality of gaming machines 1. In the first embodiment, the external control device 200 is a so called hall server installed in a gaming facility having the plurality of gaming machines 1. Each of the gaming machines 1 is assigned with its specific identification number and then the external control device 200 determines a source of data sent from each of the gaming machines 1 by identification numbers. In a case where data is transmitted from the external control device 200 to the gaming machine 1 as well, a transmission destination is specified using an identification number. The external control device 200 conducts jackpot accumulation, based on the number of gaming media betted in each of the gaming machines 1.

The game system 300 may be constructed in one gaming facility such as a casino in which a variety of games can be played, or alternatively, may be constructed between a plurality of gaming facilities. In a case where the system is constructed in one gaming facility, the game system 300 may be constructed at each floor or section of the gaming facility. The communication line 301 may be wired or wireless, and a leased line or an exchange line and the like may be employed.

While the embodiment describes a case in which the plurality of gaming machines 1 are connected to enable communication via the communication line 301, the gaming machine of the present invention may be of standalone type which is not network-connected.

[Entire Structure of Gaming Machine]

Figure 4:
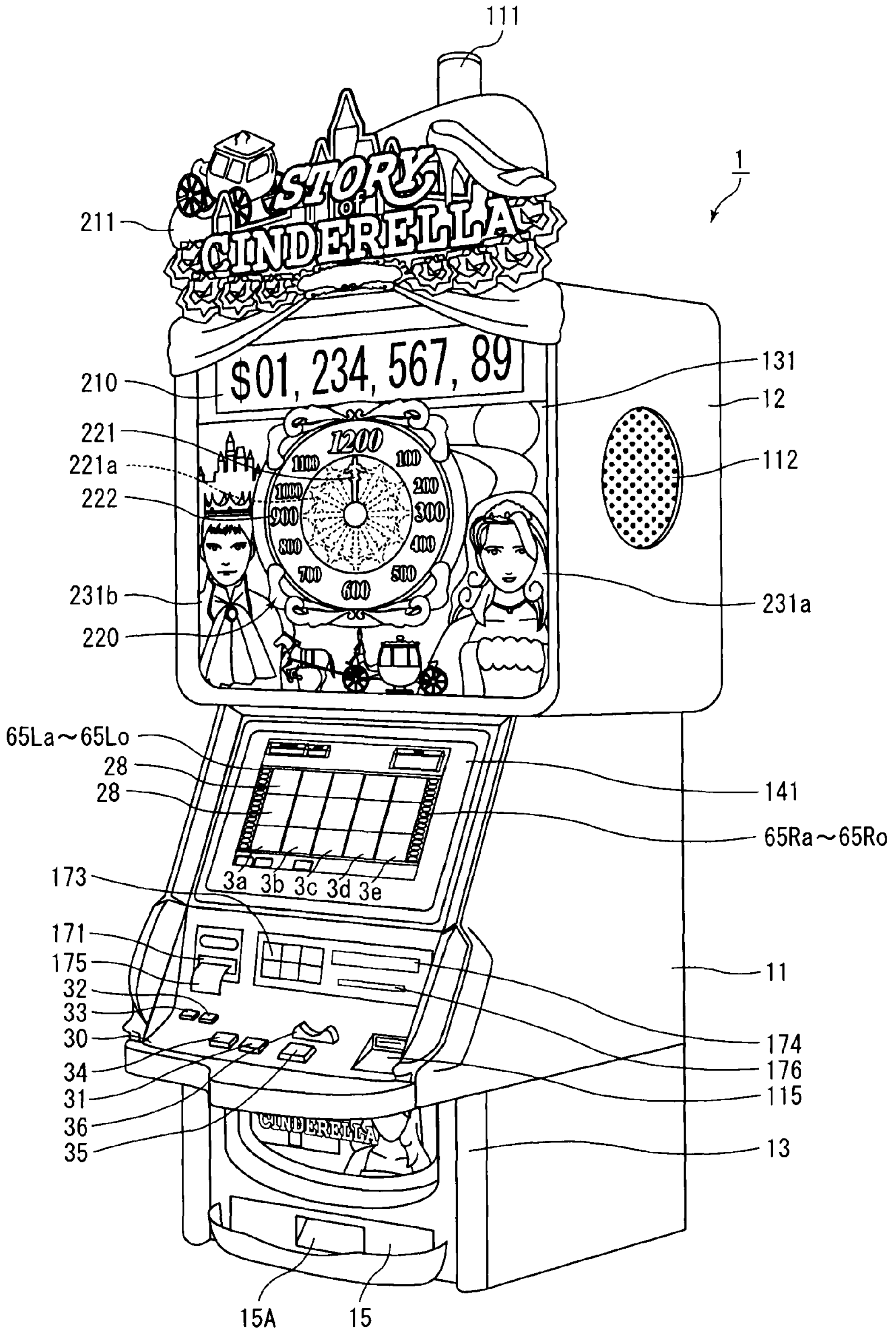
FIG. 4 is a view showing an entire configuration of the gaming machine according to the first embodiment of the present invention.

Hereinabove, the game system according to the embodiment has been described. Next, with reference to FIG. 4, an entire structure of the gaming machine 1 will be described. FIG. 4 is a view showing an entire configuration of the gaming machine according to the first embodiment of the present invention.

In the gaming machine 1, coins, bills, or electronic value information corresponding thereto is employed as gaming media. In the first embodiment, a ticket with a barcode, to be described later, is also employed as well. The gaming media are not limitative thereto, and medals, tokens, or electronic money and the like may be employed, for example.

The gaming machine 1 is provided with: a cabinet 11; a top box 12 set at the upper side of the cabinet 11; and a main door 13 provided on the front side of the cabinet 11.

A lower image display panel 141 is provided at the center of the main door 13. The lower image display panel 141 is made up of a liquid crystal panel, and configures a display. The lower image display panel 141 has a symbol display region 4. Five video reels 3 (3*a*, 3*b*, 3*c*, 3*d*, 3*e*) are displayed in the symbol display region 4. The symbol display region 4 is provided with 15 display blocks 28, and the display blocks 28 are assigned, on a three-by-three blocks basis, to the positions corresponding to each of the video reels 3. In the first embodiment, the video reels are the ones in which operations of rotating and stopping mechanical reels when a plurality of symbols are drawn on peripheral faces thereof are expressed by way of video image. A symbol array made up of a plurality of predetermined symbols is assigned to each of video reels 3.

The symbol array assigned to each of the video reels 3 is scrolled in the symbol display region 4 and then stops after the elapse of a predetermined period of time. As a result, part of the respective one of the symbol arrays (four continuous symbols of the first embodiment) is displayed for a player. In the symbol display region 4, symbols are displayed in three regions i.e., the top stage, middle stage, and bottom stage, respectively, according to each of the video reels 3. Namely, a total of 15 symbols (5 columns×3 symbols) are displayed in the symbol display region 4.

In the first embodiment, any of these three regions is selected according to each of the video reels 3 and then a line formed by connecting a respective one of them is defined as a winning line (payline). While a specific mode of the winning line may be arbitrarily employed, for example, a V-shaped or bent line and the like may be employed apart from a straight line connecting a respective one of the display regions of the middle stage according to each of the video reels 3. While, in the first embodiment, the number of winning lines is 30, it may be arbitrarily employed.

The lower image display panel 141, as described with reference to FIG. 1, displays a number-of-credits display portion 201; a number-of-BETs display portion 202; a number-of-payouts display portion 203; a help display button 204; a pay table display button 205; a denomination display portion 206; and a payline generation portion 65 or the like. A payline generation portion 65L and a payline generation portion 65R generate a payline by forming a pair of them.

The lower image display panel 141 incorporates a touch panel 114. A player can input a variety of instructions by touching the lower image display panel 141.

A ticket printer 171, a card slot 176, a data display 174, and a keypad 173 are provided at the lower side of the lower image display panel 141.

The ticket printer 171 prints on a ticket a barcode having data such as the number of credits, date and time, or identification number of gaming machine 1 encoded therein and then outputs the printed ticket as a ticket 175 with a barcode. A player can play a game while causing a gaming machine to read the above-described ticket 175 with a barcode or can exchange the barcode-attached ticket 175 with a bill or the like at a predetermined site of a gaming facility (for example, cashier in casino).

The card slot 176 is for inserting a card in which predetermined data is stored. The card stores data for identifying a player or data related to the history of games played by players, for example. The card reader 172 to be described later reads and writes data contained in the card inserted into the card slot 176. The card stores data related to coins, bills, or credits.

The data display 174 is made up of a fluorescent display or an LED and the like and displays the data read by the card reader 172, for example, or the data input via the keypad 173 by a player. The keypad 173 is for inputting instructions or data related to ticket issuance or the like.

A variety of devices targeted for a player's operation, including a variety of buttons arranged on a control panel 30, are arranged at the lower side of the ticket printer 171 or the like.

A SPIN button 31 is employed to start scrolling of the symbol arrays of each of the video reels 3. A CHANGE button 32 is employed to request the staff of a gaming facility to change money. A CASHOUT button 33 is employed to pay out the coins deposited inside of the gaming machine 1 to a coin tray 15.

A 1-BET button 34 and a MAXBET button 35 are for determining the number of coins (hereinafter, the number of BETs) employed in a game, based on the coins deposited inside of the gaming machine 1. The 1-BET button 34 is employed to determine the number of BETs in units of one piece. The MAXBET button 35 is employed to define the number of BETs as a specified upper limit.

A coin accepting slot 36 is provided for accepting coins. A bill validator 115 is provided for accepting bills. The bill validator 115 validates whether or not a bill is valid, and accepts the valid bill in a cabinet 11. The bill validator 115 may be configured so that the above-described ticket 175 with a barcode to be described later is readable.

An upper image display panel 131 is provided on the front face of the top box 12. The upper image display panel 131 is made up of a liquid crystal panel, and configures a display. The upper image display panel 131 displays an image or the like related to an effect.

A jackpot display portion 210 displaying a current jackpot amount is provided at the upper side of the upper image display panel 131. A clock-type roulette portion 220 simulating a clock is provided at the lower side of the jackpot display portion 210. A clock-hands portion 221 and a numeric portion 222 are provided at the clock-type roulette portion 220. The clock-hands portion 221 causes any of a plurality of clock-hands portion-oriented light emitting portions 221*a* to be light-emitted by means of an LED (not shown) provided at the back side of the clock-type roulette portion 220. Animation character images 231*a* and 231*b* indicating game animation character are displayed at the left and right of the clock-type roulette portion 220.

A decoration member 221, a speaker 112, and a lamp 111 are provided in the top box 12. The gaming machine executes an effect by way of image display, sound output, and light emission.

[Configuration of Circuit Included in Gaming Machine]

An entire structure of the gaming machine 1 will be described above.

Figure 5:
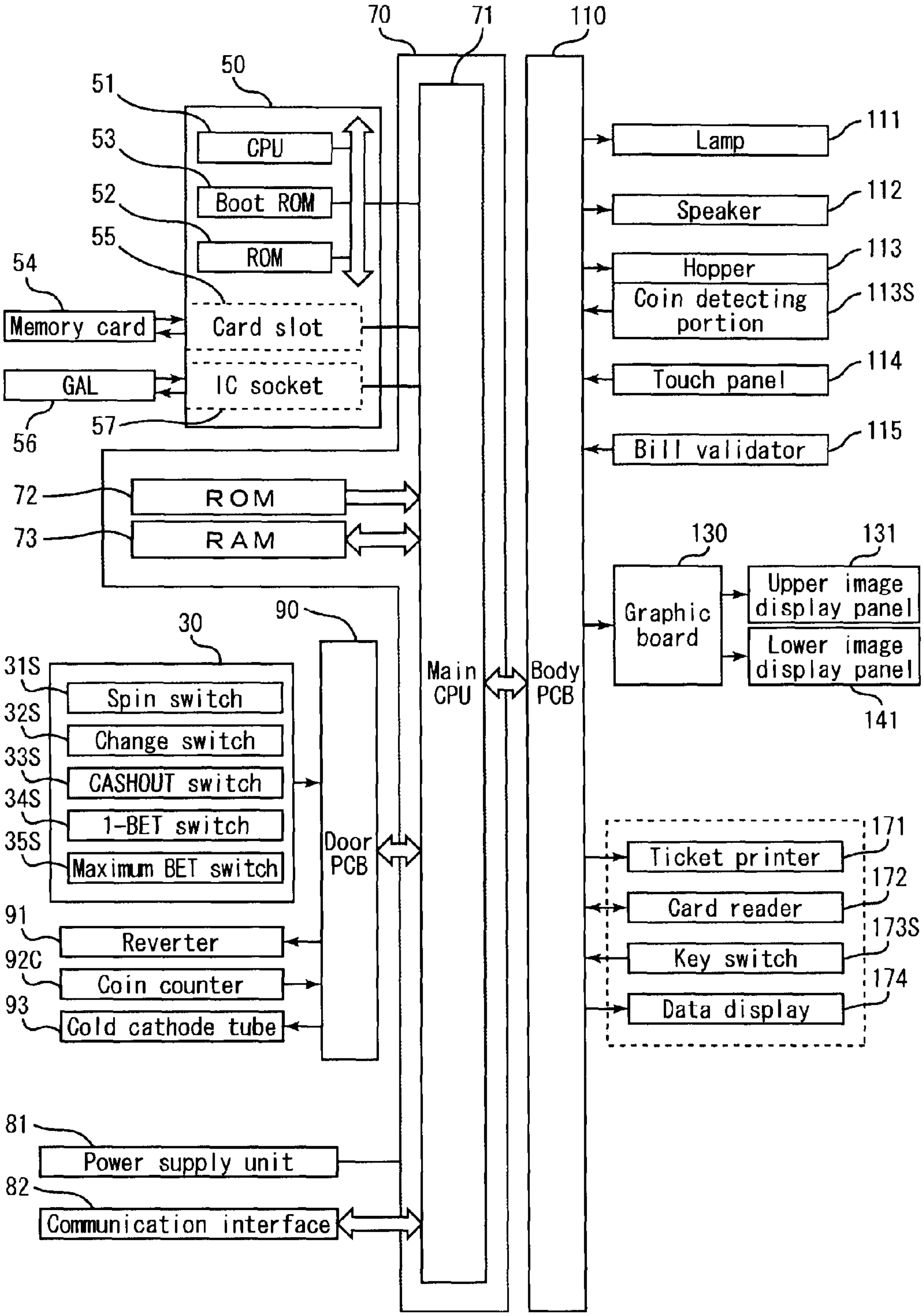
FIG. 5 is a block diagram showing an internal configuration of the gaming machine according to the first embodiment of the present invention.

Next, with reference to FIG. 5, a configuration of a circuit included in the gaming machine 1 will be described. FIG. 5 is a block diagram depicting an internal configuration of the gaming machine 1 according to the first embodiment of the present invention.

A gaming board 50 is provided with: a CPU 51, a ROM 52, and a boot ROM 53 interconnected via an internal bus; a card slot 55 corresponding to a memory card 54; and an IC socket 57 corresponding to a GAL (General Array Logic) 56.

The memory card 54 is made up of a nonvolatile memory and stores game programs and a game system program. The game programs include: a program related to the progress of games; a lottery program; and a program for executing an effect by way of image or sound (see FIGS. 6 to 12, 16, 18, 20, and 22 to be described later, for example). The game programs include data (see FIG. 5) specifying a configuration of the symbol array assigned to each of the video reels 3.

The lottery program is a program for determining the to-be-stopped symbols of each of the video reels 3 by means of lottery. The to-be-stopped symbols are data for determining three symbols displayed in the symbol display region 4, among a plurality of symbols configuring the symbol arrays. The gaming machine 1 of the embodiment determines symbols displayed in a predetermined region (for example, region of the upper stage) as to-be-stopped symbols, among three regions in accordance with each of the video reel 3 in the symbol display region 4.

The lottery program includes symbol determination data. The symbol determination data is data that specifies random values so that a respective one of the plurality of symbols configuring symbol arrays is determined at a uniform probability. The probability at which the respective one of the plurality of symbols is to be determined is basically uniform. However, it is to be noted that a variety of symbols are determined at different probabilities, since a different number of various symbols are included in the plurality of symbols (namely, a weight is generated).

While the embodiment specifies data so that the same number of symbols configure the symbols array of each of the video reels 3, a different number of symbols may configure the symbol array in accordance with each of the video reels 3. For example, the symbol array of the first video reel 3*a* may be comprised of 22 symbols, whereas that of the second video reel 3*b* may be comprised of 30 symbols. This increases the degree of freedom at the time of setting probabilities at which various symbols are to be determined according to each of the video reels 3.

The card slot 55 is configured so that a memory card 54 can be inserted thereinto or removed therefrom, and is connected to a motherboard 70 by means of an IDE bus.

The GAL 56 is one kind of PLD (Programmable Logic Device) having an OR-fixed arrayed structure. The GAL 56 is provided with pluralities of input ports and output ports, and when a predetermined input arises at an input port, the corresponding data is output from an output port.

An IC socket 57 is configured so that the GAL 56 can be removably mounted, and is connected to the motherboard 70 by means of a PCI bus. Replacing a memory card 54 with the one having other programs written therein or rewriting a program written in the memory card 54 into another one can change the contents of games to be played at the gaming machine 1.

The CPU 51, the ROM 52, and the boot ROM 53 interconnected by means of an internal bus are connected to the motherboard 70 by means of the PCI bus. The PCI bus transmits a signal between the motherboard 70 and a gaming board 50 and supplies power from the motherboard 70 to the gaming board 50.

A ROM 52 stores an authentication program. The boot ROM 53 stores a pre-authentication program and a program (boot code) or the like to be used by a CPU 51 for activating the pre-authentication program. The authentication program is a program (tamper check program) for authenticating a game program and a game system program. The pre-authentication program is a program for authenticating the above authenticating program. The authentication program and the pre-authentication program are described along procedures (authentication procedures) for performing authentication to ensure that a target program is not tampered.

The motherboard 70 is provided with a main CPU 71, a ROM 72, a RAM 73, and a communication interface 82. The motherboard 70 corresponds to a controller of the present invention. While, in the embodiment, one CPU called the main CPU 71 configures the controller, the controller of the present invention may be comprised of a plurality of CPUs.

The ROM 72 is made up of a memory device such as a flash memory, and stores: permanent programs such as a BIOS executed by the main CPU 71; and permanent data. When the main CPU 71 executes the BIOS, the main CPU conducts initialization processing of predetermined peripherals. Further, the main CPU 71 starts acquisition processing of the game program and game system program stored in the memory card 54, via the gaming board 50.

The RAM 73 stores data or programs employed when the main CPU 71 operates. For example, this RAM 73 can store these data or programs at the time of conducting the acquisition processing of the game program and the game system program and the authentication program described above. Working areas for executing the above programs are provided in the RAM 73. Examples of these working areas provided include as an area for storing the number of games played, the number of BETs, the number of payouts, and the number of credits or the like or an area for storing symbols (code numbers) determined by means of lottery.

The communication interface 82 is for communicating with an external control device 200 such as a server, via a communication line 301. In addition, a door PCB (Printed Circuit Board) 90 and a body PCB 110, respectively, to be described later are connected to the motherboard 70 by means of an USB. Further, a power unit 81 is connected to the motherboard 70. When power is supplied from the power unit 81 to the motherboard 70, the main CPU 71 of the motherboard 70 is started up. Power is then supplied to the gaming board 50 via the PCI bus, and the CPU 71 is started up.

Input devices such as switches or sensors, or alternatively, peripherals of which operations are controlled by means of the main CPU 71, are connected to the door PCB 90 and the main body PCB 110. The control panel 30, reverter 91, coin counter 92C, and cold cathode tube are connected to the door PCB 90.

The control panel 30 is provided with a SPIN switch 31S, a CHANGE switch 32S, a CASHOUT switch 33S, a 1-BET switch 34S, and MAXBET switch 35S in accordance with the aforementioned buttons, respectively. Each of the switches detects that a player presses the corresponding button, and outputs a signal to the main CPU 71.

A coin counter 92C determines whether or not a coin inserted into the coin accepting slot 36 is valid in material or shape and the like, and outputs a signal to the main CPU 71 when the counter detects the valid coin. An invalid coin is discharged from a coin payout exit 15A.

A reverter 91 operates based on a control signal outputted from the main CPU 71. This reverter 91 distributes a valid coin validated by the coin counter 92C to a hopper 113 or a cashbox (not shown). Coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by a player's finger or the like, and outputs to the main CPU 71 a signal corresponding to the detected place. Upon acceptance of a valid bill, the bill validator 115 outputs to the main CPU 71 a signal corresponding to amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3, and displays the scrolling and stop motions of the symbol arrays included in the respective video reels 3. The graphic board 130 is provided with a VDP generating image data, a video RAM temporarily storing the image data generated by the VDP, and the like. The number-of-credits display portion 201 of the lower image display panel 141 displays the number of credits stored in the RAM 73. The number-of-payouts display portion 203 of the lower image display panel 141 displays the payout number of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by a player.

The data display 174 displays data read by the card reader 172 and data inputted by a player through the keypad 173, based on a control signal outputted from the main CPU 71.

[Contents of Programs]

The circuit configuration of the gaming machine 1 has been described hereinbefore. Next, with reference to FIG. 6 to FIG. 22, programs to be executed by the gaming machine 1 will be described.

[Main Control Processing]

Figure 6:
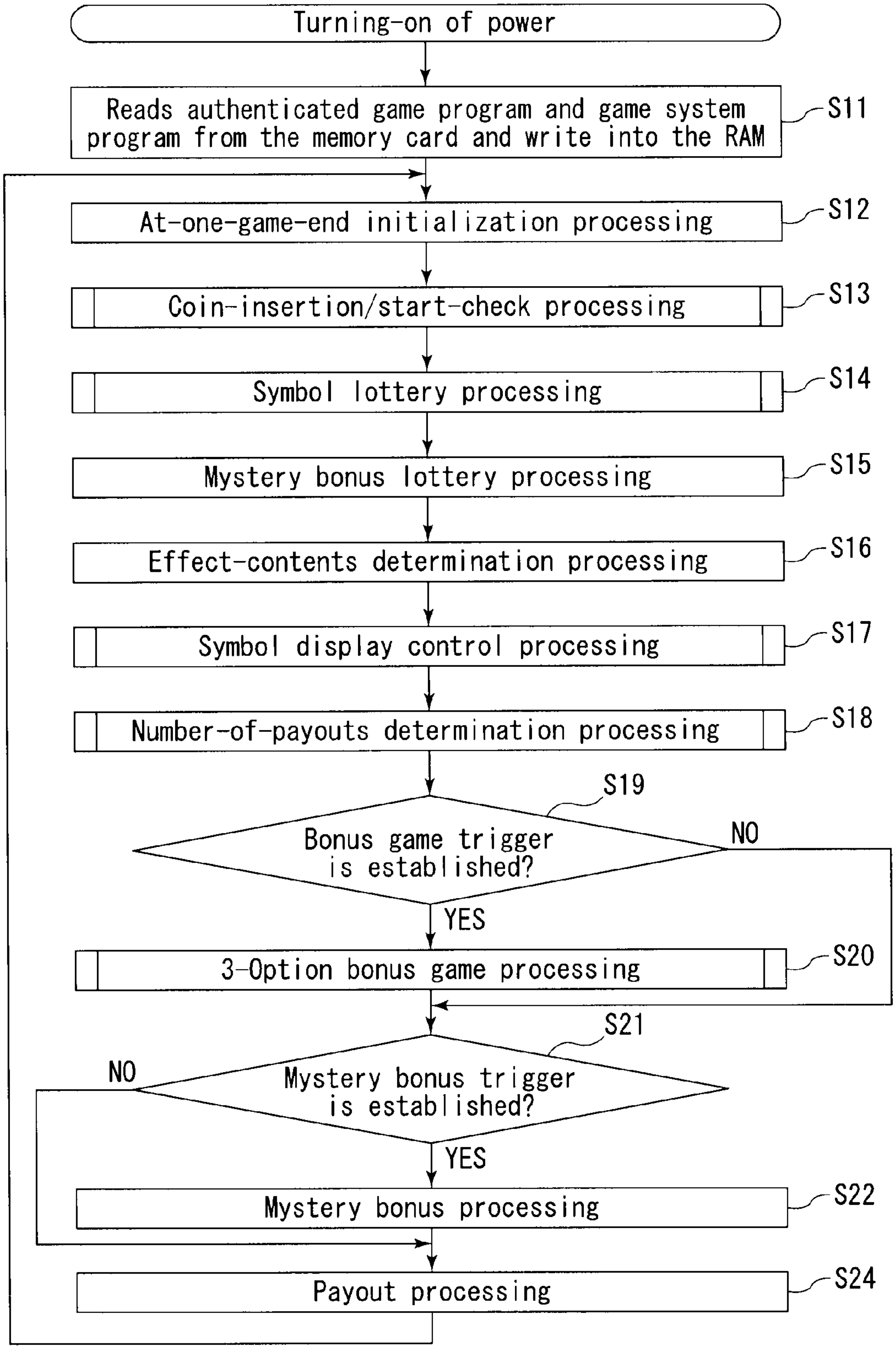
FIG. 6 is a view showing a flowchart of main control processing of the gaming machine according to the first embodiment of the present invention.

First, with reference to FIG. 6, main control processing will be described. FIG. 6 is a view showing a flowchart of the main control processing in the gaming machine according to the first embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 7 (step S13). In the processing, input from the BET switch and the spin switch is checked.

Next, the main CPU 71 conducts symbol lottery processing which is described later with reference to FIG. 9 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 establishes the mystery bonus trigger, in a case where extracts a random value for mystery bonus from the numbers in a range of "0 to 99" and the extracted random value is "0".

Next, the main CPU 71 conducts processing of determining the contents of an effect (step S16). The main CPU 71 extracts random values for effect, and determines any of a predetermined plurality of effect contents by means of lottery.

Next, the main CPU 71 conducts symbol display control processing which to be described later with reference to FIG. 10 (step S17). In the processing, scrolling of the symbol array of each video reel 3 is started, and the to-be-stopped symbols determined in the symbol lottery processing of step S14 are stopped in predetermined positions (for example, at the upper-stage region in the symbol display region 4). Namely, three symbols including the to-be-stopped symbols are displayed in the symbol display region 4. For example, in a case where the to-be-stopped symbols are symbols of code number "10", and these symbols are displayed in the upper-stage region, symbols of code numbers "11" and "12" are displayed at the middle stage and lower stage in the symbol display region 4, respectively.

Figure 11:
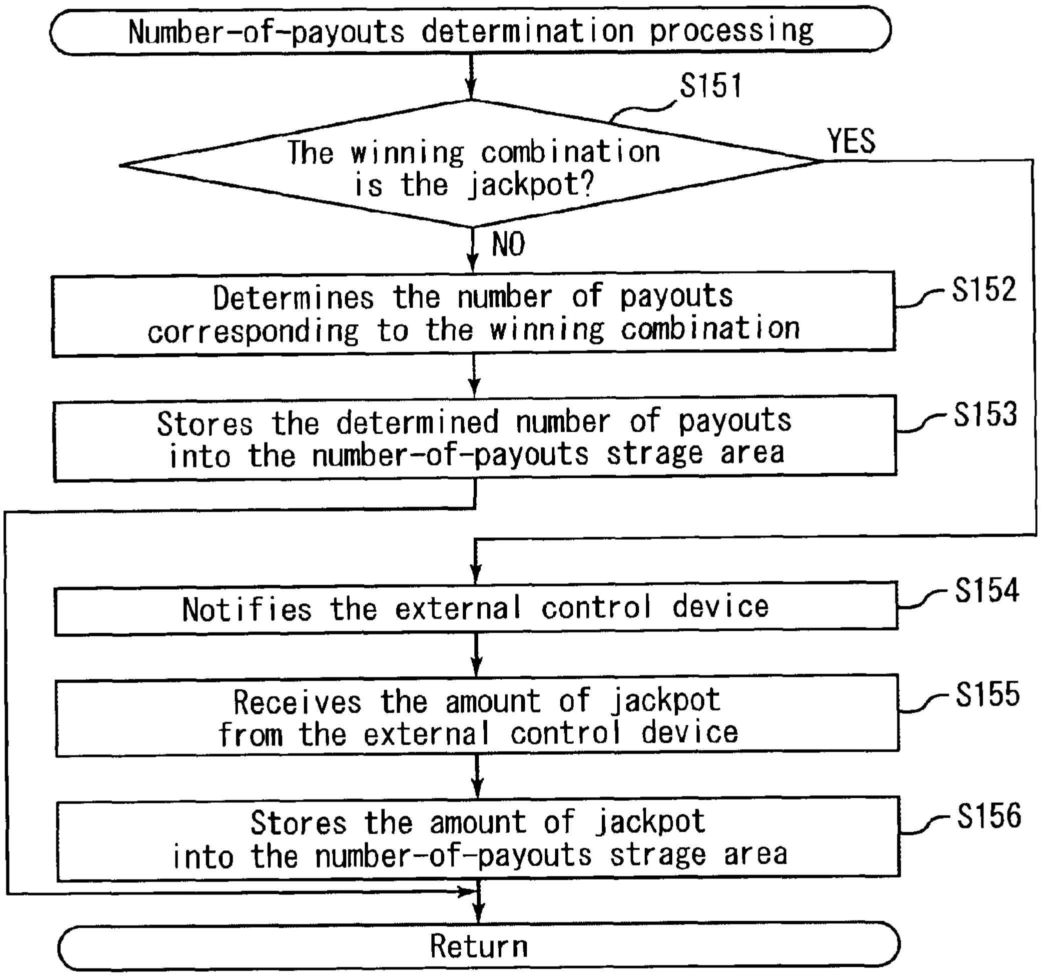
FIG. 11 is a view showing a flowchart of number-of-payouts determination processing of the gaming machine according to the first embodiment of the present invention.

Next, the main CPU 71 conducts processing of determining the number of payouts, to be described later with reference to FIG. 11 (step S18). In the processing, the number of payouts is determined based on a combination of symbols displayed on a winning line, and the determined number of payouts is stored in the number-of-payouts storage area provided in the RAM 73.

Next, the main CPU 71 determines whether or not a bonus game trigger is established (step S19). As described above, the bonus game trigger of the first embodiment means that three bonus symbols 250 (see FIG. 1B) stops in the symbol display region 4. When the main CPU 71 determines that the bonus game trigger is established, the main CPU 71 conducts 3-option bonus game processing to be described later with reference to FIG. 12 (step S20).

Subsequent to the processing of step S20 or when determining the bonus game trigger is not established in step S19, the main CPU 71 determines that a mystery bonus trigger is established (step S21). When the main CPU 71 determines that the mystery bonus trigger is established, the main CPU 71 conducts mystery bonus processing (step S22). In the processing, the number of payouts set for mystery bonus (for example, 300) is stored in the number-of-payouts storage area provided in the RAM 73.

Subsequent to the processing of step S22 or when the main CPU 71 determines that the mystery bonus trigger is not established in step S21, the main CPU 71 conducts payout processing (step S24). The main CPU 71 adds the value stored in the number-of-payouts storage area to that stored in the number-of-credits storage area provided in the RAM 73. The main CPU 71 may control driving of the hopper 113, based on the input by CASHOUT switch 33S so as to discharge the coins according to the value stored in the number-of-payouts storage area from the coin payout exit 15A. The main CPU 71 may control driving of the ticket printer 171 so as to issue a ticket with a barcode having recorded therein the value stored in the number-of-payouts storage area. After this processing is conducted, the routine reverts to step S12.

The games executed in the processing of steps S12 to S18 of the above-described main control processing correspond to normal games of the present invention.

<Coin-Insertion/Start-Check Processing>

Figure 7:
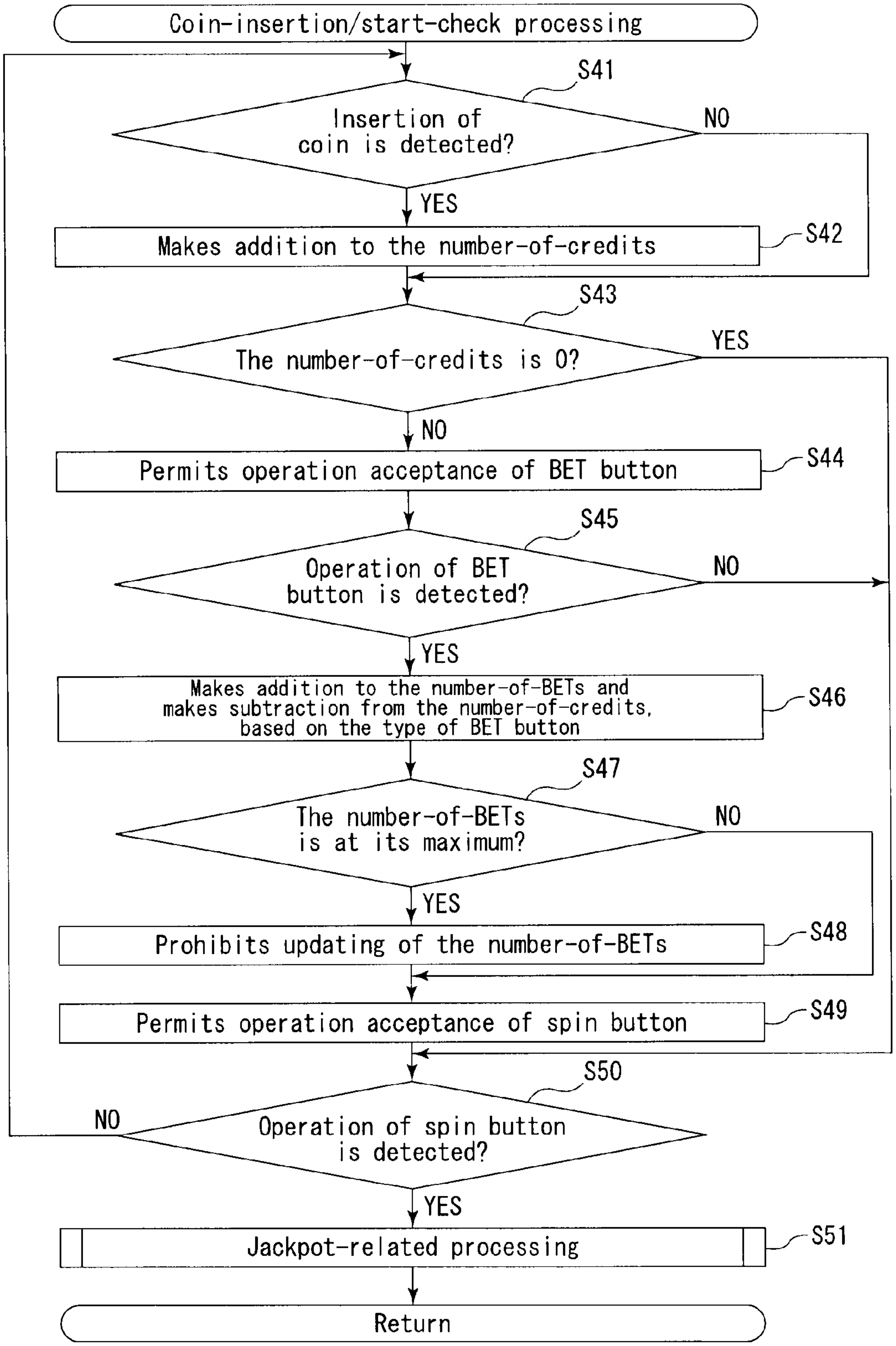
FIG. 7 is a view showing a flowchart of coin insertion/start-check processing of the gaming machine according to the first embodiment of the present invention.

Next, with reference to FIG. 7, coin-insertion/start-check processing is described.

FIG. 7 is a view illustrating a flowchart of the coin-insertion/start-check processing for the gaming machine according to the first embodiment of the present invention.

First, the main CPU 71 determines whether or not insertion of a coin has been detected by the coin counter 92C (step S41). When the main CPU 71 determines that the insertion of a coin has been detected, the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when the main CPU 71 determines that the insertion of a bill has been detected, the main CPU 71 may add a value according to the bill to the value stored in the number-of-credits storage area.

Subsequent to step S42 or when determining in step S41 that the insertion of a coin has not been detected, the main CPU 71 determines whether or not the value stored in the number-of-credits storage area is zero (step S43). When the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by a player, the main CPU 71 makes an addition to the value stored in the number-of-BETs storage area provided in the RAM 73 and makes a subtraction from the value stored in the number-of-credits storage area, based on the type of the BET button (step S46).

Next, the main CPU 71 determines whether or not the value stored in the number-of-BETs storage area is at its maximum (step S47). When the main CPU 71 determines that the value stored in the number-of-BETs storage area is at its maximum, the main CPU 71 prohibits updating of the value stored in the number-of-BETs storage area (step S48). After step S48 or when determining in step S47 that the value stored in the number-of-BETs storage area is not at its maximum, the main CPU 71 permits operation acceptance of the spin button (step S49).

Subsequent to step S49 or when determining in step S45 that the operation of any of the BET buttons has not been detected, or when determining in step S43 that the value stored in the number-of-credits storage area is zero, the main CPU 71 determines whether or not operation of the spin button has been detected (step S50). When the main CPU 71 determines that the operation of the spin button has not been detected, the routine reverts to step S41.

Figure 8:
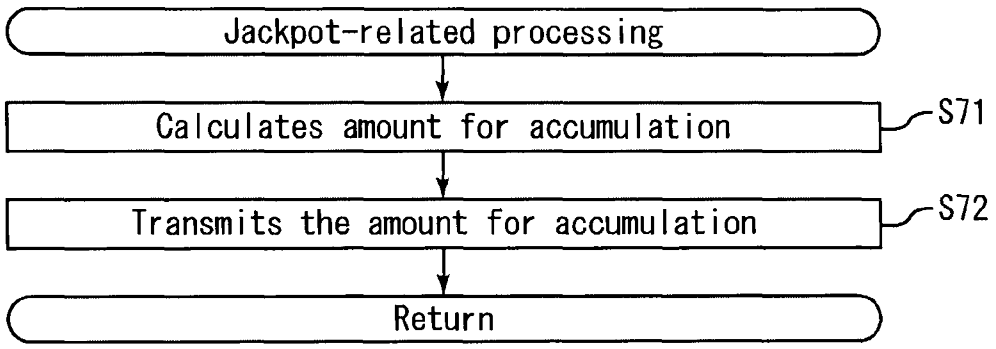
FIG. 8 is a view showing a flowchart of jackpot-related processing of the gaming machine according to the first embodiment of the present invention.

When the main CPU 71 determines that the operation of the spin button has been detected, the main CPU 71 conducts jackpot-related processing to be described later with reference to FIG. 8 (step S51). In the processing, the amount to be accumulated to the amount of jackpot is calculated, and the amount is transmitted to the external control device 200. After the processing has been conducted, the coin-insertion/start-check processing is completed.

<Jackpot-Related Processing>

Next, with reference to FIG. 8, jackpot-related processing will be described. FIG. 8 is a view showing a flowchart of jackpot-related processing of the gaming machine according to the first embodiment of the present invention.

First, the main CPU 71 calculates the amount for accumulation (step S71). The main CPU 71 obtains the product of the value stored in the number-of-BETs storage area and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Symbol Lottery Processing>

Next, with reference to FIG. 9, symbol lottery processing will be described. FIG. 9 is a view showing a flowchart of symbol lottery processing of a gaming machine according to an embodiment of the present invention.

First, the main CPU 71 extracts random values for symbol determination (step S111). Next, the main CPU 71 determines to-be-stopped symbols of each of the video reels 3 by means of lottery (step S112). A symbol array comprised of a plurality of symbols associated with code numbers is assigned to a respective one of the video reels 3 (first video reel 3*a*, second video reel 3*b*, third video reel 3*c*, fourth video reel 3*d*, and fifth video reel 3*e*) included in the gaming machine 1 of the embodiment. A ROM 72 stores a data table indicating a correlation between each of the video reels 3 and the symbol array. The main CPU 71 conducts lottery in accordance with each of the video reels 3, and determines any of a plurality of symbols as to-be-stopped symbols. At this time, a respective one of the plurality of symbols is determined at an equal probability.

Next, the main CPU 71 stores the determined to-be-stopped symbols of each of the video reels 3 in a symbol storage area provided in the RAM 73 (step S113). The main CPU 71 then determines a winning combination, based on the symbol storage area, referring to a symbol combination table (step S114). The symbol combination table specifies a combination of patterns of symbols according to a winning prize and the number of payouts. In the gaming machine 1, after scrolling of the symbol array of each of the video reels 3 has been stopped, in a case where a combination of symbols displayed on a winning line coincides with that of symbols specified in accordance with the symbol combination table, a winning prize is established. In a case where the combination of symbols displayed on the winning line fails to coincide with any combination of the symbols specified in accordance with the symbol combination table, a winning prize is not established (a so called "losing" is established). In the step S114, the main CPU 71 determines whether or not the combination of symbols displayed on the winning line according to each of the video reels 3 coincides with that of the symbols specified in the symbol combination table, and determines a winning combination. When this processing is conducted, symbol lottery processing is completed.

In the embodiment, when it is determined that three bonus symbols 250 are stop-displayed in symbol lottery processing, it is determined which of the benefits (credit payment, free game, or 29-option game) is to be associated with each of the bonus symbols 250. This determination is made based on a data table indicating a correlation between the stopped positions of the bonus symbols 250 and the benefits (credit payment, free game, or 29-option game) stored in the ROM 72.

<Symbol Display Control Processing>

Next, with reference to FIG. 10, symbol display control processing will be described. FIG. 10 is a view showing a flowchart of symbol display control of the gaming machine according to the first embodiment of the present invention.

First, the main CPU 71 starts scrolling of the symbol array of each of the video reels 3 displayed in the symbol display region 4 of the lower image display panel 141 (step S131). Next, the main CPU 71 stops scrolling of the symbol array of each of the video reels 3, based upon the aforementioned symbol storage area (step S132). When this processing is conducted, symbol display control processing is completed.

While the embodiment describes a case in which symbols constitute a symbol array, and are longitudinally scrolled, a mode of variable symbol display, of the present invention, is not limitative thereto. Symbols may be transversely scrolled, for example, or individual symbols may be displayed so as to move separately in a display region.

<Number-of-Payouts Determination Processing>

Next, with reference to FIG. 11, number-of-payouts determination processing will be described. FIG. 11 is a view showing a flowchart of the number-of-payouts determination processing of the gaming machine according to the first embodiment of the present invention.

First, the main CPU 71 determines whether or not a winning combination is a jackpot (step S151). When the main CPU 71 determines that the winning combination is not the jackpot, the main CPU 71 determines the number of payouts corresponding to the winning combination (step S152). When a "losing" event is established, "0" is determined as the number of payouts. Next, the main CPU 71 stores the determined number of payouts in a number-of-payouts storage area (step S153). When this processing is conducted, the number-of-payouts determination processing is completed.

When the main CPU 71 determines that a winning combination is a jackpot, the main CPU 71 notifies the external control device 200 that a jackpot winning prize arises (step S154). In response to this notification, the external control device 200 transmits to the gaming machine 1 an amount of jackpot having been updated so far. At this time, with part of the jackpot amount (for example, 80%) being targeted for payout, the remaining (for example, 20%) may be repeated in preparation for the establishment of a next jackpot trigger.

Next, the main CPU 71 receives a jackpot amount from the external control device 200 (step S155). The main CPU 71 then stores the received jackpot amount in the number-of-payouts storage area (step S156). When this processing is conducted, the number-of-payouts determination processing is completed.

<3-Option Bonus Game Processing>

Figure 12:
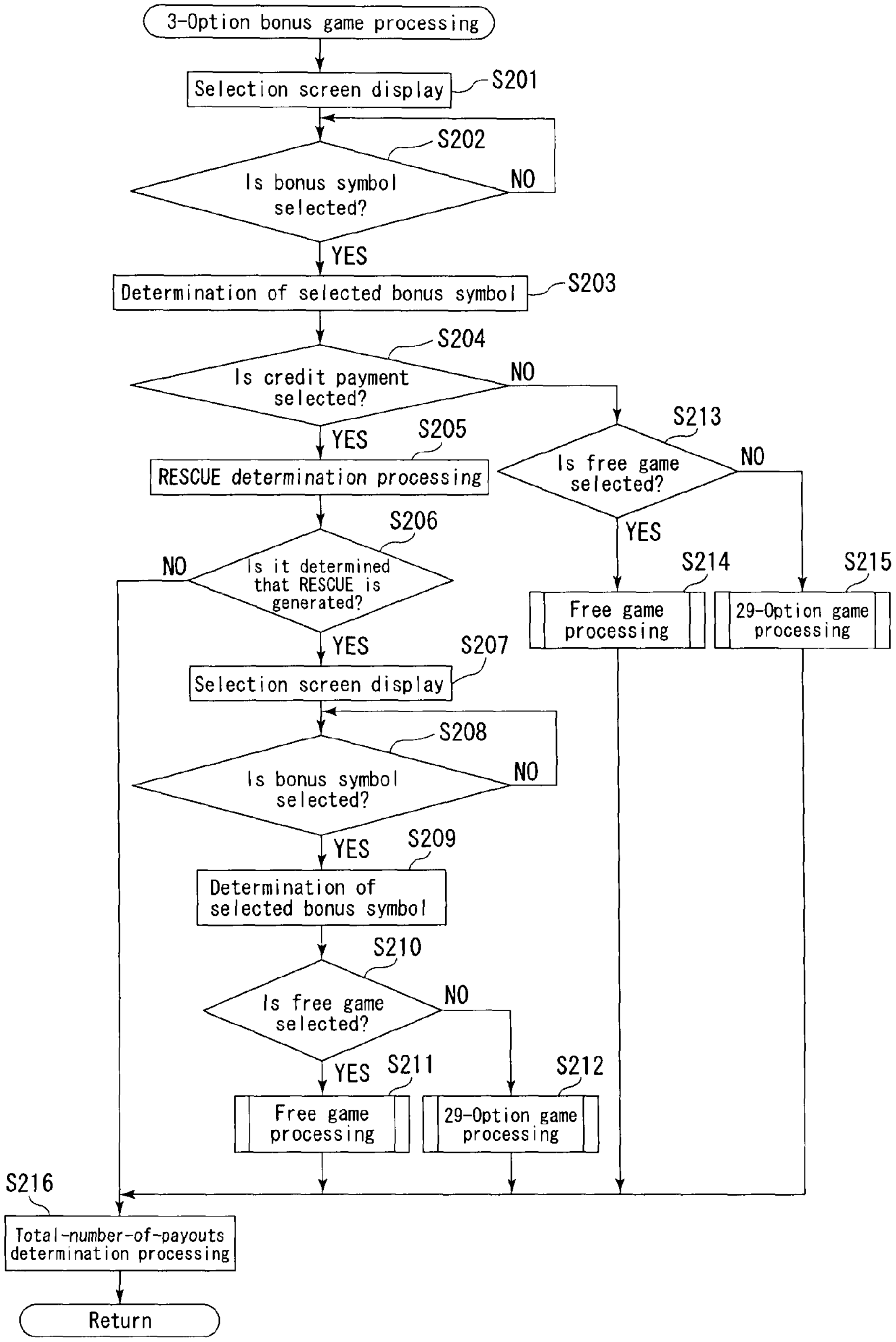
FIG. 12 is a view showing a flowchart of 3-option bonus game of the gaming machine according to the first embodiment of the present invention.

Next, with reference to FIG. 12, 3-option bonus game processing will be described. FIG. 12 is a view showing a flowchart of 3-option bonus game processing of the gaming machine according to the first embodiment of the present invention. As described with reference to FIG. 1, a 3-option bonus game in the embodiment is executed in response to the fact that three bonus symbols 250 are stop-displayed in the symbol display region 4 of the lower image display panel 141.

First in step S201, the main CPU 71 causes on the lower image display panel 141 to display a selection screen which prompts a player to select one bonus symbol 250 from among the stop-displayed three bonus symbols 250 (see FIG. 1C).

Next in step S202, the main CPU 71 determines whether or not any bonus symbol 250 is selected on the selection screen. Specifically, the main CPU 71 determines whether or not a site corresponding to any bonus symbol 250 is touched on the touch panel 114. In a case where the main CPU 71 determines that the bonus symbol 250 has been not selected, the main CPU 71 causes the routine to migrate to step S202.

In a case where the main CPU 71 determines that the bonus symbol 250 is selected, the main CPU 71 determines the selected bonus symbol 250 in step S203. That is, the main CPU 71 determines with which of the benefits made of credit payment, free game, and 29-option game, the selected bonus symbol 250 is associated.

Next in step S204, the main CPU 71 determines whether or not the selected bonus symbol 250 corresponds to credit payment, based on the determination result in step S203.

In a case where the main CPU 71 determines that the selected bonus symbol 250 corresponds to credit payment, the main CPU 71 adds the amount of the credit payment to a value of the number of payouts stored in the RAM 73, and subsequently, executes processing of determining whether or not to generate "RESCUE PRESENT" in step S205. Specifically, the main CPU 71 extracts random numbers, and determines "RESCUE PRESENT" to be generated in a case where the extracted random numbers are within a predetermined numeric range. The "RESCUE PRESENT" state is a game state in which one more bonus symbol 250 can be further selected from among the two bonus symbols 250 that have not been selected. In step S205, "RESCUE PRESENT" is determined to be generated at a probability of ¼.

Next in step S205, the main CPU 71 determines whether or not "RESCUE PRESENT" is determined to be generated in step S205. In a case where the main CPU 71 determines that "RESCUE PRESENT" is determined to be generated, in step S207 the main CPU 71 causes the lower image display panel 141 to display a selection screen which prompts a player to further select one more bonus symbol 250 from among the two bonus symbols 250 that have not been selected on the selection screen of step S201 (see FIG. 1F). In step S207, a correlation between the selectable two bonus symbols 250 and the benefit (free game or 29-option game) is maintained as a correlation in a case where the selection screen is displayed in step S201.

Next in step S208, the main CPU 71 determines whether or not any bonus symbol 250 is selected on the selection screen of step S207. Specifically, the main CPU 71 determines whether or not a site corresponding to any bonus symbol 250 is touched on the touch panel 114. In a case where the main CPU 71 determines that the bonus symbol 250 is not selected, the main CPU 71 causes the routine to revert to step S208.

In a case the main CPU 71 determines that the bonus symbol 250 is selected, the main CPU 71 makes determination of the selected bonus symbol 250, in step S209. That is, the main CPU 71 determines with which of the benefits made of free game and 29-option game the selected bonus symbol 250 is associated.

Next in step S210, the main CPU 71 determines whether or not the selected bonus symbol 250 corresponds to free game(s), based on the determination result in step S209. In a case where the main CPU 71 determines that the selected bonus symbol 250 corresponds to free game(s), the main CPU 71 execute free game processing in step S211. Free game processing will be described later in detail with reference to FIG. 14.

Figure 16:
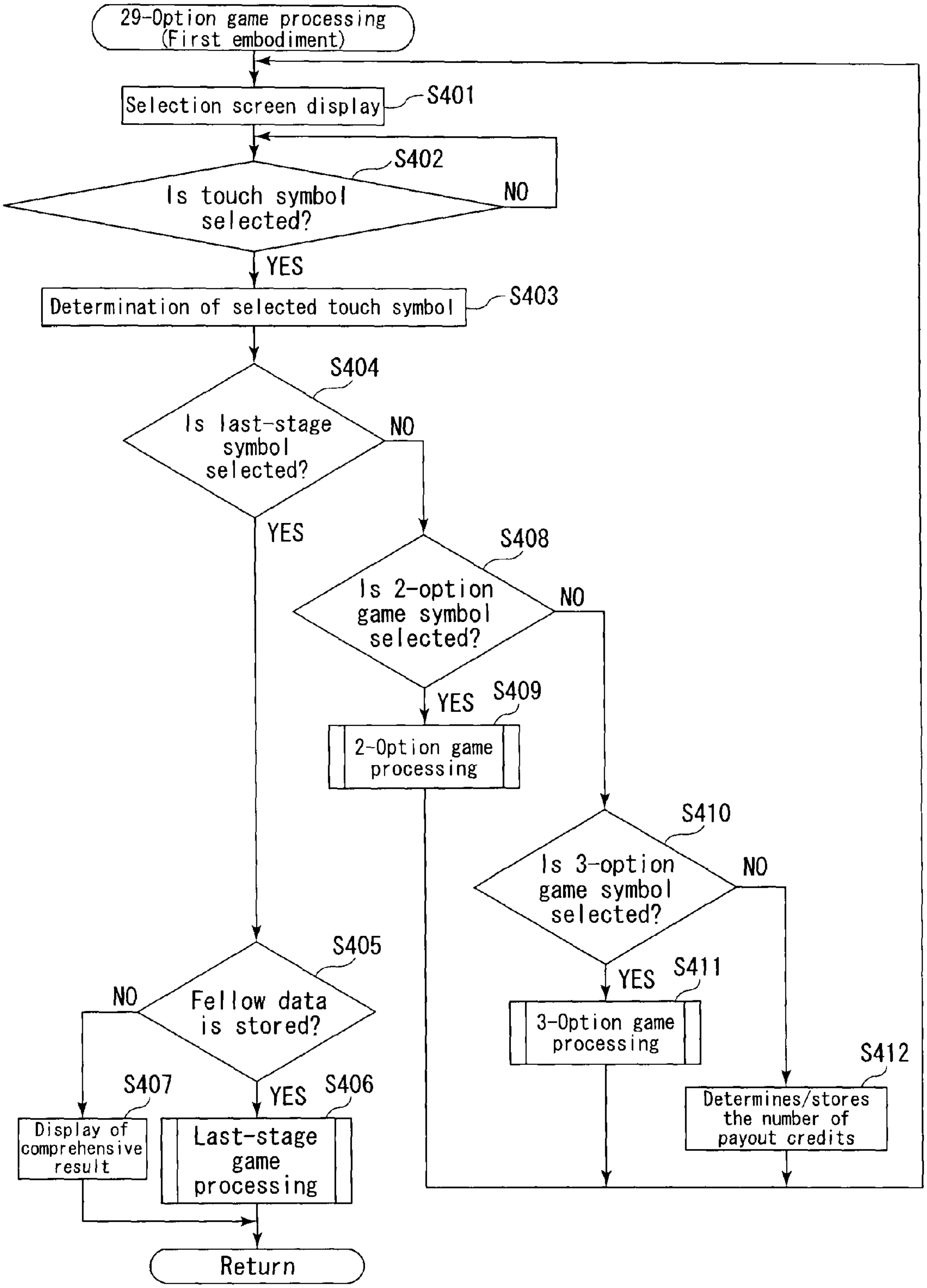
FIG. 16 is a view showing a flowchart of 29-option game processing of the gaming machine according to the first embodiment of the present invention.

In step S210, in a case where the main CPU 71 determines that the selected bonus symbol 250 does not correspond to free game(s), the main CPU 71 executes 29-option game processing in step S212. 29-option game processing will be described later in detail with reference to FIG. 16.

In step S204, in a case where the main CPU 71 determines that the selected bonus symbol 250 does not correspond to credit payment, the main CPU 71 determines whether or not the selected bonus symbol 250 corresponds to free game(s) in step S213. In a case where the main CPU 71 determines that the selected bonus symbol 250 corresponds to free game(s), the main CPU 71 executes free game processing in step S214.

In step S213, in a case where the main CPU 71 determines that the selected bonus symbol 250 does not correspond to free game(s), the main CPU 71 executes 29-option game processing in step S215.

In a case where the main CPU 71 determines that "RESCUE PRESENT" is not determined to be generated in step S206 or in a case where the main CPU 71 executes processing of step S211, step S212, step S214 or step S215, the main CPU 71 executes processing of determining a total number of payments in a 3-option bonus game in step S216. Specifically, the main CPU 71 totalizes all payments awarded in the 3-option bonus game, i.e., a payment corresponding to the selected bonus symbol 250, a payment in a free game, and a payment in the 29-option game, and stores data indicating the totalized value in the RAM 73. After the processing of step S216 is executed, this subroutine is completed.

Next, the free game to be executed in the embodiment will be described. In the embodiment, when a bonus symbol 250 corresponding to free game(s) is selected on a selection screen in the 3-option game (see FIG. 1C and FIG. 1F), a predetermined number of free games (8 free games) are executed. Free game(s) is (are) game(s) which can be played without betting gaming media. In the free game of the embodiment, there are employed video reels 3 to which symbol arrays different from that in a normal game (for example, symbol array in which symbols are arranged differently from those in a normal game or symbol array composed of different kinds of symbols from those in a normal game) are assigned.

First, with reference to FIG. 13A to FIG. 13D, an outline of free game will be described. FIG. 13A to 13D are views each showing an example of an image displayed on the lower image display panel included in the gaming machine according to the first embodiment of the present invention.

Figure 13A:
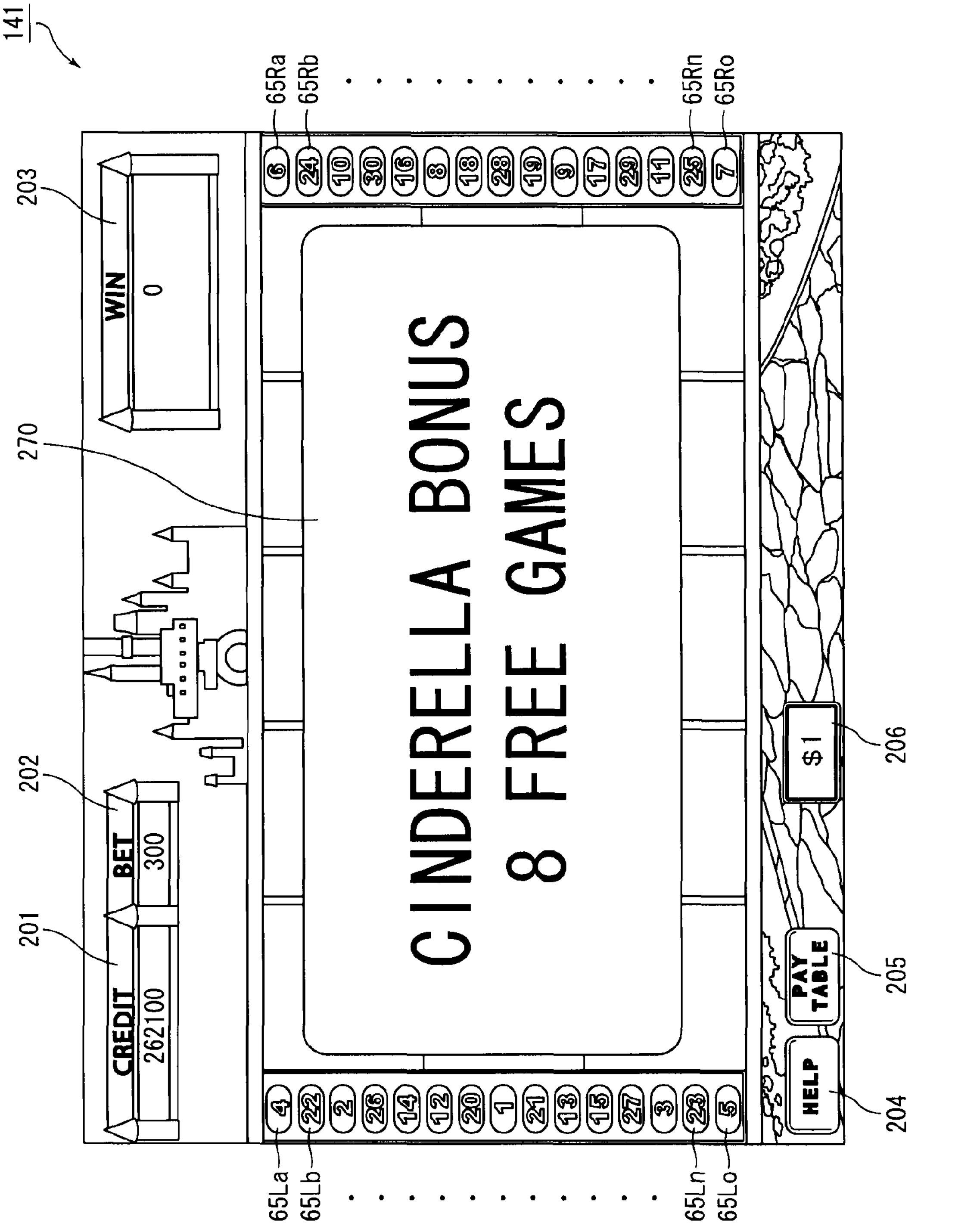
FIG. 13A is a view showing an example of an image displayed on the lower image display panel included in the gaming machine according to the first embodiment of the present invention.

When the bonus symbol 250 corresponding to free game(s) is selected on a selection screen, an image 270 indicating a title of free game (CINDERELLA BONUS) and the number of free games to be executed is displayed at a substantial center part of the lower image display panel 141, as shown in FIG. 13A.

Figure 13B:
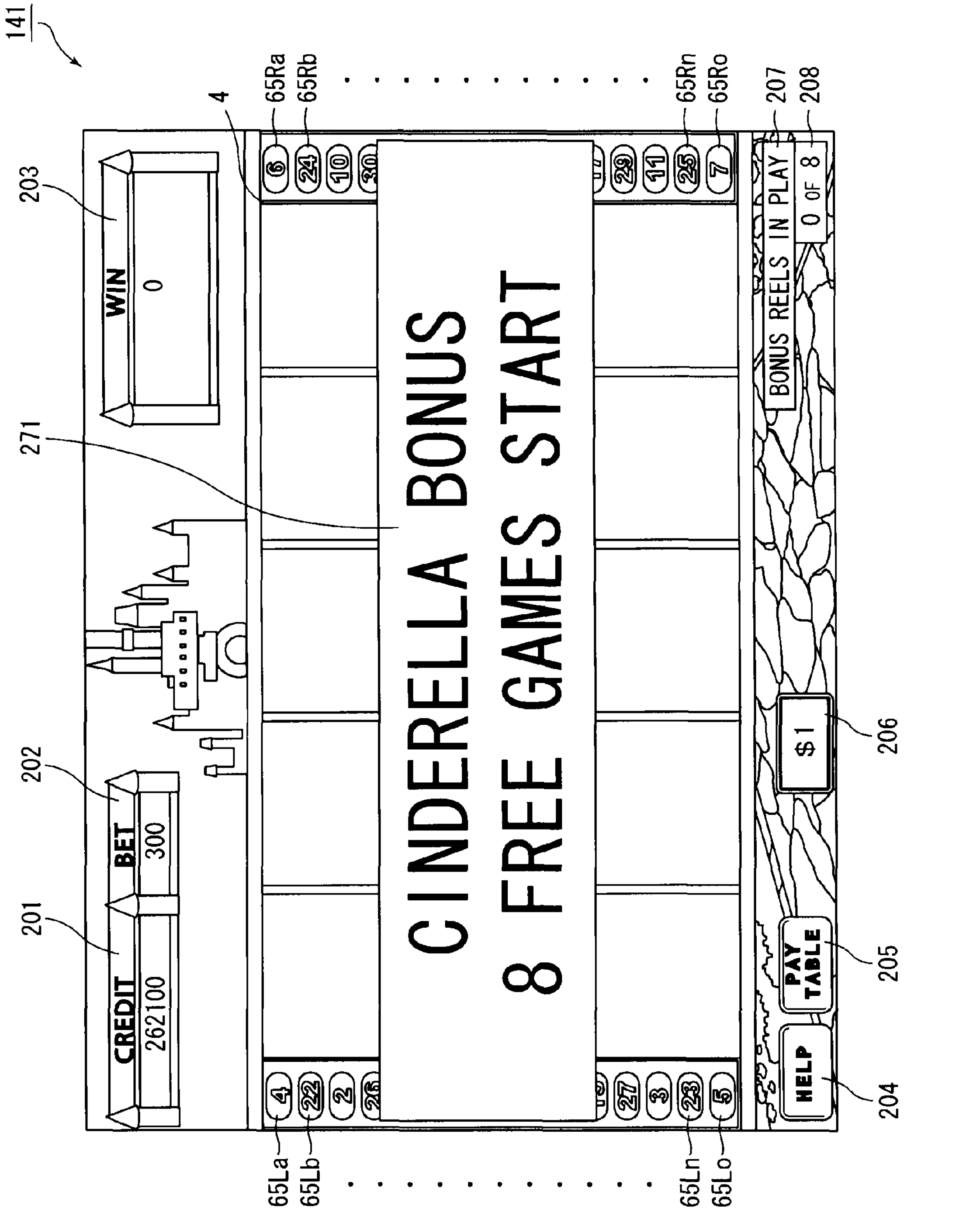
FIG. 13B is a view showing an example of an image displayed on the lower image display panel included in the gaming machine according to the first embodiment of the present invention.

Subsequently, as shown in FIG. 13B, an image 271 notifying that a free game is started is displayed at a substantial center part of the lower image display panel 141. An image 207 indicating that reels for free game are employed and a free game counter image 208 for displaying an executable total number of free games and the number of free games played so far are displayed at the lower right part of the lower image display panel 141.

Figure 13C:
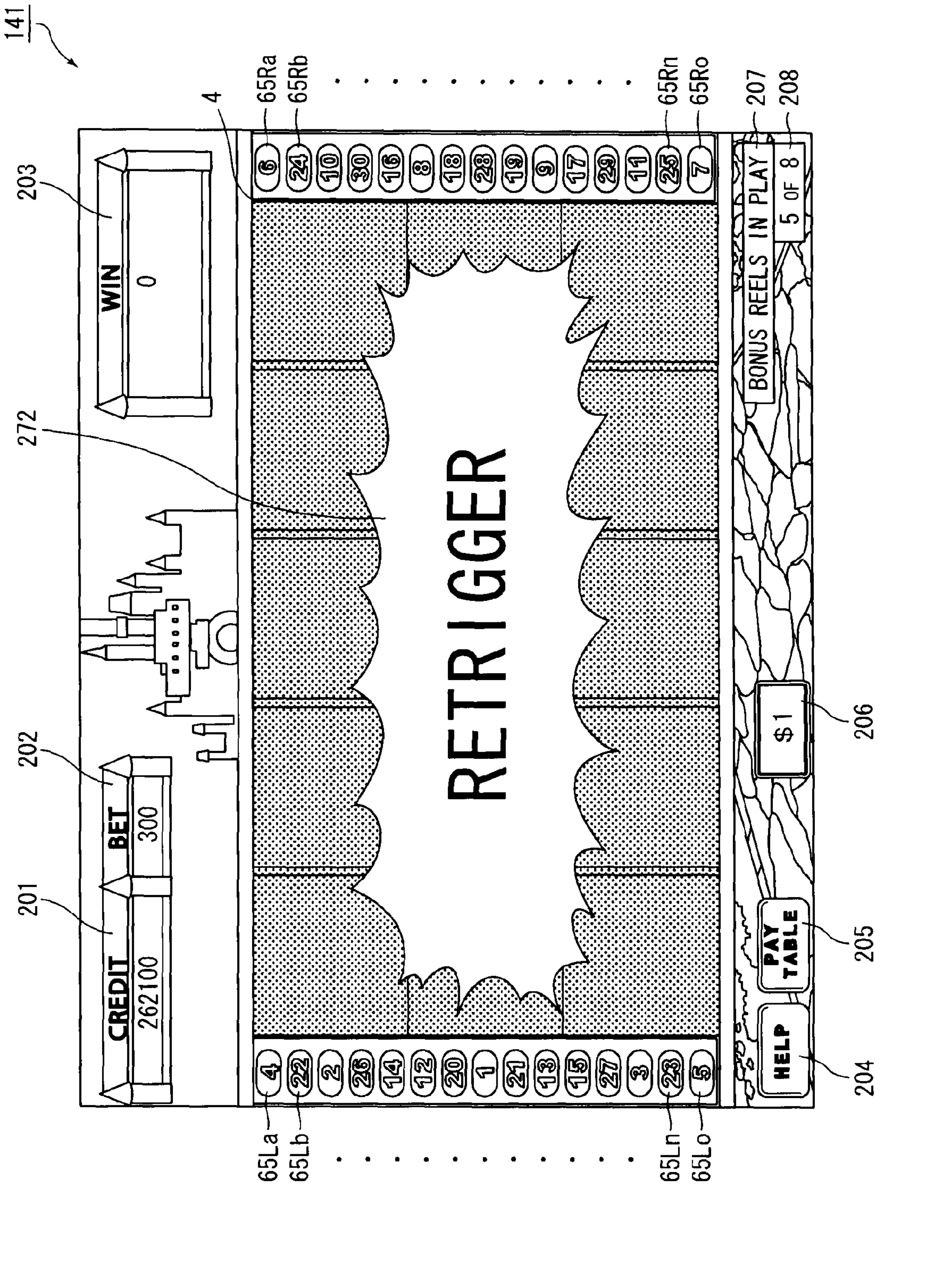
FIG. 13C is a view showing an example of an image displayed on the lower image display panel included in the gaming machine according to the first embodiment of the present invention.
Figure 13D:
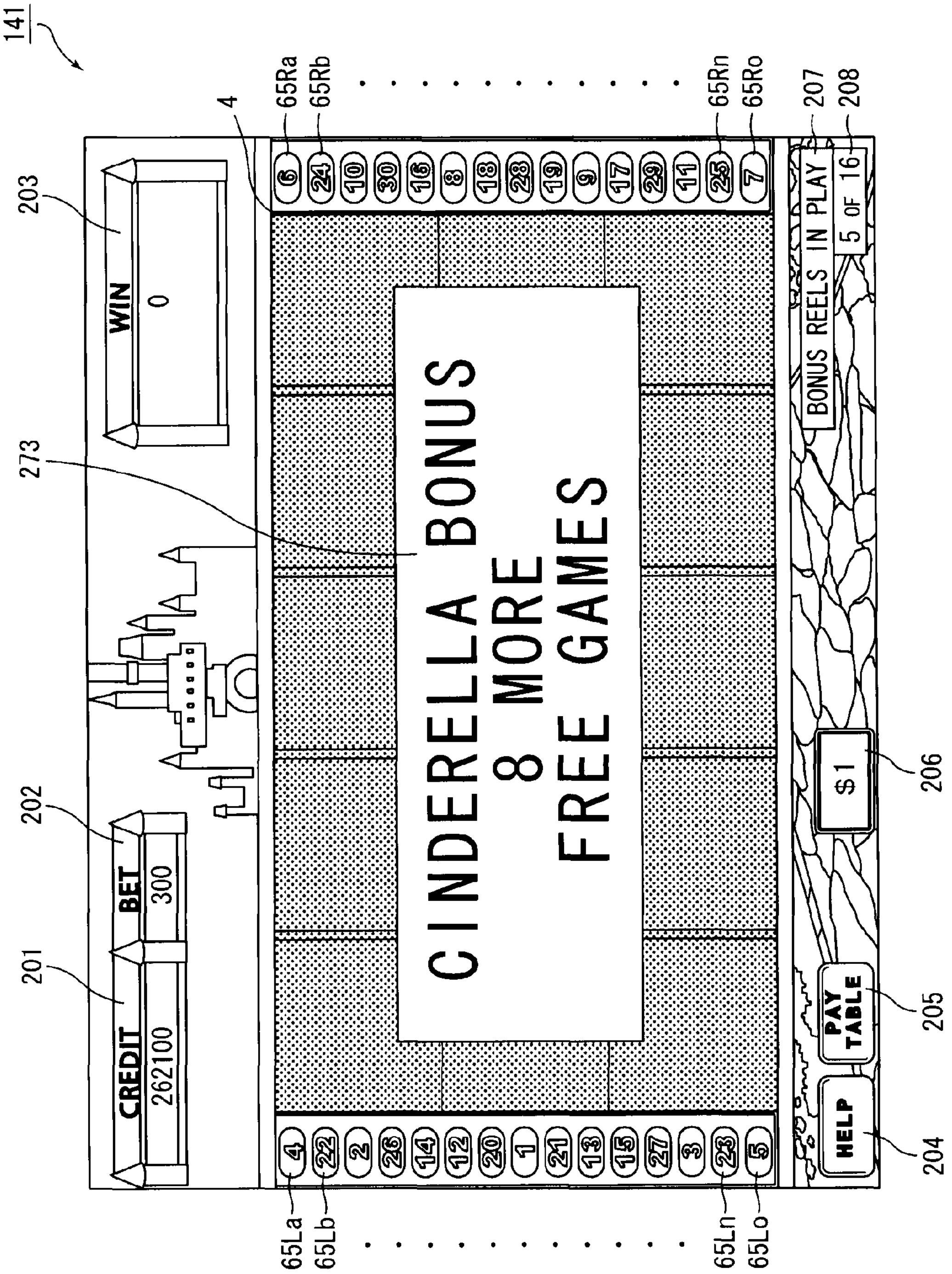
FIG. 13D is a view showing an example of an image displayed on the lower image display panel included in the gaming machine according to the first embodiment of the present invention.

In a case where a retrigger is established in a free game, the remaining number of free games increases. For example, if retrigger is established in a fifth free game in a total of eight free games, the symbol display region 4 blacks out, as shown in FIG. 13C, and an image 272 notifying that retrigger is established is displayed on a front face. Subsequently, an image 273 notifying that eight free games are to be further added is displayed as shown in FIG. 13D. At this time, an executable total number in a free game counter image 208 is 16 (=8+8).

<Free Game Processing>

Figure 14:
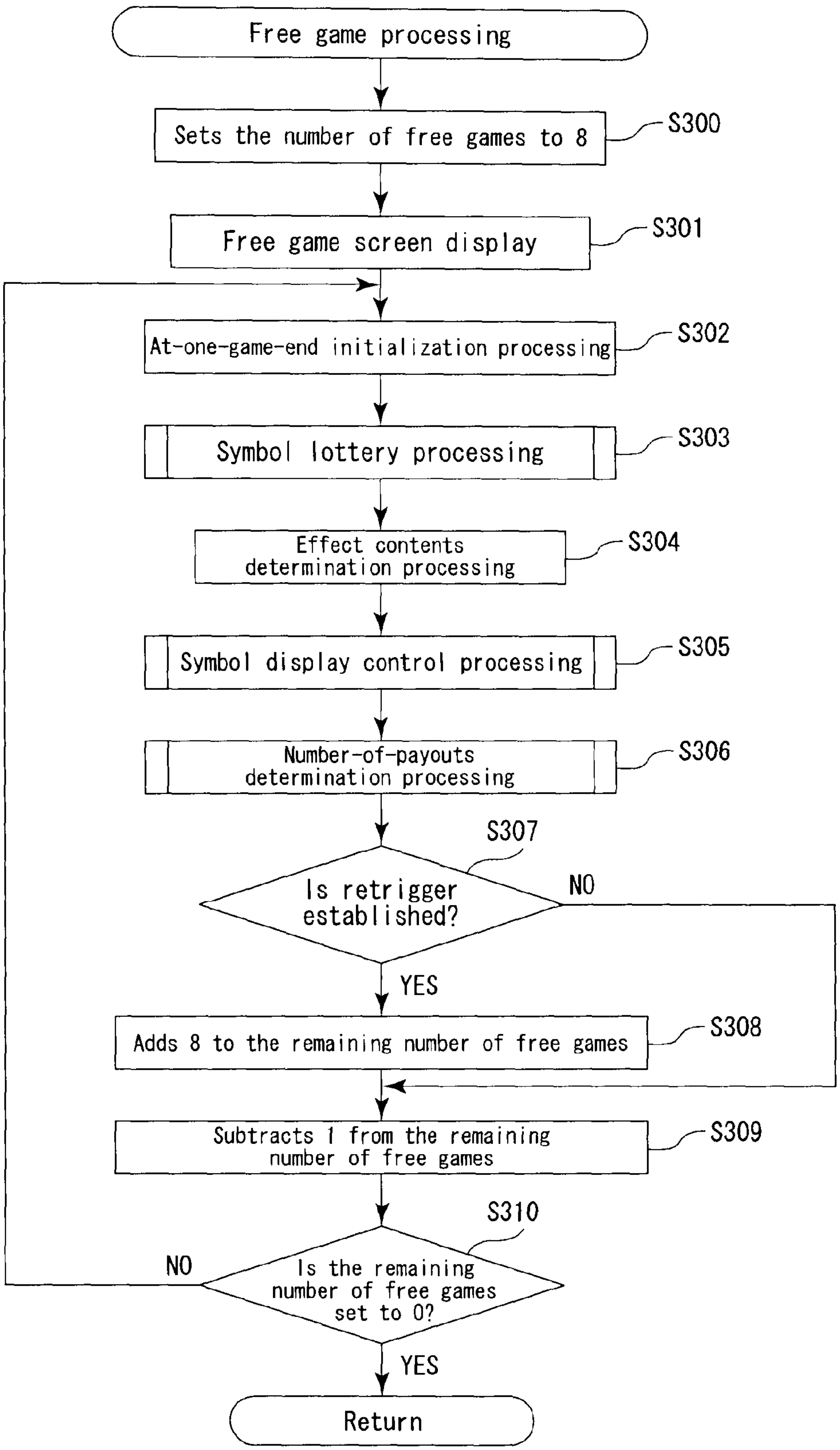
FIG. 14 is a view showing a flowchart of free game processing of the gaming machine according to the first embodiment of the present invention.

Next, with reference to FIG. 14, free game processing executed in steps S211 and S214 of FIG. 12 will be described. FIG. 14 is a view showing a flowchart of the free game processing of the gaming machine according to the first embodiment of the present invention.

First, the main CPU 71 sets the number of free games to 8 and then stores data indicating the number of free games in a number-of-free-games storage area provided in the RAM 73 (step S300).

Next, the main CPU 71 causes the lower image display panel 141 to display an image related to introduction of free game, as described in FIG. 13A (step S301).

Next, the main CPU 71 conducts at-one-game-end initialization processing, as in that of step S12 described with reference to FIG. 6 (step S302). The main CPU 71 then conducts symbol lottery processing which is similar to that described with reference to FIG. 9 (step S303). The main CPU 71 then conducts effect contents determination processing, as in that of step S16 described with reference to FIG. 6 (step S304). The main CPU 71 then conducts symbol display control processing which is similar to that described with reference to FIG. 10 (step S305). The main CPU 71 then conducts number-of-payouts determination processing which is similar to that described with reference to FIG. 11 (step S306).

Next, the main CPU 71 determines whether or not retrigger is established (step S307). When the main CPU 71 determines that retrigger is established, the main CPU 71 adds 8 to the remaining number of free games stored in the RAM 73 (step S308).

Subsequent to the processing of step S308 or when the main CPU 71 determines that retrigger is not established in step S307, the main CPU 71 subtracts 1 from the remaining number of free games stored in the RAM 73 (step S309). The main CPU 71 then determines whether or not the remaining number of free games stored in the RAM 73 is 0 (step S310). When the main CPU 71 determines that the remaining number of free games stored in the RAM 73 is not 0, the routine reverts to step S302. When the main CPU 71 determines that the remaining number of free games stored in the RAM 73 is 0, free game processing is completed.

In a case where the routine migrates to free game(s) after "RESCUE PRESENT" has been generated, the number of times of playing free games first awarded becomes 9 times.

Next, the 29-option game executed in the embodiment will be described. In the embodiment, when a bonus symbol 250 corresponding to the 29-option game is selected on the selection screen (see FIG. 1C and FIG. 1F) in a 3-option bonus game, the 29-option game is executed to cause a player to select any touch symbol from among 29 touch symbols provided as options. In the 29-option game, a predetermined credit payment is awarded in accordance with the selected touch symbol or a variety of feature games are executed. The feature games played in accordance with the selected touch symbol include: a 2-option game in which an animation character (fellow animation character) can be acquired; and a 3-option game in which credit payment is awarded. In a case where a fellow animation character could be acquired in the 2-option game, a last-stage game is executed at the end of the 29-option game.

Figure 15A:
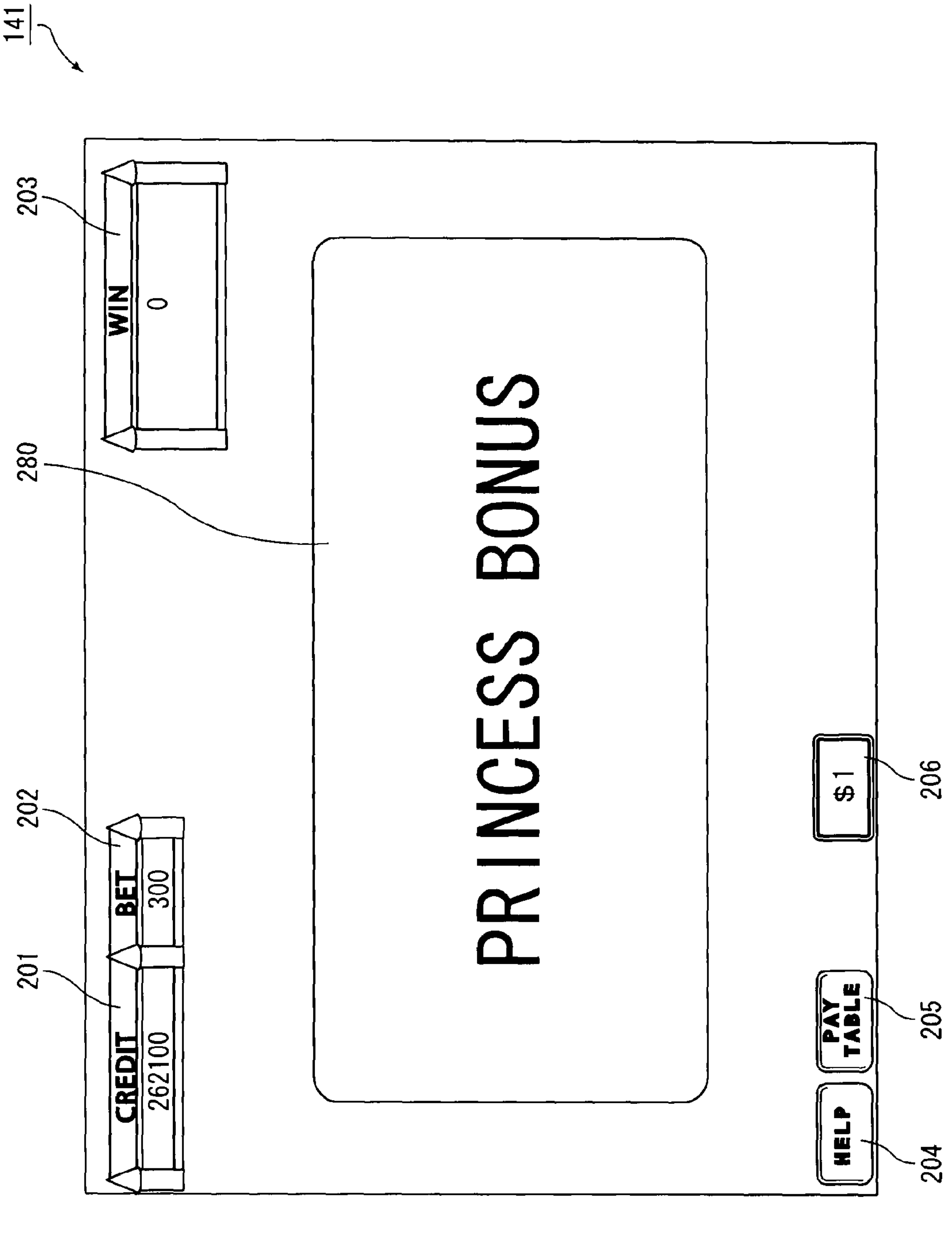
FIG. 15A is a view showing an example of an image displayed on the lower image display panel included in the gaming machine according to the first embodiment of the present invention.
Figure 15B:
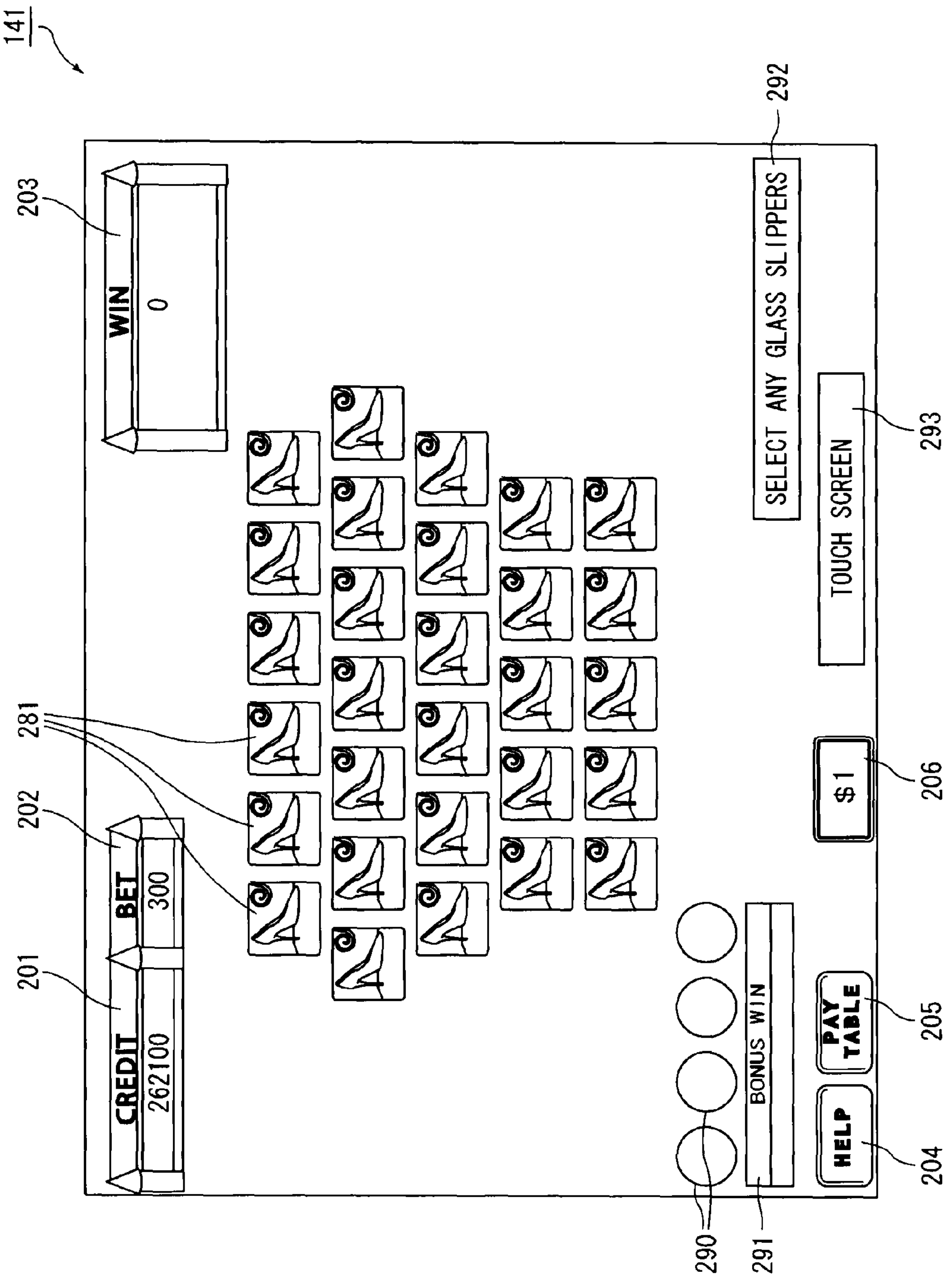
FIG. 15B is a view showing an example of an image displayed on the lower image display panel included in the gaming machine according to the first embodiment of the present invention.

First, with reference to FIG. 15A and FIG. 15B, an outline of the 29-option game will be described. FIG. 15A and FIG. 15B are views each showing an example of an image displayed on the lower image display panel included in the gaming machine according to the first embodiment of the present invention.

When a bonus symbol 250 corresponding to a 29-option game is selected on a selection screen in 3-option bonus game, an image 280 indicating a title of the 29-option game (PRINCESS BONUS) is displayed at a substantial center part of the lower image display panel 141, as shown in FIG. 15A, notifying that the 29-option game is started.

Figure 29:
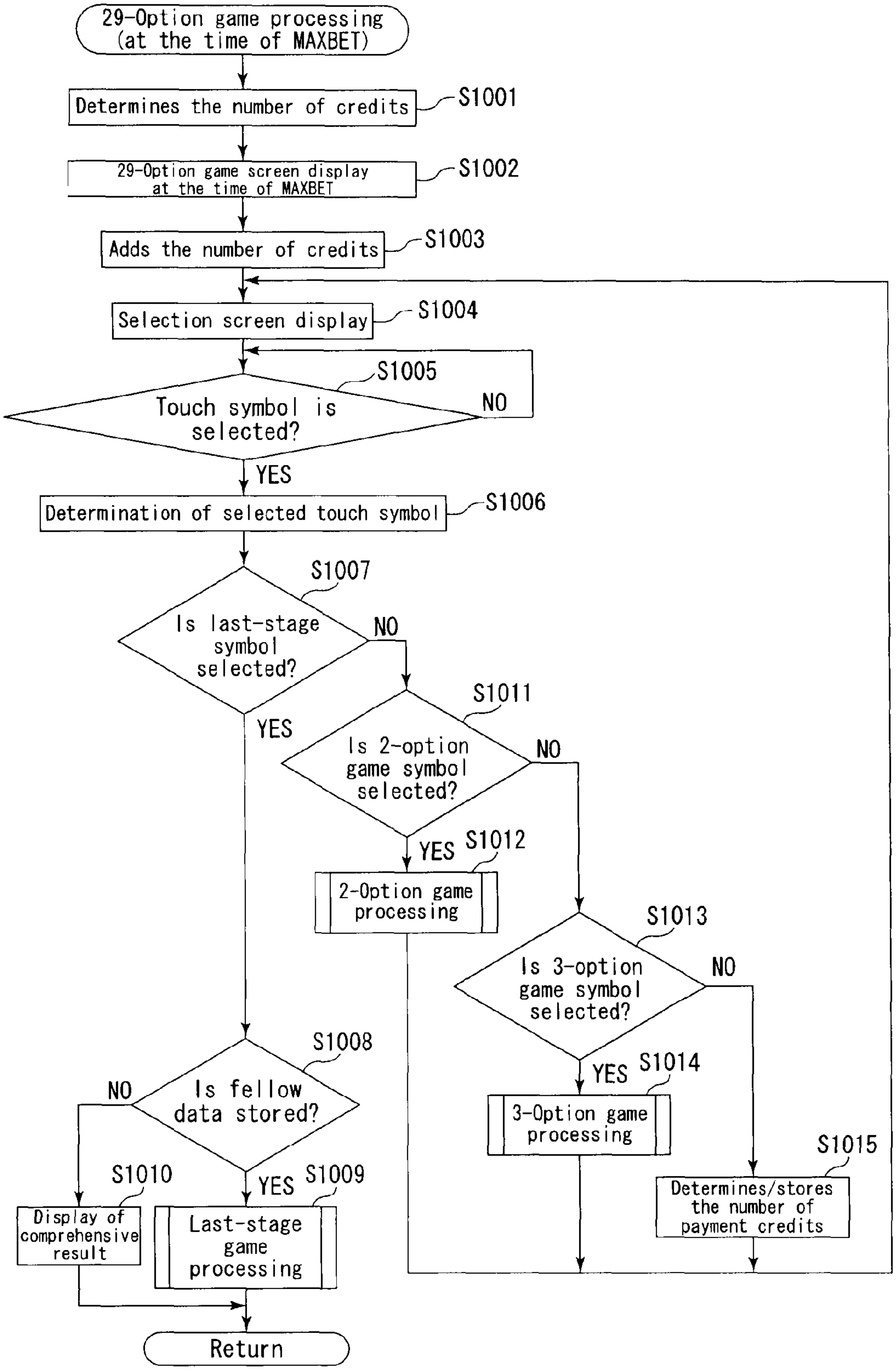
FIG. 29 is a view showing a flowchart of 29-option game processing (at the time of MAXBET) conducted by the gaming machine according to the third embodiment of the present invention.

Subsequently, a 29-touch symbol selection screen is displayed. As shown in FIG. 15B, 29 touch symbols 281 on which a pattern of glass shoes is drawn are displayed at a substantial center part of the lower image display panel 141. At this time point, a player cannot visually recognize the contents of each of the touch symbols 281 (credit payment or feature game). A fellow meter image 290 representative of an acquired fellow animation character and a BONUS WIN meter image 291 representative of the number of credits acquired in the 29-option game are displayed at the lower left part of the lower image display panel 141. An image 292 and an image 293 which prompt selection of the touch symbols 281 are displayed at the lower right of the lower image display panel 141. At this time point, the player can select a desired touch symbol 281 by touching a site corresponding to the touch symbol 281 on the touch panel 114. When any touch symbol 281 is selected, the contents corresponding to the touch symbol 281 are displayed and then credit payment is awarded or a variety of feature games are executed.

<29-Option Game Processing>

Next, with reference to FIG. 16, 29-option game processing executed in steps S212 and S215 of FIG. 12 will be described. FIG. 16 is a view showing a flowchart of 29-option game processing of the gaming machine according to the first embodiment of the present invention.

First in step S401, the main CPU 71 causes the lower image display panel 141 to display a selection screen which prompts a player to select one touch symbol 281 from among the displayed 29 touch symbols 281 (see FIG. 15A). Any of the fellow animation character, credit payment, 2-option game, 3-option game, and last-stage game is associated in advance with a respective one of 29 touch symbols 281 by means of lottery. A correlation between them is displayed on the lower image display panel 141 in an aspect in which the correlation cannot be visually recognized.

Next in step S402, the main CPU 71 determines whether or not any touch panel 281 is selected on a selection screen. Specifically, the main CPU 71 determines whether a site corresponding to any touch symbol 281 is touched on the touch panel 114. In a case where the main CPU 71 determines that the touch symbol 281 is not selected, the main CPU 71 causes the routine to revert to step S402.

In a case where the main CPU 71 determines that the touch symbol 281 is selected, the main CPU 71 makes determination of the selected touch symbol 281, in step S403. That is, the main CPU 71 determines with which of credit payment and a plurality of feature games the touch symbol 281 is associated.

Next in step S404, the main CPU 71 determines whether or not the selected touch symbol 281 corresponds to the last-stage game, based on the determination result in step S403.

In a case where the main CPU 71 determines that the selected touch symbol 281 is not associated with the last-stage game, the main CPU 71 determines whether or not the selected touch symbol 281 is associated with a 2-option game, in step S408. In a case where the main CPU 71 determines that the selected touch symbol 281 is associated with the 2-option game, the main CPU 71 executes 2-option game processing in step S409. The 2-option game processing will be described later in detail, with reference to FIG. 18.

In step S408, in a case where the main CPU 71 determines that the selected touch symbol 281 does not correspond to the 2-option game, the main CPU 71 determines whether or not the selected touch symbol 281 corresponds to a 3-option game in step S410. In a case where the main CPU 71 determines that the selected touch symbol 281 corresponds to the 3-option game, the main CPU 71 executes 3-option game processing in step S411. The 3-option game processing will be described later in detail, with reference to FIG. 20.

In step S410, in a case where the main CPU 71 determines that the selected touch symbol 281 does not correspond to the 3-option game, the main CPU 71 determines the amount of credit payment corresponding to the selected touch symbol 281, and cumulatively stores the relevant data in the RAM 73 in step S412.

After executing the processing of step S409, the processing of step S411, or the processing of step S412, the main CPU 71 causes the routine to revert to step S401.

In a case where the main CPU 71 determines that the selected touch symbol 281 corresponds to the last-stage game in step S404, the main CPU 71 determines whether or not at least one type of fellow data indicating a fellow animation character is stored in a predetermined storage area of the RAM 73. In a case where the main CPU 71 determines that at least such one type of fellow data indicating the fellow animation character is stored in the predetermined storage area of the RAM 73, the main CPU 71 executes the last-stage game processing in step S406. The last-stage game processing will be described later in detail with reference to FIG. 22. In a case where the main CPU 71 determines that none of the fellow data indicating the fellow animation character is stored in the predetermined storage area of the RAM 73, the main CPU causes the lower image display panel 141 to display a comprehensive result in the 29-option game (a total number of credits acquired by a player in the 29-option game, namely, a total number of acquired credits stored in the number-of-credits storage area of the RAM 73). After the processing of step S406 or the processing of step S407 has been executed, this subroutine is completed.

Next, the 2-option game executed in the 29-option game of the embodiment will be described. When a touch symbols 281 corresponding to the 2-option game is selected on a selection screen (see FIG. 15B) in the 29-option game, the 2-option game is executed causing a player to select one touch symbol from among two touch symbols provided as options. A fellow animation character is associated with one of the two touch symbols in the 2-option game and credit payment is associated with the other one. When a touch symbol corresponding to the fellow animation character is selected, the fellow animation character is awarded. When a touch symbol corresponding to credit payment is selected, the credit payment is awarded. A player can proceed to the last-stage game if the player selects the touch symbol 281 corresponding to the last-stage game in the 29-option game after acquiring the fellow animation character in this 2-option game.

Figure 17A:
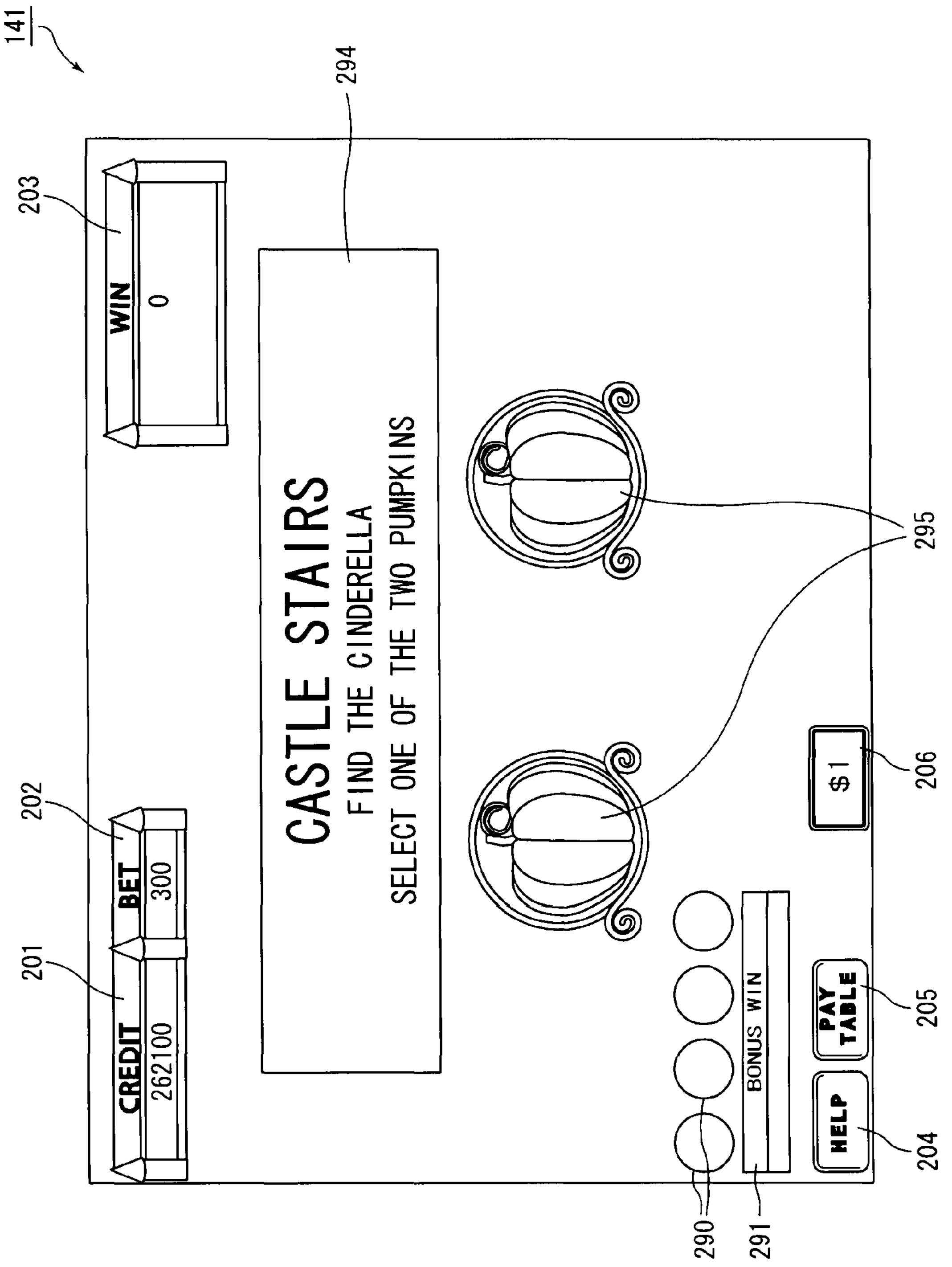
FIG. 17A is a view showing an example of an image displayed on the lower image display panel included in the gaming machine according to the first embodiment of the present invention.
Figure 17B:
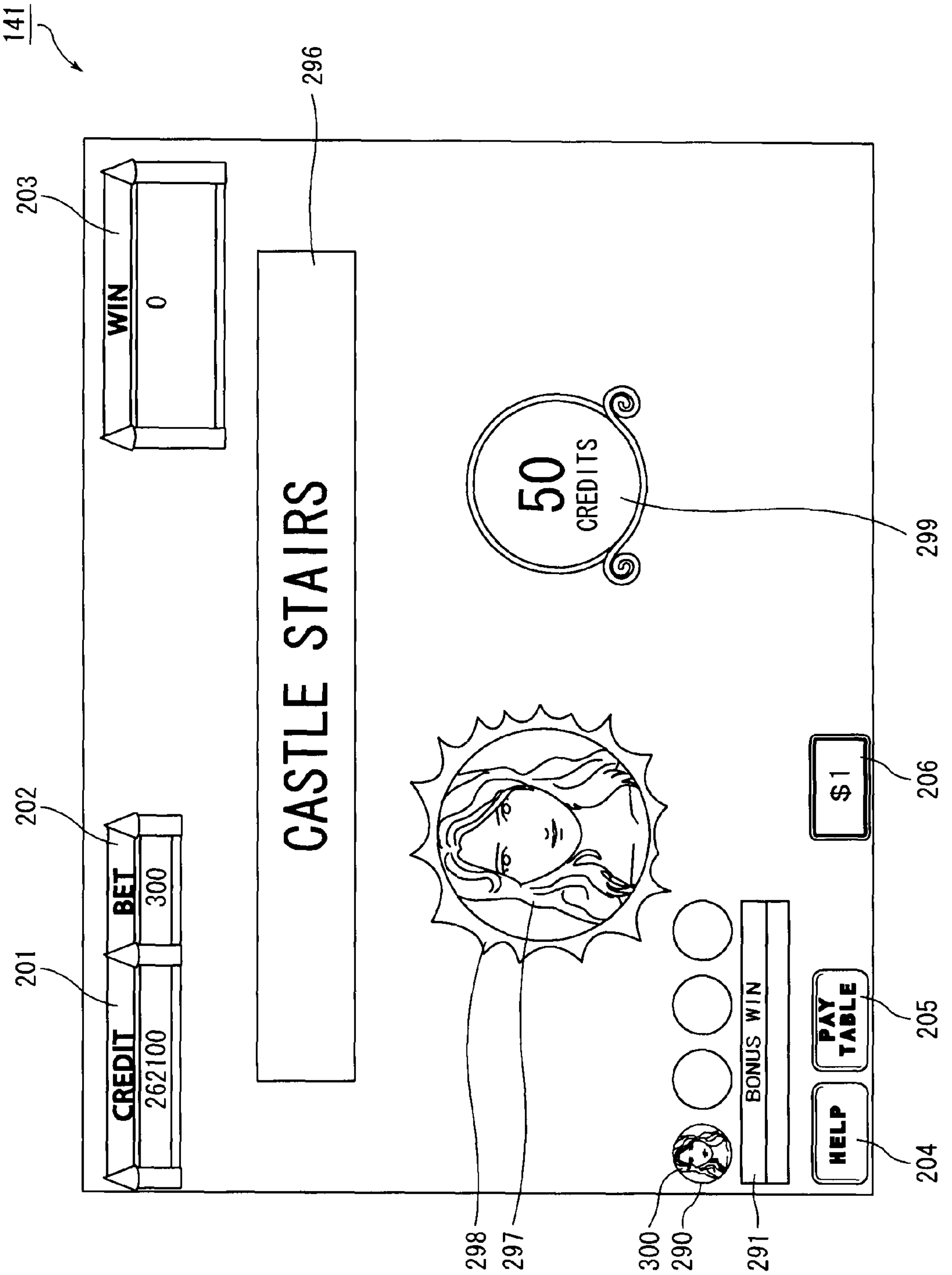
FIG. 17B is a view showing an example of an image displayed on the lower image display panel included in the gaming machine according to the first embodiment of the present invention.

With reference to FIG. 17, an outline of the 2-option game will be described. FIG. 17A and FIG. 17B are views each showing an example of an image displayed on the lower image display panel included in the gaming machine according to the first embodiment of the present invention.

When a bonus symbol 281 corresponding to the 2-option game is selected on a selection screen in the 29-option game, two touch symbols 295 and an image 294 which prompts a player to select either of these symbols are displayed at a substantially center part of the lower image display panel 141, as shown in FIG. 17A.

When selecting of the touch symbol 295 is executed, the image as shown in FIG. 17B is displayed. FIG. 17B shows how the touch symbol 295 corresponding to the fellow animation character (Cinderella) is selected. Images displayed at the lower side of an image 296 indicating a title of 2-option game are: an image 297 indicating a fellow animation character (Cinderella) corresponding to the selected touch symbol 295; an image 298 emphasizing that the touch symbol 295 corresponding to the fellow animation character (Cinderella) is selected; and an image 299 notifying the content of a touch symbol 295 which is not selected. An image 300 indicating the acquired fellow animation character (Cinderella) is additionally displayed for one of the fellow meter images 290.

<2-Option Game Processing>

Figure 18:
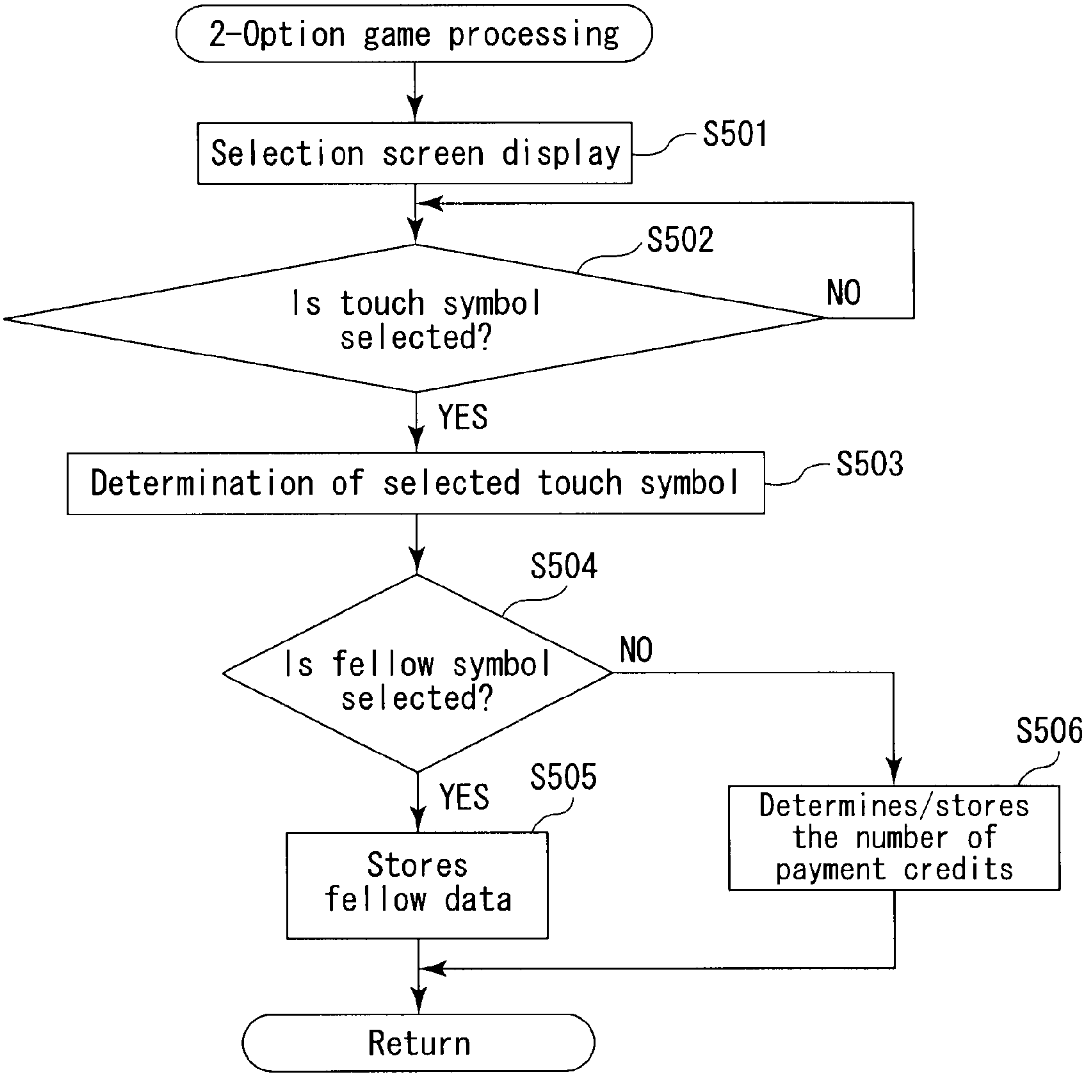
FIG. 18 is a view showing a flowchart of two-option game processing of the gaming machine according to the first embodiment of the present invention.

Next, with reference to FIG. 18, 2-option game processing executed in step S409 of FIG. 16 will be described. FIG. 18 is a view showing a flowchart of 2-option game processing of the gaming machine according to the first embodiment of the present invention.

First in step S501, the main CPU 71 causes the lower image display panel 141 to display a selection screen which prompts a player to select one touch symbol 295 from among the displayed two touch symbols 295 (see FIG. 17A). The two touch symbols 295 are associated in advance with either of the fellow animation character and credit payment by means of lottery. A correlation between them is displayed on the lower image display panel in an aspect in which the correlation cannot be visually recognized.

Next in step S502, the main CPU 71 determines whether or not any touch symbol 295 is selected on the selection screen. Specifically, the main CPU 71 determines whether or not a site corresponding to any touch symbol 295 is touched on the touch panel 114. In a case where the main CPU 71 determines that the touch symbol 295 is not selected, the main CPU 71 causes the routine to revert to step S502.

In a case where the main CPU 71 determines that the touch symbol 295 is selected, the main CPU 71 makes determination of the selected touch symbol 295 in step S503. That is, the main CPU 71 determines with which of the fellow animation character and credit payment the touch symbol 295 is associated.

Next in step S504, the main CPU 71 determines whether or not the selected touch symbol 295 corresponds to the fellow animation character, based on the determination result in step S503.

In a case where the main CPU 71 determines that the selected touch symbol 295 corresponds to the fellow animation character, the main CPU 71 causes the RAM 73 to store fellow data indicating the fellow animation character in step S505.

In a case where the main CPU 71 determines that the selected touch symbol 295 does not correspond to the fellow animation character, the main CPU 71 determines the number of payment credits corresponding to the touch symbol 295 and then cumulatively stores the determined number in the RAM 73, in step S506. After the processing of step S505 or step S506 has been executed, this subroutine is completed.

Next, the 3-option game executed in the 29-option game of the embodiment will be described. When a touch symbol 281 corresponding to the 3-option game is selected on a selection screen (see FIG. 15B) in the 29-option game, the 3-option game is executed causing a player to select one touch symbol from among the three touch symbols provided as options. Different types of credit payments are associated with the three touch symbols in the 3-option game. When one touch symbol is selected, the credit payment corresponding to the touch symbol is awarded.

First, with reference to FIG. 19, an outline of the 3-option game will be described. FIG. 19A and FIG. 19B are views each showing an example of an image displayed on the lower image display panel included in the gaming machine according to the first embodiment of the present invention.

Figure 19A:
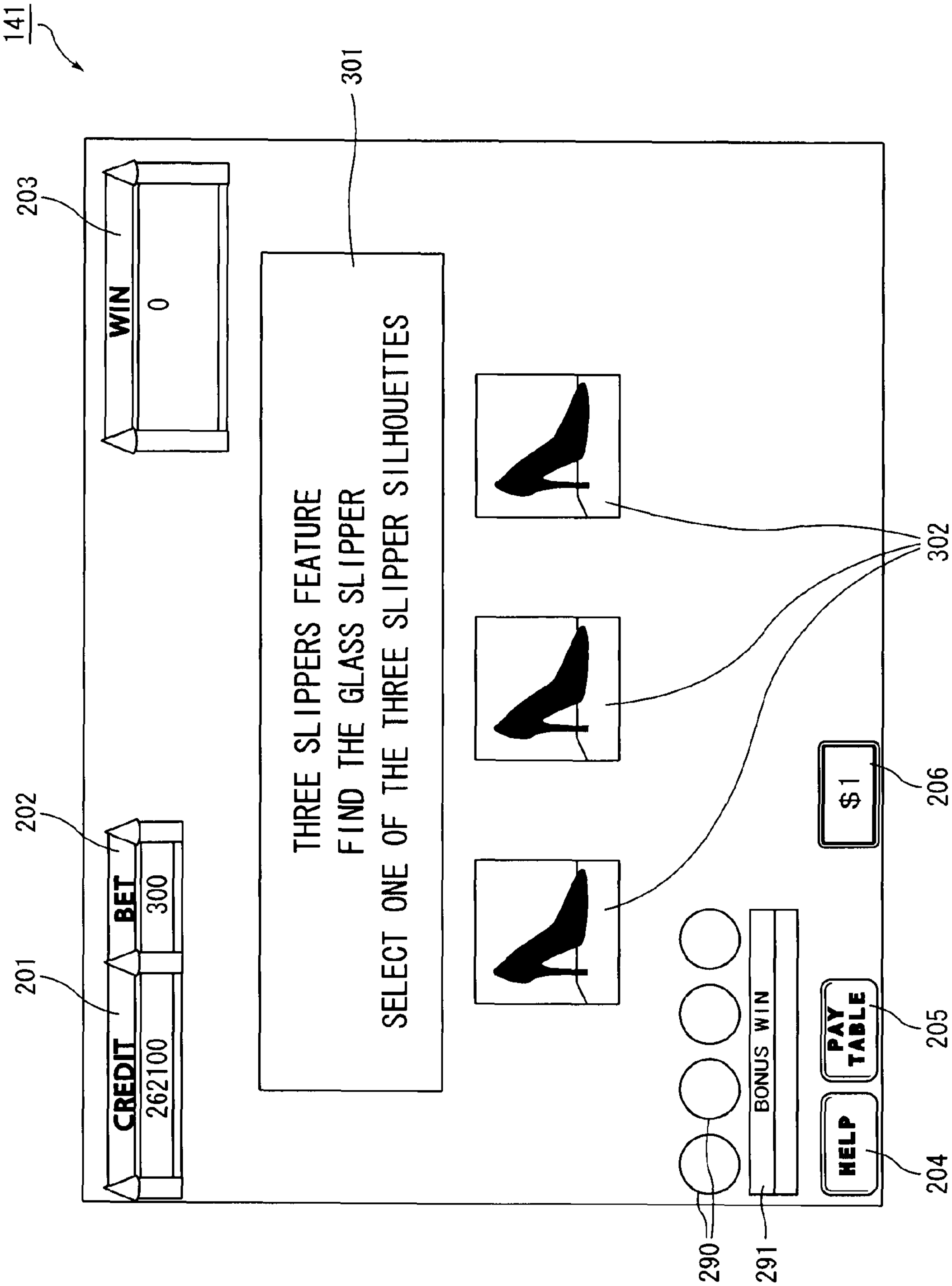
FIG. 19A is a view showing an example of an image displayed on the lower image display panel included in the gaming machine according to the first embodiment of the present invention.

When a bonus symbol 281 corresponding to the 3-option game is selected on a selection screen in the 29-option game, three touch symbols 302 and an image 301 which prompts a player to select any of these symbols are displayed at a substantial center part of the lower image display panel 141, as shown in FIG. 19A.

Figure 19B:
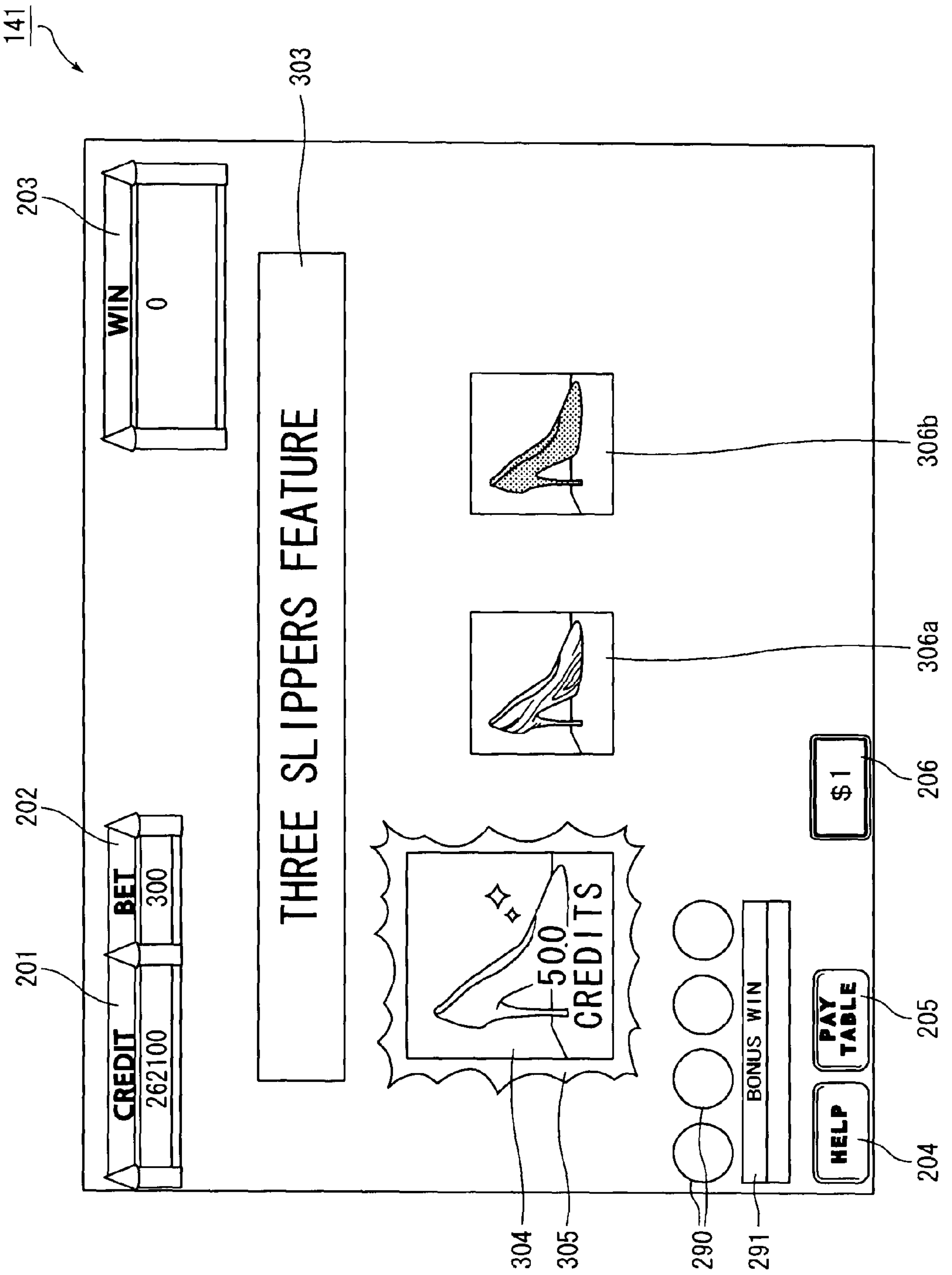
FIG. 19B is a view showing an example of an image displayed on the lower image display panel included in the gaming machine according to the first embodiment of the present invention.

When selecting of the touch symbol 302 is executed, an image as shown in FIG. 19B is displayed. FIG. 19B shows how the touch symbol 302 corresponding to 500 credits (glass shoes) is selected. Those displayed at the lower side of an image 303 indicating a title of 3-option game are: an image 304 indicating credit payment (500 credits, glass shoes) corresponding to the selected touch symbol 302; an image 305 emphasizing that the touch symbol 302 corresponding to the glass shoes is selected; and an image 306*a* (indicating wooden shoes) and an image 306*b* (indicating red shoes), notifying the contents of the two touch symbols 302 which are not selected.

<3-Option Game Processing>

Figure 20:
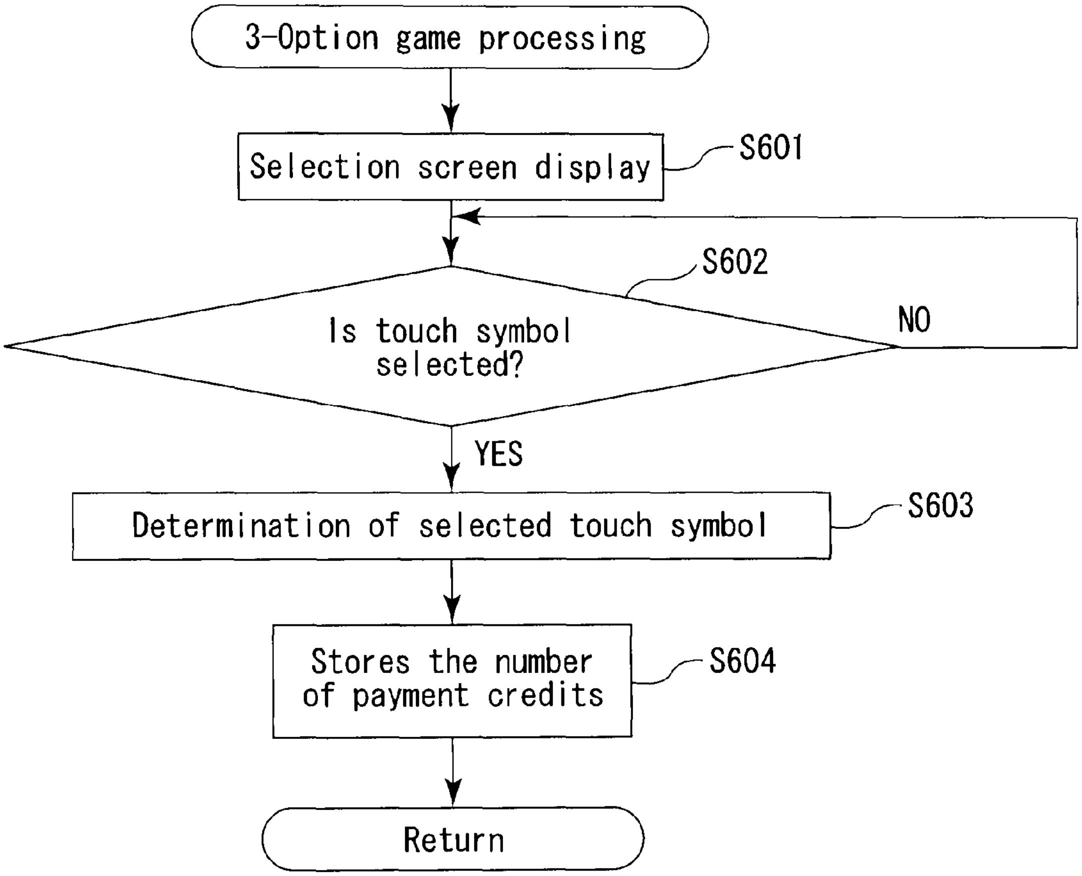
FIG. 20 is a view showing a flowchart of 3-option game processing of the gaming machine according to the first embodiment of the present invention.

Next, with reference to FIG. 20, the 3-option game processing executed in step S411 of FIG. 16 will be described. FIG. 20 is a view showing a flowchart of the 3-option game processing of the gaming machine according to the first embodiment of the present invention.

First, the main CPU 71 causes the lower image display panel 141 to display a selection screen which prompts a player to select one touch symbol 302 from among the displayed three touch symbols 302 in step S601 (see FIG. 19A). Credit payments whose amounts are different from each other are associated in advance with the three touch symbols 302 by means of lottery. A correlation between them is displayed on the lower image display panel 141 in an aspect in which the correlation cannot be visually recognized.

Next in step S602, the main CPU 71 determines whether or not any touch symbol 302 is selected on a selection screen. Specifically, the main CPU 71 determines whether or not a site corresponding to any touch symbol 302 is touched on the touch panel 114. In a case where the main CPU 71 determines that the touch symbol 302 is not selected, the main CPU 71 causes the routine to revert to step S602.

In a case where the main CPU 71 determines that the touch symbol 302 is selected, the main CPU 71 makes determination of the selected touch symbol 302 in step S603. That is, the main CPU 71 determines with which of the credit payments the touch symbol 302 is associated.

Next in step S604, the main CPU 71 cumulatively stores data related to the amount of credit payment corresponding to the selected touch symbol 302 in the RAM 73, based on the determination result in step S603. After the processing of step S604 has been executed, this subroutine is completed.

Next, the last-stage game executed in the 29-option game of the embodiment will be described. The last-stage game is executed in a case where a touch symbol 281 corresponding to the last-stage game is selected on a selection screen of the 29-option game (see FIG. 15B) and in a case where at least one or more types of fellow data are stored in the RAM 73. In the last-stage game, a roulette lottery game using a clock-type roulette portion 220 included in an upper image display panel 131 of the gaming machine 1 is executed for each fellow animation character acquired (fellow animation character indicated by the fellow data stored in the RAM 73), and as the result of lottery, the payment based on the numeric value designated by a clock-hands portion 221 is awarded. Specifically, the payment whose amount is obtained by multiplying the number of BETs per one payline for the number determined by means of lottery is awarded.

Figure 21A:
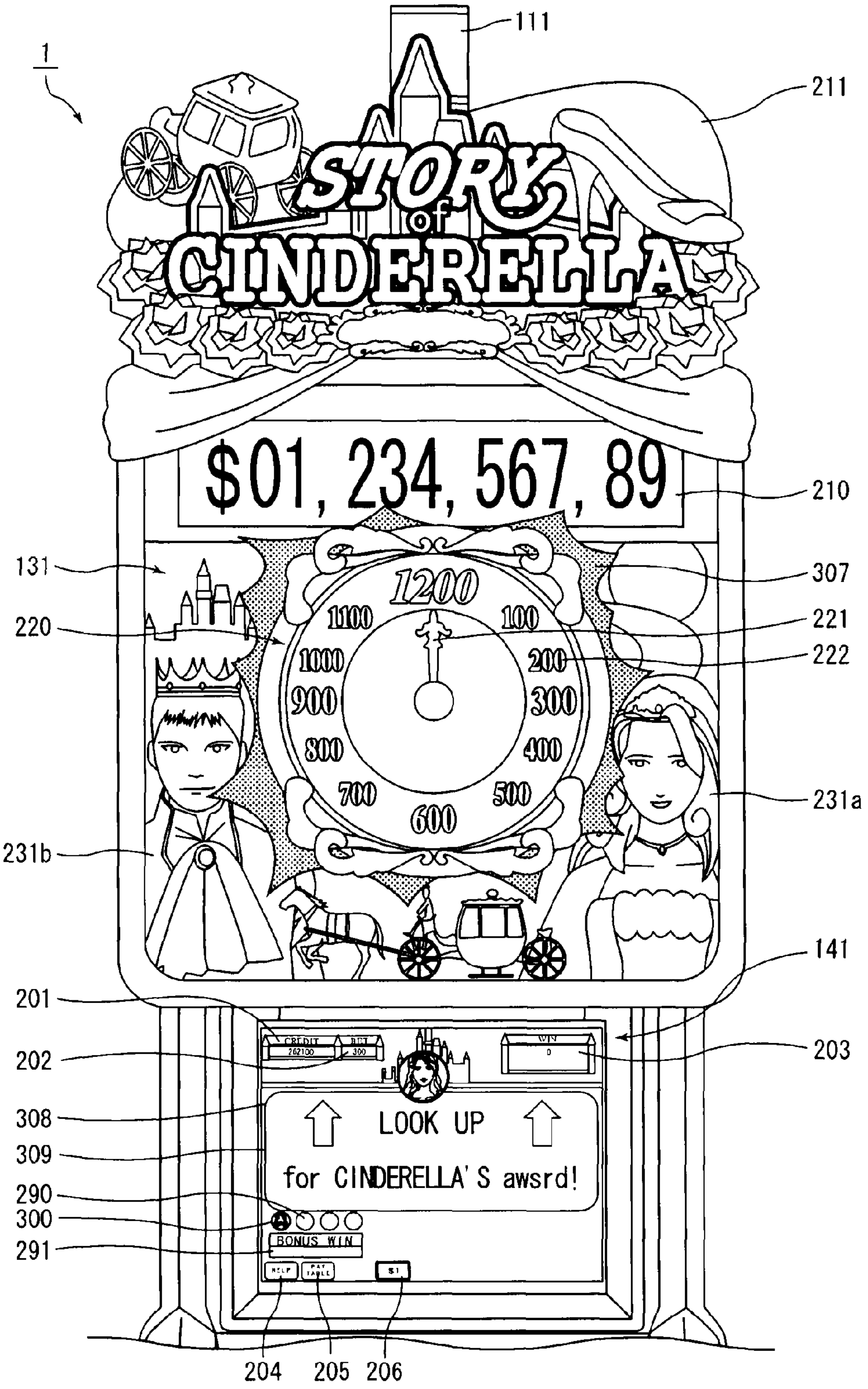
FIG. 21A is an enlarged view of part of a front side of the gaming machine according to the first embodiment of the present invention.
Figure 21B:
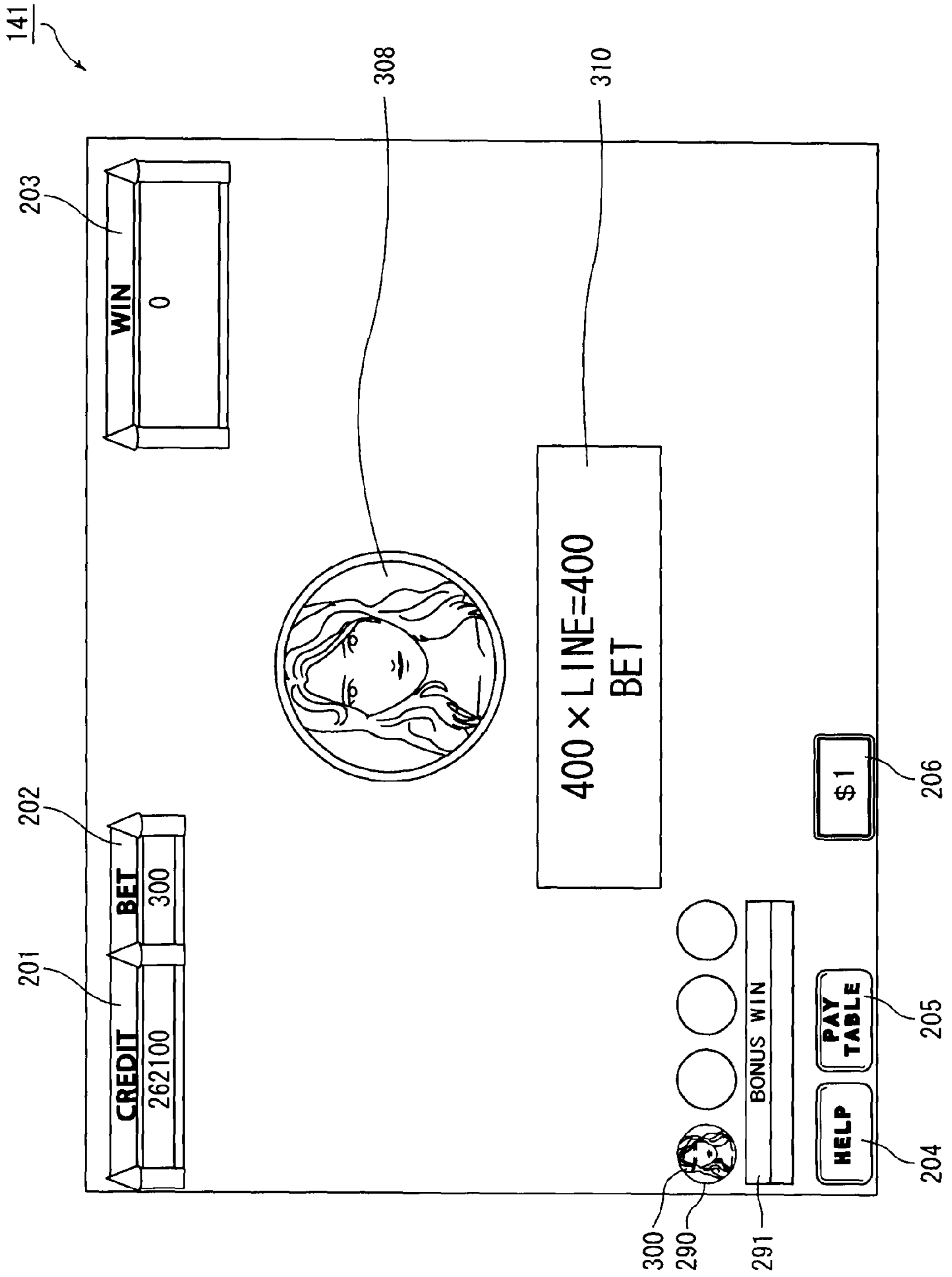
FIG. 21B is a view showing an example of an image displayed on the lower image display panel included in the gaming machine according to the first embodiment of the present invention.
Figure 21C:
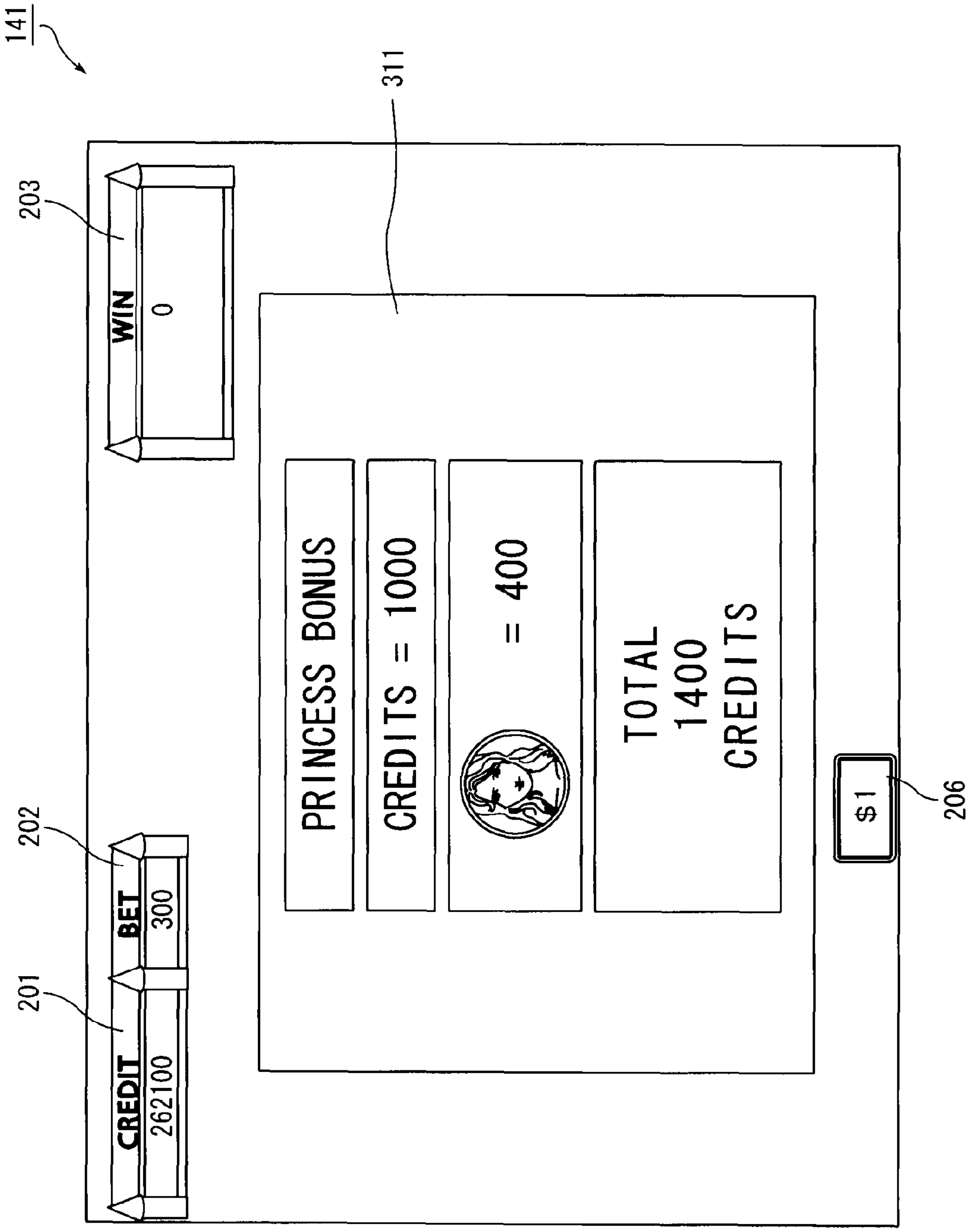
FIG. 21C is a view showing an example of an image displayed on the lower image display panel included in the gaming machine according to the first embodiment of the present invention.

First, with reference to FIG. 21A to FIG. 21F, an outline of the last-stage game will be described. FIG. 21A is an enlarged view of part of a front face of the gaming machine according to the first embodiment of the present invention. FIG. 21B and FIG. 21C are views each showing an example of an image displayed on the lower image display panel included in the gaming machine according to the first embodiment of the present invention.

When the last-stage game is started, as shown in FIG. 21A, an image 307 emphasizing the clock-type roulette portion 220 is displayed on the upper image display panel 131; and an image 308 indicating an animation character related to the last-stage game and an image 309 which prompts a player to pay attention to the upper image display panel 131 are displayed at a substantial center part of the lower image display panel 141.

When a game using the clock-type roulette portion 220 completes, as shown in FIG. 21B, an image 308 indicating an animation character related to the last-stage game and an image 310 indicating a payment awarded as a result of the game using the clock-type roulette portion 220 are displayed at a substantial center part of the lower image display panel 141.

An image 311 notifying a comprehensive result of the 29-option game (total amount of acquired credits) is displayed on the lower image display panel 141 at the end of the last-stage game.

Figure 21D:
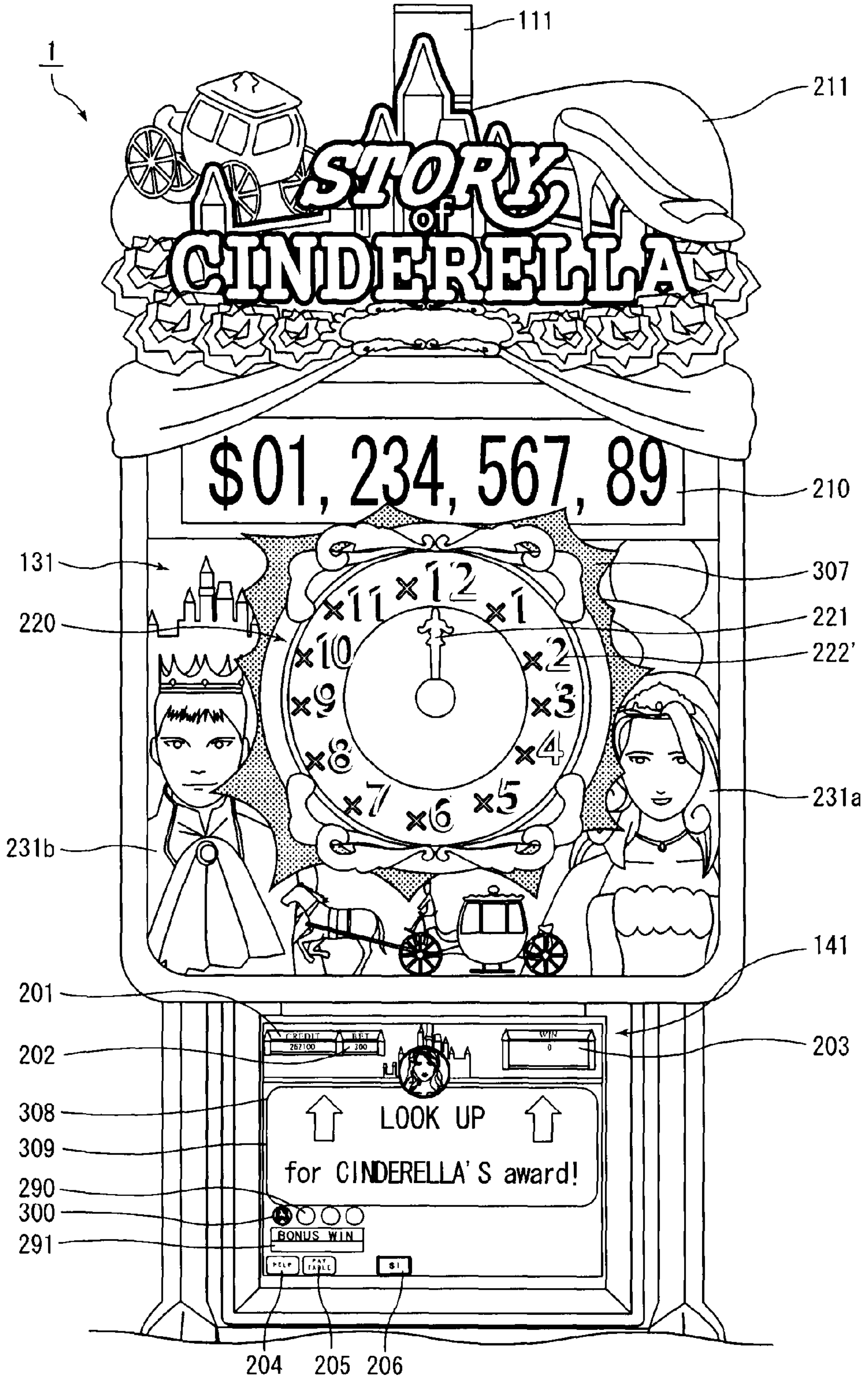
FIG. 21D is an enlarged view of part of a front side of a gaming machine according to another embodiment of the present invention.
Figure 21E:
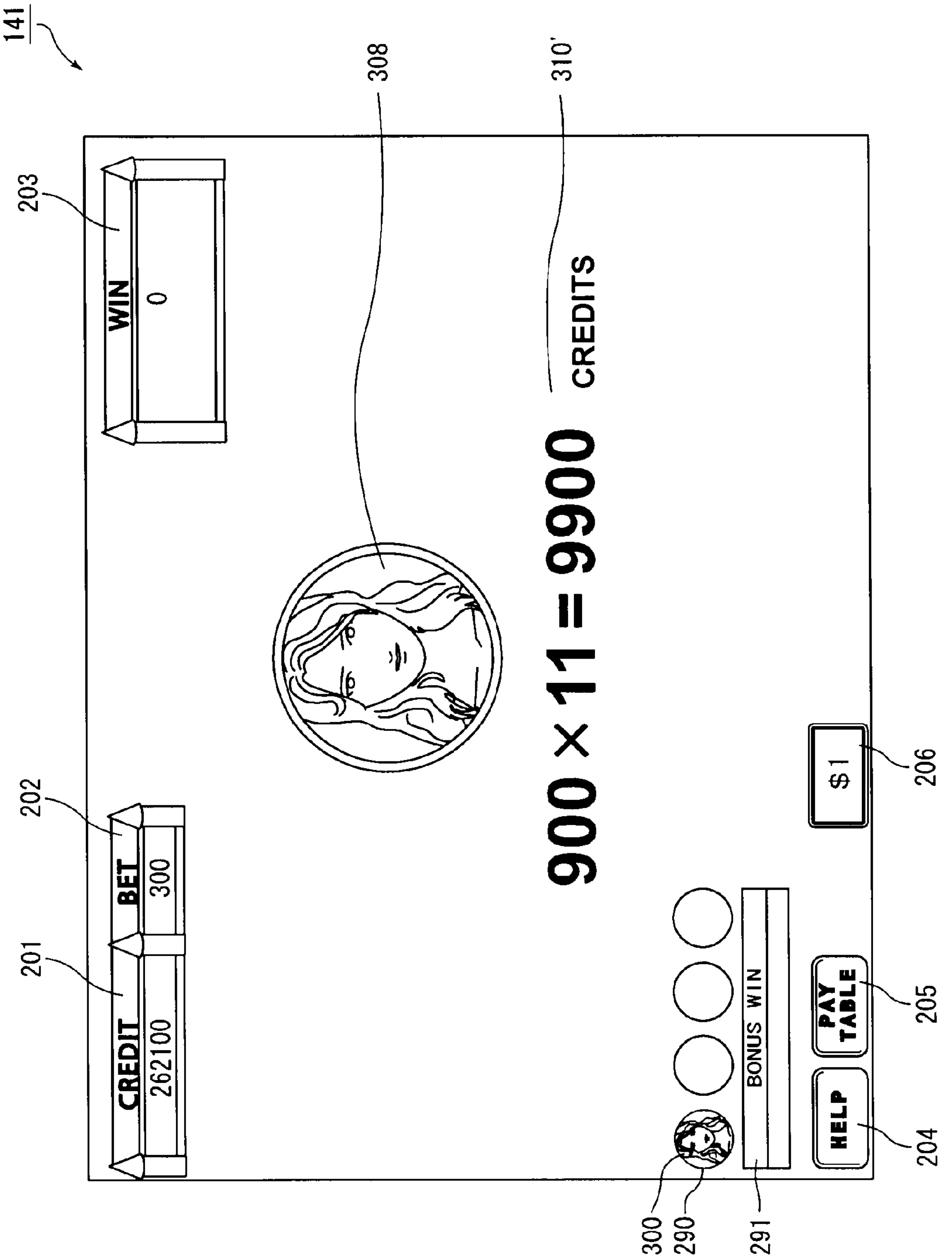
FIG. 21E is a view showing an example of an image displayed on a lower image display panel included in a gaming machine according to another embodiment of the present invention.
Figure 21F:
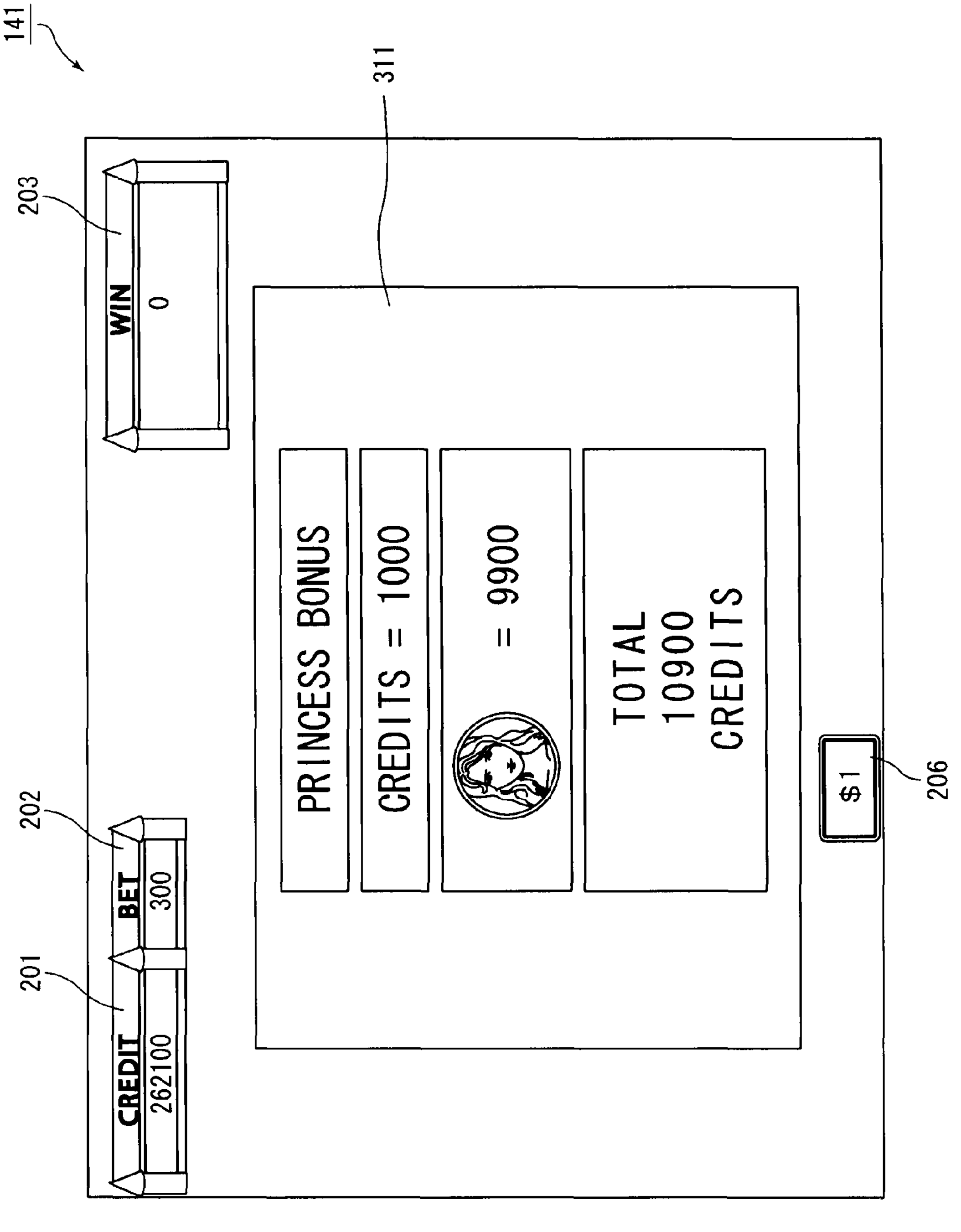
FIG. 21F is a view showing an example of an image displayed on the lower image display panel included in the gaming machine according to another embodiment of the present invention.

While the first embodiment describes a case in which the payment in the last-stage game is calculated by multiplying the number of BETs per one payline for the number determined by means of lottery, the present invention is not limitative thereto. A payment may be determined by multiplying a magnification determined by means of lottery for a fixed payment (hereinafter, referred to as an animation character payment) assigned to a fellow animation character as described below, for example. FIG. 21D is an enlarged view of a front face of a gaming machine according to another embodiment of the present invention. FIG. 21E and FIG. 21F are views each showing an example of an image displayed on the lower image display panel included in the gaming machine according to another embodiment of the present invention. Like constituent elements common to the gaming machine 1 of the first embodiment are designated by like reference numerals and are explained. As shown in FIG. 21D, a numeric portion 222' representing magnifications, respectively, determined at the 1'O clock to 12'O clock positions of a clock, is provided at the clock-type roulette portion 220. A magnification is determined by means of lottery, an effect that the clock-hands portion 221 indicates the magnification is conducted. When a game using the clock-type roulette portion 220 completes, as shown in FIG. 21E, an image 310' is displayed indicating a payment calculated by multiplying the magnification determined by means of lottery for animation character payment. A comprehensive result (total number of acquired credits) of 29-option game as shown in FIG. 21F is then notified at the end of the last-stage game. In the present invention, a payment may be determined by multiplying the magnification determined by means of lottery for a total number of BETs (for example, the number displayed at the number-of-BETs display portion 202).

<Last-Stage Game Processing>

Figure 22A:
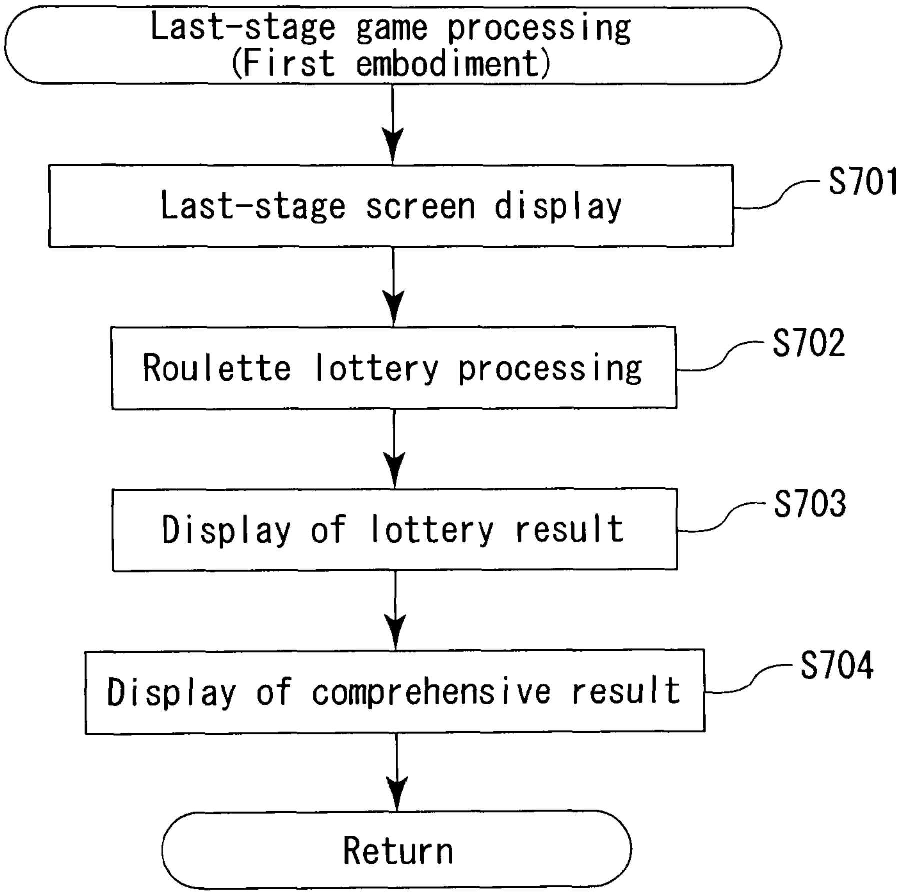
FIG. 22A is a view showing a flowchart of last stage game processing of the gaming machine according to the first embodiment of the present invention.

Next, with reference to FIG. 22A, the last-stage game processing executed in step S406 of FIG. 16 will be described. FIG. 22A is a view showing a flowchart of the last-stage game processing of the gaming machine according to the first embodiment of the present invention.

First in step S701, the main CPU 71 causes the upper image display panel 131 and the lower image display panel 141 to display an image indicating that the last-stage game is played (see FIG. 21A).

Next in step S702, the main CPU 71 conducts lottery processing in a game using the clock-type roulette portion 220. That is, the main CPU 71 determines, by means of lottery, at which number's position to stop the clock-hands portion 221 of the clock-type roulette portion 220.

Next in step S703, the main CPU 71 conducts an effect, based on a result of the lottery in step S702, and displays a lottery result (see FIG. 21B).

Next in step S704, the main CPU 71 causes the lower image display panel 141 to display an image notifying a comprehensive result (a total number of acquired credits) of the 29-option game (see FIG. 21C). After the processing of step S704 has been executed, this subroutine is completed.

In a case where a plurality of fellow animation characters are acquired in the 29-option game (in a case where plural types of fellow data are stored in the RAM 73), the lottery processing related to the game using the clock-type roulette portion 220 is executed for a respective one of the plurality of fellow animation characters acquired, in the last-stage game processing.

While the first embodiment described a case in which the last-stage game is played using the clock-type roulette portion 220 simulating a roulette, a mechanical roulette or a video roulette can be used.

Figure 22B:
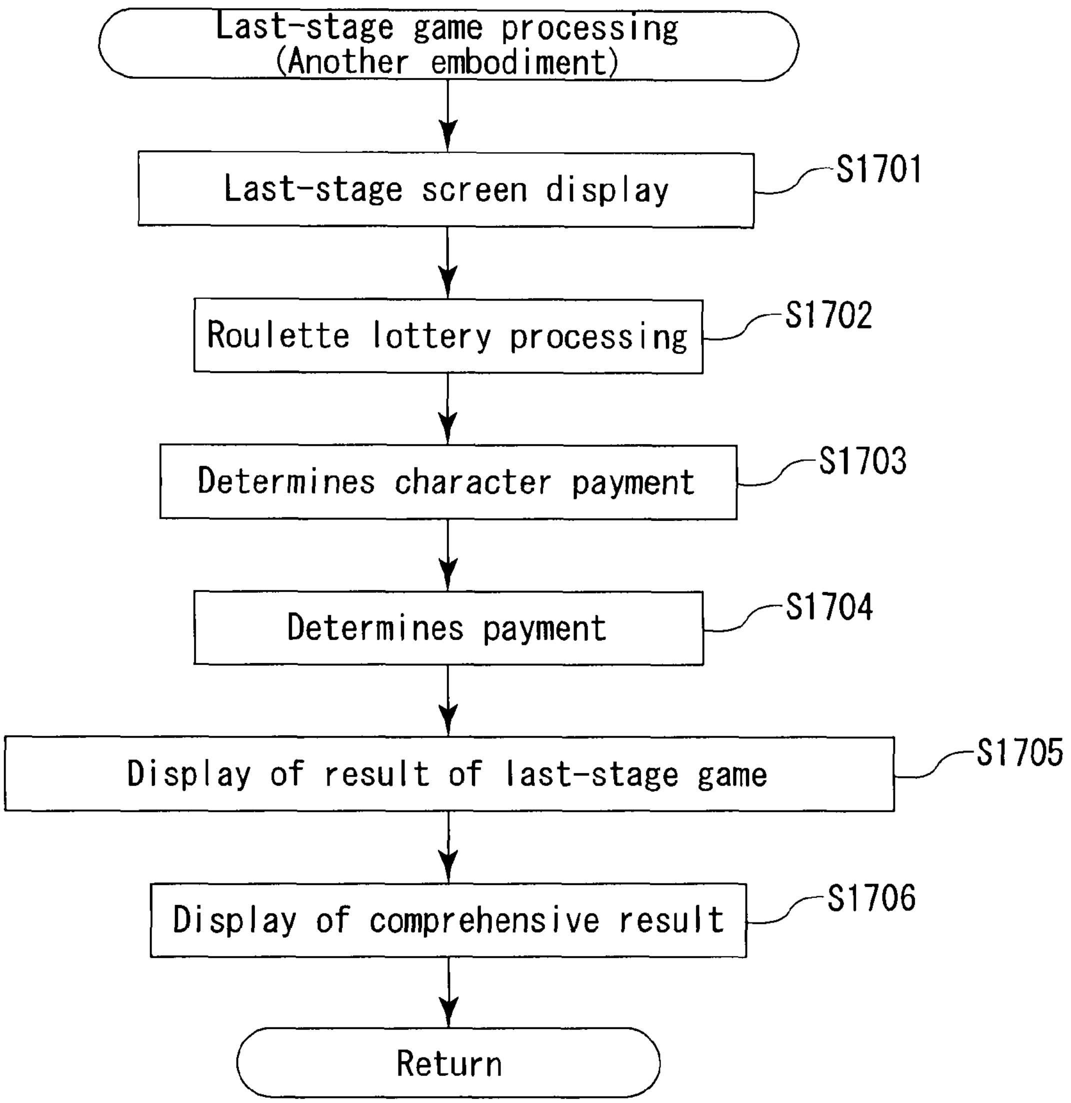
FIG. 22B is a view showing a flowchart of last stage game processing of a gaming machine according to another embodiment of the present invention.

In a case where a payment in the last-stage game is determined based on an animation character payment and a magnification determined by means of lottery, the processing shown in FIG. 22B is executed. FIG. 22B is a view showing a flowchart of the last-stage game processing of a gaming machine according to another embodiment of the present invention. The processing of step S1701 and step S1702 is similar to that of step S701 and step S702 of FIG. 22A. Thus, a duplicate description of these steps is omitted here. In step S1703, the main CPU 71 conducts processing of determining an animation character payment. That is, the main CPU 71 determines a fixed payment assigned to an animation character (fellow animation character) related to the last-stage game. For example, in FIG. 21E, the fellow animation character is Cinderella, and the animation character payment is 900 credits. Next in step S1704, the main CPU 71 conducts processing of determining a payment in the last-stage game. Specifically, the main CPU 71 calculates the number of credits to be paid, by multiplying the magnification determined by means of the lottery in step S1702 for the animation character payment determined in step S1703. The processing of step S1705 and step S1706 is similar to that of step S701 and step S702 of FIG. 22A. Thus, a duplicate description of these steps is omitted here. After the processing of step S1706 has been executed, this subroutine is completed.

As has been described above, with the gaming machine 1 according to the first embodiment, in response to the fact that three bonus symbols 250 (specific symbols) are stop-displayed in a normal game, a player can select any of the stop-displayed three bonus symbols 250, via the touch panel 114 (input device). The benefit (credit payment, free game, or 29-option game) according to the selected bonus symbol 250 is awarded. Random numbers are extracted in accordance with the selected bonus symbol 250 (when a predetermined payment symbol, namely the bonus symbol 250 corresponding to credit payment is selected), whereby it is determined whether or not to generate "RESCUE PRESENT" (specific game state). In response to the fact that it is determined that "RESCUE PRESENT" is generated (in a case where the extracted random numbers are within the predetermined numeric range), the player can further select a bonus symbol 250 other than the selected bonus symbol 250, via the touch panel 114. Then, the benefit (free game or 29-option game) according to the selected bonus symbol 250 is awarded. That is, in a case where "RESCUE PRESENT" arises, the player can acquire the benefit according to the bonus symbol 250 twice. Therefore, great satisfaction can be imparted to the player. Further, it is possible to cause the player to hold a great sense of expectation relative to the generation of such "RESCUE PRESENT". The first selected bonus symbol 250 is involved in the generation of "RESCUE PRESENT". Therefore, it is possible to cause the player to hold a great interest relative to what kind of bonus symbol 250 is first selected. Further, the player can enjoy every minute of selection of bonus symbol 250. In response to the fact three bonus symbols 250 are stop-displayed in a normal game, it becomes possible to select such bonus symbol 250, and thus, the player can play a normal game while expecting that three bonus symbols 250 are stop-displayed. In this manner, it is possible to drive the player to be engaged in the play of game(s).

"RESCUE PRESENT" can take place only in a case where the first selected bonus symbol 250 is a predetermined payment symbol. Therefore, a player can hold an interest relative to whether the first selected bonus symbol 250 is a predetermined payment symbol. For example, if "RESCUE PRESENT" arises when the first selected bonus symbol 250 is a predetermined payment symbol, a benefit (for example, free game) is further awarded in addition to the predetermined payment. If "RESCUE PRESENT" does not take place, only the predetermined payment is awarded, and the benefit such as free game is not awarded. When the first selected bonus symbol 250 is a bonus symbol 250 (for example, free game symbol) other than the predetermined payment symbol, the benefit (for example, free game) according to the bonus symbol is awarded, whereas the predetermined payment is not awarded. Therefore, it is possible to create a situation causing the player to think about whether the predetermined payment symbol is desirable as the first selected bonus symbol 250 or a bonus symbol 250 (for example, free game symbol) other than the predetermined payment symbol is desirable. Through this fact, it is possible to drive the player to be engaged in the play of game(s).

The first embodiment described a case in which selection of bonus symbol 250 is accepted on condition that three bonus symbols 250 are stop-displayed in a normal game. However, the condition for accepting selection of a specific symbol of the present invention may be that a plurality of specific symbols are stop-displayed in a normal game, and the number or stop position of specific symbols to be stop-displayed is not limited in particular.

The first embodiment described a case in which the bonus associated with each bolus symbol 250 is credit payment, free game, or 29-option game in the 3-option bonus game. However, the bonus (benefit) associated with each specific symbol of the present invention is not limitative thereto, and it is possible to employ an arbitrary payment or an arbitrary game different from normal game.

The first embodiment described a case in which each bonus symbol 250 and bonus (credit payment, free game, 29-option game) are associated with each other in advance on a one-to-one basis in the 3-option bonus game. However, in the present invention, with a timing at which a specific symbol is selected, the bonus (benefit) associated with the specific symbol may be determined using random numbers or the like. For example, in a case where any specific symbol stop-displayed is selected, specific one bonus (benefit), for example, free game may be adapted to be awarded.

The first embodiment described a case in which "RESCUE PRESENT" takes place at a predetermined probability in a case where a bonus symbol 250 corresponding to credit payment is selected, in the 3-option bonus game. However, in the present invention, a specific game state may be adapted to take place at a probability determined every time a specific symbol corresponding to a specific one bonus (benefit) is selected.

The first embodiment described a case in which "RESCUE PRESENT" takes place (at a predetermined probability) only in a case where a bonus symbol 250 corresponding to specific one bonus (credit payment) is selected, in the 3-option bonus game. However, in the present invention, for example, with a probability of generation being set for each specific symbol selected, a specific game state may be caused to take place at a probability according to the selected specific symbol. Such aspect can include an aspect in which it is determined whether or not a specific game state is generated, based on: a random number table in which each type of specific symbols and a numeric range within which random numbers are allowable to be are associated; and the extracted random numbers. The data indicating the random number table is stored in memory included in a gaming machine. With such configuration, the first selected specific symbol is involved in whether or not a specific game state takes place or a probability at which a specific game state takes place. Therefore, a player can hold a further greater interest relative to what kind of specific symbol is first selected.

The first embodiment described a case in which the number of free games is predetermined, whereas in the present invention, the number of free games may be determined every time a free game is played.

The first embodiment described a case of executing a 29-options game in which any touch symbol is selected via the touch panel 114 from among a plurality of touch symbols as one example of the feature games. However, the feature games in the present invention may include a selection game in which an operation of selecting an option is made via a physical button device associated to the option, and a result of the selection (the content of the option) is displayed on a display device such as a display.

The first embodiment described a case in which a prize is determined based on a combination of stop-displayed symbols, whereas in the present invention, a prize may be determined based on the number of stop-displayed symbols.

While the first embodiment described a case in which a player inputs a variety of selections via the touch panel 114, an input device in the present invention is not limitative thereto, and may be a physical button device installed in cabinet, for example.

While the first embodiment described a case in which a slot game using video reels 3 is played in the gaming machine 1, a slot game using mechanical reels may be played in the gaming machine according to the present invention.

Second Embodiment

A second embodiment describes the invention of (2). In the following description, like constituent elements of the gaming machine 1 according to the foregoing embodiment are designated by like reference numerals and are explained. A duplicate description is omitted with respect to a case where the descriptive matters in the foregoing embodiment apply for the second embodiment as well.

Hereinafter, the second embodiment will be described with reference to FIG. 23A.

Figure 23A:
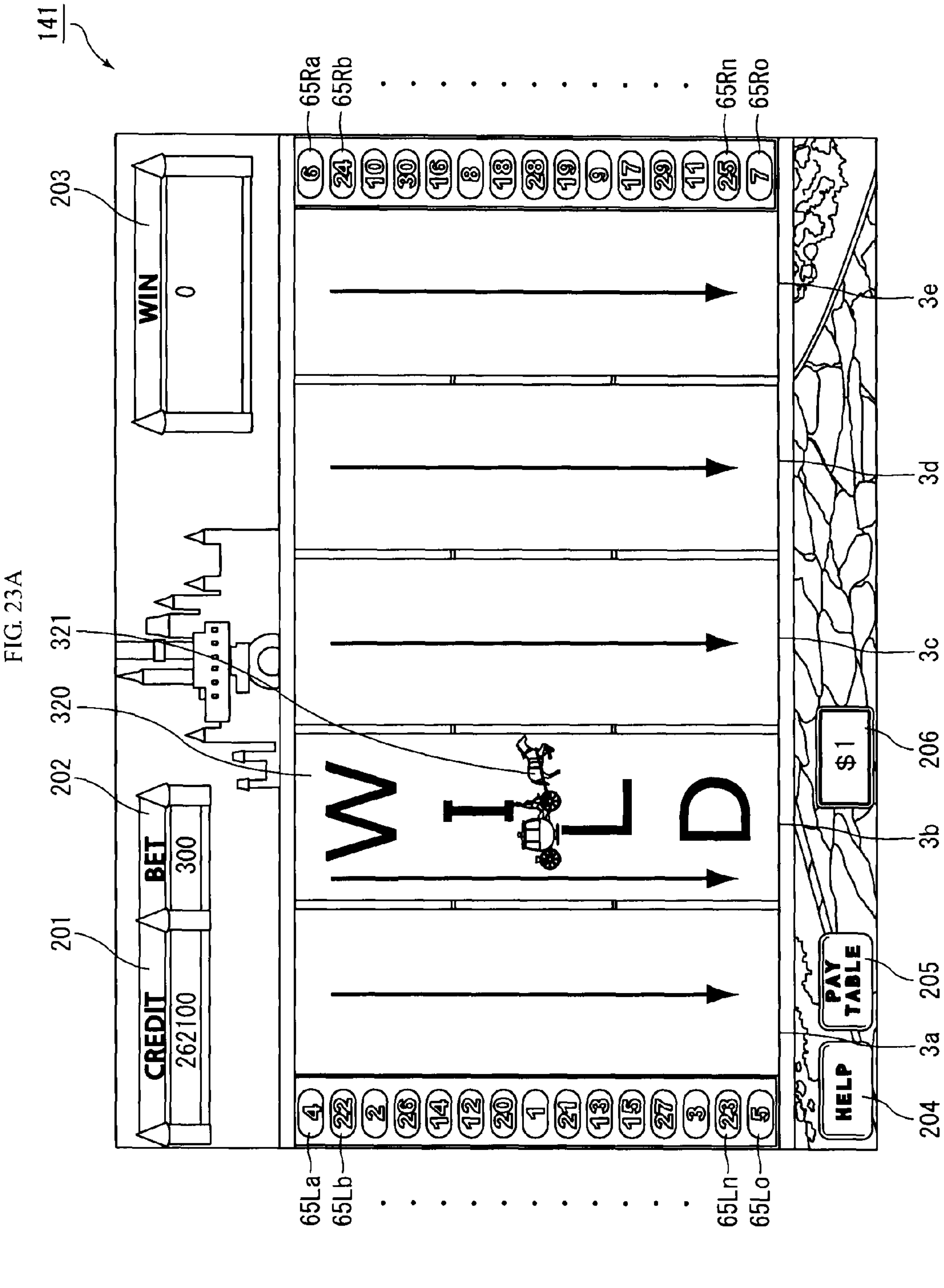
FIG. 23A shows an example of an image displayed on a lower image display panel of a gaming machine according to a second embodiment of the present invention.

FIG. 23A shows an example of an image displayed on a lower image display panel 141. FIG. 23A shows how symbols are scroll-displayed in a first video reel 3*a* and a third video reel 3*c* to a fifth video reel 3*e*. FIG. 23A also shows how expanded WILD symbols 320 are scroll-displayed in the video reel 3*b*. In the embodiment, expanded WILD symbols 320 are thus scroll-displayed. FIG. 23A also shows how a carriage image 321 is displayed. In the embodiment, the lower image display panel 141 displays the appearance that the carriage image 321 replaces symbols with expanded WILD symbols 320 on a column-by-column basis. The expanded WILD symbols 320 correspond to WILD symbols in the invention of (2). A state in which the expanded WILD symbols 320 are displayed corresponds to a specific game state in the invention of (2).

Figure 23B:
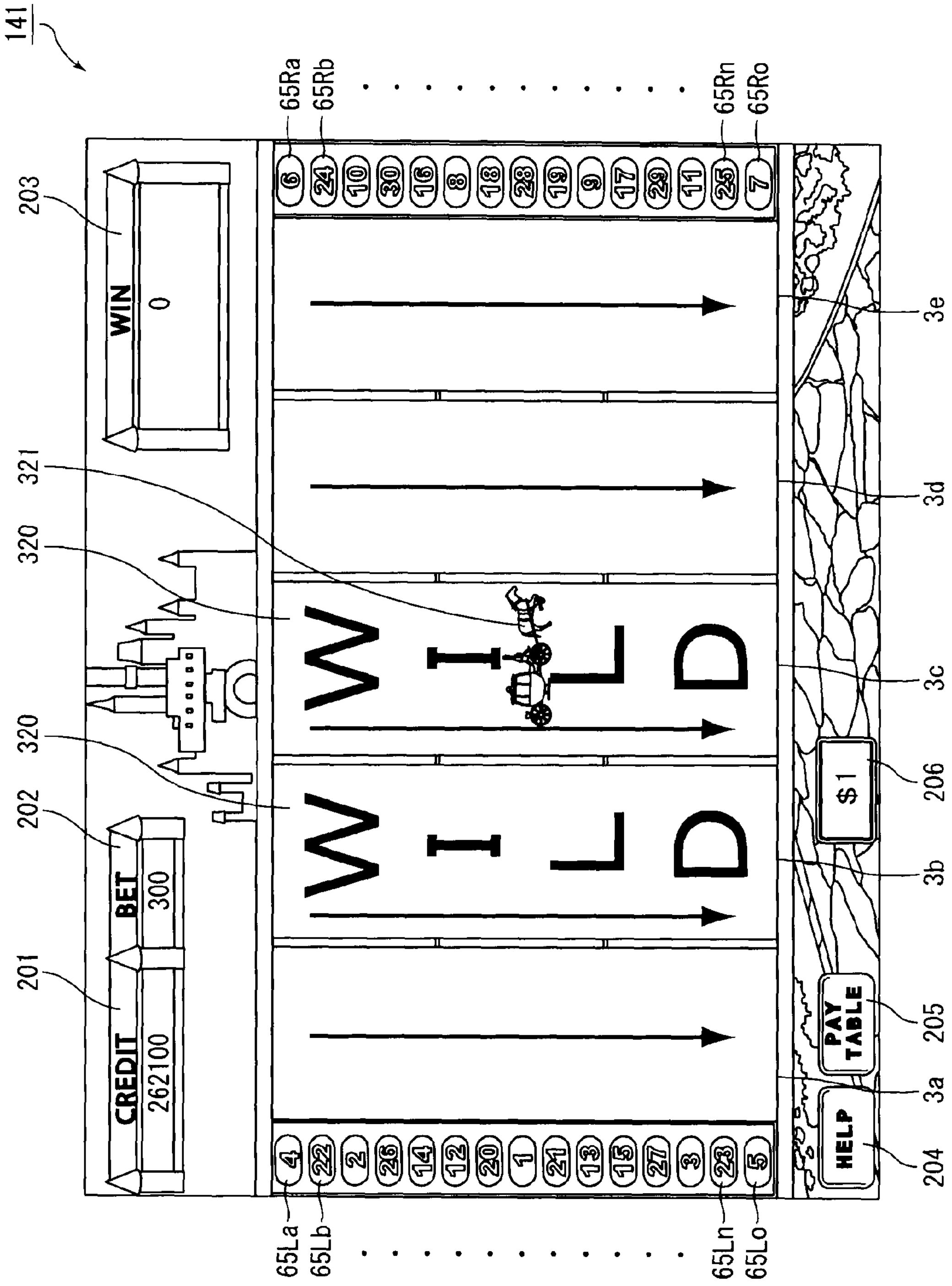
FIG. 23B shows an example of an image displayed on the lower image display panel of the gaming machine according to the second embodiment of the present invention.

FIG. 23B shows an example of an image displayed on the lower image display panel 141. FIG. 23B shows how expanded WILD symbols 320 are scroll-displayed in a second video reel 3*b* and the third video reel 3*c*. As shown in FIG. 23B, in the embodiment, the lower image display panel 141 displays an image displaying a view showing how an carriage image 321 replaces symbols with expanded WILD symbols 320. In the embodiment, the scroll-displayed symbols are thus replaced with the expanded WILD symbols 320 on a column-by-column basis.

Figure 23C:
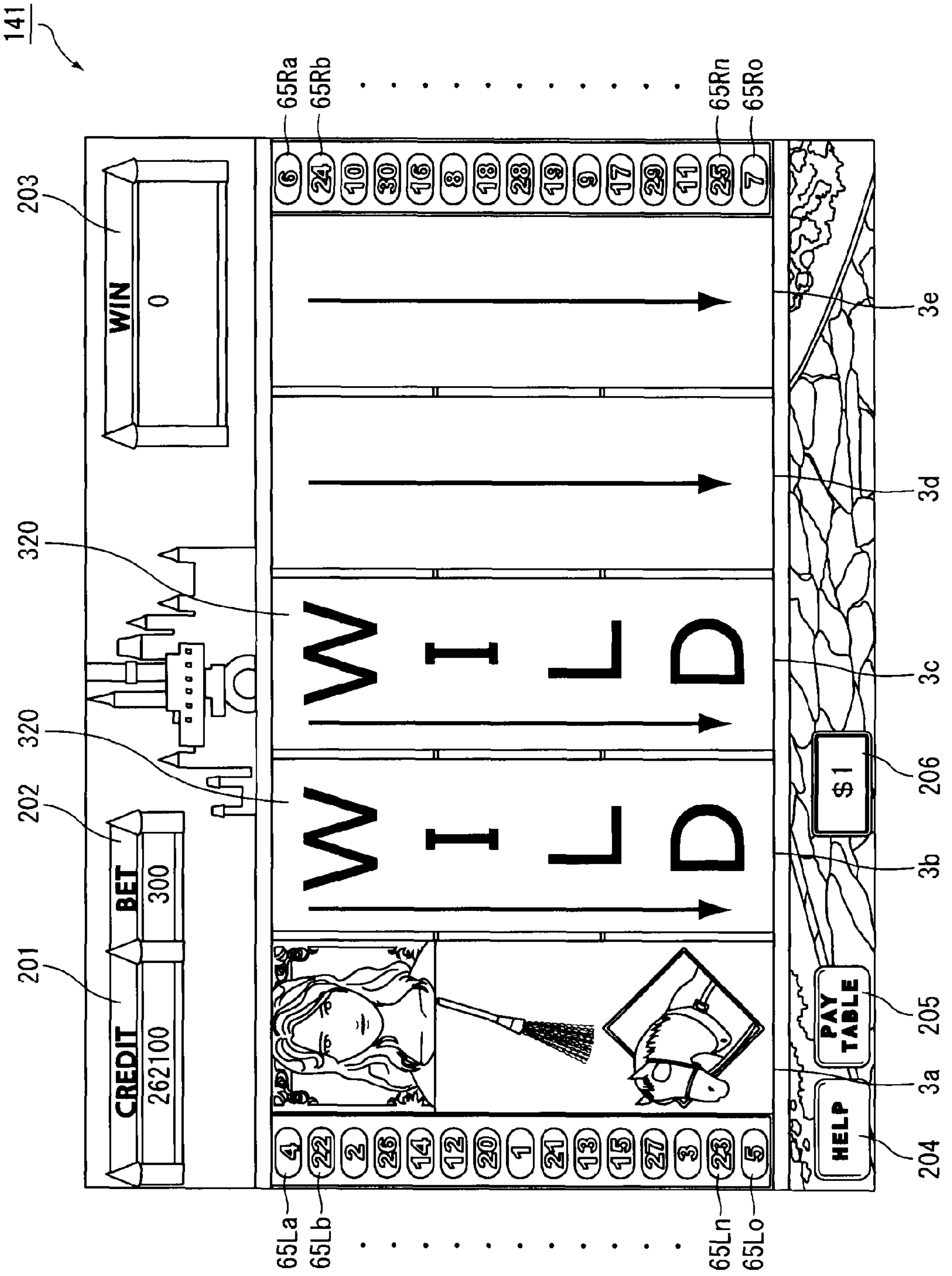
FIG. 23C shows an example of an image displayed on the lower image display panel of the gaming machine according to the second embodiment of the present invention.

FIG. 23C is a view of an image displayed on the lower image display panel 141. FIG. 23C shows how symbols are stop-displayed in the first video reel 3*a*. In the embodiment, scroll-displayed symbols are stop-displayed on a column-by-column basis.

Figure 23D:
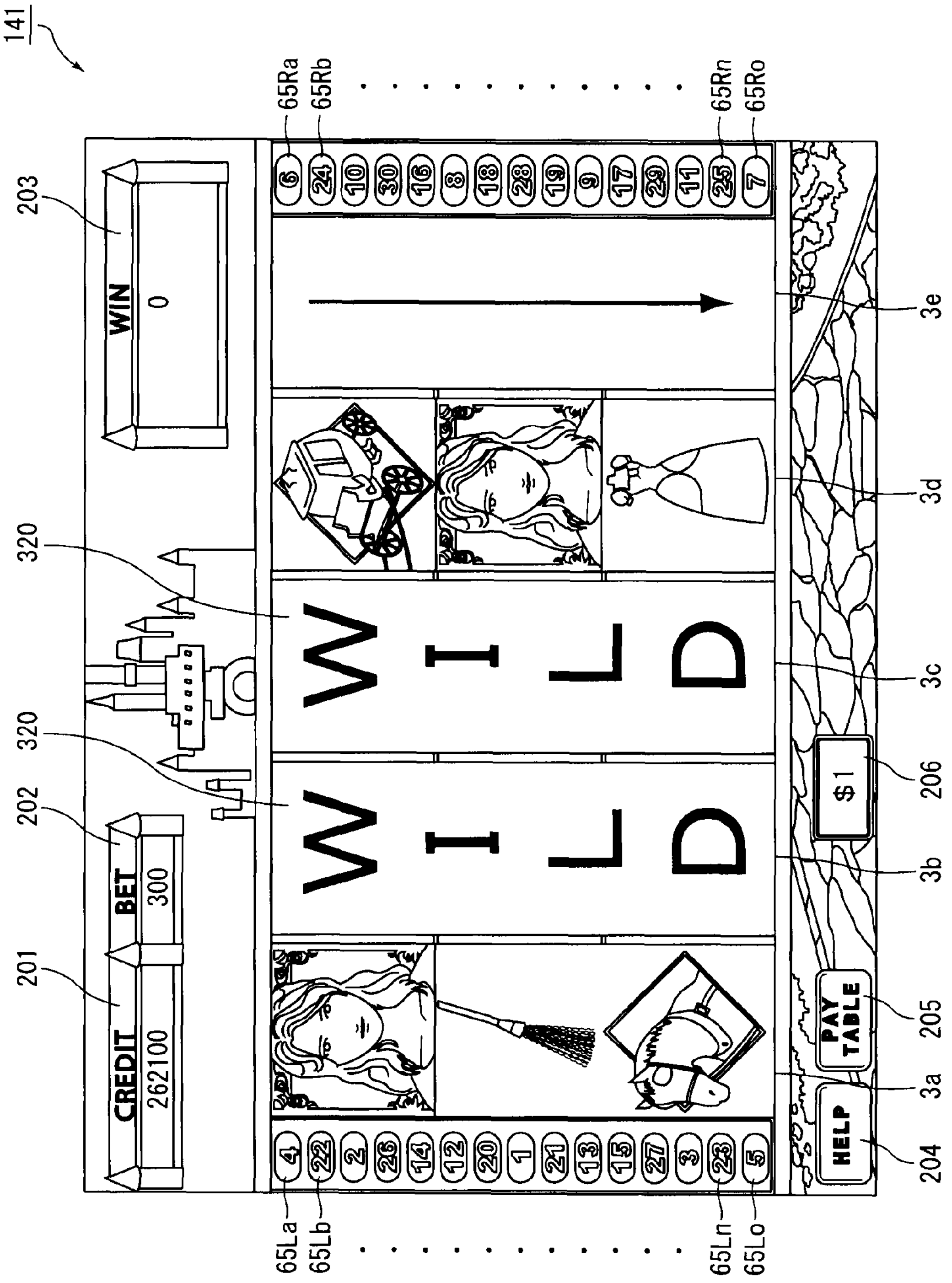
FIG. 23D shows an example of an image displayed on the lower image display panel of the gaming machine according to the second embodiment of the present invention.

FIG. 23D is a view of an image displayed on the lower image display panel 141. FIG. 23D shows how symbols are stop-displayed in the first video reel 3*a* and the fourth video reel 3*d*. FIG. 23D is also a view showing how expanded WILD symbols 320 are stop-displayed in the second video reel 3*b* and the third video reel 3*c*.

Figure 23E:
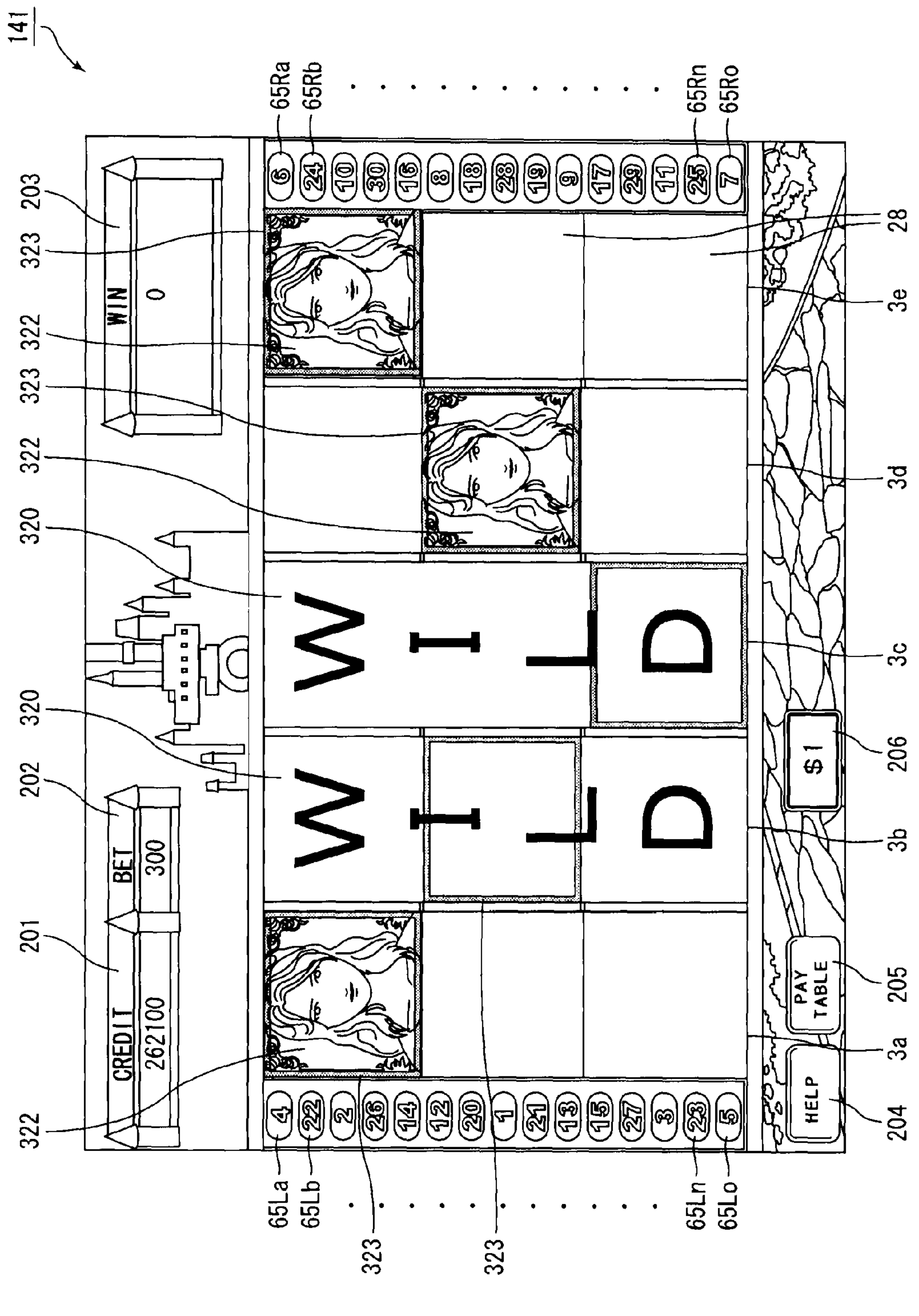
FIG. 23E shows an example of an image displayed on the lower image display panel of the gaming machine according to the second embodiment of the present invention.

FIG. 23E shows how symbols are stop-displayed in the fifth video reel 3*e*, subsequent to the view shown in FIG. 23D. As shown in FIG. 23E, winning prize frame images 323 are displayed around the symbols corresponding to an upper stage of the first video reel 3*a*, a middle stage of the second video reel 3*b*, a lower stage of the third video reel 3*c*, a middle stage of the fourth video reel 3*d*, and an upper stage of the fifth video reel 3*e*, respectively. In the embodiment, a winning prize is established on condition that Cinderella symbols 322 are stop-displayed at predetermined positions (for example, the positions corresponding to a payline). At this time, winning prize frame images 323 are displayed around symbols (Cinderella symbols 322 and expanded WILD symbols 320) forming the establishment of a winning prize, respectively (see FIG. 23E).

In the embodiment, the scroll-displayed symbols are thus replaced with expanded WILD symbols 320 on a column-by-column basis. A winning prize is then determined based on the expanded WILD symbols 320 replaced with.

Hereinabove, the outline of the second embodiment has been described with reference to FIG. 23A to FIG. 23E.

Figure 24:
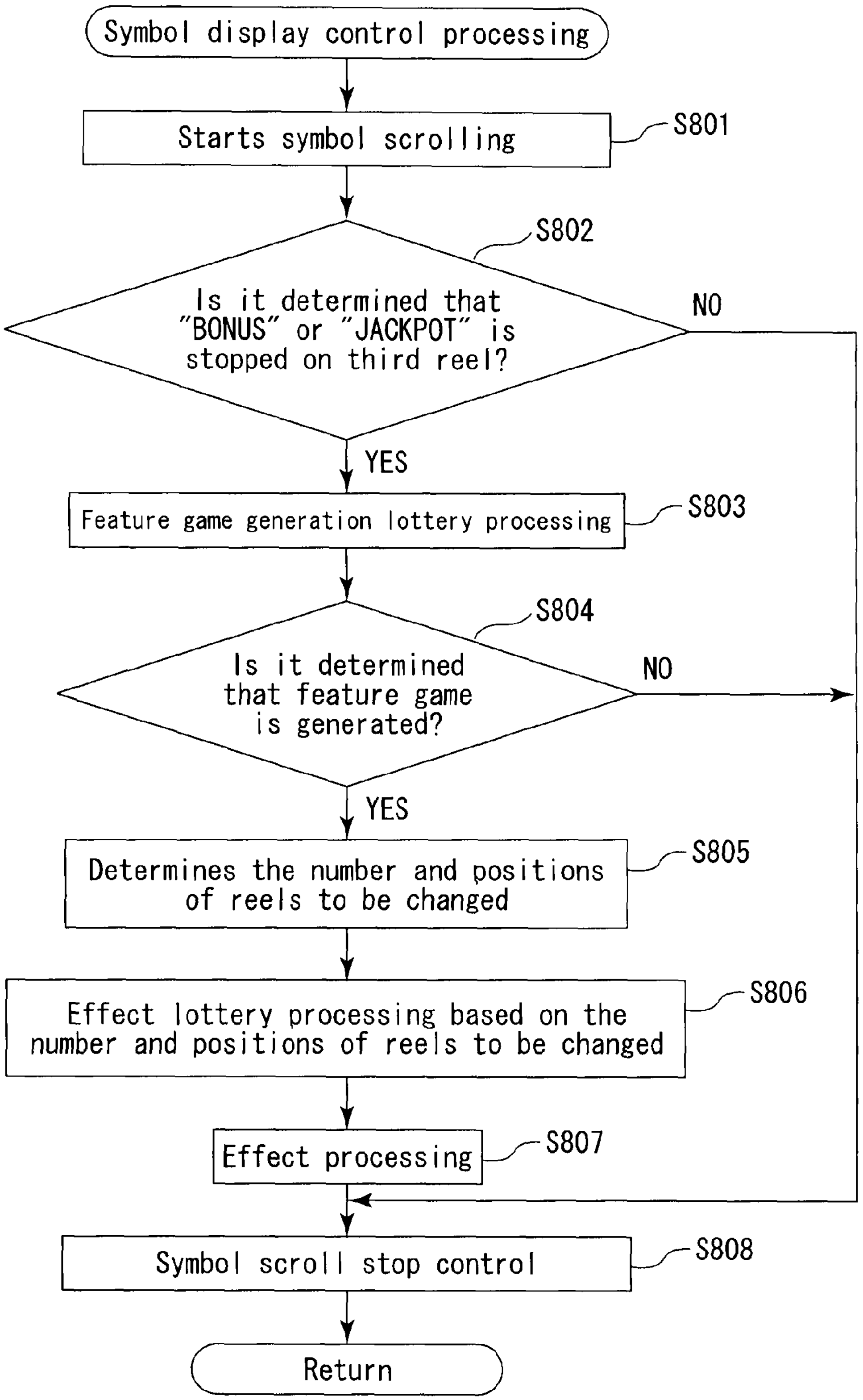
FIG. 24 is a view showing a flowchart of symbol display control processing conducted by the gaming machine according to the second embodiment of the present invention.

Next, with reference to FIG. 24, symbol display control processing will be described. FIG. 24 is a view showing a flowchart of symbol display control processing (see step S17 of FIG. 6) conducted by a gaming machine according to the second embodiment of the present invention.

First, the main CPU 71 executes processing of step S801. The processing of these steps is identical to that of step S131 described with reference to FIG. 10. Thus, a duplicate description of these steps is omitted here.

Next, the main CPU 71 determines whether or not, among to-be-stopped symbols indicated by the to-be-stopped symbol data (see step S113 of FIG. 9) stored in the symbol storage area provided in the RAM 73, the to-be-stopped symbol corresponding to the third video reel 3*c* is a "BONUS" symbol or a "JACKPOT" symbol (step S802). In a case where the to-be-stopped symbol corresponding to the third video reel 3*c* is the "BONUS symbol" or "JACKPOT" symbol, the main CPU 71 causes the routine to revert to step S808. In a case where the to-be-stopped symbol corresponding to the third video reel 3*c* is not the "BONUS symbol" or "JACKPOT" symbol, the main CPU 71 causes the routine to revert to step S803. (Note: Answers "Yes" and "No" are Reversed in Step S802 of FIG. 24.)

Figure 9:
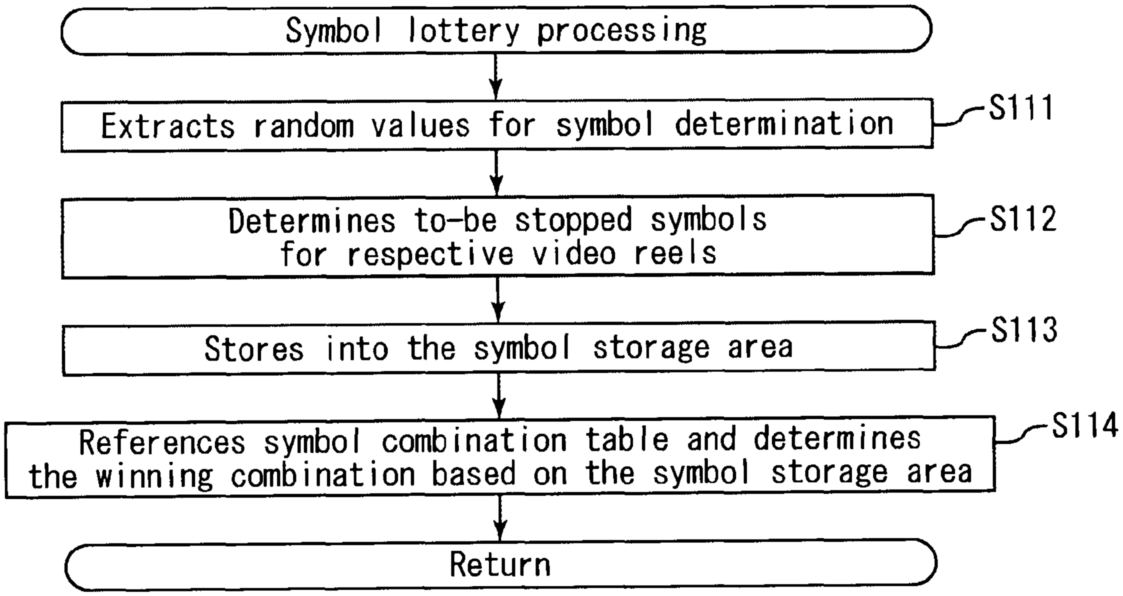
FIG. 9 is a view showing a flowchart of symbol lottery processing of a gaming machine according to an embodiment of the present invention.

In the embodiment, in a case where it is determined that a "BONUS" symbol or a "JACKPOT" symbol is stop-displayed at a predetermined position (for example, the position corresponding to a payline) (see step S112 of FIG. 9), it is determined that a winning combination is a jackpot (see step S114 of FIG. 9). The to-be-stopped symbols correspond to the symbols determined in the invention of (2). The third video reel 3*c* corresponds to a predetermined display region in the invention of (2) and a predetermined symbol array display region in the invention of (2). The "BONUS" symbol and "JACKPOT" symbol correspond to predetermined symbols in the invention of (2). Payout processing (step S23 of FIG. 6), which is executed in response to the fact that it is determined that a "BONUS" symbol or a "JACKPOT" symbol is stop-displayed at a predetermined position (for example, the position corresponding to a payline) (see step S112 of FIG. 9), corresponds to processing (F) in the invention of (2).

In step S803, the main CPU 71 executes feature game generation lottery processing. The feature game generation lottery processing corresponds to step (C) in the invention of (2).

Next, the main CPU 71 determines whether or not a player wins a feature game generation lottery executed in accordance with step S803 (step S804). In a case where the main CPU 71 determines that the player fails to win the feature game generation lottery executed in accordance with step S803, the main CPU 71 causes the routine to revert to step S808. In a case where the main CPU 71 determines that the player wins the feature game generation lottery executed in accordance with step S803, the main CPU 71 causes the routine to revert to step S805.

In step S805, the main CPU 71 determines the number of reels and the positions of the reels, based on a variable reel lottery table (see FIG. 25). With reference to FIG. 25, the processing of step S805 will be described. FIG. 25 is a view for explaining a variable reel lottery table according to the embodiment. In step S805, random values are extracted from the range of 1 to 1951. The number and positions of video reels are determined based on the extracted random values and the variable reel lottery table (see FIG. 25). For example, the number of video reels (=4) and the positions of the video reels (=the positions of the second video reel 3*b* to the fifth video reel 3*e*) are determined at a probability of 5/1,951 (see combined numbers 2 shown in FIG. 25). Based on the positions of the video reels, determined in accordance with the above processing, the main CPU 71 updates symbol data (the data indicating a data table showing a correlation between the video reels 3 and the symbol arrays, respectively). That is, symbol data is updated so that expanded WILD symbols 320 are displayed at the positions of the video reels, determined in accordance with the above processing (for example, the positions of the second video reel 3*b* to the fifth video reel 3*e*). Further, the to-be-stopped symbol data stored in the symbol storage area provided in the RAM 73 (see step S112 to step S113 of FIG. 9) is updated so that expanded WILD symbols 320 are stop-displayed at the positions of the video reels, determined in accordance with the above processing (for example, the positions of the second video reel 3*b* to the fifth video reel 3*e*). Furthermore, the main CPU 71 determines whether or not a winning prize is established, based on the updated to-be-stopped symbol data and data indicating a symbol combination table.

Next, the main CPU 71 executes effect lottery processing (step S806). In the processing, one effect is determined from among a plurality of effects, based on the number of reels, determined in accordance with step S805. That is, in the embodiment, in a case where the number of reels, determined in accordance with step S805, is less than 3, one effect is determined based on: an effect lottery table 1 in which each of two effects (a first effect and a second effect) is associated with a predetermined numeric range and; the extracted random values. In a case where the number of reels, determined in accordance with step S805, is 3 or more, one effect is determined based on: an effect lottery table 1 in which each of three effects (a first effect, a second effect, and a premium effect) is associated with a predetermined numeric range; and the extracted random values. The ROM 72 stores the data indicating the effect table 1 and the data indicating the effect table 2.

Next, the main CPU 71 executes processing of causing the lower image display panel 141 to display an effect image corresponding to the effect determined in accordance with step S806 (step S807). In the processing, the lower image display panel 141 displays an image indicating a view showing how a carriage image 321 replaces symbols with expanded WILD symbols 320 on a column-by-column basis (see FIG. 23B). In a case where it is determined that one effect is a first effect in step S806, it is displayed that a carriage image 321 appears from the first reel 3*a* side and that the carriage image 321 replaces symbols with expanded WILD symbols 320. In a case where it is determined that one effect is a second effect in step S806, it is displayed that a carriage image 321 appears from the fifth reel 3*e* side and that the carriage image 321 replaces symbols with expanded WILD symbols 320. In a case where it is determined that one effect is a premium effect in step S806, it is displayed that a plenty of carriage images 321 appear from the first reel 3*a* side and that the carriage images 321 replaces symbols with expanded WILD symbols 320. The first effect, the second effect, and the premium effect correspond to the effects in the invention of (2).

In step S808, the main CPU 71 stop-displays the symbol arrays scroll-displayed in the video reels 3, respectively, based on the to-be-stopped symbol data stored in the symbol storage area provided in the RAM 73 (see step S112 to step S113 of FIG. 9) (step S808).

The main CPU 71 executes processing of controlling stop-display timing (hereinafter, referred to as timing control processing). In the embodiment, the ROM 72 stores a plurality of programs in which timing of stopping each of the video reels 3 is predetermined (hereinafter, referred to as stop-timing programs). Hereinafter, the stop-timing programs according to the embodiment will be described. In the embodiment, in the stop-timing programs used during normal game(s), each video reel is programmed to be stop-displayed at predetermined intervals. However, in a case where the main CPU 71 determines that the position of the reel, determined in step S805, is the fourth video reel 3*d*, the main CPU 71 determines a stop-timing program in which the fifth video reel 3*e* is programmed to be stopped with predetermined timing for the fourth video reel 3*d*. In this manner, video reels 3 (the first video reel 3*a*, the second video reel 3*b*, the third video reel 3*c*, and the fifth video reel 3*e*) which are not replaced with the expanded WILD symbols 320 are stop-displayed at predetermined intervals. That is, in timing control processing, the main CPU 71 executes the following subroutine. The main CPU 71 determines one stop-timing program, based on the reel combination determined in accordance with step S805, and stop-timing determination table data. The ROM 72 stores the data indicating a stop-timing determination table in which a respective one of the stop-timing programs and a reel combination are associated with each other. The main CPU 71 stop-displays the scroll-displayed symbol arrays, based on the stop-timing program.

In the processing of step S808, the main CPU 71 determines whether or not the stop-displayed arrayed symbols form a winning prize. The main CPU 71 determines whether or not a winning prize is established while an expanded WILD symbol 320 is substituted by another symbol (for example, Cinderella symbol 322). Afterwards, in the number-of-payouts determination processing (see step S18 of FIG. 6), the main CPU 71 determines the number of payouts which is based on a symbol combination displayed on a winning line. The payout processing (see step S23 of FIG. 23), which is executed in response to the number-of-payouts determination processing based on the expanded WILD symbols 320 (see step S18 of FIG. 6), corresponds to processing (E) in the invention of (2).

Hereinabove, the second embodiment has been described with reference to FIG. 23A to FIG. 25.

The embodiment described an example in which the predetermined display region in the invention of (2) and the predetermined symbol array display region in the invention of (2) are the third video reel 3*c*. However, the predetermined display region in the invention of (2) and the predetermined symbol array display region in the invention of (2) may be any of 15 display blocks 28 included in the symbol display region 4 or may be a plurality of display blocks 28 from among the 15 display blocks 28 included in the symbol display region 4.

The embodiment described an example in which processing (D) or step (D) in the invention of (2) is executed between the start of symbol scroll-display and the completion of stop-display of the scroll-displayed symbols. However, the processing (D) or step (D) in the invention of (2) is not limitative thereto. That is, the processing (D) or step (D) in the invention of (2) may be a constituent element to be executed after scroll-displayed symbols have been stop-displayed.

The embodiment described an example in which processing (D-1) in the invention of (2) is adapted to allow one or plural symbol arrays to be determined based on the variable reel lottery table (see FIG. 25). However, the processing (D-1) in the invention of (2) is not limitative thereto. For example, the processing (D-1) in the invention of (2) may be configured as follows. That is, in step S805 of FIG. 24, the main CPU 71 determines one numeral from the range of 1 to 5. The main CPU 71 then extracts random values by the determined number (total number of symbols to be varied). The main CPU 71 then determines one or plural symbol arrays, based on the extracted random values and a table in which a predetermined numeric range and a respective one of the five symbol arrays are associated with each other.

Third Embodiment

A third embodiment describes the invention of (3). In the following description, like constituent elements of the gaming machine 1 according to the foregoing embodiments are designated by like reference numerals and are explained. A duplicate description is omitted with respect to a case where the above descriptive matters in the embodiments apply for the third embodiment.

As in the first embodiment, in the third embodiment as well, in a case where a bonus game trigger is established, a predetermined bonus (credit payment, free game, or 29-option game) is awarded. In the third embodiment, in a case where the number of BETs in a normal game in which a bonus game trigger is established is a specific upper limit (a maximum number of BETs), a benefit is further additionally awarded in addition to the one to be awarded in a case where the number of BETs is less than the maximum number of BETs. Hereinafter, an activity of betting coins of the maximum number of BETs is referred to as "MAXBET".

First, with reference to FIG. 26, an outline of free game(s) in the third embodiment will be described. FIG. 26A to FIG. 26C are views each showing an example of an image displayed on a lower image display panel included in a gaming machine according to the third embodiment of the present invention.

Figure 26A:
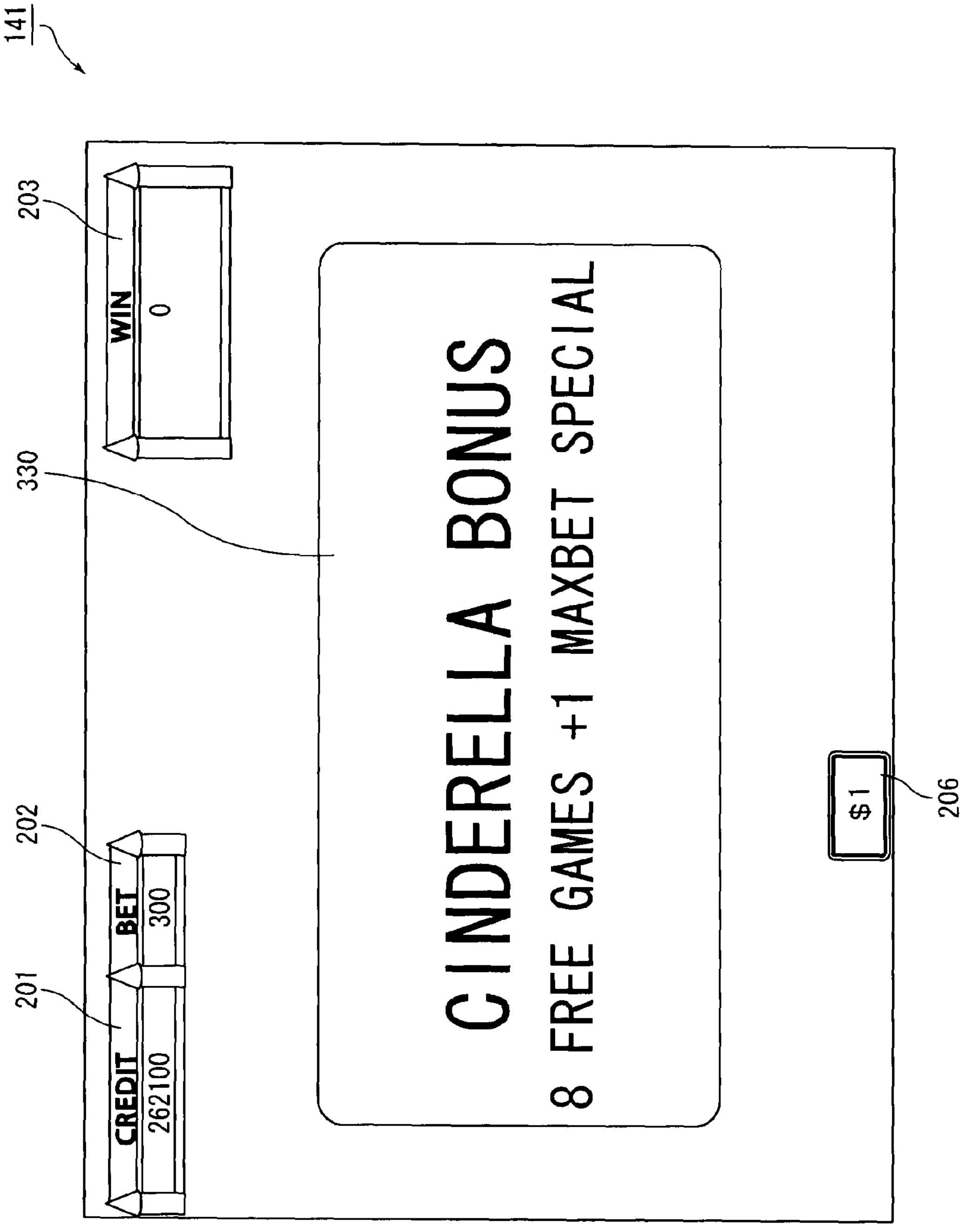
FIG. 26A is a view showing an example of an image displayed on a lower image display panel included in a gaming machine according to a third embodiment of the present invention.

FIG. 26A shows an example of an image displayed on the lower image display panel 141 when a free game takes place. FIG. 26A also shows how a character image 330 "CINDERELLA BONUS 8 FREE GAMES+1 MAXBET SPECIAL" is displayed. The character image 330 notifies a player that the number of free games having taken place is one more than a predetermined number (8). The one more free game is a bonus which may be obtained where coins of the maximum number of BETs are betted in a normal game in which a bonus game trigger is established.

Figure 26B:
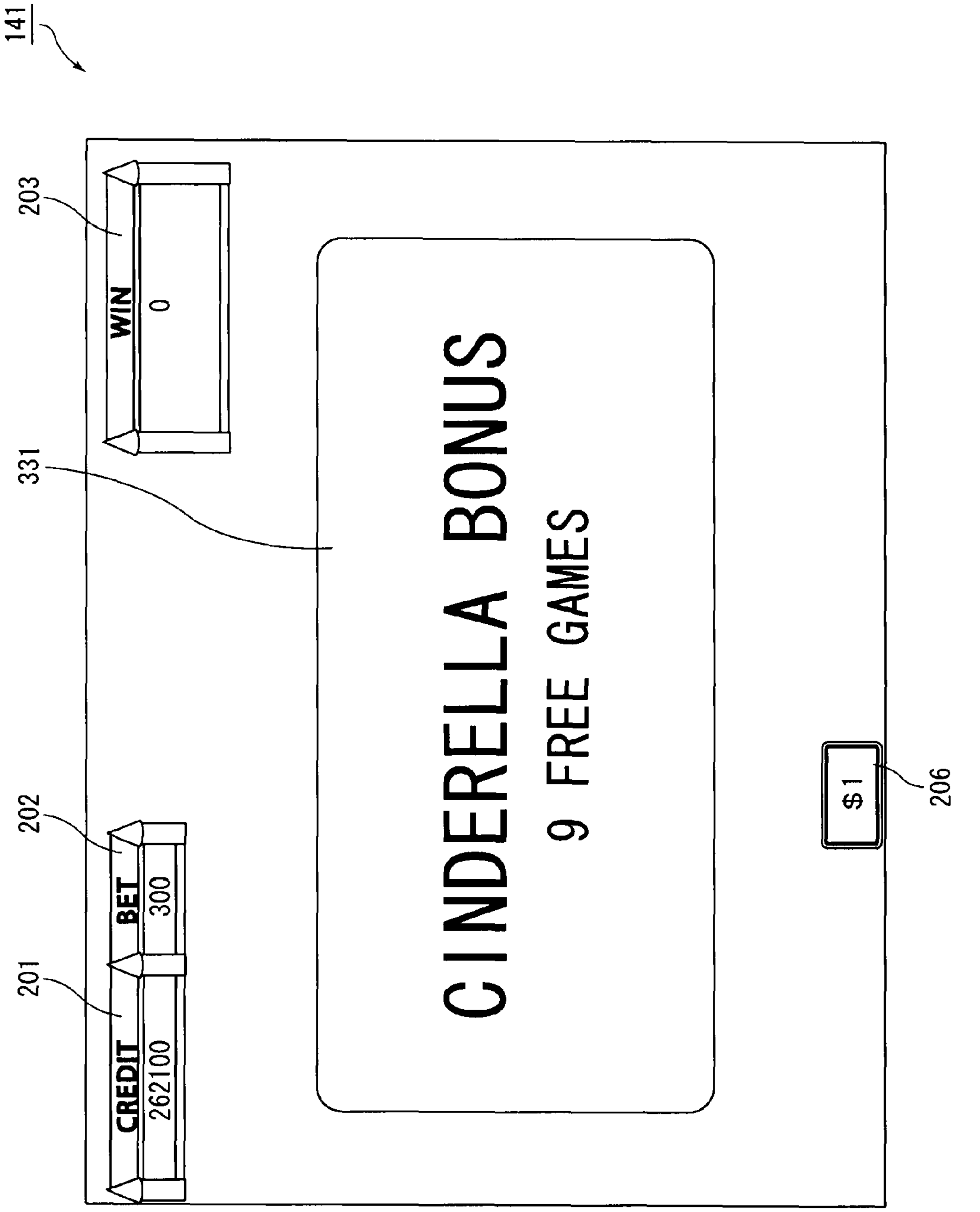
FIG. 26B is a view showing an example of an image displayed on the lower image display panel included in the gaming machine according to the third embodiment of the present invention.

Afterwards, as shown in FIG. 26B, a character image 331 "CINDERELLA BONUS 9 FREE GAMES" is displayed. The character image 331 notifies a player that a total of 9 free games are executed.

Figure 26C:
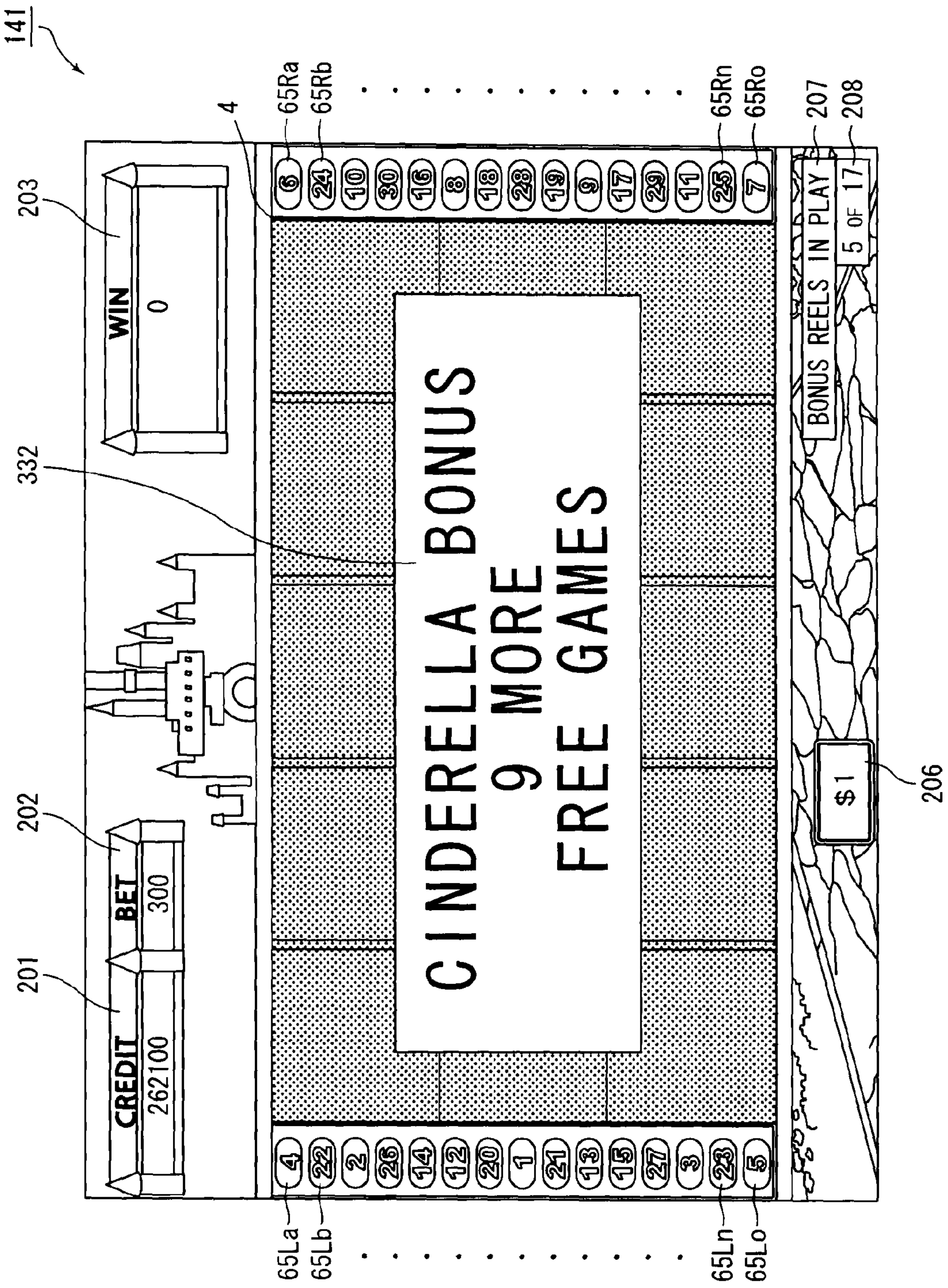
FIG. 26C is a view showing an example of an image displayed on the lower image display panel included in the gaming machine according to the third embodiment of the present invention.

FIG. 26C shows an example of an image displayed when a retrigger is established. In a case where the number of BETs in a normal game in which a bonus game trigger is established is less than a maximum number of BETs, when a retrigger is established in a free game, 8 free games are added. In a case where the number of BETs is the maximum number of BETs, when a retrigger is established in a free game, 9 free games are added. FIG. 26C shows how a character image 332 "CINDERELLA BONUS 9 MORE FREE GAMES" is displayed. The character image 332 notifies a player that 9 free games are added by the fact that a retrigger is established.

Figure 27:
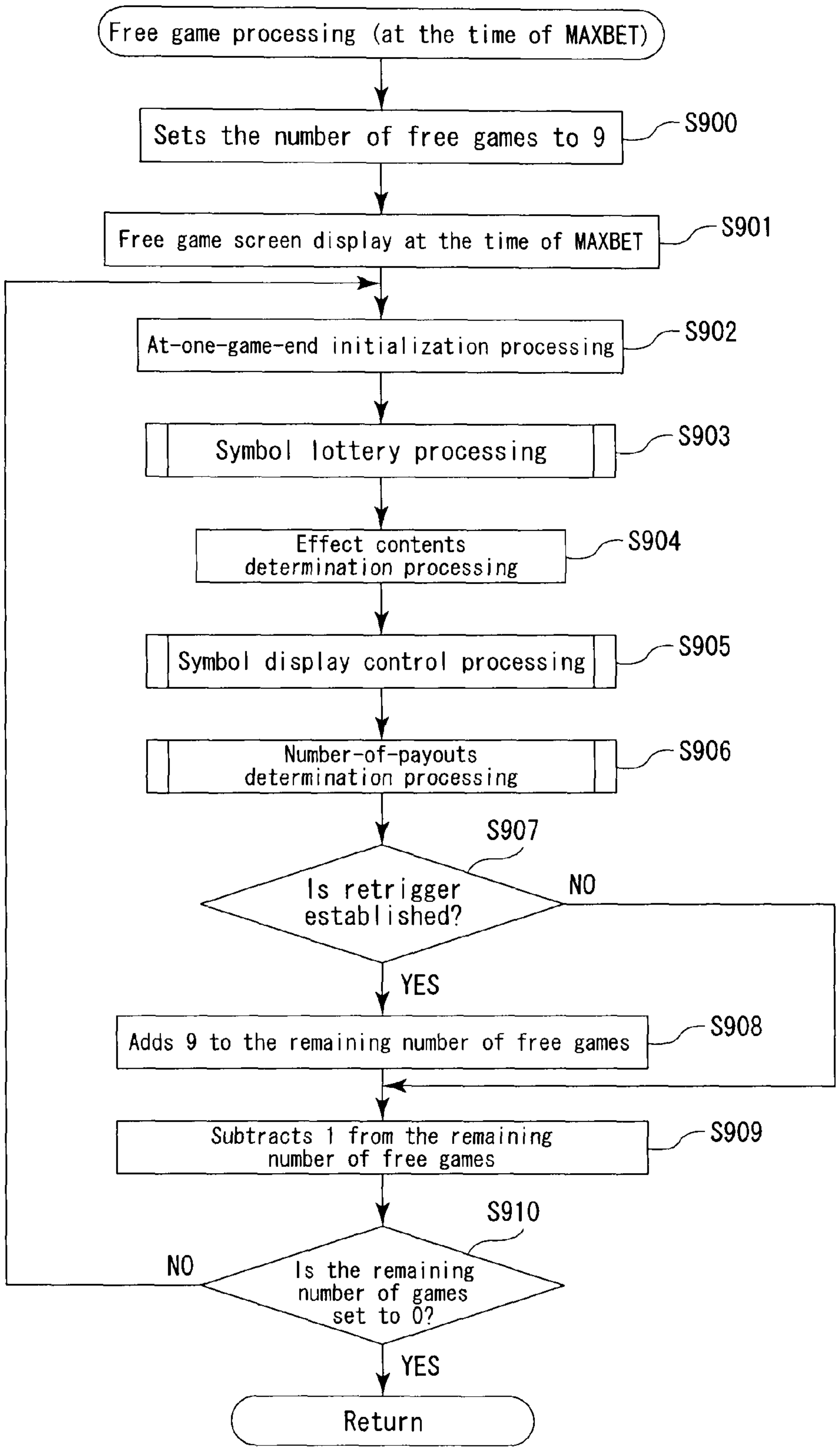
FIG. 27 is a view showing a flowchart of free game processing (at the time of MAXBET) conducted by the gaming machine according to the third embodiment of the present invention.

Hereinabove, the outline of the free game in the third embodiment has been described with reference to FIG. 26. Next, with reference to FIG. 27, free game processing (at the time of MAXBET) will be described. FIG. 27 is a view showing a flowchart of the free game processing (at the time of MAXBET) conducted by the gaming machine according to the third embodiment of the present invention.

First, the main CPU 71 sets the number of free games to 9, and stores data indicating the set number of free games in a number-of-free-games storage area provided in the RAM 73 (step S900). The number of free games is set to 8 at a time other than at the time of MAXBET (see step S300 of FIG. 14).

Next, the main CPU 71 causes the lower image display panel 141 to display a free game screen at the time of MAXBET (step S901). In the processing, the main CPU 71 causes the lower image display panel 141 to display a character image 330 (see FIG. 26A).

The main CPU 71 then executes the processing of step S902 to step S907. The processing of these steps is similar to that of step S302 to step S307 described with reference to FIG. 14. Thus, a duplicate description of these steps is omitted here.

When the main CPU 71 determines that a retrigger is established in step S907, the main CPU 71 adds 9 to the remaining number of free games stored in the RAM 73 (step S908).

When determining that a retrigger is not established in step S907 or after executing step S908, the main CPU 71 executes the processing of step S909 to step 910. The processing of these steps is similar to that of step S309 to step S310 described with reference to FIG. 14. Thus, a duplicate description of these steps is omitted here. The abovementioned free game processing (at the time of MAXBET) corresponds to "processing of awarding a benefit greater than a predetermined bonus" in the invention of (3) and corresponds to "processing of executing more free games than a predetermined number of free games."

Hereinabove, the free game in the third embodiment has been described with reference to FIG. 26 and FIG. 27.

Figure 28:
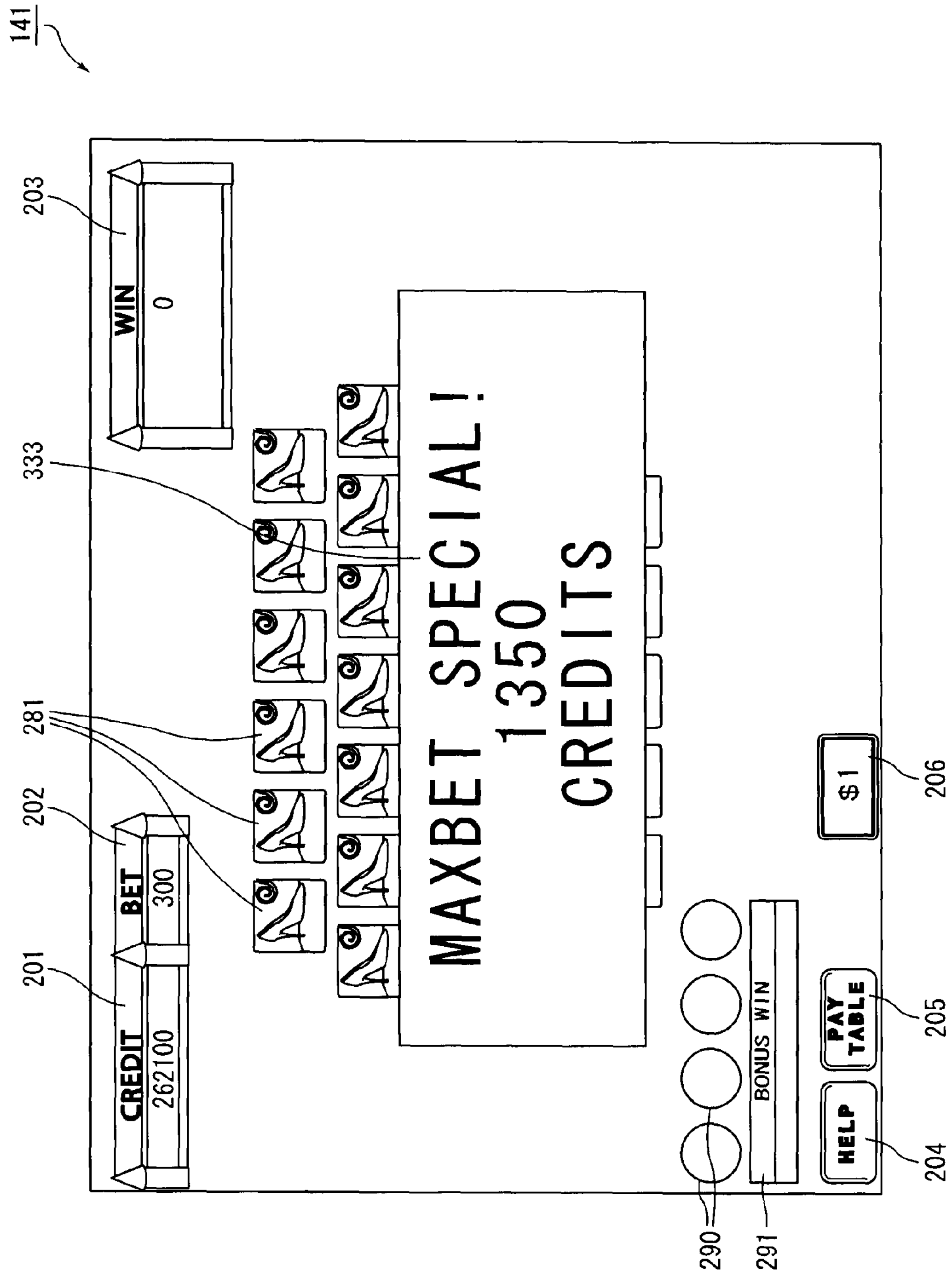
FIG. 28 is a view showing an example of an image displayed on the lower image display panel included in the gaming machine according to the third embodiment of the present invention.

Next, with reference to FIG. 28, an outline of a 29-option game in the third embodiment will be described. FIG. 28 is a view showing an example of an image displayed on the lower image display panel included in the gaming machine according to the third embodiment of the present invention.

In the third embodiment, when a 29-option game takes place, in a case where the number of BETs in a normal game serving as a trigger for the generation of the 29-option game is a maximum number of BETs, coins whose number corresponding to 2 to 20 times of a total number of BETs are paid out to a player before the 29-option game is executed. A total number of BETs means a total number of coins betted by a player, until a bonus game trigger is established.

FIG. 28 shows how a character image 333 "MAXBET SPECIAL! 1350 CREDITS" is displayed. The character image 333 notifies a player that coins corresponding to 1,350 credits are determined to be paid out.

Hereinabove, the outline of the 29-option game in the third embodiment has been described with reference to FIG. 28. Next, with reference to FIG. 29, 29-option game processing (at the time of MAXBET) will be described. FIG. 29 is a view showing a flowchart of the 29-option game processing (at the time of MAXBET) conducted by the gaming machine according to the third embodiment of the present invention.

First, the main CPU 71 determines the number of credits paid out as a bonus due to MAXBET (step S1001). In the processing, the main CPU 71 extracts one random number. Further, based on the extracted random number and a magnification determination table (not shown), any one magnification is determined from among four different magnifications of ×2, ×5, ×10, and ×20. Then, a value obtained by multiplying the determined magnification for the number of credits corresponding to a total number of BETs stored in the RAM 73 is determined at the number of credits paid out as a bonus due to MAXBET.

Next, the main CPU 71 displays a screen of a 29-option game at the time of MAXBET (step S1001). In the processing, the main CPU 71 displays a character image 333 notifying to a player that credits whose number is determined in step S1001 are paid out as a bonus due to MAXBET in the 29-option game processing (see FIG. 28).

The main CPU 71 then adds the determined number of credits to a stake of 29-option bonus (step S1002). In the processing, the main CPU 71 adds the value indicating the determined number of credits in step S1001 to the value indicating the stake of the 29-option bonus stored in the RAM 73. The value after added is then displayed in a BONUS WIN meter image 291 indicating the number of credits acquired in a 29-option game.

The main CPU 71 then executes the processing of step S1004 to step S1015. The processing of these steps is similar to that of step S401 to step S412. Thus, a duplicate description of these steps is omitted here. The 29-option game processing (at the time of MAXBET) corresponds to "processing of awarding a benefit greater than a predetermined bonus" in the invention of (3) and corresponds to "processing of awarding more gaming media than those awarded in accordance with processing (C)" in the invention of (3).

Hereinabove, the third embodiment has been described with reference to FIG. 26 to FIG. 29.

According to the third embodiment of the present invention, a free game executed by a bonus trigger established in a MAXBET-placed normal game is treated more preferentially, in terms of the number of times of free game execution and the number of times of free game execution to be added at the time of establishment of retrigger, than a free game which is not so executed. However, in the present invention, preferential treatment to the free game executed by the bonus trigger established in the MAXBET-placed normal game is not limitative thereto. For example, such preferential treatment may be that more payment can be readily obtained, since the free game executed by the bonus trigger established in the MAXBET-placed normal game has more WILD symbols than the one which is not so executed. According to the third embodiment of the present invention, in a 29-option game executed by the bonus trigger established in the MAXBET-placed normal game, more preferential treatment is given in that there is payout of a payment which does not exist in a 29-option game which is not so executed. In the present invention, however, preferential treatment to the 29-option game executed by the bonus trigger established in the MAXBET-placed normal game is not limitative thereto. For example, the 29-option game executed by the bonus trigger established in the MAXBET-placed normal game may have more touch symbols 281 associated with a large amount of payment than in the 29-option game which is not so executed.

According to the third embodiment of the present invention, in a case where the amount of gaming media betted in a normal game in which a predetermined condition is established is a maximum BET amount, a player can acquire more gaming media than in a case where the amount of the gaming media betted in the normal game is less than a maximum BET amount. Therefore, pleasure can be imparted to a player having betted gaming media of the maximum BET amount in the normal game in which the predetermined condition is established. In addition, it is possible to prompt a player to bet gaming media of the maximum BET amount. Further, in order to acquire more gaming media, the gaming media of the maximum BET amount needs to be betted in the normal game in which the predetermined condition is established. Even if the gaming media of the maximum BET amount is betted in an earlier normal game, the fact is not considered. Therefore, it is possible to cause the player to continue betting of the gaming media of the maximum BET amount. In this manner, the profits in gaming facilities such as casinos can be increased.

According to the third embodiment of the present invention, in a case where the amount of gaming media betted in a normal game in which a predetermined condition is established is a maximum BET amount, more free games are executed than in a case where the amount of the gaming media betted in the normal game is less than a maximum BET amount. Further, when a predetermined condition is established in a free game as well, in a case where the amount of gaming media betted in the normal game serving as a trigger for the generation of the free game is the maximum BET amount, more free games are added than in a case where the amount of gaming media betted in the normal game is less than the maximum BET amount. Therefore, pleasure can be imparted to a player having betted gaming media of the maximum BET amount in the normal game in which the predetermined condition is established. In addition, it is possible to prompt a player to bet gaming media of the maximum BET amount. Further, in order to enjoy more free games, the gaming media of the maximum BET amount needs to be betted in the normal game in which the predetermined condition is established. Even if the gaming media of the maximum BET amount is betted in an earlier normal game, the fact is not considered. Therefore, it is possible to cause the player to continue betting of gaming media of the maximum BET amount. In this manner, the profits in gaming facilities such as casinos can be increased.

According to the third embodiment of the present invention, a bonus awarded to a player is displayed on an image in a free game and a 29-option game that have taken place at the time of betting of gaming media of the maximum BET amount (MAXBET) (character image 330, character image 332, and character image 333). In this manner, a player can be clearly aware of the fact a bonus based on MAXBET is awarded and can feel a sense of satisfaction or a sense of superiority relative to the fact that a bonus can be obtained. As a result, it becomes possible to stimulate the player's motivation to actively place a MAXBET. In this manner, the profits in gaming facilities such as casinos can be increased.

Fourth Embodiment

A fourth embodiment describes the invention of (4). In the following description, like constituent elements of the gaming machine 1 according to the above-described embodiments are designated by like reference numerals, and are explained. A duplicate description is omitted with respect to a case where the descriptive matters in the foregoing embodiment apply for the fourth embodiment as well.

First, with reference to FIG. 30A to FIG. 30D, an outline of the fourth embodiment will be described. FIG. 30A to FIG. 30D are views each showing an example of an image displayed on a lower image display panel included in a gaming machine according to the fourth embodiment of the present invention.

Figure 30A:
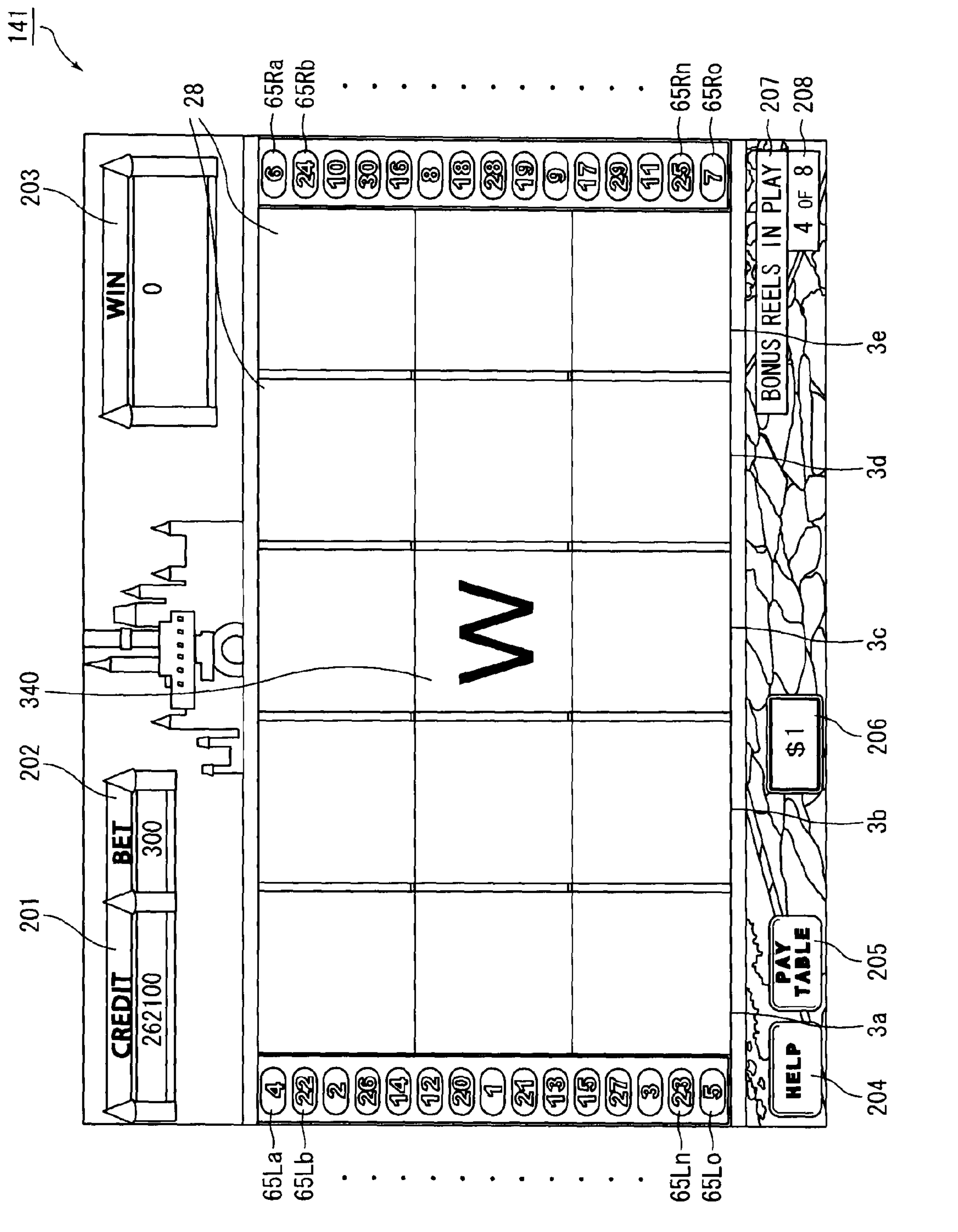
FIG. 30A is a view showing an example of an image displayed on a lower image display panel included in a gaming machine according to a fourth embodiment of the present invention.

FIG. 30A shows how a WILD handout symbol 340 is stop-displayed at a middle stage of a third video reel 3_c_. In the embodiment, WILD symbols 344 increases in the wake of the fact that the WILD handout symbol 340 is stop-displayed on the third video reel 3*c* in a free game. The WILD handout symbol 340 corresponds to a trigger symbol in the invention of (4). The third video reel 3*c* also corresponds to a predetermined display region in the invention of (4) and a predetermined symbol array display region in the invention of (4).

Figure 30B:
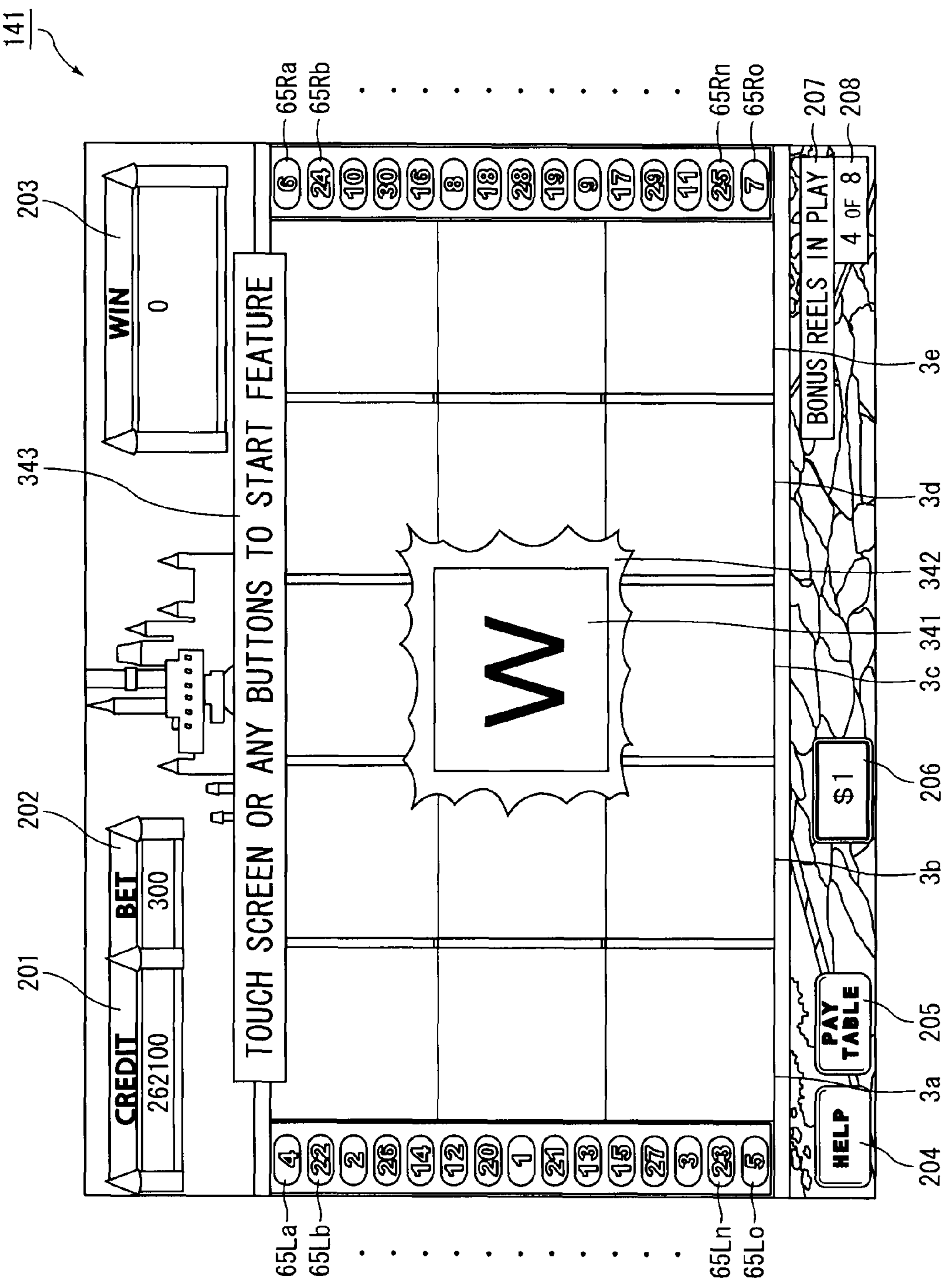
FIG. 30B is a view showing an example of an image displayed on the lower image display panel included in the gaming machine according to the fourth embodiment of the present invention.

FIG. 30B shows how a standby image is displayed on a lower image display panel 141. As shown in FIG. 30B, the standby image according to the embodiment displays a message image 343 representing a message "TOUCH SCREEN OR PRESS APPROPRIATE BUTTON IN ORDER TO START A FEATURE GAME." Further, as shown in FIG. 30B, the third video reel 3*c* displays a frame image 342 emphasizing that a WILD handout symbol 340 is stop-displayed.

Figure 30C:
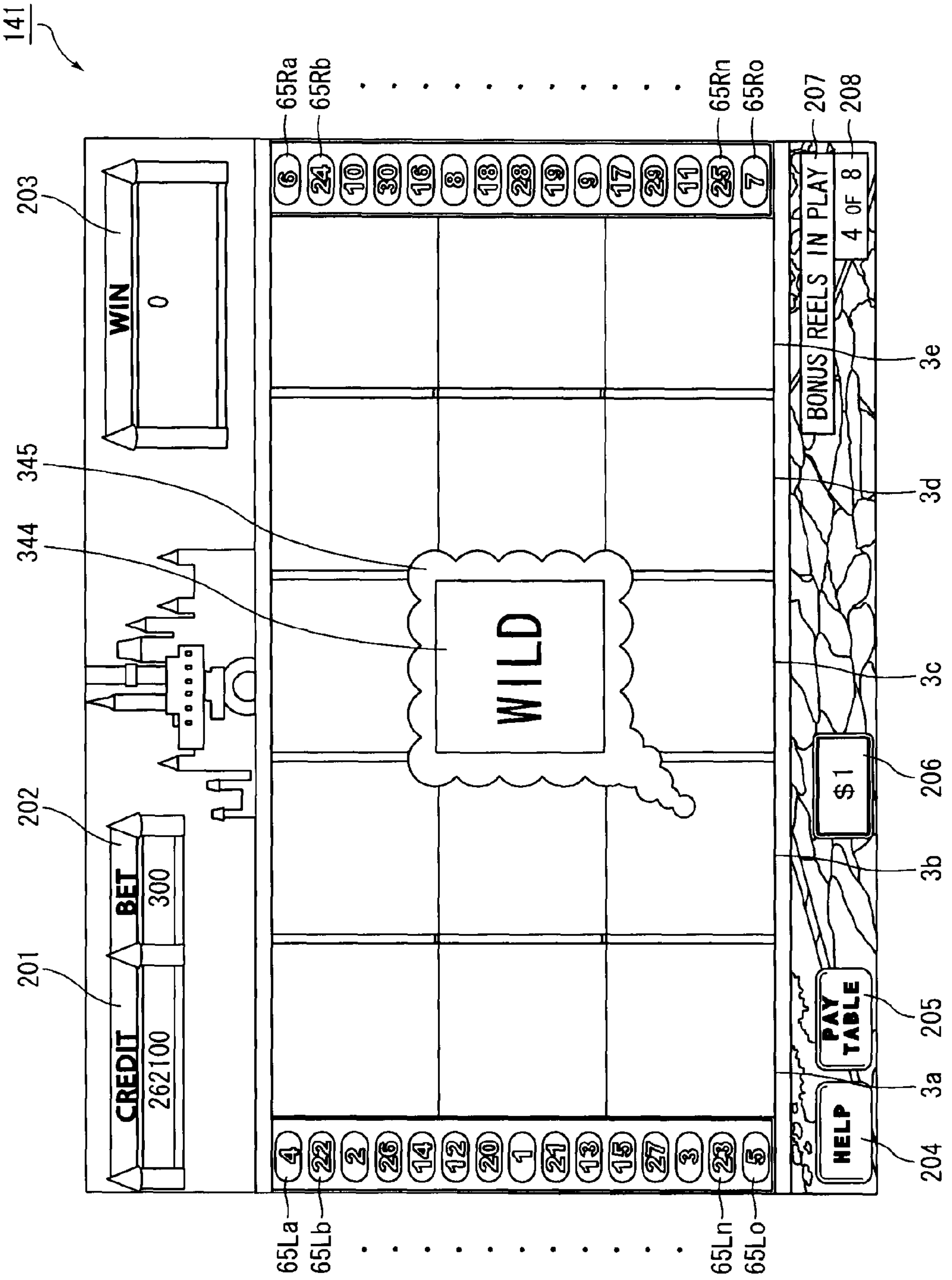
FIG. 30C is a view showing an example of an image displayed on the lower image display panel included in the gaming machine according to the fourth embodiment of the present invention.

FIG. 30C shows how a WILD symbol 344 is displayed at a middle stage of the third video reel 3*c*. In the embodiment, in a case where the image shown in FIG. 30B is displayed, the WILD handout symbol 340 stop-displayed on the third video reel 3*c* changes to a WILD symbol 344 in the wake of the fact that a player operates the lower image display panel 141 or any button (such as a BET button). A frame image 345 is displayed around the WILD symbol 344 displayed by the change of the WILD handout symbol 340.

Figure 30D:
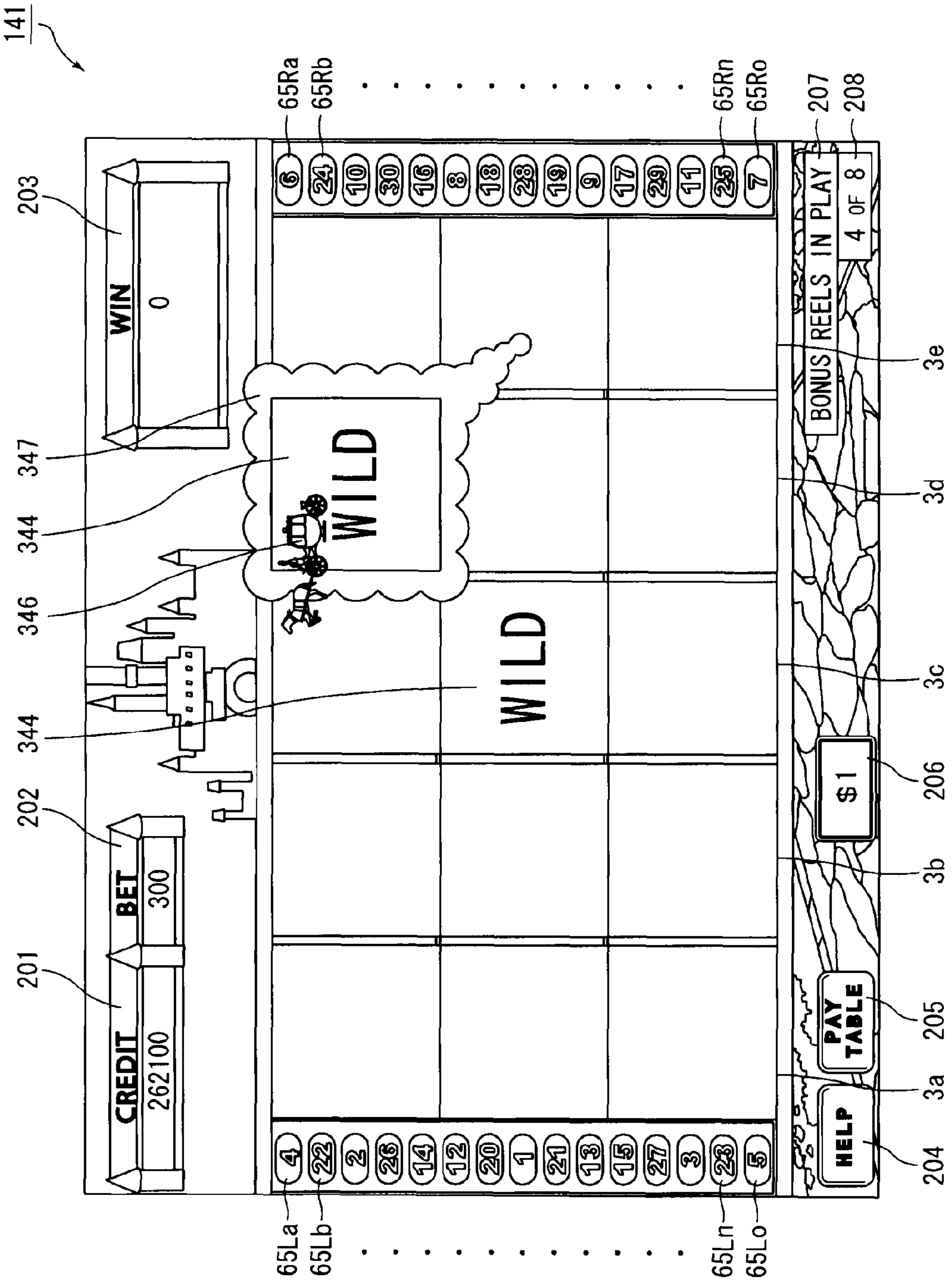
FIG. 30D is a view showing an example of an image displayed on the lower image display panel included in the gaming machine according to the fourth embodiment of the present invention.

FIG. 30D shows how the symbol displayed at an upper stage of a fourth video reel 3*e* changes to a WILD symbol 344. In the embodiment, the lower image display panel 141 displays an image showing how a carriage image 346 replaces a symbol with a WILD symbol 320. As just described, in the embodiment, the WILD handout symbol 340 stop-displayed in the third video reel 3*c* changes to a WILD symbol 344, and then, a symbol other than the WILD handout symbol 340 stop-displayed in the third video reel 3*c* changes to a WILD symbol 344. The "symbol other than the WILD handout symbol 340 stop-displayed in the third video reel 3*c*" corresponds to "a symbol other than the trigger symbol stop-displayed in a predetermined display region" in the invention of (4) and "a symbol other than the trigger symbol stop-displayed in a predetermined symbol array display region" in the invention of (4).

Hereinafter, the outline of the fourth embodiment has been described with reference to FIG. 30A to FIG. 30D.

<Free Game Processing>

Figure 31:
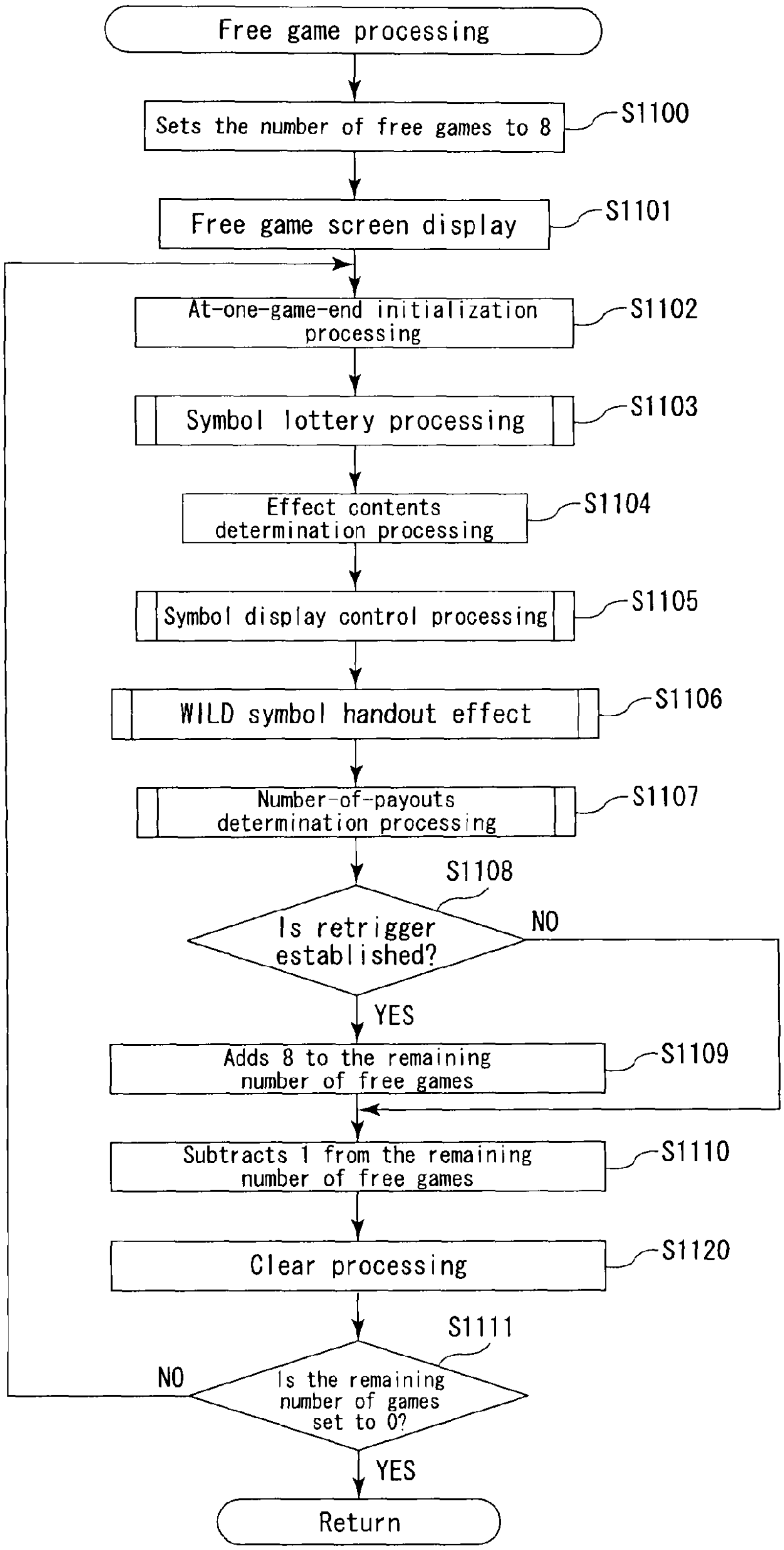
FIG. 31 is a view showing a flowchart of free game processing executed by the gaming machine according to the fourth embodiment of the present invention.

Next, with reference to FIG. 31, free game processing executed by the gaming machine according to the embodiment will be described. FIG. 31 is a view showing a flowchart of the free game processing executed by the gaming machine according to the fourth embodiment of the present invention (see step S211 of FIG. 12 and step S214 of the same figure). In the embodiment, as in the first embodiment, a free game can take place. That is, a free game can take place in the wake of the fact that three bonus symbols 250 (see FIG. 1B) stop in the symbol display region 4. The fact that three bonus symbols 250 (see FIG. 1B) stop corresponds a predetermined condition in the invention of (4).

The main CPU 71 first executes the processing of step S1100 to step S1105. The processing of these steps is identical to that of step S300 to step S305 described with reference to FIG. 14. Thus, a duplicate description of these steps is omitted here.

After executing the processing of step S1105, the main CPU 71 executes WILD symbol handout effect processing (step S1106). The WILD symbol handout effect processing will be described later with reference to FIG. 32.

Next, the main CPU 71 executes the processing of step S1107 to step S1110. The processing of these steps is identical to that of step S306 to step S309 described with reference to FIG. 14. Thus, a duplicate description of these steps is omitted here.

In step S1120, the main CPU 71 executes clear processing. In the processing, the main CPU 71 executes processing of displaying the symbol indicated by symbol data in place of the WILD symbol 320 displayed in accordance with step S1205 of FIG. 32. In this manner, the WILD symbol 320 displayed in accordance with step S1205 of FIG. 32 becomes valid only in one free game. The processing of step S1205 will be described later with reference to FIG. 32. The clear processing (step S1120) in the embodiment corresponds to processing (G) in the invention of (4). Subsequent to step S1120, the main CPU 71 causes the routine to migrate to step S1111.

In step S1111, in a case where the main CPU 71 determines that the remaining number of free games stored in the RAM 73 is 0, the main CPU 71 completes this subroutine.

Hereinabove, the free game processing executed by the gaming machine according to the embodiment has been described with reference to FIG. 31.

<WILD Symbol Handout Effect Processing>

Figure 32:
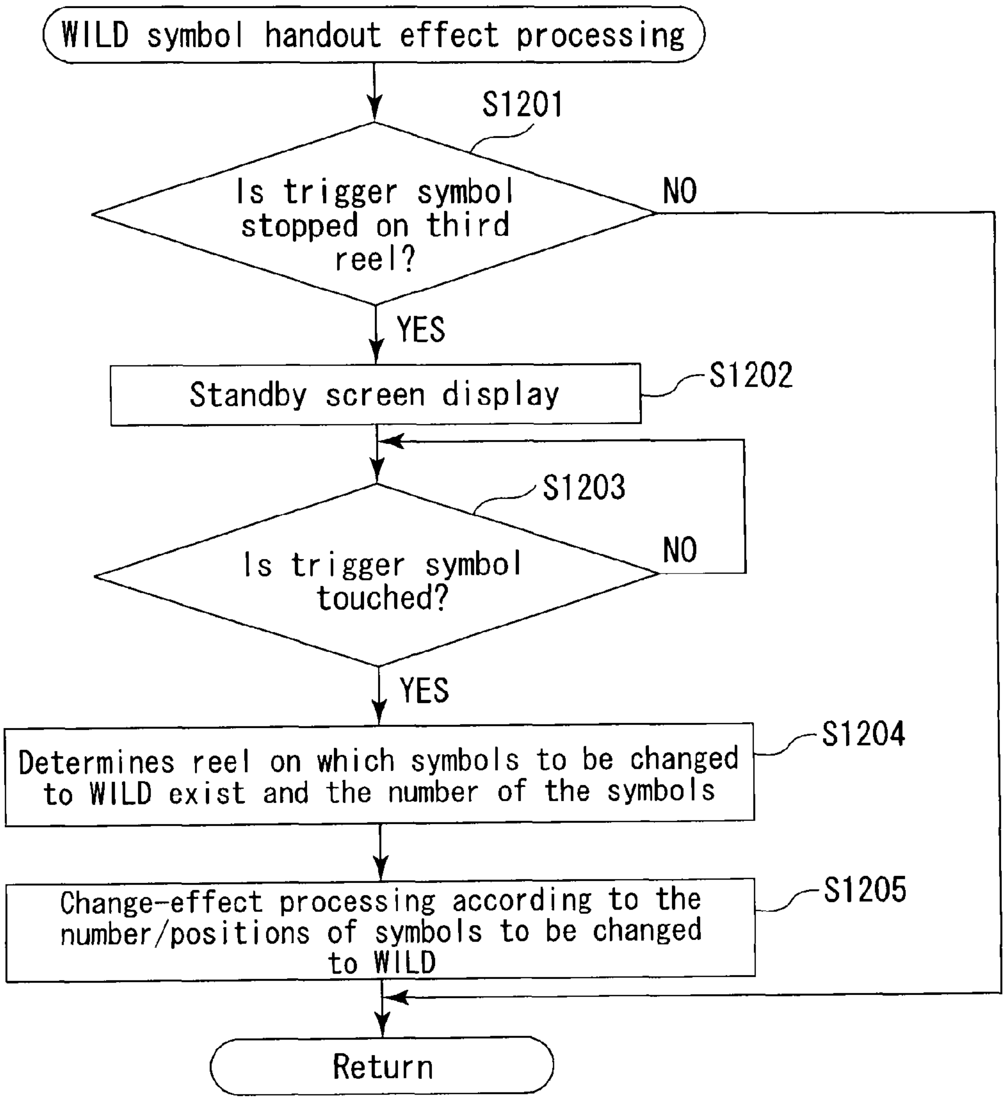
FIG. 32 is a view showing a flowchart of WILD symbol handout effect processing executed by the gaming machine according to the fourth embodiment of the present invention.

Next, with reference to FIG. 32, WILD symbol handout effect processing executed by the gaming machine according to the embodiment will be described. FIG. 32 is a view showing a flowchart of the WILD symbol handout effect processing executed by the gaming machine according to the embodiment (see step S1106 of FIG. 31).

Figure 10:
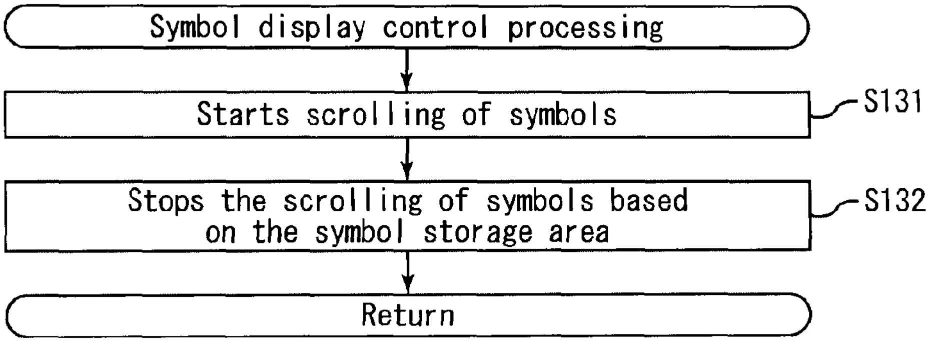
FIG. 10 is a view showing a flowchart of symbol display control processing of the gaming machine according to the first embodiment of the present invention.

First, the main CPU 71 determines whether or not a handout WILD symbol 340 is stop-displayed in a third video reel 3*c* in accordance with step S132 of FIG. 10 (step S1201). In a case where the main CPU 71 determines that the handout WILD symbol 340 is not stop-displayed in the third video reel 3*c*, the main CPU 71 completes this subroutine. In a case where the main CPU 71 determines that the handout WILD symbol 340 is stop-displayed in the third video reel 3*c*, the main CPU 71 causes the routine to migrate to step S1202.

In step S1202, the main CPU 71 causes the lower image display panel 141 to display a standby image (see FIG. 30B).

Next, the main CPU 71 determines whether or not a handout instruction signal is received (step S1203). The handout instruction signal is a signal to be transmitted from the touch panel 114 to the main CPU 71. When a player touches a position on the touch panel 114 corresponding to a position of the handout WILD symbol 340 displayed on the lower image display panel 141, the handout instruction signal is transmitted from the touch panel 114 to the main CPU 71 (see FIG. 30B). In a case where the main CPU 71 determines that no handout instruction signal is received, the main CPU 71 causes the routine to revert to step S1203. In a case where the main CPU 71 determines that the handout instruction signal is received, the main CPU 71 causes the routine to migrate to step S1204.

In step S1204, the main CPU 71 determines symbols to be changed to WILD symbols. In the processing, video reels in which symbols to be changed to WILD symbols exist are determined by means of lottery or the like, for example, and the number of symbols to be changed to WILD symbols for each of the video reels is determined by means of lottery or the like, for example. That is, in the processing, the main CPU 71 determines one or plural video reels in which symbols to be changed to WILD symbols exist (hereinafter, referred to as variable WILD reels), from among 5 video reels. Further, the main CPU 71 determines the number of symbols to be changed to WILD symbols for each of the variable WILD reels. Subsequently, based on arrangement determination table data, the main CPU 71 determines positions of symbols to be changed, by means of lottery or the like, for example.

The arrangement determination table data is data indicating an arrangement determination table in which a respective one of three display blocks 28 corresponding to an upper stage, a middle stage, and a lower stage of the video reel 3 and a predetermined numeric range are associated with each other. The ROM 72 stores the arrangement determination table data. A numeric range of 1 to 100 is associated with the upper stage in the arrangement determination table indicated by the arrangement determination table data according to the embodiment. A numeric range of 101 to 200 is associated with the middle stage. A numeric range of 201 to 300 is associated with the lower stage. As just described, in the arrangement determination table according to the embodiment, a predetermined numeric range is associated with a respective one of three display blocks 28 corresponding to the upper stage, middle stage, and lower stage of the video reel 3.

In a case where it is determined that the number of symbols to be changed to WILD symbols for a first video reel is 1, for example, one random value is extracted. Then, based on the extracted random value and the above arrangement determination table data, any display block 28 is determined from among the three display blocks 28 corresponding to the upper stage, middle stage, and lower stage of the video reel 3. In a case where a display block 28 corresponding to an upper stage of a fourth video reel 3*d* is determined, a symbol displayed in the display block 28 changes to a WILD symbol 344 (see step S1205 and FIG. 30D).

Next, the main CPU 71 executes change-effect processing which is based on the number and positions of symbols to be changed to WILD symbols, determined in accordance with step S1204 (steps 1205).

Hereinafter, the change-effect processing (step S1205) will be described in detail. In the processing, the lower image display panel 141 first displays an image indicating that a WILD handout symbol 340 stop-displayed in a third video reel 3*c* changes to a WILD symbol 344 (see FIG. 30C). A frame image 345 is displayed around the WILD symbol 344 displayed by the change of the handout WILD symbol 340 (see FIG. 30C). After completion of the display indicating that the handout WILD symbol 340 stop-displayed in the third video reel 3*c* is changed to the WILD symbol 344, the main CPU 71 determines whether or not 1 second has elapsed. After the main CPU 71 determines that 1 second has elapsed, the main CPU 71 executes processing of causing the lower image display panel 141 to display a carriage image 346 by the number determined in accordance with step S1204 (the number of symbols to be changed) (see FIG. 30D). In addition, the main CPU 71 executes processing of causing the lower image display panel 141 to display an image indicating how the carriage image 346 replaces a symbol with a WILD symbol 320. In the embodiment, the lower image display panel 141 displays one of a plurality of pattern images as an image indicating how the carriage image 346 replaces the symbol with the WILD symbol 320. That is, the main CPU 71 determines one pattern image, based on data indicating a pattern image determination table in which a respective one of the pattern images, the number of symbols to be changed to WILD symbols, and a respective one of the positions of symbols to be changed are associated with each other. The ROM 72 stores the data indicating the pattern image determination table. As just described, the change-effect processing (step S1205) reflects on an image the number and positions of symbols to be changed to WILD symbols, determined in accordance with step S1204.

In the above processing, the main CPU 71 determines whether or not stop-displayed arrayed symbols form a winning prize. In the embodiment, the main CPU 71 determines whether or not a winning prize is established after the WILD symbol 320 increased in accordance with step S1205 has been substituted for another symbol (for example, Cinderella symbol 322). In number-of-payouts determination processing (see step S1107 of FIG. 31), the main CPU 71 determines the number of payouts, based on a combination of symbols displayed on a winning line. Payout processing (see step S23 of FIG. 6) which is based on the number-of-payouts determination processing (see step S1107 of FIG. 31) in the embodiment corresponds to processing (F) or step (F) in the invention of (4).

Hereinabove, the WILD symbol handout effect processing executed by the gaming machine according to the embodiment has been described with reference to FIG. 32.

Hereinabove, the fourth embodiment has been described with reference to FIG. 30A to FIG. 32.

The embodiment described an example in which processing (D) or step (D) in the invention of (4) is configured as follows. That is, the embodiment described an example of determining video reels in which symbols to be changed to WILD symbols exist and then determining the number of symbols to be changed to WILD symbols for each of the video reels (see step S1204 of FIG. 32). However, processing (D) or step (D) in the invention of (4) may be configured so as to determine a total number of symbols to be changed to WILD symbols and then determine the positions of symbols to be changed to WILD symbols. Hereinafter, this configuration will be described.

In step S1204 of FIG. 32, the main CPU 71 determines a total number and positions of symbols to be changed to WILD symbols. In the processing, the main CPU 71 determines one numeral and symbol positions. That is, in the processing, one numeral is determined from the range of 1 to 14 by means of lottery or the like, for example. The determined number corresponds to a total number of symbols to be changed. The symbol positions are determined based on address determination table data by the determined number (total number of symbols to be changed). The address determination table data is data indicating an address determination table in which a respective one of 14 display blocks 28 excluding the display block 28 corresponding to the middle stage of the third video reel 3*c* and a predetermined numeric range are associated with each other. The ROM 72 stores the address determination table data. A numeric range of 1 to 100 is associated with an upper stage of the first video reel 3*a* in the address determination table indicated by the address determination table data according to the embodiment. A numeric range of 101 to 200 is associated with an upper stage of the second video reel 3*b*. As just described, in the address determination table according to the embodiment, a predetermined numeric range is associated with a respective one of 14 display blocks included in the symbol display region 4.

In a case where numeral 2 is determined in step S1204, for example, two random values are extracted. Two of 15 display blocks 28 are then determined based on the extracted two random values and the above address determination table data.

The embodiment described an example in which a predetermined display region in the invention of (4) and a predetermined symbol array display region in the invention of (4) fall under the third video reel 3*c*. However, the predetermined display region in the invention of (4) and the predetermined symbol array display region in the invention of (4) may fall under any of 15 display blocks 28 included in the symbol display region 4 or may be a plurality of display blocks 28 of the 15 display blocks 28 included in the symbol display region 4.

The embodiment described an example in which "determining symbols to be replaced with WILD symbols" is a configuration of determining symbols to be replaced with WILD symbols, based on data obtained by associating a respective one of the display blocks 28 with a predetermined numeric range (arrangement determination table data or address determination table data) (see step S1204 of FIG. 32). However, the configuration of "determining symbols to be replaced with WILD symbols" in the invention of (4) is not limitative thereto. That is, in the embodiment, "determining symbols to be replaced with WILD symbols" in the invention of (4) may be a configuration of determining symbols to be replaced with WILD symbols, based on the data obtained by associating a respective one of symbols and a predetermined numeric range, indicated by symbol data (the data indicating a data table showing a correlation between each video reel 3 and a symbol array). In a case where this configuration is employed, the following configuration may be further provided. That is, symbol data is updated in response to the fact that symbols to be replaced with WILD symbols are determined (see step S1204 of FIG. 32). A winning combination is then determined based on the symbol data. The symbol data is initialized to symbol data before updated (original symbol data) by means of clear processing (step S1120 of FIG. 31).

Fifth Embodiment

A fifth embodiment describes the invention of (5). In the following description, like constituent elements of the gaming machine 1 according to the foregoing embodiments are designated by like reference numerals, and are explained. A duplicate description is omitted with respect to a case where the descriptive matters in the foregoing embodiments apply for the fifth embodiment as well.

Figure 33A:
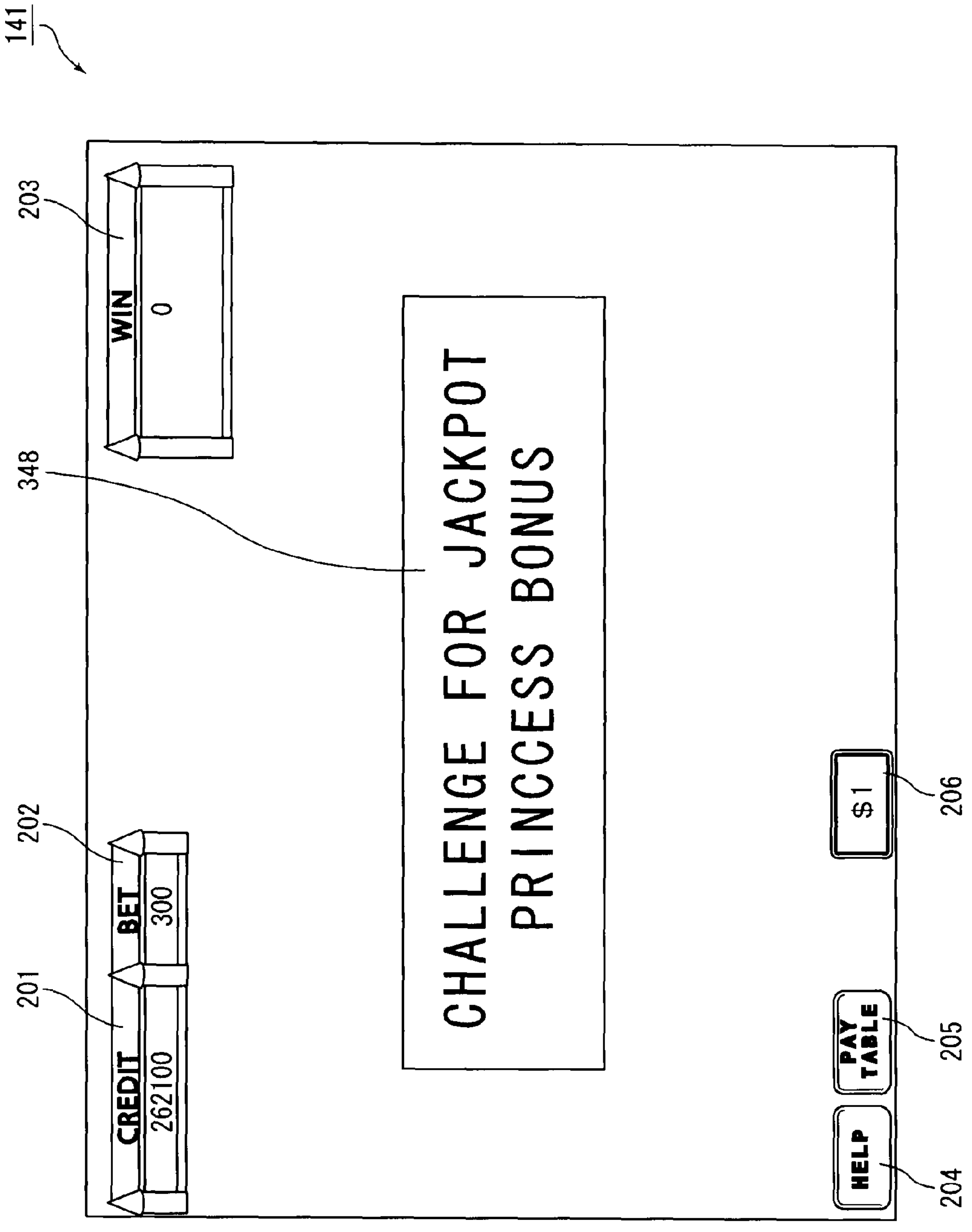
FIG. 33A is a view showing an example of an image displayed on a lower image display panel included in a gaming machine according to a fifth embodiment of the present invention.
Figure 33B:
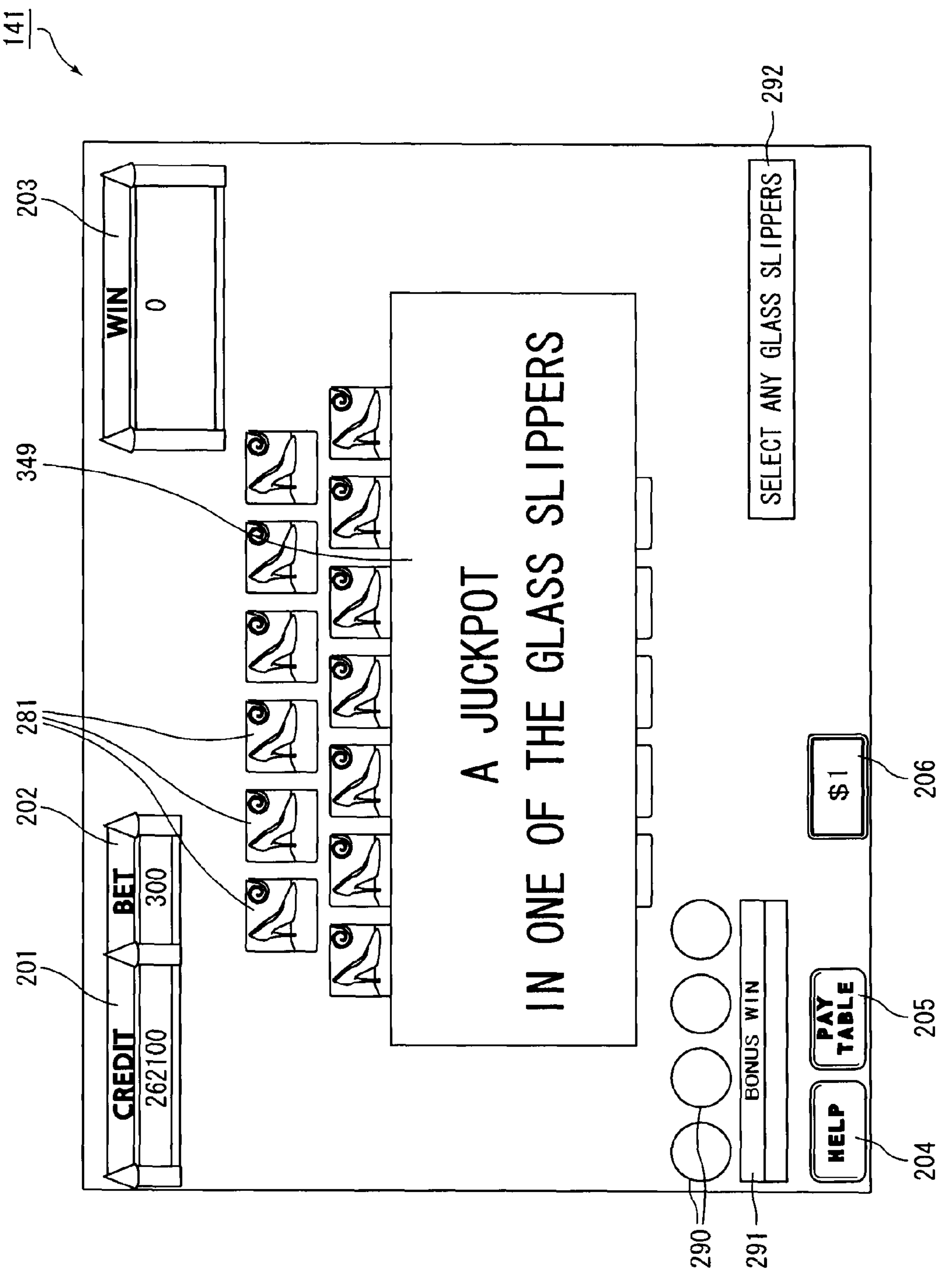
FIG. 33B is a view showing an example of an image displayed on the lower image display panel included in the gaming machine according to the fifth embodiment of the present invention.
Figure 33C:
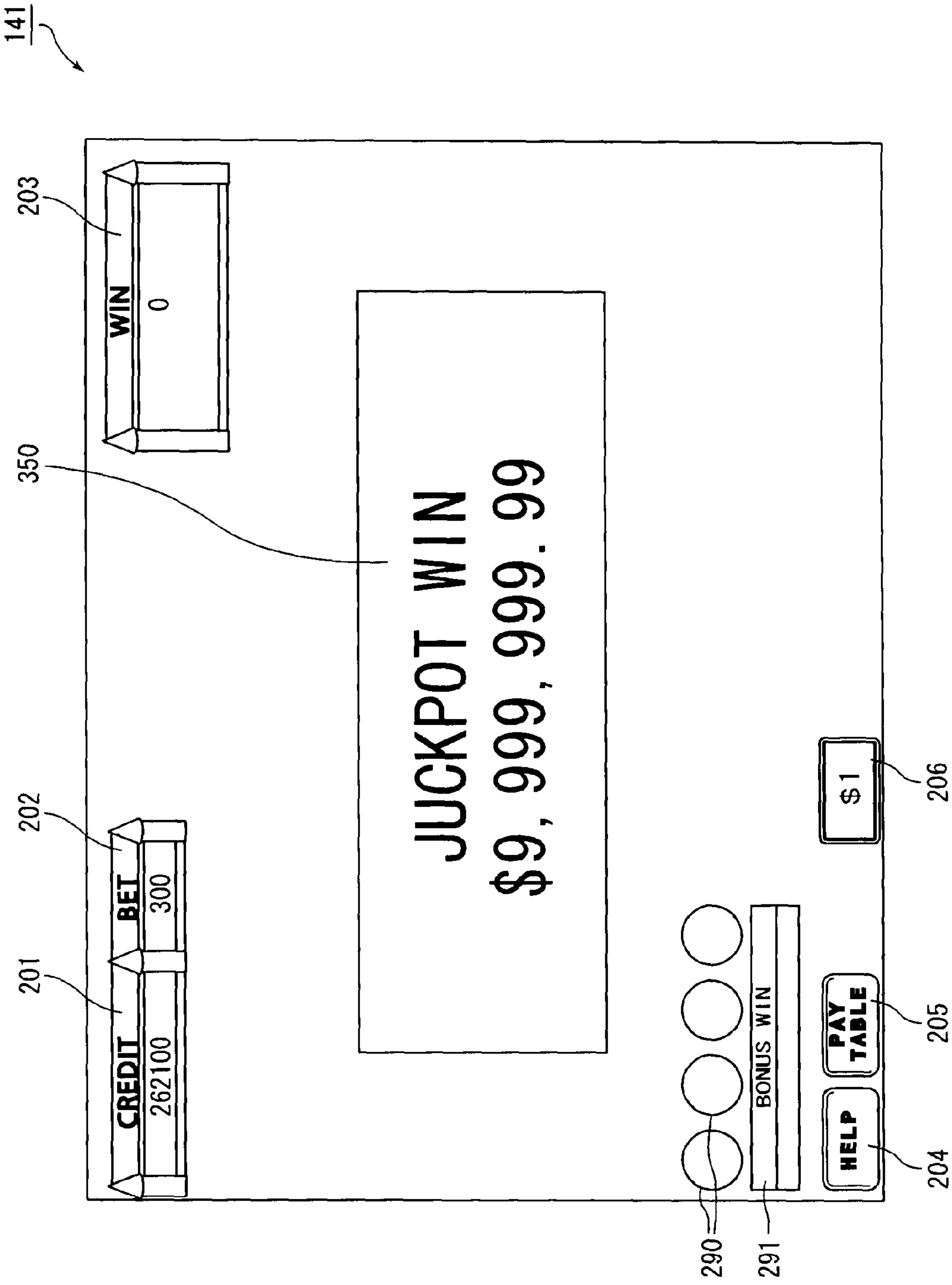
FIG. 33C is a view showing an example of an image displayed on the lower image display panel included in the gaming machine according to the fifth embodiment of the present invention.

First, with reference to FIG. 33A to FIG. 33C, an outline of the fifth embodiment will be described. FIG. 33A to FIG. 33C are views each showing an example of an image displayed on a lower image display panel included in a gaming machine according to the fifth embodiment of the present invention.

In the fifth embodiment, with respect to a 29-option game, a feature which is not included in the first embodiment is added. Specifically, in the 29-option game according to the fifth embodiment, 29 touch symbols 281 can include a touch symbol 281 whose content is a jackpot. In a case where the touch symbol 281 whose content is a jackpot is included, a player can acquire a benefit according to the jackpot by selecting the touch symbol 281.

FIG. 33A shows how a character image 348 "CHALLENGE FOR JACKPOT PRINCESS BONUS" is displayed. After the character image 348 has been displayed, a character image 349 "A JACKPOT IN ONE OF THE GLASS SLIPPERS" is displayed as shown in FIG. 33B. The character image 348 and the character image 349 are images notifying a player that 29 touch symbols 281 include a touch symbol 281 whose content is a jackpot.

When a player select the touch symbol 281 associated with a jackpot, a character image 350 "JACKPOT WIN $9,999,999.99" is displayed as shown in FIG. 33C. The character image 350 is an image notifying a player that a winning jackpot is established and what the jackpot amount is. The example of FIG. 33C shows how the jackpot amount of $ 9,999,999.99 is paid out to a player.

The jackpot amount in the fifth embodiment is the amount obtained by adding the jackpot amount of the first embodiment to an initial amount of jackpot. An administrator or the like in a gaming facility can set an initial amount of jackpot via an administrator-side input device (not shown) connected to an external control device 200. The initial amount of jackpot corresponds to a progressive initial value in the invention of (5).

Figure 34A:
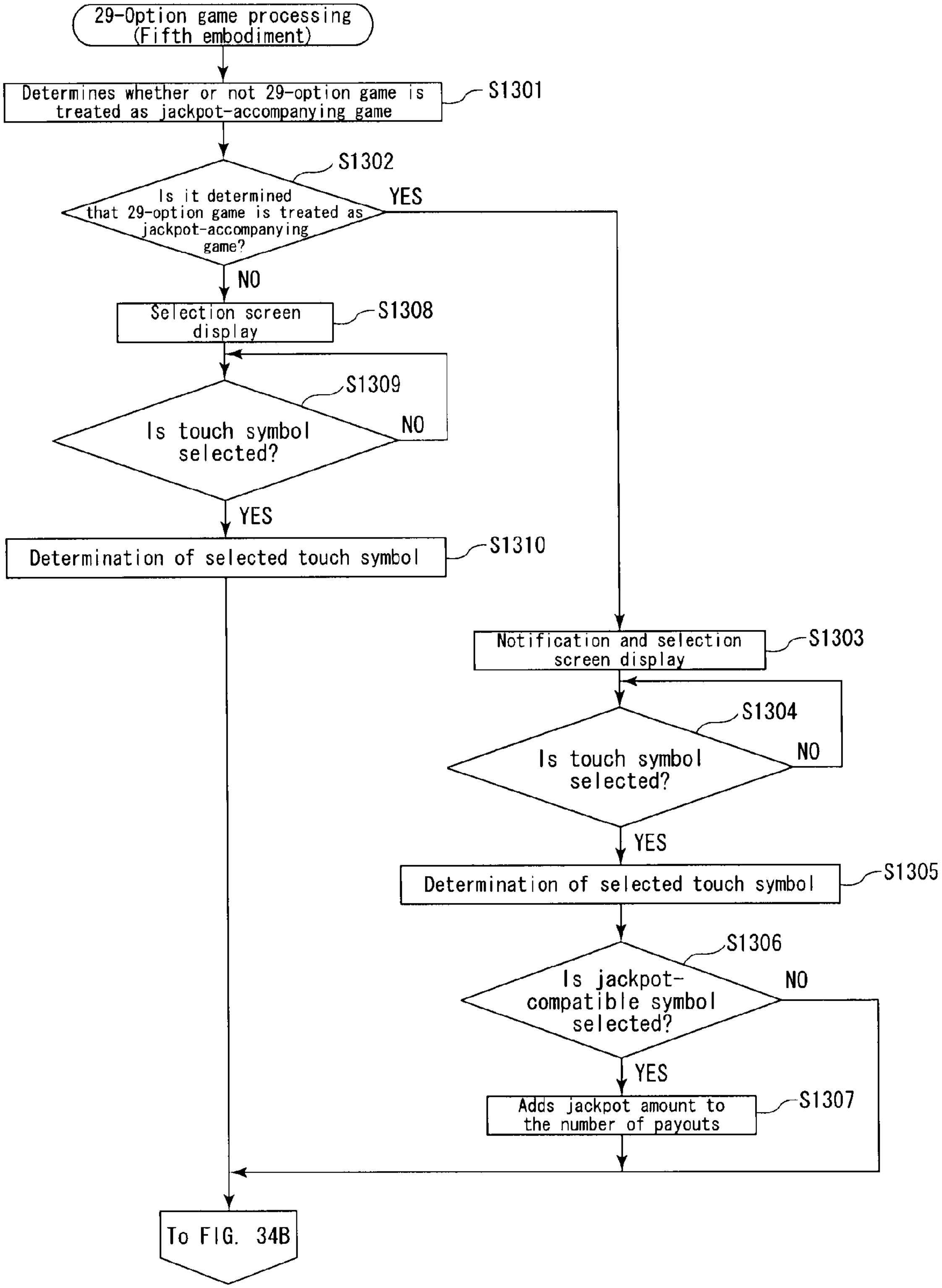
FIG. 34A is a view showing a flowchart of 29-option game processing conducted by the gaming machine according to the fifth embodiment of the present invention.
Figure 34B:
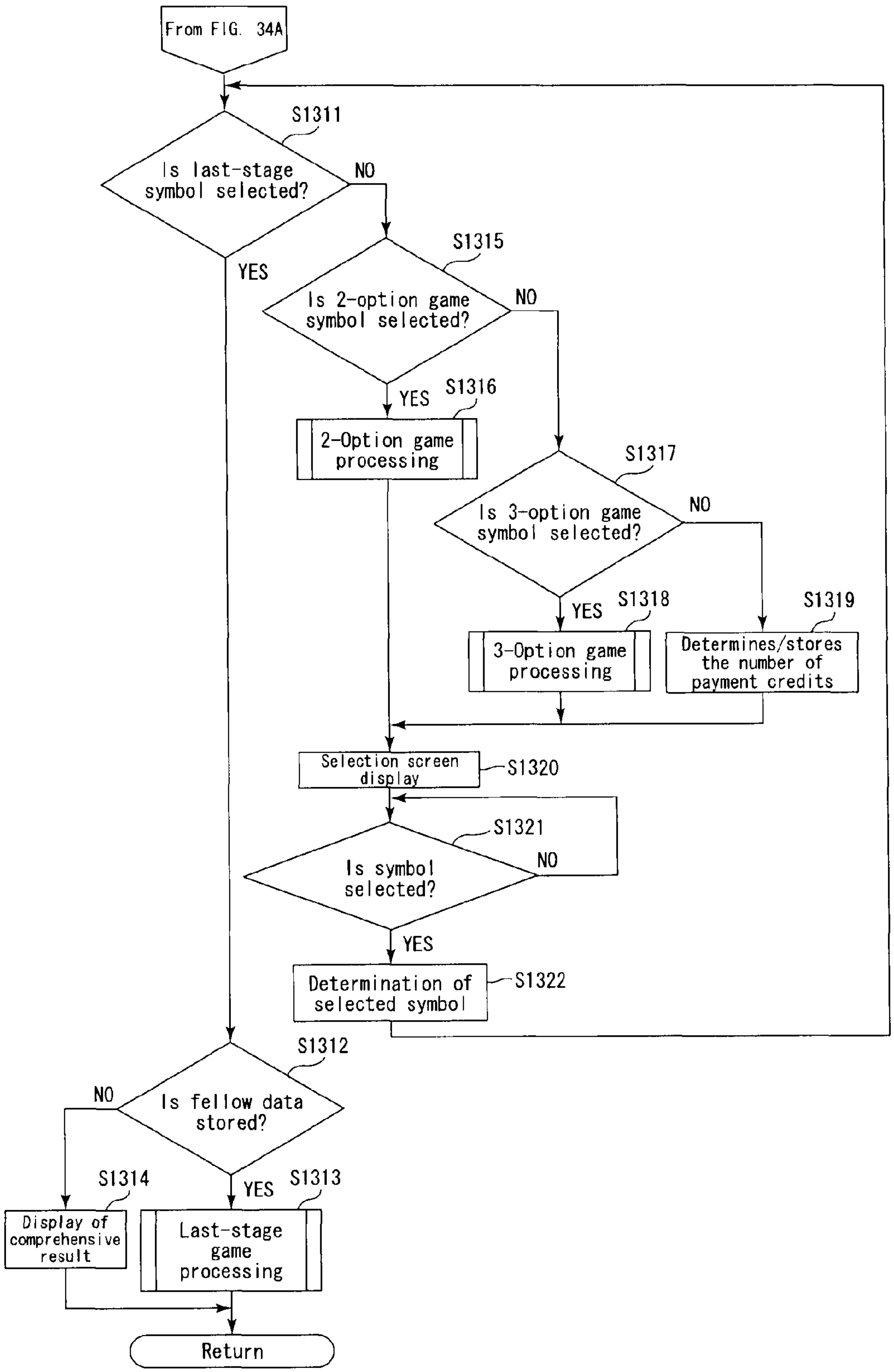
FIG. 34B is a view showing a flowchart of 29-option game processing conducted by the gaming machine according to the fifth embodiment of the present invention.

Hereinabove, the outline of the fifth embodiment has been described with reference to FIG. 33A to FIG. 33C. Next, with reference to FIG. 34A and FIG. 34B, 29-option game processing will be described. FIG. 34A and FIG. 34B are views each showing a flowchart of the 29-option game processing conducted by a gaming machine according to the fifth embodiment of the present invention.

First, the main CPU 71 determines whether or not a 29-option game is treated as a jackpot-accompanying game (step S1301). In the processing, the main CPU 71 determines the 29-option game as a jackpot-accompanying game at a probability (the probability of the generation of jackpot-accompanying game) based on the initial amount of jackpot and the number of BETs. The probability of the generation of jackpot-accompanying game is expressed by the formula below.

Probability of the generation of jackpot-accompanying game≈the number of BETs×1,000/initial amount of jackpot Specifically, the main CPU 71 conducts processing of:

(i) specifying natural number N meeting N−1<M×the number of BETs×1,000/initial amount of jackpot≤N, (where M is the number of the random number which can be extracted, for example, M=65536);

(ii) specifying N random numbers (N is a value specified in accordance with the processing (i)) from among M random numbers;

(iii) extracting one random number; and (iv) determining whether or not the N random numbers specified in accordance with the processing (ii) includes the random number extracted in accordance with the processing (iii).

When the main CPU 71 determines that the 29-option game is not treated as a jackpot-accompanying game, the main CPU 71 executes the processing of step S1308 to step S1310. The processing of these steps is similar to that of step S401 to step S403 described with reference to FIG. 16. Thus, a duplicate description of these steps is omitted here. In the processing (iv), in a case where the main CPU 71 determines that N random numbers specified in accordance with the processing (ii) does not include the random number extracted in accordance with the processing (iii), the main CPU 71 determines that the 29-option game is not treated as a jackpot-accompanying game.

When the main CPU 71 determines that the 29-option game is treated as a jackpot-accompanying game, the main CPU 71 notifies a player that 29 touch symbols 281 include a touch symbol 281 whose content is a jackpot, and displays a selection screen (see FIG. 33A) (step S1303). In the processing (iv), in a case where the main CPU 71 determines that the N random numbers specified in accordance with the processing (ii) include the random number extracted in accordance with the processing (iii), the main CPU 71 determines that the 29-option game is treated as a jackpot-accompanying game.

Next, the main CPU 71 determines whether or not any touch symbol 281 is selected on the selection screen (step S1304). Specifically, the main CPU 71 determines whether or not a site corresponding to any touch symbol 281 is touched on a touch panel 114. The touch panel 114 corresponds to an input device in the invention of (5). In a case where the main CPU 71 determines that the touch symbol is not selected, the main CPU 71 causes the routine to revert to step S1304.

In a case where the main CPU 71 determines that the touch symbol 281 is selected, the main CPU 71 makes determination of the selected touch symbol 281 (step S1305). That is, the main CPU 71 determines with which of credit payment and a plurality of feature games the touch symbol 281 is associated.

Next, the main CPU 71 determines whether or not a touch symbol 281 associated with a jackpot (see step S1301) is selected (step S1306).

When the main CPU 71 determines that the touch symbol 281 associated with a jackpot is selected, the main CPU 71 displays a jackpot amount (see FIG. 33C) and adds the jackpot amount to the number of payouts (step S1307). In the processing, the main CPU 71 transmits to an external control device 200 a jackpot generation signal indicating that the touch symbol 281 associated with a jackpot is selected. In the wake of the receipt of the jackpot generation signal, a CPU included in the external control device 200 transmits the jackpot amount, which is stored in the RAM included in the external control device 200, to a gaming machine 1 as a transmission source of the jackpot generation signal. The main CPU 71 executes the processing of step S1307, based on the jackpot amount received from the external control device 200.

After executing step S1310 or step S1317 or when determining that the touch symbol 281 associated with a jackpot is not selected in step S1306, the main CPU 71 executes the processing of step S1311 to step S1319. The processing of these steps is similar to that of step S404 to step S412 described with reference to FIG. 16. Thus, a duplicate description of these steps is omitted here.

Further, after executing the processing of step S1316, step S1318, or step S1319, the main CPU 71 executes the processing of step S1320 to step S1322. The processing of these steps is similar to that of step S401 to step S403 described with reference to FIG. 16. Thus, a duplicate description of these steps is omitted here. After executing the processing of step S1322, the main CPU 71 causes the routine to revert to step S1311.

Hereinabove, the fifth embodiment has been described with reference to FIG. 33 and FIG. 34.

The fifth embodiment described a case of paying coins whose amount corresponds to a jackpot amount. The payment of coins whose amount corresponds to the jackpot amount corresponds to awarding of a progressive payment in the invention of (5). The awarding of a special payment in the invention of (5) is not limitative thereto. In the invention of (5), for example, a predetermined amount of gaming media may be awarded as a special payment.

The fifth embodiment described a case in which a touch panel 114 is employed as an input device for selecting a touch symbol 281 and a 1-BET button 34 and a MAXBET button 35 (BET buttons) are employed as an input device for placing a BET. The touch panel 114 and the BET buttons configure an input device in the invention of (5). In the invention of (5), an input device for selecting an option and an input device for placing a BET may be configured separately or may be configured integrally (for example, as a touch panel). In the invention of (5), as an input for placing a BET, there may be employed a conventionally publicly known input device such as a currency insertion slot which is capable of accepting currency such as coins or bills, other than buttons or touch panel.

In the fifth embodiment, when the main CPU 71 determines that the 29-option game is treated as a jackpot-accompanying game, the main CPU 71 associates one touch symbol 281 with a jackpot from among 29 touch symbols 281. However, a plurality of touch symbols 281 may be associated with a jackpot. For example, at the time of starting the 29-option game, it may be determined as to whether or not a respective one of 29 touch symbols 281 can be associated with a jackpot.

According to the fifth embodiment of the present invention, a probability at which it is determined that a special payment is included in the contents of a plurality of options becomes a probability which is based on a progressive initial value. For example, either of the cases below can be exemplified. In a case where the progressive initial value is a large value (for example, in a case where a large amount of gaming media can be awarded as a progressive payment), there arises a low probability that it is determined that a special payment is included in the contents of a plurality of options. In contrast, in a case where a progressive initial value is a small value (for example, in a case where a small amount of gaming media can be awarded as a progressive payment), there arises a high probability that it is determined that a special payment is included in the contents of a plurality of options. In this manner, adjustment can be made as to timing of the arising of a progressive payment or the amount of gaming media awarded as a progressive payment. An administrator in a gaming facility or the like can change a probability that it is determined that a special payment is included in the contents of a plurality of options, by changing the setting of the progressive initial value via an input device included in a gaming machine or an input device connected to a server. Therefore, a gaming facility can be speedily and easily maintained and/or managed so that a special payment is included the contents of a plurality of options at an optimal probability according to management strategy.

According to the fifth embodiment of the present invention, there can arise a probability that as a larger amount of gaming media is betted in a normal game in which a predetermined condition is established, there can arise a higher probability that it is determined that a special payment is included in the contents of a plurality of options. Therefore, it is possible to prompt a player to bet more gaming media. Further, in order to increase the probability that is determined a special payment to be included in the contents of a plurality of options, a plenty of gaming media needs to be betted in a normal game in which a predetermined condition is established. Even if a plenty of gaming media is betted in an earlier normal game, the fact is not considered. Therefore, in a situation in which a player is unaware of when a predetermined condition is established, it is possible to cause the player to continue betting of a plenty of gaming media. In this manner, the profits in gaming facilities such as casinos can be increased.

According to the fifth embodiment of the present invention, a probability at which it is determined that a special payment is included in the contents of a plurality of options becomes a probability which is based on a progressive initial value and an amount of gaming media betted in a normal game in which a predetermined condition is established. An administrator in a gaming facility or the like determines a progressive initial value via an input device included in a gaming machine or an input device connected to a server. A player determines the amount of gaming media betted in a normal game. That is, elements determining the probability that is determined that a special payment is included in the contents of a plurality of options depend on the administrator or the like and the player. In this manner, the administrator or the like and the player set a progressive initial value which seems to be optimal for them or place a BET on a normal game while considering their speculations, respectively. As a result, a highly-strategic profound game can be provided.

Sixth Embodiment

A sixth embodiment describes the invention of (6). In the following description, like constituent elements of the gaming machine 1 according to the first embodiment are designated by like reference numerals and are explained. A duplicate description is omitted with respect to a case where the descriptive matters in the first embodiment apply for the sixth embodiment as well.

First, an outline of the sixth embodiment will be described. In the sixth embodiment, 3-option bonus game is executed in a case where a bonus game trigger is established in a normal game, and a 29-option game is executed according to a selection result of a bonus symbol 250 in the 3-option bonus game (see FIG. 1B). In a case where a touch symbol 281 corresponding to a last-stage game in the above 29-option game (see FIG. 15B) is selected and any one type of fellow animation character is not acquired at that time point (any one type of fellow animation character is not stored in the RAM 73), a consolation game in which a right advancing to the last-stage game can be acquired is executed. In the consolation game, a 4-option game in which any touch symbol is selected from among four touch symbols is first executed. In a case where a touch symbol corresponding to a fellow animation character is selected, the corresponding fellow animation character is awarded, and the last-stage game is executed. Even where the fellow animation character is not acquired in the 4-option game, in a case where a touch symbol selected in the 4-option game is a specific touch symbol, a consolation race in which a fellow animation character can be awarded is executed. In the consolation race, a race employing three race animation characters is performed, and if a race animation character selected by a player wins the race, the corresponding fellow animation character is awarded, and the last-stage game is executed.

Hereinafter, with reference to FIG. 35A to FIG. 35F, the outline of the sixth embodiment will be described. FIG. 35A to FIG. 35F are views each showing an example of an image displayed on a lower image display panel included in a gaming machine according to the sixth embodiment of the present invention.

Figure 35A:
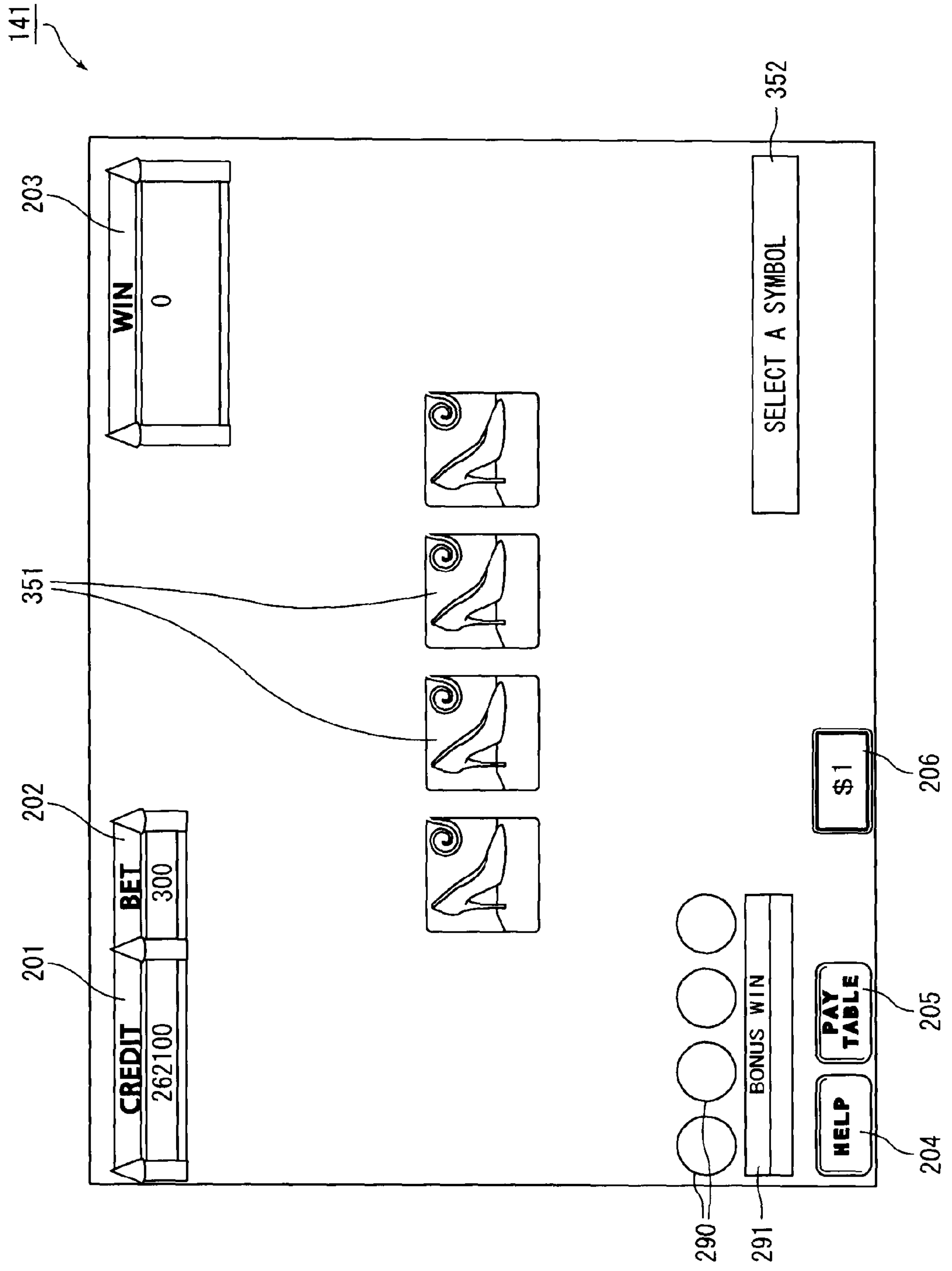
FIG. 35A is a view showing an example of an image displayed on a lower image display panel included in a gaming machine according to a sixth embodiment of the present invention.

In a case where a touch symbol 281 corresponding to a last-stage game is selected in a 29-option game and any one of fellow animation character is not acquired at that time point, a lower image display panel 141 included in a gaming machine 1 displays an image related to a 4-option game, as shown in FIG. 35A. Specifically, four touch symbols 351 is displayed at a substantial center part of the lower image display panel 141, and an image 352 which prompts a player to select any touch symbol 351 is displayed at the lower right part of the lower image display panel 141. While any of the fellow animation character, credit payment, and credit payment with consolation race is associated in advance with a respective one of the touch symbols 351 by means of lottery, a selection screen shown in FIG. 35A displays touch symbols 351 that are displayed in an aspect in which a correlation cannot be visually recognized. In a case where the selected touch symbol 351 corresponds to a fellow animation character, after the fellow animation character has been awarded (that is, after fellow data indicating the fellow animation character has been stored in the RAM 73), the last-stage game described with reference to FIG. 21 is executed. In a case where the selected touch symbol 351 corresponds to credit payment, a 29-option game is completed after the payment has been awarded.

Figure 35B:
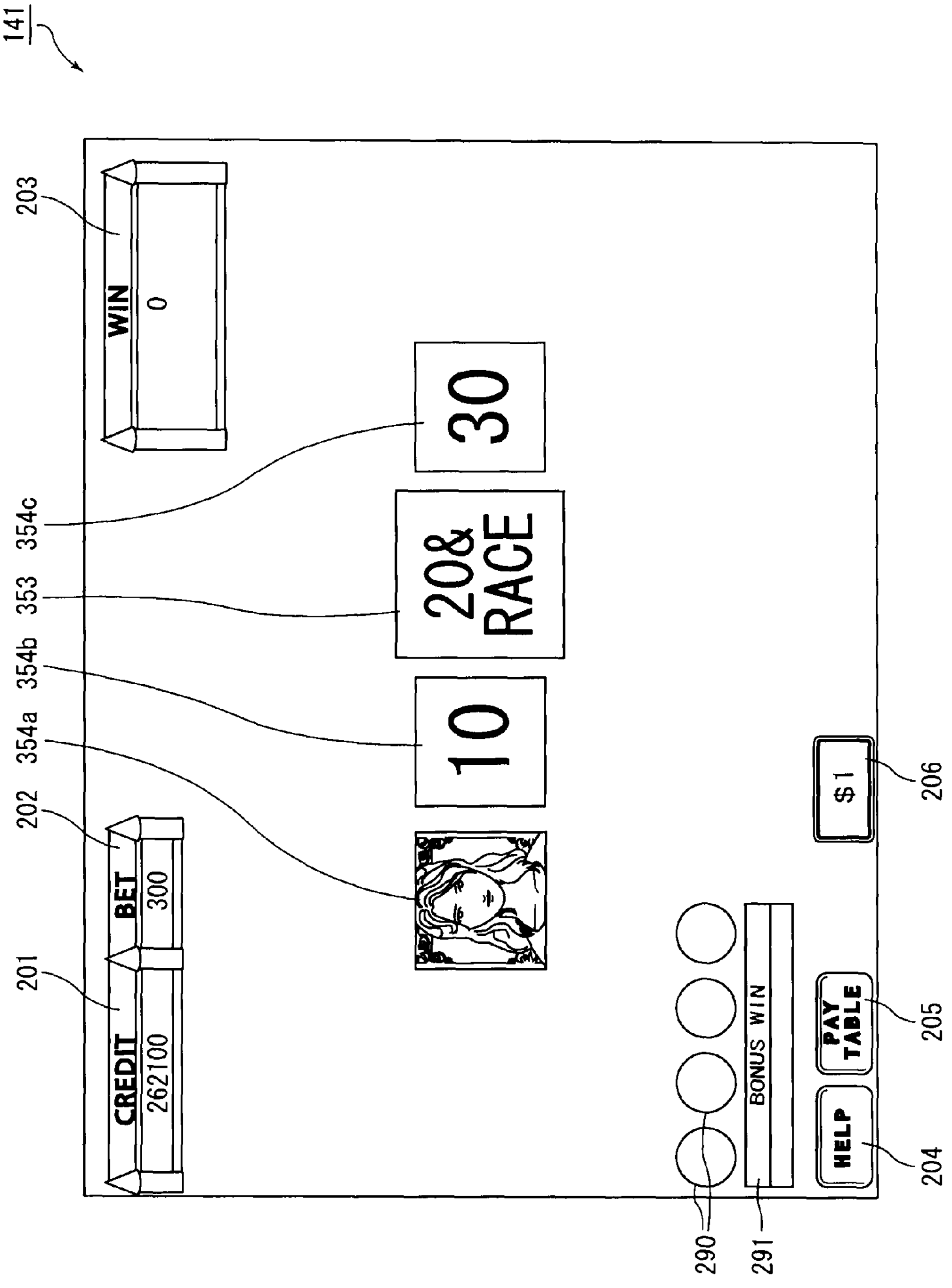
FIG. 35B is a view showing an example of an image displayed on the lower image display panel included in the gaming machine according to the sixth embodiment of the present invention.

In a case where the selected touch symbol 351 corresponds to credit payment with consolation race, an image 353 emphasizing that credit payment with consolation race is selected and images 354*a* to 354*c* indicating the contents of touch symbols 351 that are not selected are displayed as shown in FIG. 35B.

Figure 35C:
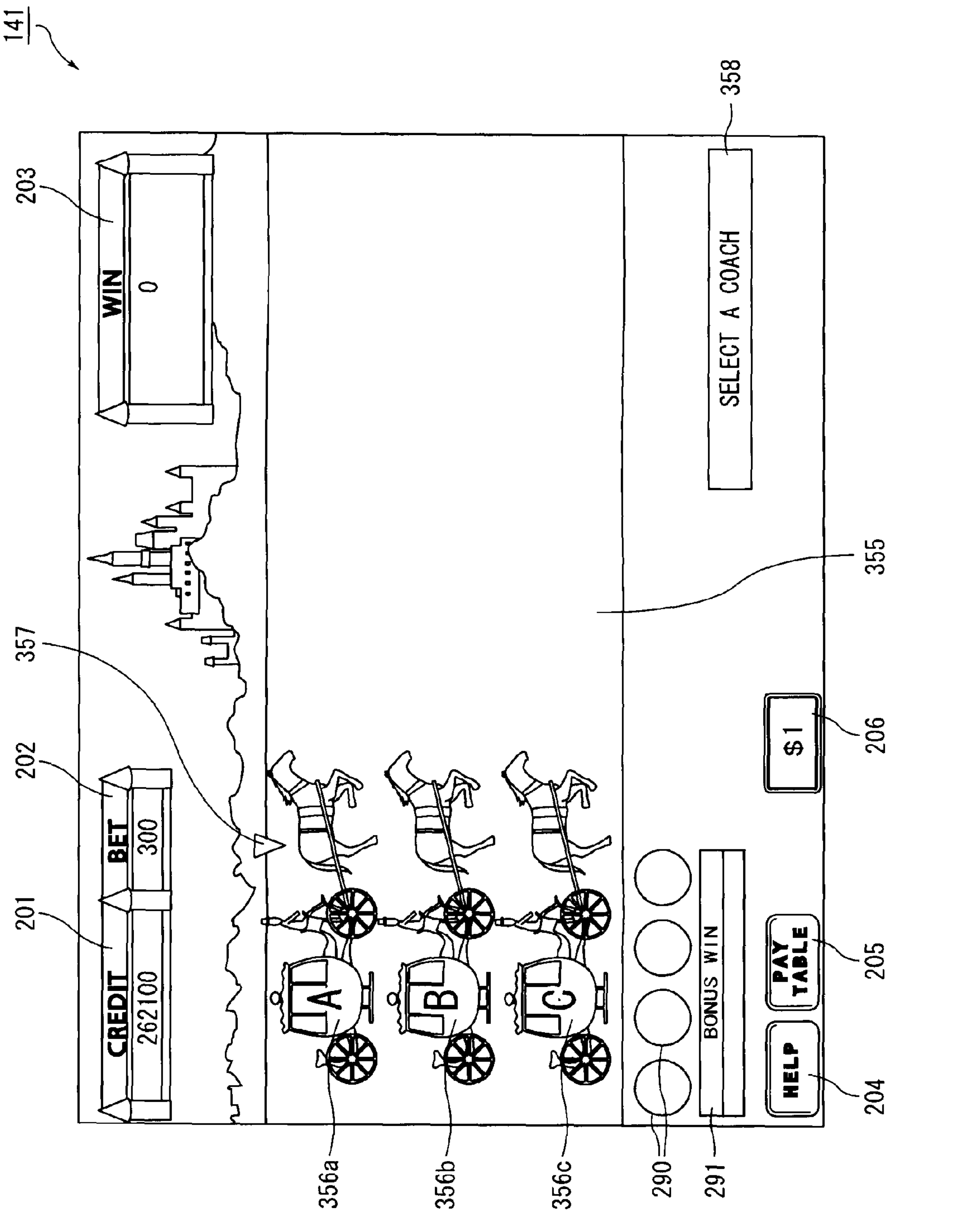
FIG. 35C is a view showing an example of an image displayed on the lower image display panel included in the gaming machine according to the sixth embodiment of the present invention.

Subsequently, as shown in FIG. 35C, an image 355 indicating a course of the race is displayed at a substantial center part of the lower image display panel 141, and race animation character images 356*a* to 356*c* indicating three race animation characters A to C participating in the race are displayed at a left end of the image 355. An image 358 which prompts a player to select any race character is displayed at the lower right part of the lower image display panel 141. In a case where the race animation character is selected, a mark image 357 for identifying the selected race animation character is displayed in the vicinity of the selected race animation character image 356. FIG. 35C shows how the race animation character A is selected.

Figure 35D:
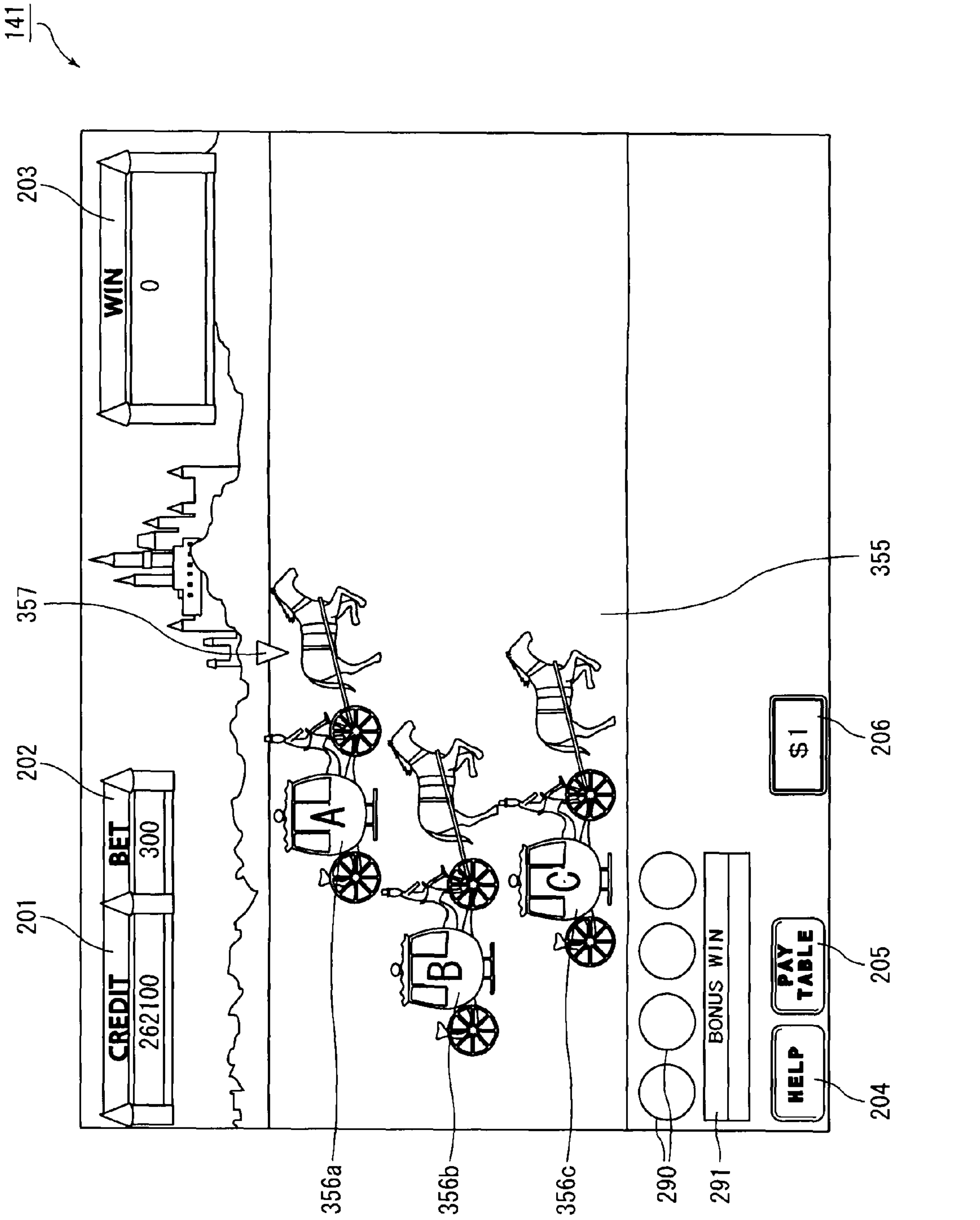
FIG. 35D is a view showing an example of an image displayed on the lower image display panel included in the gaming machine according to the sixth embodiment of the present invention.

Subsequently, a race using the race animation characters A to C are started. As shown in FIG. 35D, race animation character images 356*a* to 356*c* indicating the three race animation characters A to C move from left to right of the screen, and an effect that the race animation characters A to C compete against each other in the race is executed. At this time, the mark image 357 is displayed so as to move in response to the selected race animation character image 356.

Figure 35E:
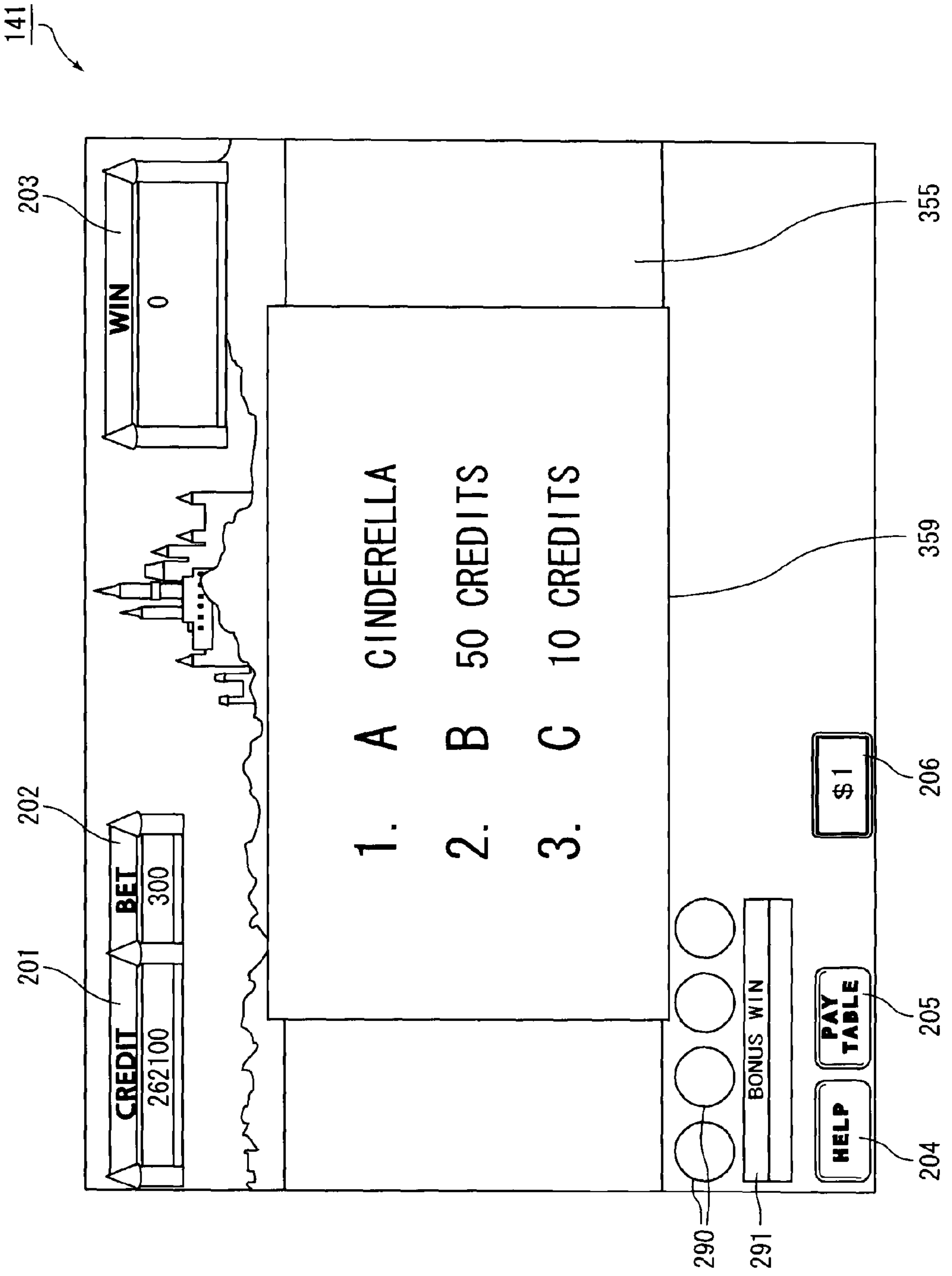
FIG. 35E is a view showing an example of an image displayed on the lower image display panel included in the gaming machine according to the sixth embodiment of the present invention.

When a race effect completes, a race result image 359 indicating a race result is displayed as shown in FIG. 35E. The race result image 359 includes an image indicating ranking of the race characters in race and a bonus to be awarded (fellow animation character or credit payment). FIG. 35E shows how the selected race animation character A is a first rank and the fellow animation character "CINDERELLA" is awarded. In a case where the selected race animation character is a rank other than the first rank (a second or third rank in the embodiment), a predetermined credit payment is awarded.

Figure 35F:
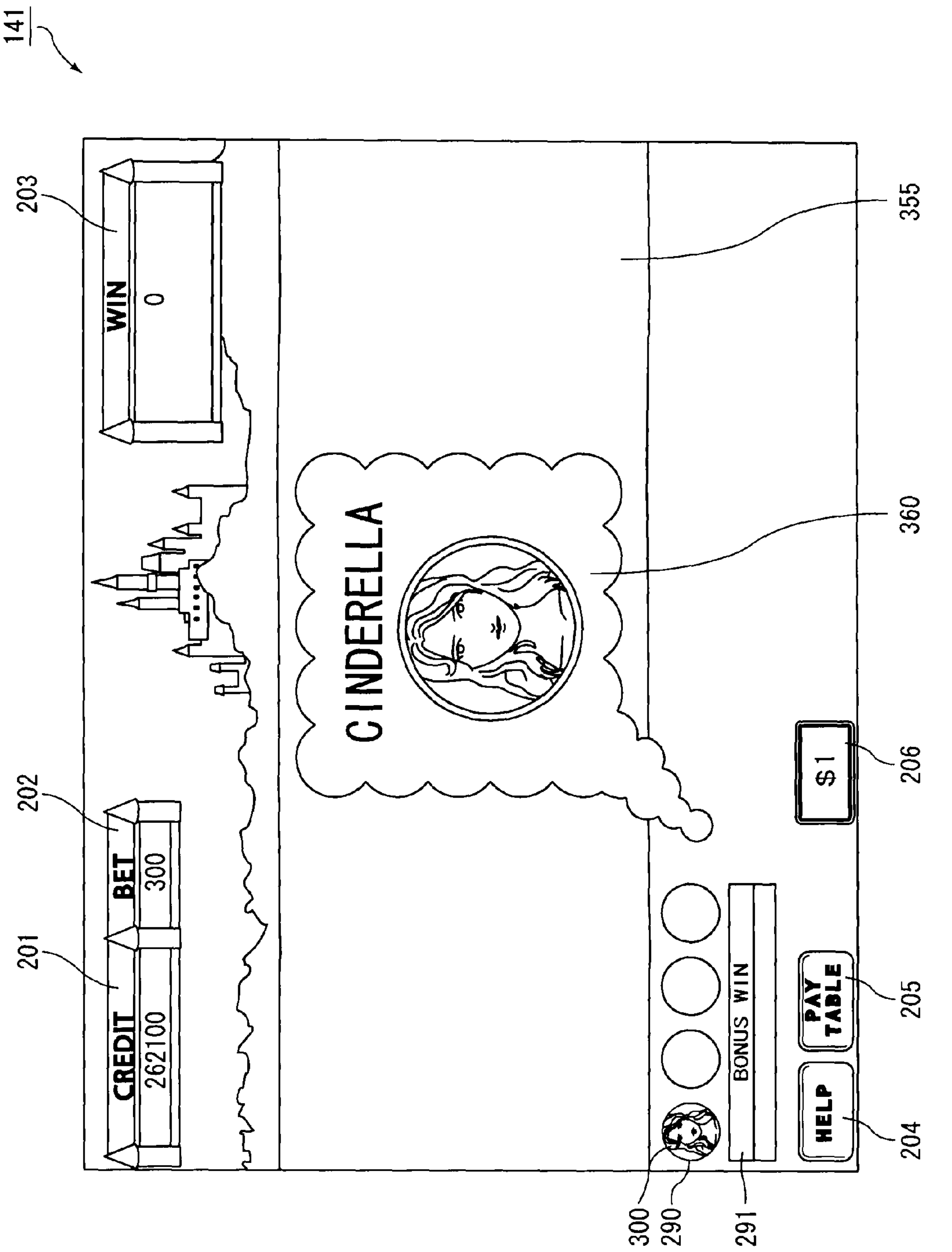
FIG. 35F is a view showing an example of an image displayed on the lower image display panel included in the gaming machine according to the sixth embodiment of the present invention.

Subsequently, an image 360 notifying that a new fellow animation character "CINDERELLA" is awarded is displayed as shown in FIG. 35F. Afterwards, a last-stage game described with reference to FIG. 21 is executed.

Next, the processing executed in the gaming machine 1 according to the embodiment will be described. The processing according to a normal game in the embodiment is substantially similar to that of step S12 to step S18 in the main control processing of the first embodiment (see FIG. 6). In addition, the processing related to the 3-option bonus game in the embodiment is substantially similar to the 3-option bonus game processing of the first embodiment except the processing related to "RESCUE PRESENT" is not conducted (see FIG. 12). Thus, a duplicate description of the above processing is omitted here. Hereinafter, 29-option game processing will be described.

<29-Option Game Processing>

Figure 36:
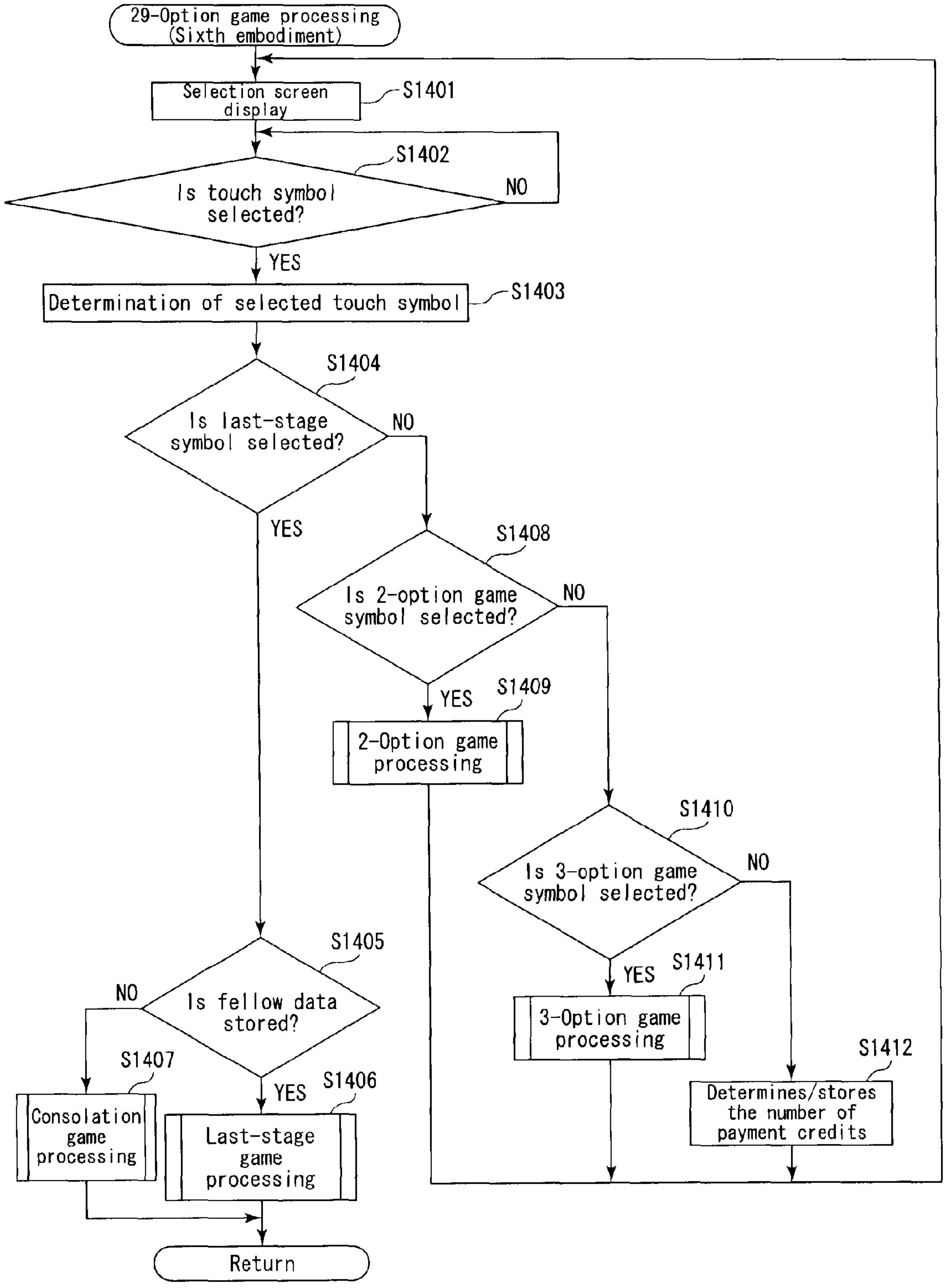
FIG. 36 is a view showing a flowchart of 29-option game processing of the gaming machine according to the sixth embodiment of the present invention.

FIG. 36 is a view showing a flowchart of the 29-option game processing of the gaming machine according to the sixth embodiment of the present invention. The processing in step S1401 to step S1406 and the processing in step S1408 to step S1312 are substantially similar to that in step S401 to step S406 of FIG. 16 and that of step S408 to step S412, respectively. Thus, a duplicate description of these steps is omitted here.

In step S1405, in a case where the CPU 71 determines that any item of fellow data indicating a fellow animation character is not stored in a predetermined storage area of the RAM 73, the main CPU 71 executes consolation game processing in which a fellow animation character can be awarded, in step S1407. The consolation game processing will be described later in detail with reference to FIG. 37. After the processing of step S1406 or the processing of step S1407 has been executed, this subroutine is completed.

<Consolation Game Processing>

Figure 37:
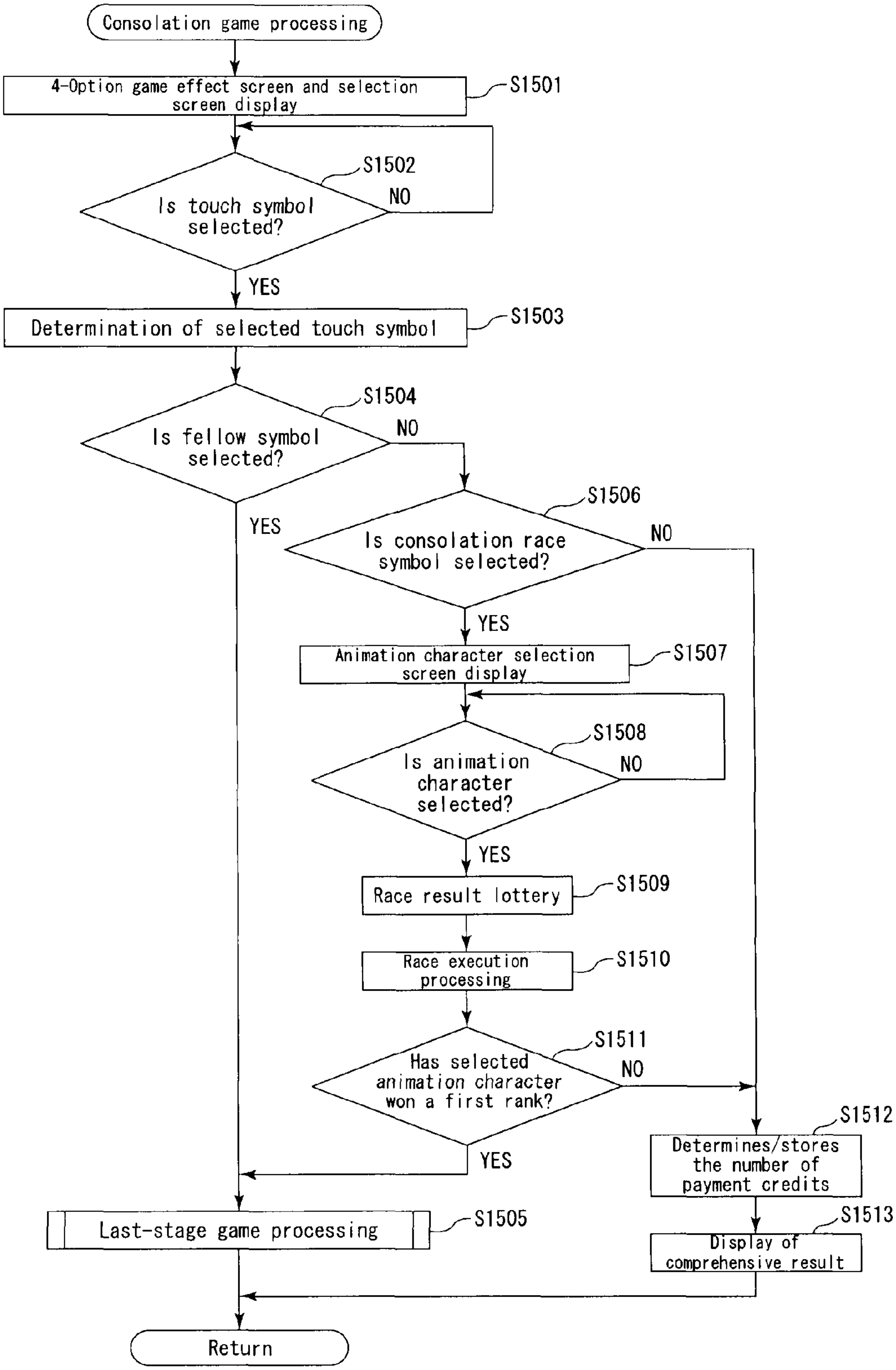
FIG. 37 is a view showing a flowchart of consolation game processing of the gaming machine according to the sixth embodiment of the present invention.

Next, with reference to FIG. 37, the consolation game processing executed in step S1407 of FIG. 36 will be described. FIG. 37 is a view showing a flowchart of the consolation game processing of the gaming machine according to the sixth embodiment of the present invention.

First, the main CPU 71 causes the lower image display panel 141 to display an effect image related to introduction of a 4-option game in step S1501 and then display a selection screen which prompts a player to select one touch symbol 351 from among the displayed four touch symbols 351 (see FIG. 35A). Any of fellow animation character, credit payment, and credit payment with consolation race is associated in advance with a respective one of the touch symbols 351 by means of lottery, and a correlation therebetween is displayed on the lower image display panel 141 in an aspect that it cannot be visually recognized.

Next in step S1502, the main CPU 71 determines whether or not any touch symbol 351 is selected on the above selection screen. Specifically, the main CPU 71 determines whether or not a site corresponding to any touch symbol 351 is touched on the touch panel 114. In a case where the main CPU 71 determines that the touch symbol 351 is not selected, the main CPU 71 causes the routine to revert to step S1502.

In a case where the main CPU 71 determines that the touch symbol 351 is selected, the main CPU 71 makes determination of the selected touch symbol 351 in step S1503. That is, the main CPU 71 determines with which of fellow animation character, credit payment, and credit payment with consolation race the touch symbol 351 is associated.

Next in step S1504, the main CPU 71 determines that the selected touch symbol 351 corresponds to a fellow animation character, based on the determination result in step S1503.

In a case where the main CPU 71 determines that the selected touch symbol 351 corresponds to the fellow animation character, the main CPU 71 causes the RAM 73 to store the fellow data indicating the fellow animation character and then executes last-stage game processing in step S1505. The last-stage game processing is similar to that described with reference to FIG. 22. Thus, a duplicate description of the above step is omitted here.

In step S1504, in a case where the main CPU 71 determines that the selected touch symbol 351 does not correspond to the fellow animation character, the main CPU 71 determines whether or not the selected touch symbol 351 corresponds to credit payment with consolation race in step S1506. In a case where the main CPU 71 determines that the selected touch symbol 351 corresponds to the credit payment with consolation race, the main CPU 71 causes the lower image display panel 141 to display an image which prompts a player to select a desired race animation character employed in a consolation race in step S1507 (see FIG. 35C).

Next in step S1508, the main CPU 71 determines whether or not any race animation character is selected in the selection screen. Specifically, the main CPU 71 determines that a site corresponding to any race animation character image 356 is touched on the touch panel 114. In a case where the main CPU 71 determines that the race animation character is not selected, the main CPU 71 causes the routine to revert step S1508.

In a case where the main CPU 71 determines that the race animation character is selected, the main CPU 71 executes processing of determining a result of the consolation race by means of lottery in step S1509. Specifically, the main CPU 71 selects one item of race data from among a plurality of items of race data stored in advance in the ROM 72, by means of lottery. The above items of race data include at least one item of data indicating the order of arrival of each of the race animation characters and one item of data related to an effect produced in race.

Next in step S1510, the main CPU 71 conducts processing of executing an effect of a consolation race, based on the race data selected in step S1509.

Next in step S1511, the main CPU 71 determines whether or not the order of arrival of the selected race animation character is a first rank, based on the lottery result in step S1509. In a case where the main CPU 71 determines the order of arrival is the first rank, the main CPU 71 causes the RAM 73 to store the fellow data indicating a fellow animation character to be awarded, and causes the routine to revert to step S1505.

Next in step S1511, in a case where the CPU 71 determines that the order of arrival is not the first rank or in step S1506, in a case where the CPU 71 determines that the selected touch symbol 351 does not correspond to credit payment with consolation race, the main CPU 71 makes determination of credit payment to be awarded and then cumulatively stores the determined number of credits in the RAM 73 in step S1512.

Next in step S1512, the main CPU 71 causes the lower image display panel 141 to display a comprehensive result in the 29-option game (total number of credits acquired by a player in the 29-option game). After the processing of step S1505 or the processing of step S1513 has been executed, this subroutine is completed.

The ROM 72 and the RAM 73 in the embodiment constitute a memory in the present invention. The memory in the present invention may be thus comprised of a plurality of storage devices or may be comprised of one storage device. The 29-option game in the embodiment corresponds to a first feature game of the present invention; the consolation game in the embodiment corresponds to a second feature game of the present invention; the touch symbols 281 and the touch symbols 351, of the embodiment, correspond to options in the present invention; the fellow animation characters in the embodiment correspond to specific items related to the first feature game, in the present invention; and the fellow animation data in the embodiment corresponds to specific item data in the present invention. Selecting a touch symbol 281 corresponding to a 2-option game in a 29-option game and then selecting a touch symbol 295 corresponding to a fellow animation character in the 2-option game to be subsequently played, in the embodiment, corresponds to a predetermined specific item acquisition condition in the present invention. Selecting a touch symbol 281 corresponding to a last-stage game in a 29-option game, in the embodiment, corresponds to a predetermined stage migration condition in the present invention.

With the gaming machine 1 according to the sixth embodiment, in a 29-option game (first feature game), any touch symbol is selected from among a plurality of touch symbols. At a time point when a touch symbol 281 corresponding to a last-stage game is selected, in a case where a fellow animation character has been acquired so far, a payment is awarded based on the touch symbol. Alternatively, at a time point when the touch symbol 281 corresponding to the last-stage game is selected, in a case where no fellow animation characters have been acquired so far, a consolation game (second feature game) is executed. In a case where a player has won the consolation game, a payment is awarded based on the fellow animation character acquired by the player. In general, in a feature game, a player plays a game while strongly expecting that a large amount of payment is acquired. Thus, if the feature game completes while the large amount of payment cannot be acquired, the player feels that the expectation is disappointed, and as a result, the player's motivation or interest may be declined. In this regard, with the gaming machine 1 according to the sixth embodiment, in a case where a fellow animation character is not acquired in a 29-option game, a consolation game is executed. Thus, a chance that a payment can be acquired one more time can be imparted to such an almost disappointed player. In addition, it becomes possible to cause a player to be strongly impressed with the fact that a bailout is taken. Therefore, even if the player has not successfully won the consolation game, it is possible to prevent the player's motivation or interest for game from being declined.

With the gaming machine 1 according to the sixth embodiment, when a 29-option game is selected in a 3-option bonus game executed in response to the fact three bonus symbols 250 are stop-displayed in a normal game, the 29-option game is executed; and when a predetermined payment is selected, the predetermined payment is awarded. In addition to these, a plurality of bonuses are provided. In a case where the 3-option bonus game is thus played, a variety of payments can be made according to a type of a selected bonus. Thus, it is possible to cause a player to pay one's attention while holding a sense of expectation as to which bonus is selected.

In a case where a 29-option game is selected in spite of the fact that a predetermined payment is reliably awarded when the predetermined payment is selected, if the 29-option game completes while a fellow animation character is not acquired and a large amount of payment cannot be acquired, there arise a higher possibility that there arises a circumstance that a player feels that one's expectation is disappointed. In this regard, with the gaming machine 1 according to the sixth embodiment, even in a case where a fellow animation character could not be acquired in a 29-option game, a consolation game is executed. Thus, it becomes possible to cause the player to be strongly impressed with the fact that a bailout is taken and a possibility that the above-described circumstance arises can be reduced.

With the gaming machine 1 according to the sixth embodiment, in a consolation game, a player can select any of a plurality of race animation characters via the touch panel 114. In a case where an effect image is displayed indicating how the selected race animation character has won a race, a payment is awarded according to the race animation character. Therefore, the player can feel a sense of affinity or a sense of community with the animation character for race through activity of cheerleading winning of one's own selected animation character for race or acquiring a payment according to the animation character for race. As a result, it is possible to drive the player to be engaged in the play of game(s) and feel an attachment to game(s).

The sixth embodiment described a case in which: a predetermined specific item acquisition condition is that a touch symbol 281 corresponding to a 2-option game is selected in a 29-option game; and a touch symbol 295 corresponding to a fellow animation character is selected in the 2-option game to be subsequently played. However, the predetermined specific item acquisition condition of the present invention is not limitative thereto. For example, a predetermined option (for example, a touch symbol corresponding to a fellow animation character) may be selected in a 29-option game.

The sixth embodiment described a case in which a 29-option game is executed in accordance with a selection result in a 3-option bonus game. However, a first feature game of the present invention may be determined to be executed, based on a result of a normal game, without the play of a bonus game or the like.

The sixth embodiment described a case in which the lower image display device 141, i.e., a symbol display device of the present invention displays an image related to selection or an effect image in a consolation game. However, an image related to a second feature game, of the present invention, may be displayed on a display device different from the symbol display device that is included in the gaming machine (for example, an upper image display device) or an external display device.

Other aspects of the consolation game can include the following. In the following description, like constituent elements of the gaming machine 1 according to the sixth embodiment are designated by like reference numerals, and the concept common to the sixth embodiment will be described using like terms of the sixth embodiment. That is, in a case where a touch symbol 281 corresponding to a last-stage game is selected in a 29-option game and any one type of fellow animation character is not acquired at that time point (any one item of fellow data is not stored in the RAM 73), a feature game is executed in which any touch symbol is selected from among a plurality of touch symbols (for example, 5 touch symbols) associated with any of the fellow animation character and credit payment. In a case where a touch symbol corresponding to the fellow animation character is selected in this feature game, a last-stage game is executed. In a case where a touch symbol corresponding to credit payment is selected, a special feature game is executed in which any touch symbol is selected from among a plurality of touch symbols (for example, 20 touch symbols) associated with any of the fellow animation character, credit payment, and end of the game, at a predetermined probability (for example, ¼). Further, in a case where a touch symbol corresponding to a fellow animation character is selected in this special feature game, a game corresponding to the fellow animation character (for example, a roulette game corresponding to a fellow animation character) is executed, and a payment is awarded according to a result of the game.

Seventh Embodiment

A seventh embodiment describes the invention of (7). In the following description, like constituent elements of the gaming machine 1 according to the foregoing embodiment are designated by like reference numerals and are explained. A duplicate description is omitted with respect to a case where the descriptive matters in the foregoing embodiments apply for the seventh embodiment as well.

Figure 38:
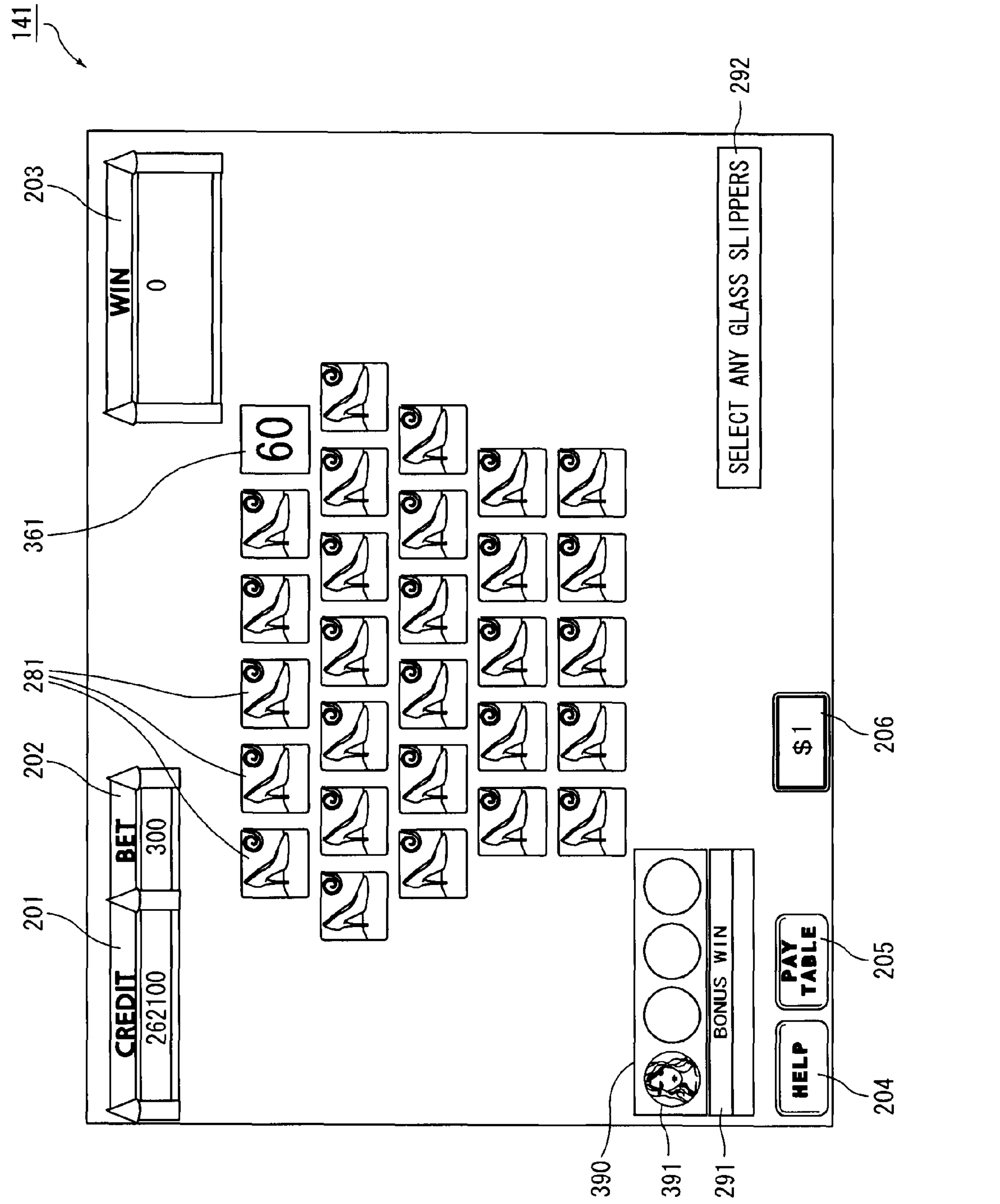
FIG. 38 is a view showing an example of an image displayed on the lower image display panel included in the gaming machine according to the seventh embodiment of the present invention.

First, with reference to FIG. 38, an outline of the seventh embodiment will be described. FIG. 38 is a view showing an example of an image displayed on a lower image display panel included in a gaming machine according to the seventh embodiment of the present invention.

FIG. 38 shows how a 60-credits icon 361 is displayed in place of the touch symbol 281 disposed at the uppermost right of 29 touch symbols 281, described in the fifth embodiment. A payout of 60 credits is associated with the touch symbol 281, and 60-credits icon 361 indicates "60 credits" which is the content of the touch symbol 281. The display of the 60-credits icon 361 continues until a 29-option game completes. As just described, in the seventh embodiment, the icon indicating the content of the touch symbol 281, selected by a player in a 29-option game, is continuously displayed on a selection screen until the 29-option game completes.

FIG. 38 also shows how an animation character icon 391 is displayed in an animation character icon display region 390. The animation character icon 391 is an icon indicating a fellow animation character acquired in a 2-option game. The display of the animation character icon 391 also continues until a 29-option game completes.

The icon indicating the content of the touch symbol 281 selected in the 29-option game (for example, 60 credits icon 361) and the icon indicating the fellow animation character in the 2-option game (for example, animation character icon 391) correspond to "the content related to a selected option" in the invention of (7).

Figure 39:
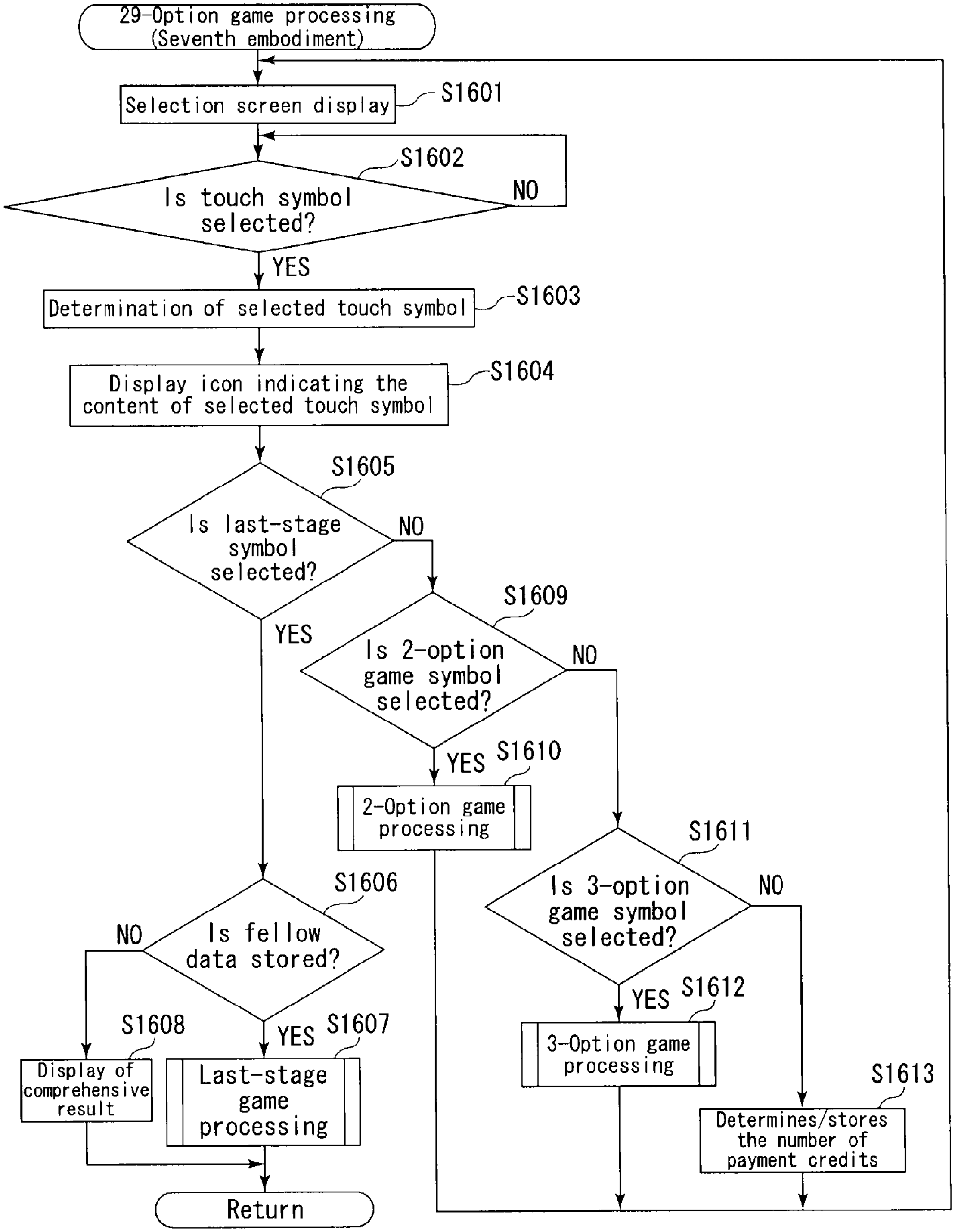
FIG. 39 is a view showing a flowchart of 29-option game processing of the gaming machine according to the seventh embodiment of the present invention.

Hereinabove, the outline of the seventh embodiment has been described with reference to FIG. 38. Next, with reference to FIG. 39, 29-options game processing will be described. FIG. 39 is a view showing a flowchart of the 29-option game processing conducted by a gaming machine according to the seventh embodiment of the present invention.

First, the main CPU 71 executes the processing of step S1601 to step S1603. The processing of these steps is similar to that of step S401 to step S403 described with reference to FIG. 16. Thus, a duplicate description of these steps is omitted here.

After executing step S1603, the main CPU 71 displays an icon indicating the content of a selected touch symbol 281 (for example, 60 credits icon 361) (step S1604). The CPU 71 then continues the display until a 29-option game completes.

Next, the main CPU 71 executes the processing of step S1605 to step S1613. The processing of these steps is substantially similar to that of step S404 to step S412 described with reference to FIG. 16. Thus, only difference from the description of FIG. 16 will be explained.

In the processing of step S1610 (2-option game processing), the main CPU 71 causes the RAM 73 to store the fellow data indicating the acquired fellow animation character (see step S505 of FIG. 18) and then causes an animation character icon display region 390 to display an icon indicating the fellow animation character (for example, character icon 391). Afterwards, the main CPU 71 continues the display until a 29-option game completes.

As described in the first embodiment, when a touch symbol 281 corresponding to a last-stage game is then selected, a roulette lottery game is executed based on the fellow animation characters that have been acquired so far.

Fellow data corresponds to specific item data in the invention of (7). A RAM 73 corresponds to a memory in the invention of (7). A roulette lottery game corresponds to an animation character game in the invention of (7). Hereinabove, the seventh embodiment has been described with reference to FIG. 38 and FIG. 39.

The seventh embodiment described a case in which the content related to a touch symbol 281 selected in a 29-option game is displayed by way of icon, and is notified to a player. However, processing (C) in the invention of (7) is not limitative to the processing of displaying an image on a display. For example, the content related to a selected option may be notified to a player by way of speech or may be notified to a player by allowing a lamp to light up according to the content.

The seventh embodiment described the content related to a touch symbol 281 selected in a 29-option game by way of example of "60 credits" and fellow animation character acquired in a 2-option game. However, "the content related to a selected option" in the invention of (7) is not limitative thereto. "The content related to a selected option" also include "a jackpot" (see the fifth embodiment) or "a two-option game". A touch symbol 281 whose content is "60 credits" corresponds to a fixed payment option in the invention of (7).

The seventh embodiment assumes that; the amount of credit payment is determined every time a touch symbol 281 with which a predetermined number of credits are associated is selected; and a value corresponding to the determined amount is added to a value stored in a number-of-credits storage area provided in the RAM 73. That is, every time a fixed payment option is selected, gaming media whose amount corresponds to the fixed payment option is awarded. However, in the invention of (7), when a feature game completes, a total amount of gaming media according to each of the fixed payment options selected through a period of the feature game may be awarded at one time. In this case, every time a fixed payment option is selected, the amount of gaming media which is the content of the fixed payment option may be cumulatively counted in a storage device such as a RAM.

According to the seventh embodiment of the present invention, any option is selected from among a plurality of options in a feature game played in the wake of the fact that a predetermined condition is established in a normal game. A payment is then awarded based on the contents related to the selected option. The contents related to options can include a predetermined animation character or the amount of gaming media and the like. During a period in which the feature game is executed, the content related to the selected option is continuously notified. For example, a display mode of an image (for example, card) according to a selected option changes from a display mode disabling the contents of the option to be visually recognized (for example, faced-down card) to a display mode enabling the contents to be visually recognized (for example, faced-up card). The display mode after changed continues during the period in which the feature game is executed. As just described, the content related to the selected option is continuously notified during the period in which the feature game is executed, thus imparting a yardstick to a player as to the amount of payment acquirable in the feature game.

According to the seventh embodiment of the present invention, at a time point when a predetermined stage migration condition is established (for example, at a time point when a predetermined option is selected), an animation character game is executed based on specific item data (data indicating animation character) stored in a memory. Afterwards, a payment is awarded based on a result of the animation character game. According to the seventh embodiment of the present invention, during a period in which a feature game is executed, an animation character indicated by the specific item data stored in a memory is continuously notified. Therefore, when the predetermined stage migration condition is established, a player can keep track of what kind of animation character game is to be played.

According to the seventh embodiment of the present invention, a total amount of gaming media which is the content of each of the fixed payment options selected in a feature game is awarded. During a period in which the feature game is executed, the amount of gaming media which is the content of each of the fixed payment options already selected is continuously notified. Therefore, a player can keep track of the amount of gaming media determined to be acquired at a current time point.

According to the seventh embodiment of the present invention, when a player acquires an animation character in a 2-option game that can be played in a 29-option game, an animation character icon 391 is displayed in an animation character icon display region 390. In this manner, the player can feel as if one's own fellows were collected through the 29-options game. As a result, it is possible to cause the player to be engaged in the play of game(s). As more animation characters are acquired, more animation character icons 391 are displayed in the character icon display region 390, thereby making it possible to tickle the player's collecting craze of desiring to collect more animation characters.

While the embodiments of the present invention has been described hereinabove, these embodiments are merely illustrated as specific examples and are not intended to limit the present invention in particular, and specific features such as means can be appropriately changed in design. The advantageous effects described in the embodiments of the present invention are merely enumerated as the most preferred effects derived from the present invention, and the advantageous effects according to the present invention is not limitative to those described in the embodiments of the present invention.

The foregoing detailed description focused on characterizing features so as to make the present invention more easily understandable. The present invention is not limitative to the embodiments set forth in the foregoing detailed description and is applicable to other embodiments, applicable scope of which is variable. The terms and wordings used in the present specification are intended to accurately explain the present invention and are not intended to limit interpretation of the present invention. It would have been obvious to one skilled in the art to conceive another configuration, system, or method and the like, based on the concept of the invention described in the present specification. Therefore, the recitations of the claims must be treated as being inclusive of equivalent features without deviation from the scope of technical idea of the present invention. An object of the abstract is to enable personnel in patent office(s) and general public institution(s) or engineers involved in the technical field, which are unfamiliar with patent, legal terms or terminologies, to readily determine technical contents of the present application and its essence through simple research. Therefore, the abstract is not intended to limit the scope of the invention to be evaluated in accordance with the recitations of the claims. Further, in order to fully understand the object(s) of the present invention and the advantageous effects specific to the present invention, it is desired to construe them in full consideration of the disclosed literature or the like.

The foregoing detailed description includes computer-implemented processing. The foregoing descriptive matters and expressions are set forth in such a manner enabling one skilled in the art to understand them most efficiently. In the present specification, the steps used to derive one result should be understood as self-consistent processing. In each of the steps, electrical or magnetic signal transmission/reception or recording and the like is performed. In the processing of each of the steps, while such signals are expressed by bits, values, symbols, characters, terms, or numerals and the like, it should be noted that these expressions are merely used because of their explanatory convenience. While the processing in each of the steps may be described in expressions common to human action(s), the processing described in the present specification is executed by various devices in principle. Other features required to execute the steps are self-evident from the foregoing description.

The foregoing detailed description explained the first embodiment to the seventh embodiment separately. However, it is possible to appropriately combine the features according to these embodiments with each other. By combining the features according to these embodiments with each other, it is possible to provide a gaming machine having higher entertainability and a gaming machine control method.

What is claimed is:

1. A gaming machine, comprising:
a symbol display device which is capable of variably displaying a plurality of symbols;
an input device which is capable of inputting an instruction related to a game; and
a controller programmed to execute processing of:
(A) executing a normal game in which the symbol display device variably displays and then stop-displays symbols;
(B) triggering a bonus game when a plurality of specific symbols are stop-displayed, in the normal game executed in the processing (A), the plurality of specific symbols including a first specific symbol and a second specific symbol for providing a lower benefit than the first specific symbol;
(C) indicating a player to select any one of the plurality of specific symbols stop-displayed, in the bonus game;
(D) accepting in the input device an input of selecting any one of the plurality of specific symbols;
(E) awarding a benefit according to the specific symbol selected in the processing (D);
(F) determining whether or not to generate a specific game state when the specific symbol selected in the processing (D) is the second specific symbol;
(G) when it is determined that the specific game state is generated in the processing (F), indicating the player to select an additional specific symbol;
(H) accepting in the input device an input of selecting the additional specific symbol;
(I) awarding a benefit according to the additional specific symbol selected in the processing (H); and
(J) displaying a benefit according to a specific symbol that is not selected in the processing (D) or (H).

2. The gaming machine according to claim 1, wherein the processing (F) includes processing of determining that the specific game state is generated at a probability according to the specific symbol selected in the processing (D).

3. The gaming machine according to claim 1, wherein:
the benefit according to the specific symbol selected in the processing (D) includes a predetermined payment when the specific symbol selected in the processing (D) includes a predetermined payment symbol; and
the processing (F) is processing of determining whether or not to generate the specific game state, in response to the predetermined payment symbol.

4. The gaming machine of claim 3, wherein benefits of different types from each other are associated with the plurality of specific symbols stop-displayed.

5. The gaming machine of claim 4, wherein the benefit according to the specific symbol selected in the processing (D) includes execution of a special game other than the normal game and the bonus game when the specific symbol selected in the processing (D) includes a symbol other than the predetermined payment symbol.

6. The gaming machine according to claim 5, wherein:
the special game includes at least one kind of game of a predetermined number of free games and a feature game;
the free game is a game in which even if no gaming media are betted, the symbol display device variably displays and then stop-displays symbols; and
the feature game is a game in which an input of selecting any option from among a plurality of options is accepted from the input device; and a benefit associated with the option selected by the input is awarded.

7. A gaming machine control method, comprising the steps of:
(A) a controller executing a normal game in which a symbol display device which is capable of variably displaying a plurality of symbols variably displays and then stop-displays symbols;

(B) the controller triggering a bonus game when a plurality of specific symbols are stop-displayed, in the normal game executed in the step (A), the plurality of specific symbols including a first specific symbol and a second specific symbol for providing a lower benefit than the first specific symbol;

(C) the controller indicating a player to select any one of the plurality of specific symbols stop-displayed, in the bonus game;

(D) the controller accepting in the input device an input of selecting any one of the plurality of specific symbols;

(E) the controller awarding a benefit according to the specific symbol selected in the step (D);

(F) the controller determining whether or not to generate a specific game state when the specific symbol selected in the step (D) is the second specific symbol;

(G) when it is determined that the specific game state is generated in the step (F), the controller indicating the player to select an additional specific symbol;

(H) the controller accepting in the input device an input of selecting the additional specific symbol;

(I) the controller awarding a benefit according to the additional specific symbol selected in the step (H); and (J) the controller displaying a benefit according to a specific symbol that is not selected in the processing (D) or (H).

* * * * *